(12) United States Patent
Yoshino et al.

(10) Patent No.: US 7,225,341 B2
(45) Date of Patent: May 29, 2007

(54) MEMORY ACCESS CONTROL SYSTEM AND MANAGEMENT METHOD USING ACCESS CONTROL TICKET

(75) Inventors: Kenji Yoshino, Tokyo (JP); Yoshihito Ishibashi, Tokyo (JP); Taizo Shirai, Tokyo (JP); Masayuki Takada, Tokyo (JP)

(73) Assignee: Sony Corporation (JP)

( * ) Notice: Subject to any disclaimer, the term of this patent is extended or adjusted under 35 U.S.C. 154(b) by 650 days.

(21) Appl. No.: 10/276,432

(22) PCT Filed: Mar. 7, 2002

(86) PCT No.: PCT/JP02/02112

§ 371 (c)(1),
(2), (4) Date: Apr. 8, 2003

(87) PCT Pub. No.: WO02/076012

PCT Pub. Date: Sep. 26, 2002

(65) Prior Publication Data

US 2003/0149854 A1 Aug. 7, 2003

(30) Foreign Application Priority Data

Mar. 15, 2001 (JP) .............................. 2001-073352

(51) Int. Cl.
*G06F 17/30* (2006.01)
*G06F 21/24* (2006.01)
*G06F 21/02* (2006.01)

(52) U.S. Cl. ....................... 713/193; 713/185; 713/183

(58) Field of Classification Search .................... None
See application file for complete search history.

(56) References Cited

U.S. PATENT DOCUMENTS 5,025,367 A * 6/1991 Gurd et al. ................. 707/206

(Continued)

FOREIGN PATENT DOCUMENTS

EP 71002 A2 * 2/1983

(Continued)

OTHER PUBLICATIONS

D. Hagimont, et al., "JCCap: capability-based access control for Java Card", 4th Smart Card Research and Advanced Application Conference, Sep. 2000, pp. 1-20.
Masaki Kyojima, et al., "Ticket Authentication Protocols version 1.0", Fuji Xerox Co., Ltd., Jan. 15, 2000, pp. 1-75.

*Primary Examiner*—Kambiz Zand
*Assistant Examiner*—Venkat Perungavoor
(74) *Attorney, Agent, or Firm*—Lerner, David, Littenberg, Krumholz & Mentlik, LLP

(57) ABSTRACT

To provide a memory access control system in which partitions, which are divided memory areas generated in a device, can be independently managed. In response to access to the divided memory areas, which are a plurality of partitions, various types of access control tickets are issued under the management of each device or partition manager, and processing based on rules indicated in each ticket is performed in a memory-loaded device. A memory has a partition, which serves as a memory area managed by the partition manager, and a device manager management area managed by the device manager. Accordingly, partition authentication and device authentication can be executed according to either a public-key designation method or a common-key designation method.

46 Claims, 99 Drawing Sheets

U.S. PATENT DOCUMENTS

| | | | |
|---|---|---|---|
| 5,628,023 A * | 5/1997 | Bryant et al. ............... | 711/207 |
| 5,915,024 A | 6/1999 | Kitaori et al. | |
| 5,987,134 A | 11/1999 | Shin et al. | |
| 6,061,740 A | 5/2000 | Ferguson et al. | |
| 6,073,234 A | 6/2000 | Kigo et al. | |
| 6,324,087 B1 * | 11/2001 | Pereira ........................ | 365/49 |
| 2002/0112178 A1 * | 8/2002 | Scherr ........................ | 713/200 |

FOREIGN PATENT DOCUMENTS

| | | |
|---|---|---|
| EP | 0 715 247 A1 | 6/1996 |
| EP | 0 984 404 A2 | 3/2000 |
| JP | 4-232586 A1 | 8/1992 |
| JP | 6-222980 A1 | 8/1994 |
| JP | 6-289782 A1 | 10/1994 |
| JP | 7-84959 A1 | 3/1995 |
| JP | 10-3257 A1 | 1/1998 |
| JP | 11-285582 A1 | 10/1999 |
| JP | 2000-148567 A1 | 5/2000 |
| JP | 2000-151583 A1 | 5/2000 |
| JP | 2000-215165 A1 | 8/2000 |

* cited by examiner

FIG. 11

| CERTIFICATE VERSION NUMBER |
|---|
| CERTIFICATE SERIAL NUMBER (SN) ASSIGNED BY ISSUING AUTHORITY (CERTIFICATE AUTHORITY) |
| SIGNATURE ALGORITHM IDENTIFIER FIELD: ALGORITHM AND PARAMETER |
| ISSUING AUTHORITY (CERTIFICATE AUTHORITY) NAME |
| CERTIFICATE VALIDITY DATE FIELD: START TIME AND DATE, END TIME AND DATE |
| PUBLIC KEY CERTIFICATE USER NAME (SUBJECT) |
| USER PUBLIC KEY FIELD: KEY ALGORITHM AND KEY INFORMATION (KEY ITSELF) |
| OPTION AREA (ATTRIBUTES, etc.) |
| ISSUING AUTHORITY (CRTIFICATE AUTHORITY) SIGNATURE |

FIG. 23

| | |
|---|---|
| Ver | IRL_PAR |
| Ver | CRL_PAR |
| Ver | Kdut_PAR4 |
| Ver | kdut_PAR3 |
| Ver | Kdut_PAR2 |
| Ver | Kdut_PAR1 |
| Ver | Kfrt |
| Ver | CERT_PAR |
| Ver | PRI_PAR |
| Ver | PARAM_PAR |
| Ver | PUB_CA(PAR) |
| Ver | Kauth_PAR_B |
| Ver | MKauth_PAR_A |

PARTITION KEY AREA (VARIABLE LENGTH)

HAVING VERSION INFORMATION FOR EACH ITEM

FIG. 25

| TYPE CODE | FILE STRUCTURE TYPE |
|---|---|
| 0001 | RANDOM |
| 0002 | PURSE |
| 0003 | CYCLIC |
| 0004 | LOG |
| 0005 | KEY |
| 0006 | COMPOSITE FILE 1 |
| 0007 | COMPOSITE FILE 2 |

FIG. 26

| |
|---|
| TICKET TYPE (=PRT) |
| FORMAT VERSION |
| TICKET ISSUING MEANS (=DMC) |
| SERIAL NUMBER |
| SIZE OF TICKET |
| AUTHENTICATION FLAG |
| TICKET USER GROUP |
| AUTHENTICATION TYPE |
| TICKET USER IDENTIFIER |
| PMC |
| PMC VERSION |
| OPERATION TYPE |
| PARTITION SIZE |
| INTEGRITY CHECK TYPE |
| INTEGRITY CHECK VALUE |

FIG. 27

| |
|---|
| TICKET TYPE (=FRT) |
| FORMAT VERSION |
| TICKET ISSUING MEANS (=PMC) |
| SERIAL NUMBER |
| SIZE OF TICKET |
| AUTHENTICATION FLAG |
| TICKET USER GROUP |
| AUTHENTICATION TYPE |
| TICKET USER IDENTIFIER |
| SPTIC |
| SPTIC VERSION |
| FILE ID |
| OPERATION TYPE |
| FILE SIZE |
| FILE STRUCTURE TYPE |
| ACCEPTABLE AUTHENTICATION TYPE |
| Kspt_ENCRYPTED |
| INTEGRITY CHECK TYPE |
| INTEGRITY CHECK VALUE |

FIG. 28

| |
|---|
| TICKET TYPE (=SPT) |
| FORMAT VERSION |
| TICKET ISSUING MEANS (=PMC) |
| SERIAL NUMBER |
| SIZE OF TICKET |
| AUTHENTICATION FLAG |
| TICKET USER GROUP |
| AUTHENTICATION TYPE |
| TICKET USER IDENTIFIER |
| FILE ID |
| FILE ACCESS MODE |
| INTEGRITY CHECK TYPE |
| INTEGRITY CHECK VALUE |

FILE ID and FILE ACCESS MODE } PAIR

FIG. 29

| ACCESS MODE CODE | ACCESS MODE | ACCESS MODE CODE | ACCESS MODE | ACCESS MODE CODE | ACCESS MODE |
|---|---|---|---|---|---|
| 0001 | READ | 0011 | DELETE | 0021 | REGISTER CERTIFICATE |
| 0002 | WRITE | 0012 | ADD | 0022 | VERIFY CERTIFICATE |
| 0003 | ENCRYPTION READ | 0013 | SUB | 0023 | GENERATE KEY PAIR |
| 0004 | ENCRYPTION WRITE | 0014 | COMPARE | 0024 | VERIFY KEY PAIR |
| 0005 | READ WITH MAC | 0015 | ENCRYPT | 0025 | MUTUAL AUTHENTICATION |
| 0006 | WRITE WITH MAC | 0016 | DECRYPT | 0026 | MONEY DEPOSIT |
| 0007 | ENCRYPTION READ WITH MAC | 0017 | GENERATE SIGNATURE | 0027 | MONEY WITHDRAW |
| 0008 | ENCRYPTION WRITE WITH MAC | 0018 | VERIFY SIGNATURE | 0028 | |
| 0009 | ONLY WRITE | 0019 | GENERATE MAC | 0029 | |
| 0010 | WRITE ONCE | 0020 | VERIFY MAC | 0030 | |

FIG. 30

| FILE STRUCTURE | ACCESS MODE | PERMISSION COMMAND | FILE STRUCTURE | ACCESS MODE | PERMISSION COMMAND |
|---|---|---|---|---|---|
| RANDOM | READ | READ | COMPOSITE FILE (e-MONEY) | MONEY DEPOSIT | DEPOSIT |
| | WRITE | WRITE | | MONEY WITHDRAW | WITHDRAW |
| | ENCRYPTION READ | ENCREAD | | | MAKE RECEIPT |
| | ENCRYPTION WRITE | ENCWRITE | | | READ RECEIPT |
| | READ WITH MAC | MACREAD | | | |
| | WRITE WITH MAC | MACWRITE | | | |
| | ENCRYPTION READ WITH MAC | ENCMACREAD | | | |
| | ENCRYPTION WRITE WITH MAC | ENCMACWRITE | | | |

FIG. 32

| DUT(DEV) |
|---|
| TICKET TYPE (=DUT(DEV)) |
| FORMAT VERSION |
| TICKET ISSUING MEANS (=DMC) |
| SERIAL NUMBER |
| SIZE OF TICKET |
| TICKET USER GROUP |
| TICKET USER IDENTIFIER |
| AUTHENTICATION TYPE |
| ENCRYPTION FLAG |
| OLD DATA CODE |
| DATA VERSION RULE |
| DATA VERSION CONDITION |
| SIZE OF NEW DATA |
| NEW DATA |
| NEW DATA VERSION |
| INTEGRITY CHECK TYPE |
| INTEGRITY CHECK VALUE |

| DUT(PAR) |
|---|
| TICKET TYPE (=DUT(PAR)) |
| FORMAT VERSION |
| TICKET ISSUING MEANS (=PMC) |
| SERIAL NUMBER |
| SIZE OF TICKET |
| TICKET USER GROUP |
| TICKET USER IDENTIFIER |
| AUTHENTICATION TYPE |
| ENCRYPTION FLAG |
| OLD DATA CODE |
| DATA VERSION RULE |
| DATA VERSION CONDITION |
| SIZE OF NEW DATA |
| NEW DATA |
| NEW DATA VERSION |
| INTEGRITY CHECK TYPE |
| INTEGRITY CHECK VALUE |

FIG. 33

| CODE | DATA TO BE UPDATED (NEW DATA) | CODE | DATA TO BE UPDATED (NEW DATA) | CODE | DATA TO BE UPDATED (NEW DATA) |
|---|---|---|---|---|---|
| 0001 | DMC | 0011 | DUTIC_PAR | 0021 | MKauth_DEV_A |
| 0002 | DMC VERSION | 0012 | DUTIC_PAR VERSION | 0022 | Kauth_DEV_B |
| 0003 | PMC | 0013 | Kdut_DEV1,2 | 0023 | IRL_DEV |
| 0004 | PMC VERSION | 0014 | Kdut_PAR1,2 | 0024 | IRL_PAR |
| 0005 | PRTIC | 0015 | Kprt | 0025 | |
| 0006 | PRTIC VERSION | 0016 | Kprt VERSION | 0026 | |
| 0007 | FRTIC | 0017 | Kfrt | 0027 | |
| 0008 | FRTIC VERSION | 0018 | kfrt VERSION | 0028 | |
| 0009 | DUTIC_DEV | 0019 | Kspt | 0029 | |
| 0010 | DUTIC_DEV VERSION | 0020 | Kspt VERSION | 0030 | |

FIG. 51

| GROUP | PUBLIC-KEY AUTHENTICATOR INFORMATION | SESSION KEY | COMMON-KEY AUTHENTICATOR INFORMATION | SESSION KEY |
|---|---|---|---|---|
| DMC | DN, SERIAL NUMBER, CATEGORY | Kses1 | — | — |
| PMC1 | — | — | ID_RW | Kses2 |
| PMC2 | DN, SERIAL NUMBER, CATEGORY | Kses3 | ID_RW | Kses4 |

FIG. 52

| GROUP | PUBLIC-KEY AUTHENTICATOR INFORMATION | COMMON-KEY AUTHENTICATOR INFORMATION | SESSION KEY |
|---|---|---|---|
| DMC | DN, SERIAL NUMBER, CATEGORY | — | Kses1 |
| PMC1 | — | IDm | Kses2 |
| PMC2 | DN, SERIAL NUMBER, CATEGORY | IDm | Kses3 |

FIG. 68

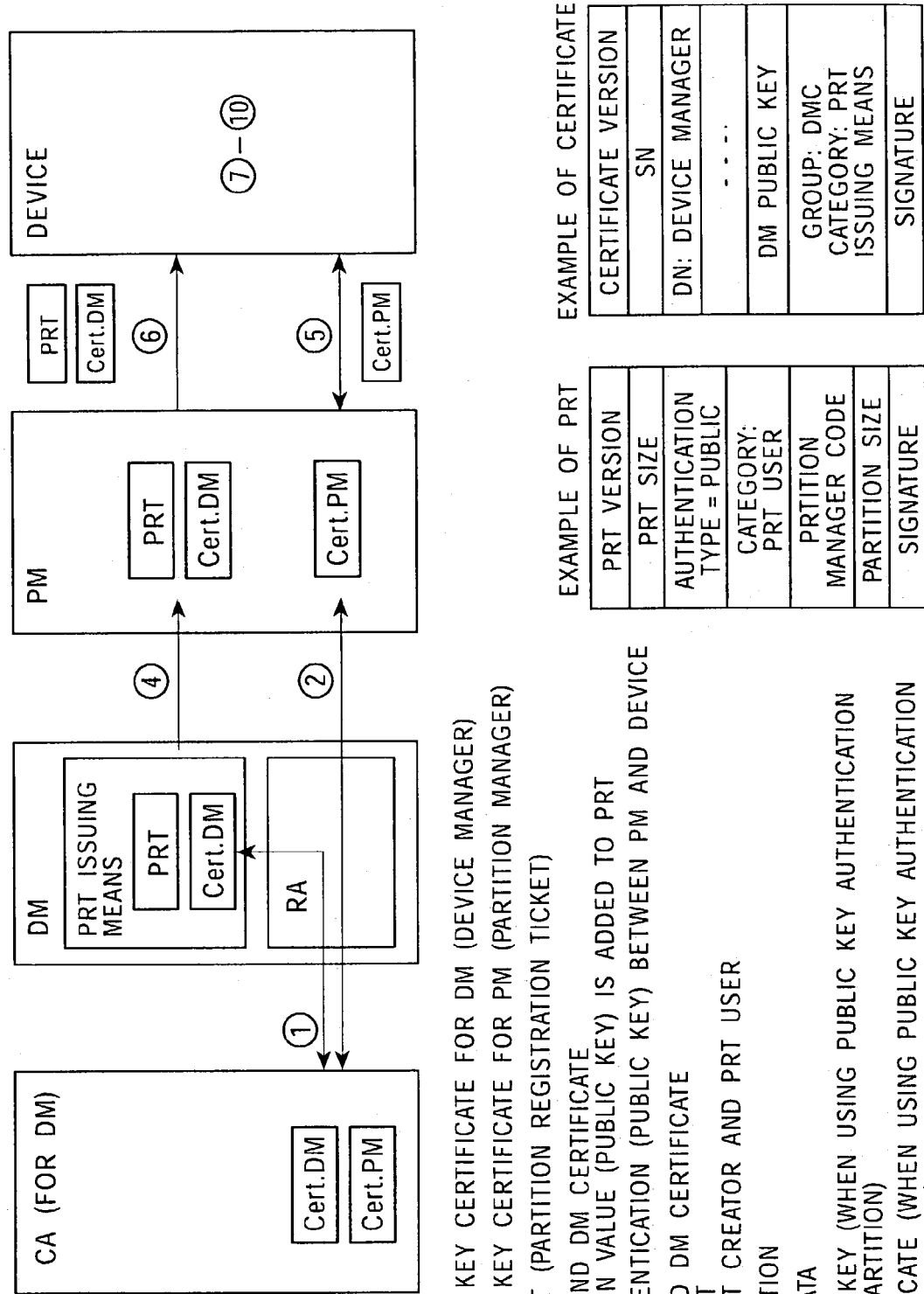

① ISSUE PUBLIC KEY CERTIFICATE FOR DM (DEVICE MANAGER)
② ISSUE PUBLIC KEY CERTIFICATE FOR PM (PARTITION MANAGER)
③ GENERATE PRT (PARTITION REGISTRATION TICKET)
④ SUPPLY PRT AND DM CERTIFICATE
  → VERIFICATION VALUE (PUBLIC KEY) IS ADDED TO PRT
⑤ MUTUAL AUTHENTICATION (PUBLIC KEY) BETWEEN PM AND DEVICE
⑥ SEND PRT AND DM CERTIFICATE
  ↑ VERIFY PRT
  ↑ VERIFY PRT CREATOR AND PRT USER
⑦ CREATE PARTITION
⑧ WRITE KEY DATA
⑨ READ PUBLIC KEY (WHEN USING PUBLIC KEY AUTHENTICATION IN CREATED PARTITION)
⑩ ISSUE CERTIFICATE (WHEN USING PUBLIC KEY AUTHENTICATION IN CREATED PARTITION)

FIG. 69

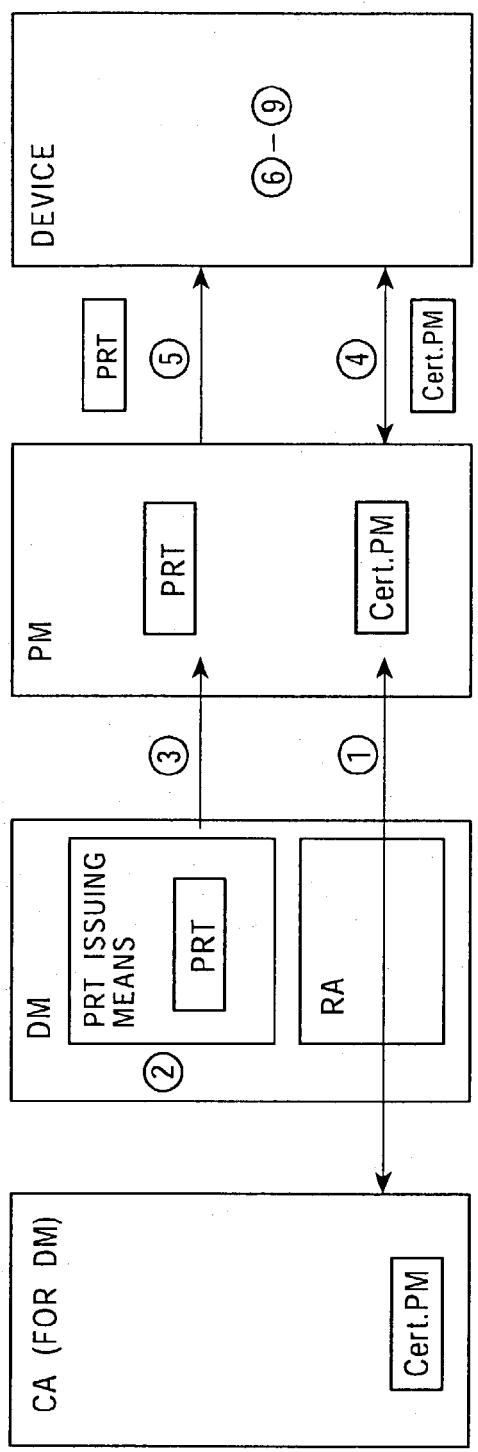
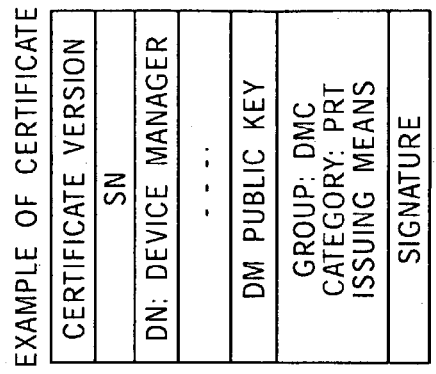
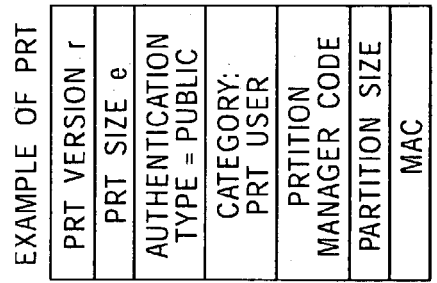

① ISSUE PUBLIC KEY CERTIFICATE FOR PM (PARTITION MANAGER)
② GENERATE PRT (PARTITION REGISTRATION TICKET)
③ SUPPLY PRT
 → VERIFICATION VALUE (COMMON KEY) IS ADDED TO PRT
④ MUTUAL AUTHENTICATION (PUBLIC KEY) BETWEEN PM AND DEVICE
⑤ SEND PRT
 → VERIFY PRT
 → VERIFY PRT CREATOR AND PRT USER
⑥ CREATE PARTITION
⑦ WRITE KEY DATA
⑧ READ PUBLIC KEY (WHEN USING PUBLIC KEY AUTHENTICATION IN CREATED PARTITION)
⑨ ISSUE CERTIFICATE (WHEN USING PUBLIC KEY AUTHENTICATION IN CREATED PARTITION)

FIG. 81

| GROUP | FILE ID | FILE ACCESS MODE |
|---|---|---|
| PMC1 | 0x0001 | ENCRYPTION(ENC), DECRYPTION(DEC) |
| PMC1 | 0x0002 | READ |

FIG. 82

| GROUP | FILE ID | FILE ACCESS MODE | TARGET FILE GROUP | TARGET FILE ID | READ/WRITE PERMISSION |
|---|---|---|---|---|---|
| PMC1 | 0x0001 | ENCRYPTION, DECRYPTION | | | |
| PMC1 | 0x0002 | READ | PMC1 | 0x0001 | READ |

FIG. 90
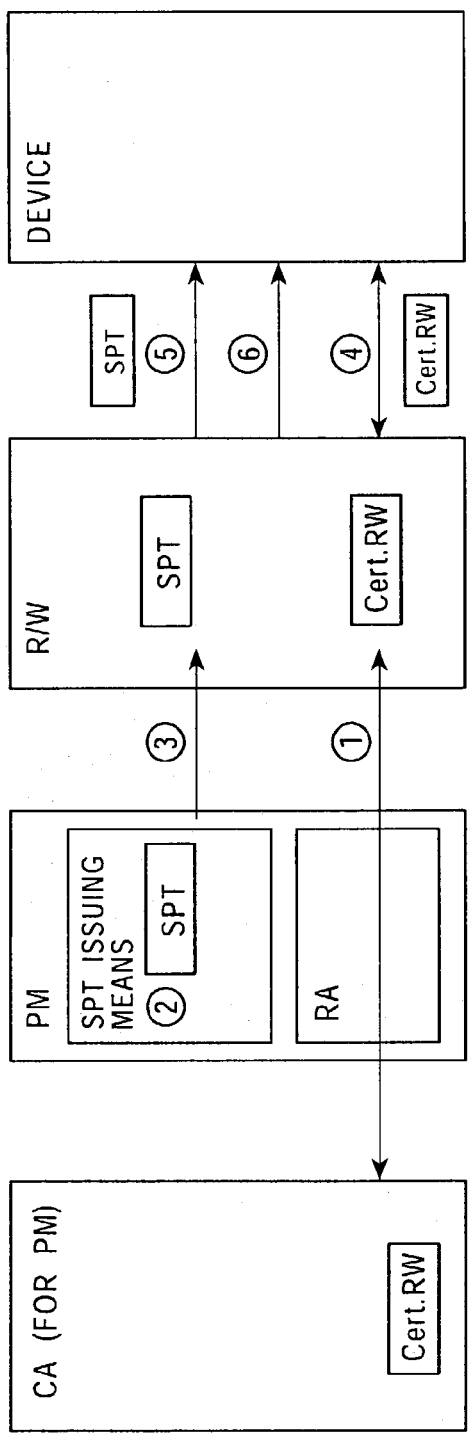
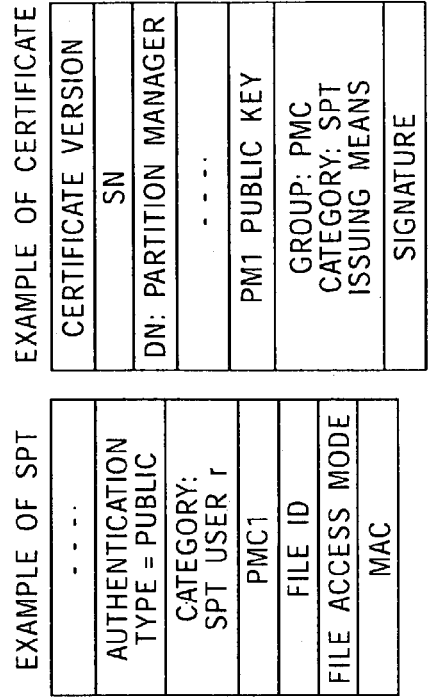
① ISSUE PUBLIC KEY CERTIFICATE FOR R/W
② GENERATE SPT (SERVICE PERMISSION TICKET)
③ SUPPLY SPT
   → VERIFICATION VALUE (COMMON KEY) IS ADDED TO SPT
④ MUTUAL AUTHENTICATION (PUBLIC KEY) BETWEEN R/W AND DEVICE
⑤ SEND SPT
   → VERIFY SPT
   → VERIFY SPT CREATOR AND SPT USER
   → ACCESS RESTRICTION INDICATED IN SPT IS RELEASED
⑥ FILE ACCESS FIG. 92
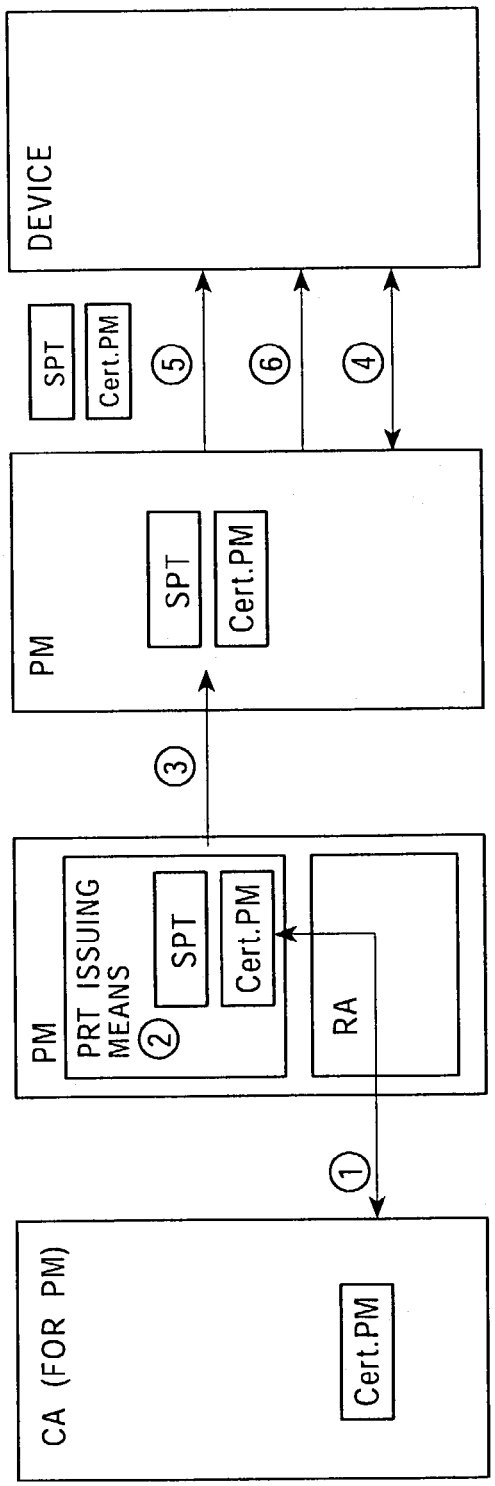
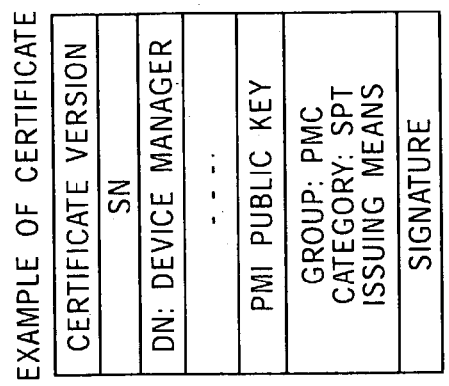
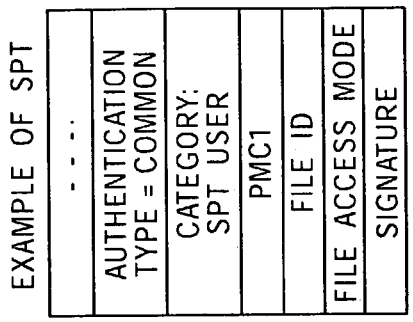
① ISSUE PUBLIC KEY CERTIFICATE FOR PM
② GENERATE SRT (SERVICE PERMISSION TICKET)
③ SUPPLY SPT AND PM CERTIFICATE
 → VERIFICATION VALUE (PUBLIC KEY) IS ADDED TO SPT
④ MUTUAL AUTHENTICATION (COMMON KEY) BETWEEN R/W AND DEVICE
⑤ SEND SPT AND PM CERTIFICATE
 → VERIFY SPT
 → VERIFY SPT CREATOR AND SPT USER
 → ACCESS RESTRICTION INDICATED IN SPT IS RELEASED
⑥ FILE ACCESS

FIG. 95

- WHEN DATA TO BE UPDATED IS Kdut_DEV1,2 OR Kdut_PAR1,2
  (DESCRIPTION IS GIVEN WHEN DATA TO BE UPDATED IS Kdut_DEV1,2)

① ENCRYPT NEW Kdut_DEV1,2 (Kdut_DEV1(NEW), Kdut_DEV2(NEW)) WITH Kdut_DEV4 Kdut_DEV4(Kdut_DEV1(NEW), Kdut_DEV4(Kdut_DEV2(NEW)) STORE ENCRYPTED DATA IN DUT, AND SEND DUT TO DEVICE ② EXTRACT Kdut_DEV1(NEW) AND Kdut_DEV2(NEW), AND OVERWRITE OLD Kdut_DEV1 AND Kdut_DEV2 BY NEW Kdut_DEV1 AND Kdut_DEV2

③ SWAP Kdut_DEV1 AND Kdut_DEV3, AND SWAP Kdut_DEV2 AND Kdut_DEV4

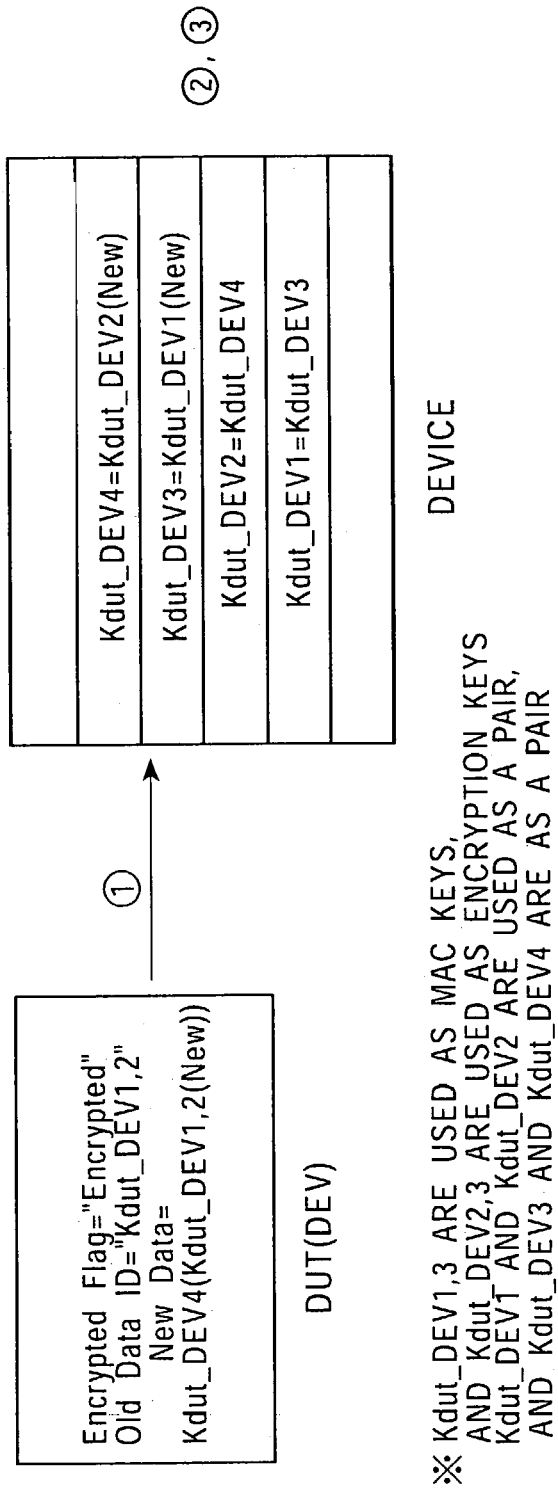

※ Kdut_DEV1,3 ARE USED AS MAC KEYS,
AND Kdut_DEV2,3 ARE USED AS ENCRYPTION KEYS
Kdut_DEV1 AND Kdut_DEV2 ARE USED AS A PAIR,
AND Kdut_DEV3 AND Kdut_DEV4 ARE USED AS A PAIR

MEMORY ACCESS CONTROL SYSTEM AND MANAGEMENT METHOD USING ACCESS CONTROL TICKET

TECHNICAL FIELD

The present invention generally relates to a memory access control system, a device management apparatus, a partition management apparatus, a memory-loaded device, a memory access control method, and a program storage medium. More particularly, the invention relates to a memory access control system, a device management apparatus, a partition management apparatus, a memory-loaded device, a memory access control method, and a program storage medium, in which a single memory is divided into a plurality of areas (partitions), and data managed by a service provider or a related entity is stored in each partition, so as to allow a user to provide various services by using a single memory-loaded device.

BACKGROUND ART

Hitherto, as devices containing a memory, tape media, floppy disks, hard disks, optical discs, semiconductor media, and so on, are utilized. Among these devices, semiconductor media are receiving attention since built-in memories can be securely managed. The reason for this is that, in a semiconductor memory, it is easy to implement a tamper-resistant structure, and more specifically, a structure in which access is not easily made from an external source.

The tamper-resistant structure can be implemented, for example, as follows. A device is formed by a single semiconductor chip, and a control unit, a memory controller, a non-volatile memory, voltage detection means, frequency detection means, etc., are provided for the semiconductor chip. Then, the non-volatile memory is sandwiched by dummy layers, such as alumina layers, so that it cannot be easily read or written from or into an external source.

A known memory structure of such a secure device is described below with reference to the "known memory structure" shown in FIG. 96. The memory shown in FIG. 96 has a configuration which can be used as, for example, e-money. As shown in FIG. 96, the memory area is largely divided into three areas, i.e., a data area, a memory management area, and a system area.

In the data area, data based on the "data structure" stored in the head of each item of data is stored. In this example, data items, such as the user name, the user address, the user telephone number, the billing, the memo, and the log, are stored. In the memory management area, the storage address, the access method, the access authentication key, and so on, for accessing each data item in the data area are stored. For example, access can be made to data 1 (user name) in the data area by read only (Read) with the access authentication key (0123 . . . ). In the system area, a device identifier (ID), and a memory management key, which is an authentication key for reserving the memory area in the data area, etc., are stored.

The data area of the memory device shown in FIG. 96 can be divided into a plurality of areas, and such divided areas can be managed by different service entities, for example, if e-money services are provided, by different e-money service providing entities (ex. different banks). Data in each divided area is read and written (ex. updating of balance data) not only by the individual service providing entities, but also by users, for example, by a reader/writer (dedicated reader/writer or a PC), which serves as a device access machine installed in a store that conducts sales using e-money.

The relationship between the manager and the user of a secure device having a plurality of divided data areas, such as that shown in FIG. 96, is indicated by the "memory manager/user" in FIG. 97. FIG. 97 illustrates a memory manager, which is the entity for issuing the secure device, and data users, to which the memory areas are assigned from the memory manager, and which utilize the assigned memory areas. As the memory users, a data 1 user through a data 6 user are shown. The memory users are banks or stores if e-money services are provided as in the above-described example.

The memory manager has an access-control memory management key for reserving memory areas, and assigns the memory areas (divided data areas) to the memory users by using the memory management key. The memory user has an access authentication key for accessing data in each data area, and is able to access the memory in the assigned data area by using the access authentication key. There are various access modes, such as read, write, and decrement, and the access authentication keys are individually set according to the processing mode, so that a determination can be individually made as to whether the processing is to be allowed.

Data 4 in the memory shown in FIG. 96, for example, is billing data, and the data 4 user is able to perform, as shown in FIG. 97, decrement processing and read/write processing on data 4. As shown in the table at the bottom right side of FIG. 96, different access keys are assigned to the decrement processing and the read/write processing for data 4, and it is necessary to access data 4 by using the appropriate access key for each processing.

FIG. 98 illustrates memory reserving processing performed by the memory manager for assigning the data areas in a memory device to the memory users. As shown in the "memory reserving system" shown in FIG. 98, the memory manager executes the data-area reserving processing for the memory device indicated at the right side of FIG. 98 by using a memory-reserving reader/writer (R/W: Reader/Writer) indicated at the left side of FIG. 98. The memory-reserving reader/writer (R/W: Reader/Writer) is provided with a secure NVRAM (Non-Volatile RAM) for reserving a memory management key. The memory-reserving R/W may be a secure-device-dedicated reader/writer R/W, or if the secure device is a device provided with an I/F, such as a USB or PCMCIA, the memory-reserving R/W may be a unit which can read and write via such an interface, for example, a PC.

For reserving a memory by using the R/W, a device ID is first read from the secure device. Then, in the R/W, an authentication key is created by using the memory management key and the device ID, and performs mutual authentication with the secure device by using the created authentication key. The mutual authentication processing may be performed by, for example, a common key cryptosystem (ex. ISO/IEC9798-2).

After successfully performing the mutual authentication, the R/W encrypts the data structure, the data size, the access method, and the access authentication key by using a session key, adds a data-checking MAC (Message Authentication Code) value if necessary, and sends the command to the secure device. Upon receiving the command, the secure device decrypts the received data and checks the integrity of the data according to the MAC checking processing if necessary. The secure device then reserves a memory area in the data area of the memory according to the data size indicated in the received data, writes the data structure into the reserved area, and writes the memory address, the access method, and the access authentication key into the memory management area.

In this manner, a plurality of divided data areas are set in the memory device. A description is now given of a memory access method for accessing the memory device provided with a plurality of divided data areas according to the "memory access method" shown in FIG. 99. The reader/writer shown at the left side of FIG. 99 is a memory-access reader/writer (R/W) possessed by the memory user, which is formed of a dedicated R/W or a PC, as in the above-described memory-reserving R/W. The memory-access reader/writer is provided with a secure NVRAM for holding access authentication keys. For accessing a data area of the secure device by using the R/W, the device ID is first read from the secure device. Then, in the R/W, an authentication key is created by using the access authentication key and the device ID, and performs mutual authentication with the secure device by using the created authentication key. After successfully performing the mutual authentication, the R/W makes a predetermined access to the data in the data area corresponding to the access authentication key.

In this case, the access method is defined in the memory management area. Accordingly, if, for example, the access authentication for decrementing the data in data 4 (billing data) has succeeded, the data in data 4 can be decremented, but it cannot be incremented or overwritten as desired, as indicated in the "memory access method" in FIG. 99. In this manner, by setting different access authentication keys used for authentication processing according to the access modes, the security of the individual data items can be enhanced. For example, even if a decrementing R/W is stolen and the data in the NVRAM in the stolen decrementing R/W is decrypted, the possibility of illegally performing incrementing processing of data 4 (billing data) in the secure device in FIG. 99 is small.

Generally, the security of money depositing terminals can be improved, as in ATMs. However, money withdrawing terminals are often used as money collecting machines in stores when goods are delivered, and are installed in different places. They are thus highly vulnerable to theft, and it is difficult to improve the security of the money withdrawing terminals. Thus, it is effective in setting different authentication keys according to the type of data access.

According to the usage mode for the above-described known memory device provided with a plurality of divided data areas, the reserving processing for the data area of the memory is performed by executing the authentication processing using the memory management key, and the access processing in each data area is performed by executing the authentication processing using the access authentication key. More specifically, however, a common key using, for example, DES encryption algorithms, is used for the above-described processings, and authentication using a public key cryptosystem or verification using a public key cryptosystem is not considered in the above-described configuration.

In the configuration in which a common key is used for a memory management key and an access authentication key, as described above, authentication and access permission can be advantageously performed by the single processing. However, if a leakage of the authentication key occurs, memory access can be made by using the leaked authentication key. Such a configuration is thus problematic in terms of the security.

In order to decrease the cost of the reader/writer (R/W) for accessing the memory device, a configuration in which encryption algorithms are not loaded in the reader/writer (R/W) can be considered. In such a configuration, however, it is impossible to perform authentication processing with the device and encryption processing for encrypting communication data. Thus, such a configuration is not appropriate for a reader/writer which communicates with a device storing user billing data and other private information.

DISCLOSURE OF INVENTION

The present invention has been made in view of the above-described background of the related art. It is an object of the present invention to implement a configuration in which various types of access control tickets are issued in response to access to a memory having a plurality of divided partitions under the control of each device or partition management entity, and processing based on the rules described in each ticket is executed by a memory-loaded device, thereby implementing a configuration in which data in each partition is independently managed.

It is another object of the present invention to provide a memory access control system, a device management apparatus, a partition management apparatus, a memory-loaded device, a memory access control method, and a program storage medium in which partition authentication and device authentication can be executed according to a public key designation method or a common key designation method so as to enable the execution of secure data communication under various environments.

A first aspect of the present invention is a memory access control system for a memory-loaded device having a memory in which a data file is stored.

The memory of the memory-loaded device includes one or more partitions for storing the data file therein, which serve as memory areas managed by a partition manager, and a device manager management area managed by a device manager, which serves as a manager of the memory-loaded device.

The memory-loaded device receives from an access unit an access control ticket managed by the device manager or an access control ticket managed by the partition manager as an access control ticket for the memory, and performs processing according to a description of the received ticket.

According to an embodiment of the memory access control system of the present invention, the access control ticket includes mutual authentication designation data that designates a mutual authentication mode to be executed between the memory-loaded device and the access unit which outputs the ticket, and the memory-loaded device executes mutual authentication according to the mutual authentication designation data of the access control ticket, and performs processing according to a description recorded in the received ticket on the condition that authentication is successfully conducted.

According to an embodiment of the memory access control system of the present invention, the access control ticket includes ticket verification designation data that designates a verification mode of the access control ticket received by the memory-loaded device, and the memory-loaded device executes ticket verification processing according to the ticket verification designation data of the access control ticket, and performs processing according to a description recorded in the received ticket on the condition that verification is successfully conducted.

According to an embodiment of the memory access control system of the present invention, the access control ticket includes a category or an identifier of issuing means of the access control ticket, and the memory-loaded device executes processing to check whether the ticket is a ticket issued by authorized issuing means based on the category or the identifier of the issuing means of the access control ticket indicated in the access control ticket received from the access unit, and performs processing according to a description recorded in the received ticket on the condition that the checking processing is successfully performed.

According to an embodiment of the memory access control system of the present invention, the access control ticket includes a category or an identifier of the access unit, which serves as using means of the access control ticket, and the memory-loaded device performs processing to check whether the ticket is a ticket provided by authorized using means based on the category or the identifier of the access unit, which serves as the using means of the access control ticket, indicated in the access control ticket received from the access unit, and performs processing according to a description recorded in the received ticket on the condition that the checking processing is successfully performed.

According to an embodiment of the memory access control system of the present invention, the access control ticket managed by the device manager includes a partition registration ticket (PRT) that allows partition creation processing or partition deletion processing for the memory of the memory-loaded device. When receiving the partition registration ticket (PRT) from the access unit, the memory-loaded device performs the partition creation processing or the partition deletion processing according to a description recorded in the received partition registration ticket (PRT).

According to an embodiment of the memory access control system of the present invention, the partition registration ticket (PRT) is issued from ticket issuing means managed by the device manager to the access unit, which serves as a ticket user managed by the partition manager.

According to an embodiment of the memory access control system of the present invention, the access control ticket managed by the partition manager includes a file registration ticket (FRT) that allows data-file creation processing or data-file deletion processing in a partition which is generated in the memory of the memory-loaded device. When receiving the file registration ticket (FRT) from the access unit, the memory-loaded device performs the file creation processing or the file deletion processing according to a description recorded in the received file registration ticket (FRT).

According to an embodiment of the memory access control system of the present invention, the file registration ticket (FRT) is issued from ticket issuing means managed by the partition manager to the access unit, which serves as a ticket user managed by the partition manager.

According to an embodiment of the memory access control system of the present invention, the access control ticket managed by the partition manager includes a service permission ticket (SPT) that allows access to the data file in a partition in the memory of the memory-loaded device. When receiving the service permission ticket (SPT) from the access unit, the memory-loaded device accesses the data file according to a description recorded in the received service permission ticket (SPT).

According to an embodiment of the memory access control system of the present invention, the service permission ticket (SPT) is issued from ticket issuing means managed by the partition manager to the access unit, which serves as a ticket user managed by the partition manager.

According to an embodiment of the memory access control system of the present invention, the access control ticket managed by the device manager or the partition manager includes a data update ticket (DUT) that allows data stored in the memory of the memory-loaded device to be updated. When receiving the data update ticket (DUT) from the access unit, the memory-loaded device performs data updating processing according to a description recorded in the received data update ticket (DUT).

According to an embodiment of the memory access control system of the present invention, the data update ticket (DUT) for updating data in the device manager management area managed by the device manager is issued from ticket issuing means managed by the device manager to the access unit, which serves as a ticket user managed by the device manager, and the data update ticket (DUT) for updating the data in the partition managed by the partition manager is issued from ticket issuing means managed by the partition manager to the access unit, which serves as a ticket user managed by the partition manager.

A second aspect of the present invention is a device management apparatus for executing device management of a memory-loaded device, the memory-loaded device including one or more partitions for storing a data file therein, which serve as memory areas managed by a partition management apparatus, and a device manager management area managed by the device management apparatus.

The device management apparatus includes issuing means for a partition registration ticket (PRT) as a memory access control ticket that allows partition creation processing or partition deletion processing for a memory of the memory-loaded device.

According to an embodiment of the device management apparatus of the present invention, the device management apparatus includes a registration authority structure which manages the issuing of a public key certificate to the memory-loaded device.

According to an embodiment of the device management apparatus of the present invention, the partition registration ticket (PRT) includes mutual authentication designation data that designates a mutual authentication mode to be executed between the memory-loaded device and an access unit which outputs the ticket.

According to an embodiment of the device management apparatus of the present invention, the partition registration ticket (PRT) includes ticket verification designation data that designates a verification mode of the access control ticket received by the memory-loaded device.

According to an embodiment of the device management apparatus of the present invention, the partition registration ticket (PRT) includes a category or an identifier of the issuing means of the access control ticket.

According to an embodiment of the device management apparatus of the present invention, the partition registration ticket (PRT) includes a category or an identifier of an access unit, which serves as using means of the access control ticket.

A third aspect of the present invention is a partition management apparatus for executing partition management of a memory-loaded device, the memory-loaded device including one or more partitions for storing a data file therein, which serve as memory areas managed by the partition management apparatus, and a device manager management area managed by a device management apparatus.

The partition management apparatus includes issuing means for an access control ticket that allows access to a partition generated in a memory of the memory-loaded device.

According to an embodiment of the partition management apparatus of the present invention, the access control ticket is a file registration ticket (FRT) that allows data-file creation processing or data-file deletion processing in a partition generated in the memory of the memory-loaded device.

According to an embodiment of the partition management apparatus of the present invention, the access control ticket is a service permission ticket (SPT) that allows access to the data file in a partition in the memory of the memory-loaded device.

According to an embodiment of the partition management apparatus of the present invention, the partition management apparatus includes a registration authority structure which manages the issuing of a public key certificate to the memory-loaded device.

According to an embodiment of the partition management apparatus of the present invention, the access control ticket includes mutual authentication designation data that designates a mutual authentication mode to be executed between the memory-loaded device and an access unit which outputs the ticket.

According to an embodiment of the partition management apparatus of the present invention, the access control ticket includes ticket verification designation data that designates a verification mode of the access control ticket received by the memory-loaded device.

According to an embodiment of the partition management apparatus of the present invention, the access control ticket includes a category or an identifier of the issuing means of the access control ticket.

According to an embodiment of the partition management apparatus of the present invention, the access control ticket includes a category or an identifier of an access unit, which serves as using means of the access control ticket.

A fourth aspect of the present invention is a memory-loaded device having a memory in which data can be stored.

The memory of the memory-loaded device includes one or more partitions, which serve as memory areas managed by a partition manager, and a device manager management area managed by a device manager, which serves as a manager of the memory-loaded device.

The memory-loaded device includes control means for receiving from an access unit an access control ticket managed by the device manager or an access control ticket managed by the partition manager as an access control ticket for the memory, and for performing processing according to a description of the received ticket.

According to an embodiment of the memory-loaded device of the present invention, the access control ticket includes mutual authentication designation data that designates a mutual authentication mode to be executed between the memory-loaded device and the access unit which outputs the ticket, and the control means executes mutual authentication according to the mutual authentication designation data of the access control ticket, and performs processing according to a description recorded in the received ticket on the condition that authentication is successfully conducted.

According to an embodiment of the memory-loaded device of the present invention, the access control ticket includes ticket verification designation data that designates a verification mode of the access control ticket received by the memory-loaded device, and the control means executes ticket verification processing according to the ticket verification designation data of the access control ticket, and performs processing according to a description recorded in the received ticket on the condition that verification is successfully conducted.

According to an embodiment of the memory-loaded device of the present invention, the access control ticket includes a category or an identifier of issuing means of the access control ticket, and the control means executes processing to check whether the ticket is a ticket issued by authorized issuing means based on the category or the identifier of the issuing means of the access control ticket indicated in the access control ticket received from the access unit, and performs processing according to a description recorded in the received ticket on the condition that the checking processing is successfully performed.

According to an embodiment of the memory-loaded device of the present invention, the access control ticket includes a category or an identifier of the access unit, which serves as using means of the access control ticket, and the control means performs processing to check whether the ticket is a ticket provided by authorized using means based on the category or the identifier of the access unit, which serves as the using means of the access control ticket, indicated in the access control ticket received from the access unit, and performs processing according to a description recorded in the received ticket on the condition that the checking processing is successfully performed.

A fifth aspect of the present invention is a memory access control method for a memory-loaded device having a memory in which a data file is stored.

The memory of the memory-loaded device includes one or more partitions for storing the data file therein, which serve as memory areas managed by a partition manager, and a device manager management area managed by a device manager, which serves as a manager of the memory-loaded device.

The memory-loaded device receives from an access unit an access control ticket managed by the device manager or an access control ticket managed by the partition manager as an access control ticket for the memory, and performs processing according to a description of the received ticket.

According to an embodiment of the memory access control method of the present invention, the access control ticket includes mutual authentication designation data that designates a mutual authentication mode to be executed between the memory-loaded device and the access unit which outputs the ticket, and the memory-loaded device executes mutual authentication according to the mutual authentication designation data of the access control ticket, and performs processing according to a description recorded in the received ticket on the condition that authentication is successfully conducted.

According to an embodiment of the memory access control method of the present invention, the access control ticket includes ticket verification designation data that designates a verification mode of the access control ticket received by the memory-loaded device, and the memory-loaded device executes ticket verification processing according to the ticket verification designation data of the access control ticket, and performs processing according to a description recorded in the received ticket on the condition that verification is successfully conducted.

According to an embodiment of the memory access control method of the present invention, the access control ticket includes a category or an identifier of issuing means of the access control ticket, and the memory-loaded device executes processing to check whether the ticket is a ticket issued by authorized issuing means based on the category or the identifier of the issuing means of the access control ticket indicated in the access control ticket received from the access unit, and performs processing according to a description recorded in the received ticket on the condition that the checking processing is successfully performed.

According to an embodiment of the memory access control method of the present invention, the access control ticket includes a category or an identifier of the access unit, which serves as using means of the access control ticket, and the memory-loaded device performs processing to check whether the ticket is a ticket provided by authorized using means based on the category or the identifier of the access unit, which serves as the using means of the access control ticket, indicated in the access control ticket received from the access unit, and performs processing according to a description recorded in the received ticket on the condition that the checking processing is successfully performed.

According to an embodiment of the memory access control method of the present invention, the access control ticket managed by the device manager includes a partition registration ticket (PRT) that allows partition creation processing or partition deletion processing for the memory of the memory-loaded device. When receiving the partition registration ticket (PRT) from the access unit, the memory-loaded device performs the partition creation processing or the partition deletion processing according to a description recorded in the received partition registration ticket (PRT).

According to an embodiment of the memory access control method of the present invention, the partition registration ticket (PRT) is issued from ticket issuing means managed by the device manager to the access unit, which serves as a ticket user managed by the partition manager.

According to an embodiment of the memory access control method of the present invention, the access control ticket managed by the partition manager includes a file registration ticket (FRT) that allows data-file creation processing or data-file deletion processing in a partition which is generated in the memory of the memory-loaded device. When receiving the file registration ticket (FRT) from the access unit, the memory-loaded device performs the file creation processing or the file deletion processing according to a description recorded in the received file registration ticket (FRT).

According to an embodiment of the memory access control method of the present invention, the file registration ticket (FRT) is issued from ticket issuing means managed by the partition manager to the access unit, which serves as a ticket user managed by the partition manager.

According to an embodiment of the memory access control method of the present invention, the access control ticket managed by the partition manager includes a service permission ticket (SPT) that allows access to the data file in a partition in the memory of the memory-loaded device. When receiving the service permission ticket (SPT) from the access unit, the memory-loaded device accesses the data file according to a description recorded in the received service permission ticket (SPT).

According to an embodiment of the memory access control method of the present invention, the service permission ticket (SPT) is issued from ticket issuing means managed by the partition manager to the access unit, which serves as a ticket user managed by the partition manager.

According to an embodiment of the memory access control method of the present invention, the access control ticket managed by the device manager or the partition manager includes a data update ticket (DUT) that allows data stored in the memory of the memory-loaded device to be updated. When receiving the data update ticket (DUT) from the access unit, the memory-loaded device performs data updating processing according to a description recorded in the received data update ticket (DUT).

According to an embodiment of the memory access control method of the present invention, the data update ticket (DUT) for updating data in the device manager management area managed by the device manager is issued from ticket issuing means managed by the device manager to the access unit, which serves as a ticket user managed by the device manager, and the data update ticket (DUT) for updating the data in the partition managed by the partition manager is issued from ticket issuing means managed by the partition manager to the access unit, which serves as a ticket user managed by the partition manager.

A sixth aspect of the present invention is a program storage medium for providing a computer program for executing memory access control processing on a computer system, the memory access control processing being performed for a memory-loaded device having a memory, the memory including one or more partitions for storing a data file therein, which serve as memory areas managed by a partition manager, and a device manager management area managed by a device manager, which serves as a manager of the memory-loaded device. The computer program includes a step of receiving from an access unit an access control ticket managed by the device manager or an access control ticket managed by the partition manager as an access control ticket for the memory, a step of executing mutual authentication with the access unit, a step of executing ticket verification processing according to a description of the received ticket, and a step of performing processing according to the description of the received ticket.

The program storage medium of the present invention is a medium for providing a computer program to, for example, a general-purpose computer system that is able to execute various program codes, in a computer-readable format. The form of the medium is not particularly restricted, and may be a recording medium, such as CD, FD, or MO, or a communication medium.

In such a program storage medium, the cooperative relationship between the computer program and the storage medium in terms of the structure or the function, which is to implement the functions of the predetermined computer program on the computer system, is defined. In other words, by installing the computer program into the computer system via the storage medium, the cooperative functions can be exhibited on the computer system, thereby obtaining operations and advantages similar to those of the other aspects of the present invention.

Further objects, features and advantages of the present invention will become apparent from the following description of the embodiments and the attached drawings. In this specification, the system means a logical group of a plurality of devices, and it is not essential that the devices having individual configurations be located in the same casing.

BRIEF DESCRIPTION OF THE DRAWINGS

FIG. 11 is a diagram illustrating a format of a public key certificate that can be used in the system of the present invention.

FIG. 23 is a diagram illustrating the data configuration of a partition key area of the data stored in the memory of the device of the present invention.

FIG. 25 is a diagram illustrating the type of file structure of the data stored in the memory of the device of the present invention.

FIG. 26 is a diagram illustrating the format of a partition registration ticket (PRT) as an access control ticket applied in the system of the present invention.

FIG. 27 is a diagram illustrating the format of a file registration ticket (FRT) as an access control ticket applied in the system of the present invention.

FIG. 28 is a diagram illustrating the format (first example) of a service permission ticket (SPT) as an access control ticket applied in the system of the present invention.

FIG. 29 is a diagram illustrating the type of file access mode using a service permission ticket (SPT) as an access control ticket applied in the system of the present invention.

FIG. 30 is a diagram illustrating the file structure to be accessed using a service permission ticket (SPT) as an access control ticket applied in the system of the present invention.

FIG. 32 is a diagram illustrating the format of a data update ticket (DUT) as an access control ticket applied in the system of the present invention.

FIG. 33 is a diagram illustrating the data to be updated using a data update ticket (DUT) as an access control ticket applied in the system of the present invention.

FIG. 51 is a diagram illustrating the configuration of an authentication table generated in the device after mutual authentication processing with the device is performed in the system of the present invention.

FIG. 52 is a diagram illustrating the configuration of an authentication table generated in the reader/writer after mutual authentication processing with the device is performed in the system of the present invention.

FIG. 68 is a diagram illustrating partition creation processing performed by the partition manager in the system of the present invention when public-key authentication and public-key ticket verification are performed.

FIG. 69 is a diagram illustrating partition creation processing performed by the partition manager in the system of the present invention when public-key authentication and common-key ticket verification are performed.

FIG. 81 is a diagram illustrating the configuration (first example) of a file open table generated by the file open operation using a service permission ticket (SPT) in the system of the present invention.

FIG. 82 is a diagram illustrating the configuration (second example) of a file open table generated by the file open operation using a service permission ticket (SPT) in the system of the present invention.

FIG. 90 is a diagram illustrating file access processing using a service permission ticket (SPT) in the system of the present invention when public-key authentication and common-key ticket verification are performed.

FIG. 92 is a diagram illustrating file access processing using a service permission ticket (SPT) in the system of the present invention when common-key authentication and public-key ticket verification are performed.

FIG. 95 is a diagram illustrating an example of data updating processing using a data update ticket (DUT) in the system of the present invention.

BEST MODE FOR CARRYING OUT THE INVENTION

Embodiments of the present invention are described in detail below with reference to the drawings.

A description is given in the following order.

A. Description of Entity and Ticket Configuration in Data Processing System Using Device
  A1. Overview of Data Management System Using Memory-Loaded Device
  A2. Device Configuration
  A3. Device Manager Configuration
  A4. Partition Manager Configuration
  A5. Ticket User (Reader/Writer as Device Access Unit) Configuration
  A6. Public Key Certificate
  A7. Storage Data in Device Memory
  A7.1. Device-Unique-Information/Device-Partition-Information Area
  A7.2. Partition Area
  A8. Data Format of Each Ticket
  A8.1. Partition Registration Ticket (PRT)
  A8.2. File Registration Ticket (FRT)
  A8.3. Service Permission Ticket (SPT)
  A8.4. Data Update Ticket (DUT)
B. Detailed Description of Device Distribution to User, Various Settings for Device, and Device Usage Processing
  B1. Flow from Device Initial registration to Usage
  B2. Initial Registration processing by Device Manufacturing Entity
  B3. Device Manager Management Processing
  B3.1. Device Registration processing by Device Manager
  B3.2. Public Key Certificate Issuing Processing under Device Manager Control
  B4. Partition Manager Management Processing
  B4.1. Partition Setting Registering and Deletion Processing Using Partition Registration Ticket (PRT) under Partition Manager Control
  B4.2. Public Key Certificate Issuing Processing under Partition Manager Control
  B4.3. Processing Procedure in Each Partition Creation Processing Method
  B4.4. File Creation and Deletion Processing Using File Registration Ticket (FRT)
  B4.5. Processing Procedure in Each File Creation Processing Method
  B4.6. Service (File Access) Processing Using Service Permission Ticket (SPT)
  B4.7. Processing Procedure in Each Access Processing Method Using Service Permission Ticket (SPT)
  B5. Device Data Updating Processing Using Data Update Ticket (DUT)

[A1. Overview of Data Management System Using Memory-Loaded Device]

Figure 1:
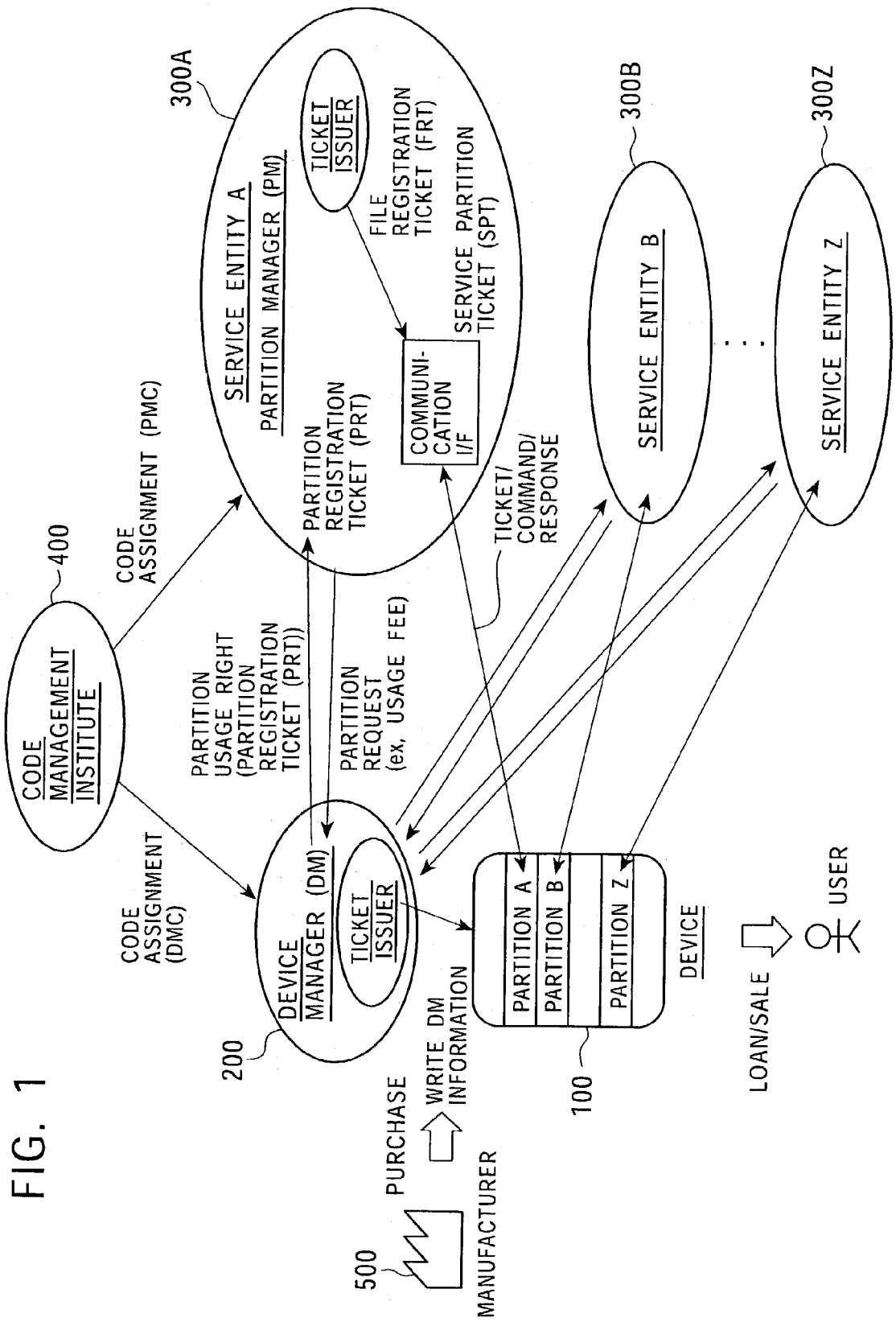
FIG. 1 is a first schematic diagram illustrating an overview of a system configuration of the present invention.

FIG. 1 illustrates an overview of a data management system according to the present invention. A memory-loaded device (hereinafter referred to as the "device") 100 is manufactured by a device manufacturing entity (manufacturer) 500, and is provided to a user under the management of a device manager (DM) 200, which serves as a device management entity, and is utilized. The device may be provided to the user in any mode, such as a loan or a sale (including assignment).

In the device 100, a memory area is divided into a plurality of partitions, which serve as data storage areas, and the individual partitions (Partitions A, B, ... Z) are utilized for various services under the management of partition managers, which serve as various service entities (A, B, ... Z) 300A through 300Z.

For performing partition setting registration processing for the device 100, file setting registration processing for the partitions set in the device, and access processing for each registered file, access control tickets for the device issued by authorized ticket issuing means (Ticket Issuer) are required.

For the partition setting registration processing for the device 100, a partition registration ticket (PRT) issued by authorized ticket issuing means (Ticket Issuer) is required. For the file setting registration processing for the partitions set in the device, a file registration ticket (FRT) issued by the authorized ticket issuing means (Ticket Issuer) is required. For making access to each file, a service permission ticket (SPT) issued by authorized ticket issuing means (Ticket Issuer) is required.

Each ticket stores access rules for the device 100, for example, the rules concerning authentication processing between the device and a reader/writer that performs various types of processing, such as reading and writing data from and into the device. The ticket also stores the partition size that can be set if the ticket is the partition registration ticket (PRT), the file size that can be set if the ticket is the file registration ticket (FRT), and the access mode that can be executed (ex. data reading and writing) if the ticket is the service permission ticket (SPT). Information concerning the ticket issuer and the ticket user, and other information are also stored. Additionally, a tamper-verification ICV (Integrity Check Value) for the data stored in the ticket is recorded, and only when the data stored in the ticket is not tampered with, the processing can be executed within the range of the permission recorded in the ticket. Details of such tickets are discussed below.

In the example shown in FIG. 1, the ticket issuing means (Ticket Issuer) for issuing the partition registration ticket (PRT) is set in the device manager (DM) 200, and the ticket issuing means (Ticket Issuer) for issuing the file registration ticket (FRT) and the service permission ticket (SPT) are set in the service entity A, 300A, which serves as the partition manager. In the configuration shown in FIG. 1, basically, service entities B . . . Z, 300B through 300Z have a configuration similar to that of the service entity A, and the ticket issuing means (Ticket Issuer) for issuing the file registration ticket (FRT) and the service permission ticket (SPT) is set in each service entity.

In FIG. 1, the service entity and the partition manager (PM) are indicated as the same entity. However, they do not have to be the same entity. Alternatively, the partition manager for managing the partitions as memory areas set in the memory may be a different entity from the service entity that borrows the partitions as the memory areas from the partition manager under a predetermined contract, stores various files in the borrowed partitions, and provides services. For the sake of simplicity, however, the configuration in which the service entity also serves as the partition manager is discussed below.

The partition manager (PM), which serves as one of the service entities 300A through 300Z, requests the device manager (DM) 200 to issue a partition registration ticket (PRT) under a predetermined contract by, for example, paying a certain price, and the ticket issuing means (Ticket Issuer) in the device manager (DM) receives a permission from the device manager (DM) and issues the partition registration ticket (PRT) for the partition manager (PM), which serves as the service entity.

Each service entity (partition manager (PM)) 300 accesses the device 100 owned by the user via a communication interface (I/F) so as to perform authentication processing and verification processing according to the rules recorded in the partition registration ticket (PRT) received from the device manager (DM) 200, and also performs the partition setting registration processing within the range of the permission recorded in the partition registration ticket (PRT). This processing is described in detail below.

The communication I/F may be any type of cable or wireless interface through which data communication can be performed with an external unit (device). For example, if the device has a USB-connecting configuration, the communication I/F may be a USBI/F. If the device is an IC card type, the communication I/F may be an IC-card reader/writer. If the device has various communication functions, such as a public line, a communication line, or the Internet, or if the device is connectable to such a communication unit, the communication I/F may be a data communication I/F according to the corresponding communication system.

After the partitions are set in the device 100 for the service entity 300, the service entity 300 accesses the device 100 owned by the user via the communication interface (I/F) so as to perform authentication processing and verification processing according to the rules recorded in the file registration ticket (FRT) issued by the ticket issuing means (Ticket Issuer) in the service entity 300, and also performs the file setting registration processing for the file within the range of the permission recorded in the file registration ticket (FRT). These processings are described in detail below.

The service entity 300 also accesses the device 100 owned by the user via the communication interface (I/F) so as to perform authentication processing and verification processing according to the rules recorded in the service permission ticket (SPT) issued by the ticket issuing means (Ticket Issuer) in the service entity, and also performs the access processing (ex. data reading and writing) within the range of the permission recorded in the service permission ticket (SPT). These processings are discussed in detail below.

As shown in FIG. 1, a code management institute 400 is set at a level higher than the device manager 200 and the partition manager 300, and assigns code, which serve as ID information of the corresponding entity, to each of the device manager and the partition manager. The code assigned to each manager is used as storage data in access control tickets, such as the above-described partition registration ticket (PRT), the file registration ticket (FRT), and so on.

Before the device 100 is provided (ex. loaned or sold) to the user and is utilized, the device manager (DM) 200 for managing the provided device is set, and device-manager management information, such as the device manager code, is written into the provided device. Details of such data are described below.

The relationship between public-key-certificate issuing processing and the entities in the data management system using the memory device is described below with reference to FIG. 2.

Figure 2:
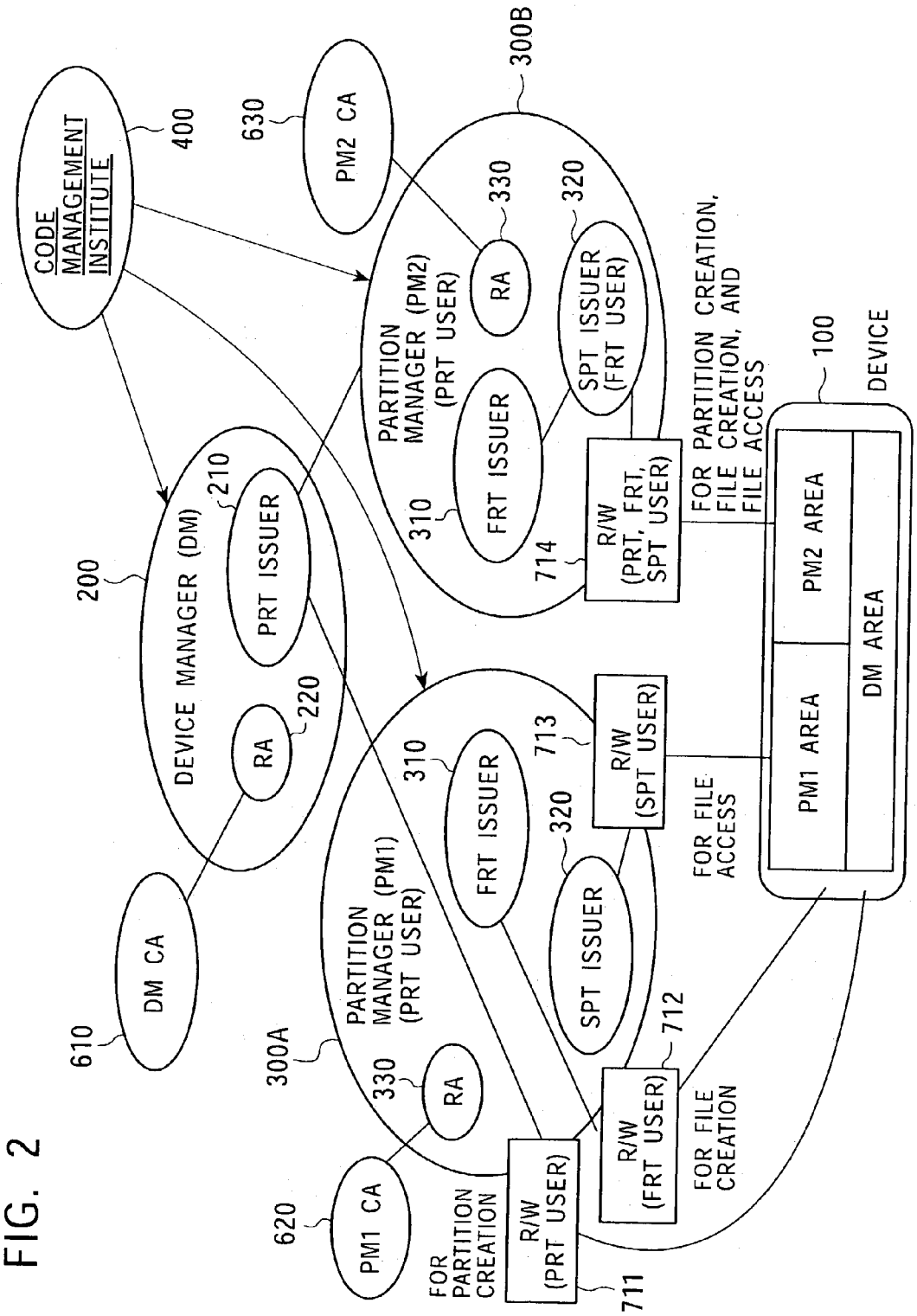
FIG. 2 is a second schematic diagram illustrating an overview of the system configuration of the present invention.

FIG. 2 illustrates the device manager as the device management entity, the two partition managers 300A and 300B as the management entities for the partitions set in the device, and the code management institute 400 for assigning ID code to the device manager 200. Additionally, there is provided a device-manager certificate authority (CA(DEV)) 610, which, in response to a public-key-certificate issuing request from a registration authority 210 managed by the device manager 200, issues a device public key certificate (CERT-DEV) corresponding to the device manager 200, individual units managed by the device manager (partition registration ticket (PRT) issuing means (PRT Issuer) 210, or the device 100. There are also provided partition-manager certificate authorities (CA(PAR)) 620 and 630 for issuing a partition public key certificate (CERT-PAR) corresponding to individual units managed by the partition managers 300A and 300B (file registration ticket (FRT) issuing means (FRT Issuer) 310, service-permission-ticket issuing means (SPT Issuer) 320, reader/writers 711 through 714 as device access units, i.e., ticket users, or a partition of the device 100.

In the configuration shown in FIG. 2, the device-manager certificate authority: CA for DM (or CA(DEV)) 610 and the partition-manager certificate authorities: CA for PAR (or CA(PAR)) 620 and 630 are separately provided as individual certificate authorities. However, this configuration may be changed as desired. For example, a single certificate authority having both functions may be provided, or a common certificate authority for a plurality of partition managers and a device-manager certificate authority may be separately provided.

The device manager 200 and the partition managers 300A and 300B are provided with registration authorities (RA) 220 and 320, respectively. The registration authorities 220 and 320 receive requests to issue public key certificates, i.e., the public key certificates of the device manager 200 and the partition managers 300A and 300B, the public key certificates of the individual units (ticket issuing means and ticket users) managed by the managers, and a public key certificate of the device 100. Then, the registration authorities 220 and 320 check the received public-key issuing requests, then transfer the public-key issuing requests to the certificate authorities, and also manages the issued public key certificates.

The public key certificates issued by the certificate authorities (CAs) 610, 620, and 630 via the registration authorities (RAs) 220 and 320 are stored in the device 100, and are used for the processing to be performed for the device 100, for example, the partition setting processing, the file setting processing for the partitions, the mutual authentication processing required for accessing the file, or the integrity verification processing for the above-described tickets. Details of the public-key-certificate issuing processing, and the above-described processings using the public key certificates are discussed below.

In FIG. 2, as the partitions, the device 100 possesses a management partition: PM1Area for the partition manager 1, 300A, a management partition: PM2Area for the partition manager 2, 300B, and a DMArea as the management area for the device manager 200.

The device manager 200 possesses the partition-registration-ticket issuing means (PRT Issuer) 210, and the partition manager 300 possesses the file-registration-ticket issuing means (FRT Issuer) 310 and the service-permission-ticket issuing means (SPT Issuer) 320. The PRT Issuer 210, the FRT Issuer 310, and the SPT Issuer 320 issue the corresponding tickets.

The partition manager 1, 300A is provided with the reader/writers 711 through 713 (data reading and writing interface of the device) dedicated for the individual tickets, i.e., PRT, FRT, and SPT, respectively, while the partition manager 2, 300B has the common reader/writer 714 for all the tickets. Accordingly, the reader/writer may be configured in various forms.

Figure 3:
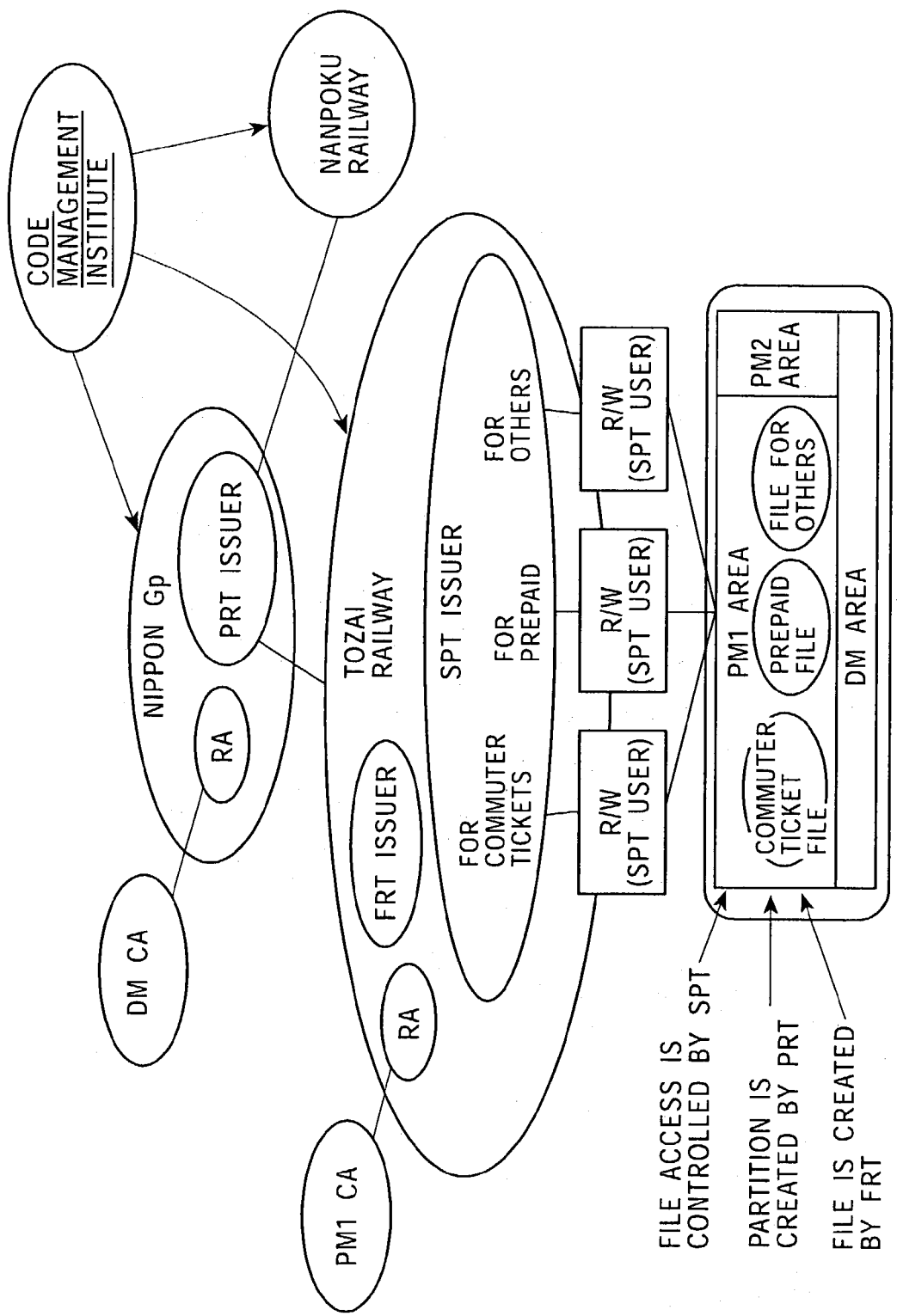
FIG. 3 is a third schematic diagram illustrating an overview of the system configuration of the present invention.

A specific example of the entities is described below with reference to FIG. 3. FIG. 3 illustrates an example of the configuration using the device. In this configuration, as the partition managers, which serve as the service entities for providing services by utilizing the partitions set in the device, Tozai Railway Co., Ltd., and Nanpoku Railway Co., Ltd. are considered. As the device manager for performing the partition setting registration for the partition managers, Nippon Railway Group is considered.

Tozai Railway Co., Ltd. sets and registers a plurality of files, i.e., a commuter ticket file, a prepaid file, and a file for the others, in the partition: PM1, which is set in the user device and managed by Tozai Railway Co., Ltd. The partition manager, which serves as a service entity, is able to register various files in partitions which are assigned from the device manager and which are set according to the services provided by the partition manager. For setting and registering files, the file registration ticket (FRT) is required.

Tozai Railway Co., Ltd. functions as a partition manager for managing one of the partitions, i.e., partition: PM1Area. Authentication processing and verification processing are performed according to the rules recorded in the partition registration ticket (PRT) issued by the PRT Issuer of Nippon Railway Group, which serves as the device manager, and the partition setting registration processing is performed within the range of the permission recorded in the partition registration ticket (PRT). Then, partition: PM1Area is assigned to Tozai Railway Co., Ltd.

Tozai Railway Co., Ltd. sets various files, such as a commuter ticket file and a prepaid file, in the assigned partition: PM1Area according to the services to be provided by Tozai Railway Co., Ltd. In the data storage area in the commuter ticket file, various data required as ticket management data, such as the ticket user, the usage period, and the usage zone, can be recorded. In the prepaid file, the user name, the prepaid amount of money, the balance data, etc., are recorded. In the file setting processing, authentication processing and verification processing are executed according to the rules recorded in the file registration ticket (FRT) issued by the FRT Issuer of Tozai Railway Co., Ltd., and the file setting registration processing is performed within the range of the permission recorded in the file registration ticket (FRT).

The device in which various files are set as described above is utilized by the user. For example, the user is able to utilize the device by setting it in a ticket machine provided with a reader/writer, which serves as a device access unit. For example, the commuter ticket file is accessed by an authorized reader/writer installed in the ticket machine so as to read the usage zone. The prepaid file is also accessed to perform updating processing for the balance data in the prepaid file.

The service permission ticket (SPT) issued by the service permission ticket (SPT) issuing means (SPT issuer) of Tozai Railway Co., Ltd. stores which file to be accessed and which processing (read, write, decrement, etc.) to be executed in the device. The tickets are stored in, for example, a reader/writer, which serves as an authorized device access unit installed in the ticket machine, and authentication processing with the device and ticket verification processing are performed according to the rules recorded in the tickets. If both the reader/writer and the device are found to be authorized devices, and if the tickets are authorized tickets, the processing (ex. reading, writing, decrementing, etc., of the data in the file) is performed within the range of the permission recorded in the service permission ticket (SPT).

Figure 4:
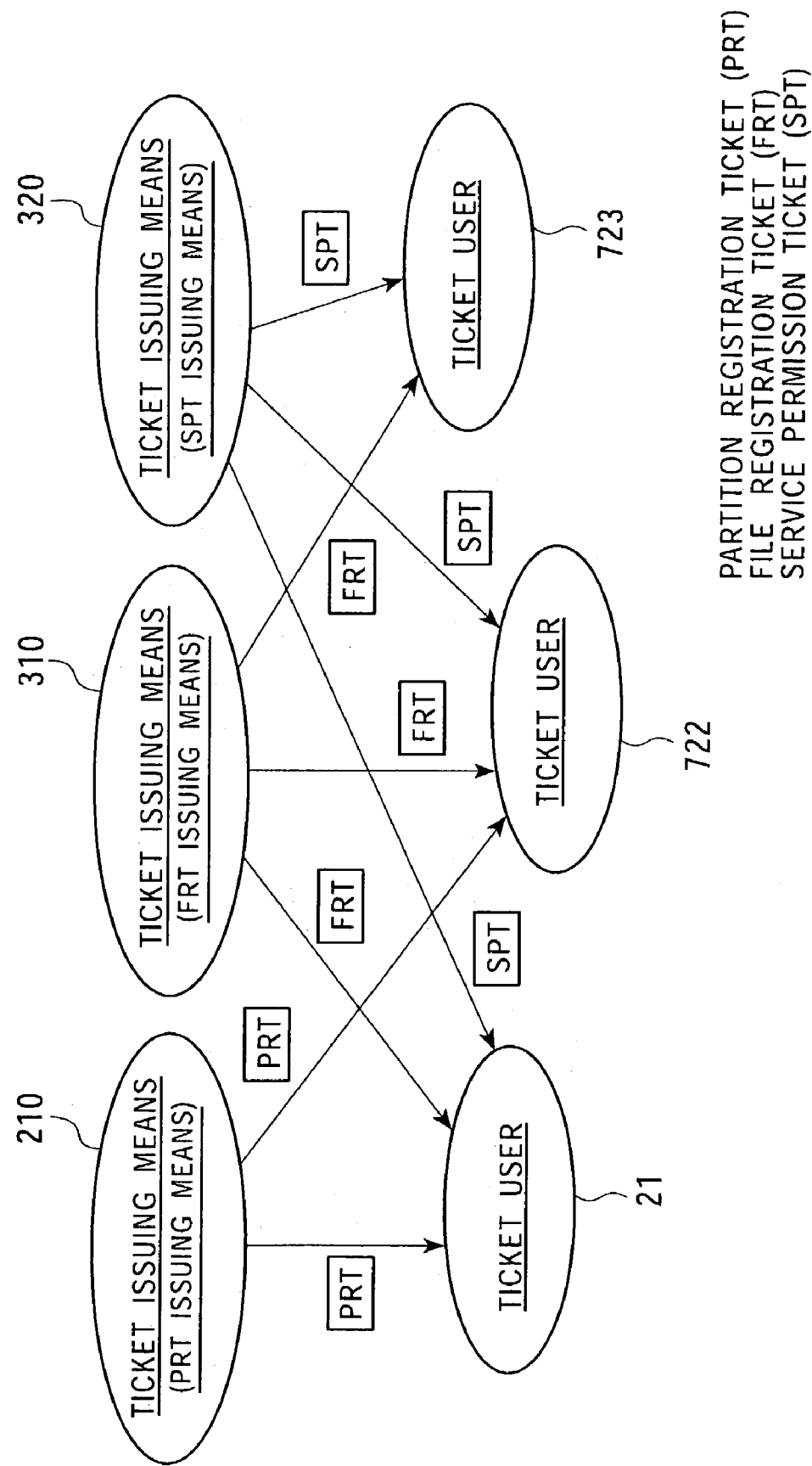
FIG. 4 is a diagram illustrating the relationship between access control ticket issuing means and using means in the system of the present invention.

FIG. 4 illustrates a typical relationship between the ticket issuing means (Ticket Issuer) for issuing various tickets, such as the partition registration ticket (PRT), the file registration ticket (FRT), and the service permission ticket (SPT), and the ticket user (Ticket User) which utilizes the tickets issued by the ticket issuing means.

As being discussed with reference to, for example, FIG. 1, the ticket issuing means (Ticket Issuer) is under the control of the device manager or the partition manager, and issues the partition registration ticket (PRT), the file registration ticket (FRT), and the service permission ticket (SPT), according to the processing to be performed on the device. The ticket user (Ticket User) is a machine or means for utilizing the tickets issued by the ticket issuing means, and more specifically, it serves as a device access unit, for example, a reader/writer, for reading and writing data into and from the device.

As shown in FIG. 4, the ticket user is able to store and utilize a plurality of tickets. Alternatively, the ticket user is able to store only a single ticket, for example, only the service permission ticket (SPT) that allows only the reading of the zone data of the commuter ticket file discussed with reference to FIG. 3, and then reads only the zone data.

For example, at a commuter-ticket read only machine of a railway company, which is a certain entity (partition manager), a reader/writer, which serves as a device access unit, storing only the service permission ticket (SPT) that allows only the reading of the zone data of the commuter ticket file is set. Then, the zone data can be read from the device owned by the user. For example, in a reader/writer, which serves as a device access unit, installed in a ticket machine for performing processing for commuter tickets and prepaid tickets, the service permission ticket (SPT) allowing only the reading of the zone data of the commuter ticket file, and the service permission ticket (SPT) allowing the decrementing processing for the balance data of the prepaid file are stored together. Then, the processing can be executed for both the files, i.e., the commuter ticket file and for the prepaid file.

The ticket user (ex. reader/writer) may be configured such that the partition registration ticket (PRT), the file registration ticket (FRT), and the service permission ticket (SPT) are stored, and all the corresponding processings, such as partition registration, file registration, and data access in the file, are executable. In this manner, the processing executable by the ticket user is determined by the types of tickets possessed by the ticket user.

[A2. Device Configuration]

Figure 5:
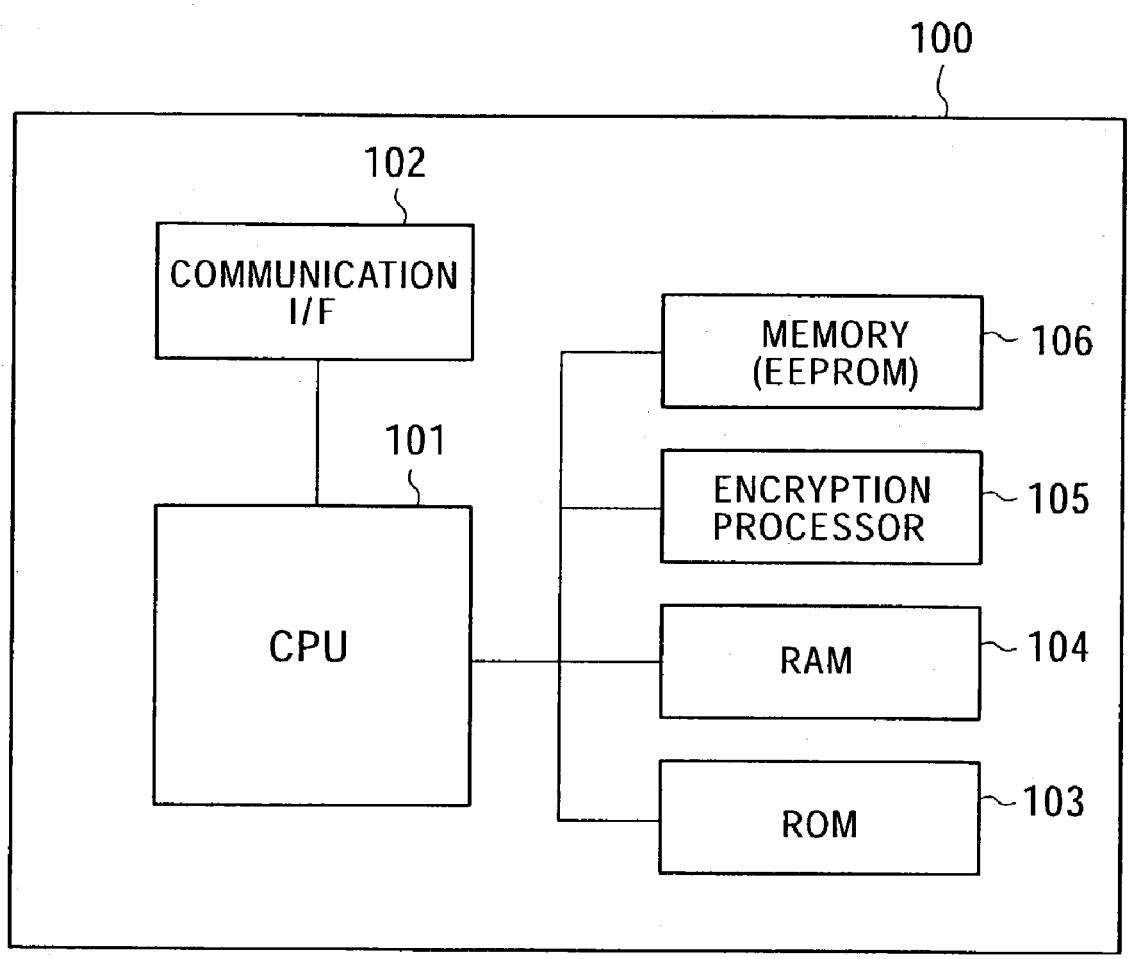
FIG. 5 is a diagram illustrating the configuration provided of a device with a memory in the system of the present invention.

A description is given below of a device provided with the above-described memory whose data storage area is divided into a plurality of partitions. FIG. 5 is a schematic diagram of the device.

As shown in FIG. 5, the device 100 includes: a CPU (Central Processing Unit) 101 having a program execution function and a computation processing function; a communication interface 102 having an interface function of performing communication processing with external devices, such as a reader/writer, which serves as a device access unit; a ROM (Read Only Memory) 103 storing various programs to be executed by the CPU 101, for example, an encryption processing program; a RAM (Random Access Memory) 104, which serves as a load area for programs to be executed, or a work area for the various types of program processing; an encryption processor 105 for performing encryption processing, such as authentication processing with external devices, digital signature creation, verification processing, encryption of storage data, and decoding processing; and a memory 106, which is formed of, for example, an EEPROM (Electrically Erasable Programmable ROM), storing the above-described partitions and files, and also storing device-unique information including various key data. Information stored in the memory 106 (ex. EEPROM) 106 is discussed below.

Figure 6:
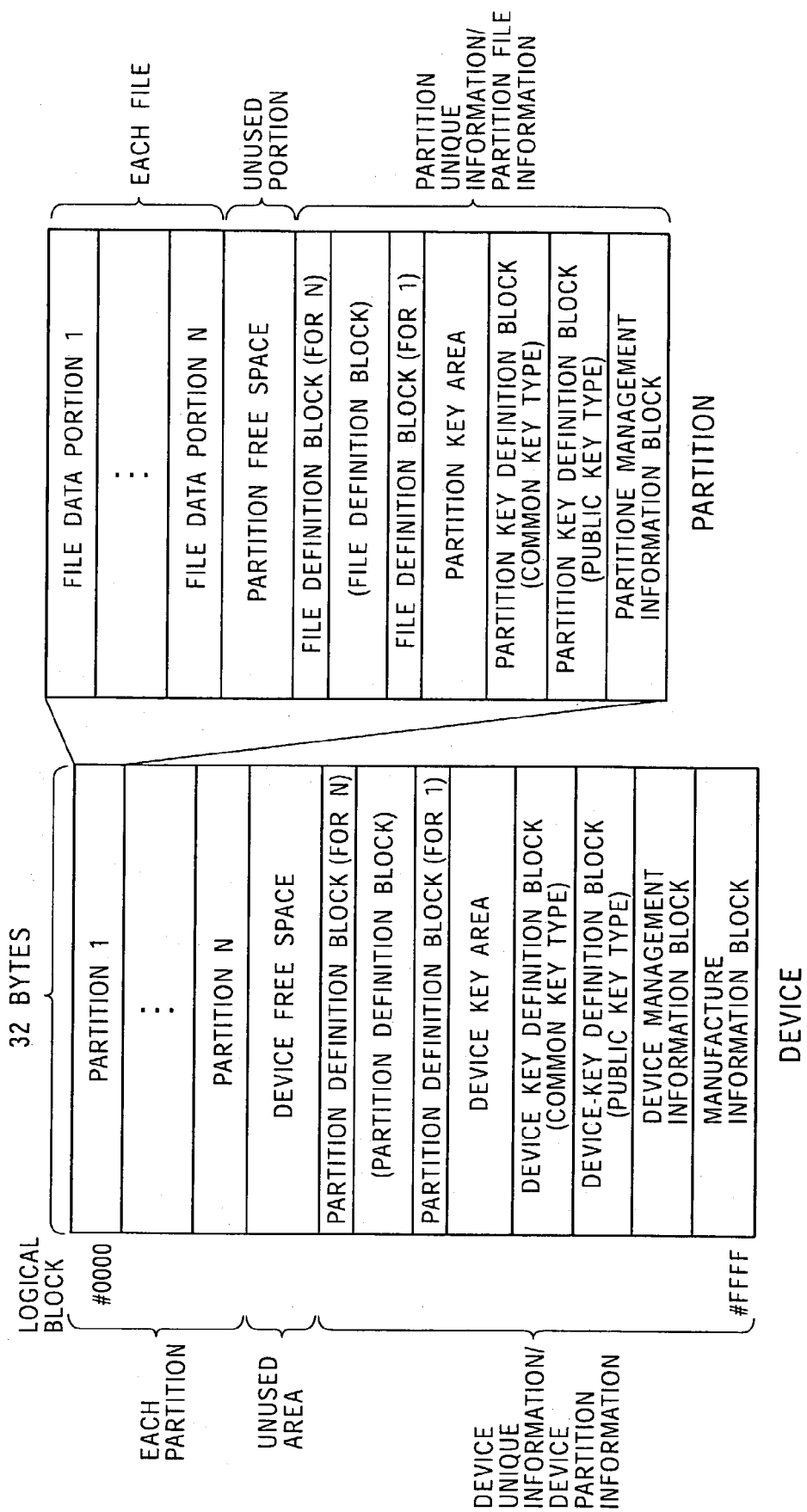
FIG. 6 is a diagram illustrating the memory format of the device of the present invention.

The data storage structure of the memory 106 is shown in FIG. 6. The memory is, for example, a flash memory, which is referred to as an EEPROM (Electrically Erasable Programmable ROM), which is one form of an electrically erasable non-volatile memory.

As shown in FIG. 6, in this embodiment, the data storage area has a number of 0xFFFF blocks, each block having 32 bytes, and as the main areas, a partition area, an unused area, a device-unique-information/device-partition-information area are provided.

In the partition area, partitions, which are the management areas managed by the partition managers, are set and registered. In the memory shown in FIG. 6, the partitions have already been set. However, in a new device, a partition area is not present since partitions are not yet set. As discussed above, the partitions are set in the memory within the device by the partition manager, which serves as the service entity, based on the PRT ticket issued by the partition registration ticket (PRT) issuing means (PRT Issuer) managed by the device manager according to a predetermined procedure, i.e., the rules set in the partition registration ticket (PRT).

In the device-unique-information/device-partition-information area, information concerning the device manufacturing entity, information concerning the device manager, set partition information, and key information required for performing the partition setting registration processing by accessing the device, are stored. Details of the stored information are given below. The storage data in the device unique information area can be used as data corresponding to IDm (discussed below), which is the unique device value used for mutual authentication.

As shown in FIG. 6, the partition area includes at least one file portion, an unused portion, and a partition-unique-information/partition-file portion. In the file portion, files, for example, files that have been set by the service entity, which is the partition manager, according to the services, such as commuter tickets and prepaid tickets, are stored. In the unused portion, new files can be set. In the partition-unique-information/partition-file-information portion, information concerning the files in the partitions and key information required for the file access processing are stored. Details of such storage information are given below.

[A3. Device Manager Configuration]

The configuration of the device manager is discussed below with reference to FIG. 7. The device manager is the management entity of the device to be provided (sold or loaned) to the user.

The device manager 200 contains the partition registration ticket (PRT) issuing means (PRT Issuer) 210, which issues the partition registration ticket (PRT) allowing partitions to be set as the memory divided areas in the device in response to a request from a partition manager, which serves as a service entity providing the services by using the divided partitions.

The device manager 200 also issues the device public key certificate (CERT-DEV) corresponding to the device. The device manager 200 receives a request to issue a public key certificate from the device, checks the received issuing request, and transfers it to the certificate authority (CA (DEV)) 610. The device manager 200 also serves as a registration authority (RA) 220 managing the issued public key certificate.

Figure 7:
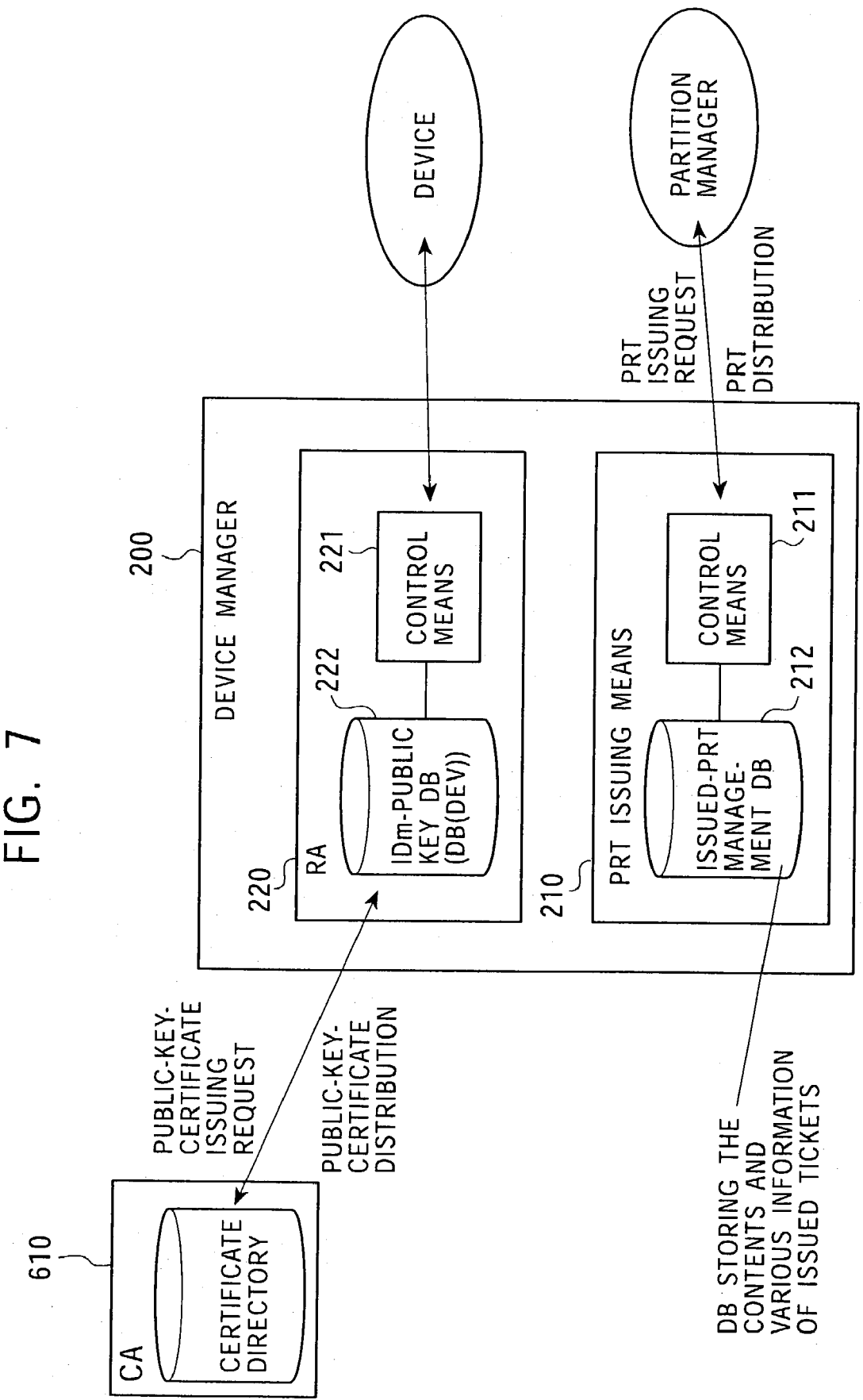
FIG. 7 is a diagram illustrating the configuration of a device manager in the system of the present invention.

As shown in FIG. 7, the partition registration ticket (PRT) issuing means (PRT Issuer) 210 of the device manager 200 has control means 211 and a database 212. The database 212 stores issued-partition-registration-ticket (PRT) management data, such as issued-ticket management data in which, for example, a partition manager identifier for identifying the ticket issuer, a ticket identifier, and a ticket user (ex. reader/writer, PC, etc.) are stored while being related to each other.

The registration authority (RA) 220 has a control means 221 and an issued-public-key-certificate management database 222, which stores issued-public-key-certificate management data, such as data in which, for example, a device identifier that has issued the public key certificate and a public-key-certificate identifier (serial number) are stored while being related to each other.

The control means 211 of the partition registration ticket (PRT) issuing means (PRT Issuer) 210 of the device manager 200 executes issuing processing of a partition registration ticket (PRT) by performing data communication with the partition manager. The control means 221 of the registration authority (RA) 220 executes issuing processing of a public key certificate for the device by performing communication with the device and the device-manager certificate authority (CA(DEV)) 610. Details of the above-described processings are discussed below. The configuration of the control means 211 or 221 is described below with reference to FIG. 8.

Figure 8:
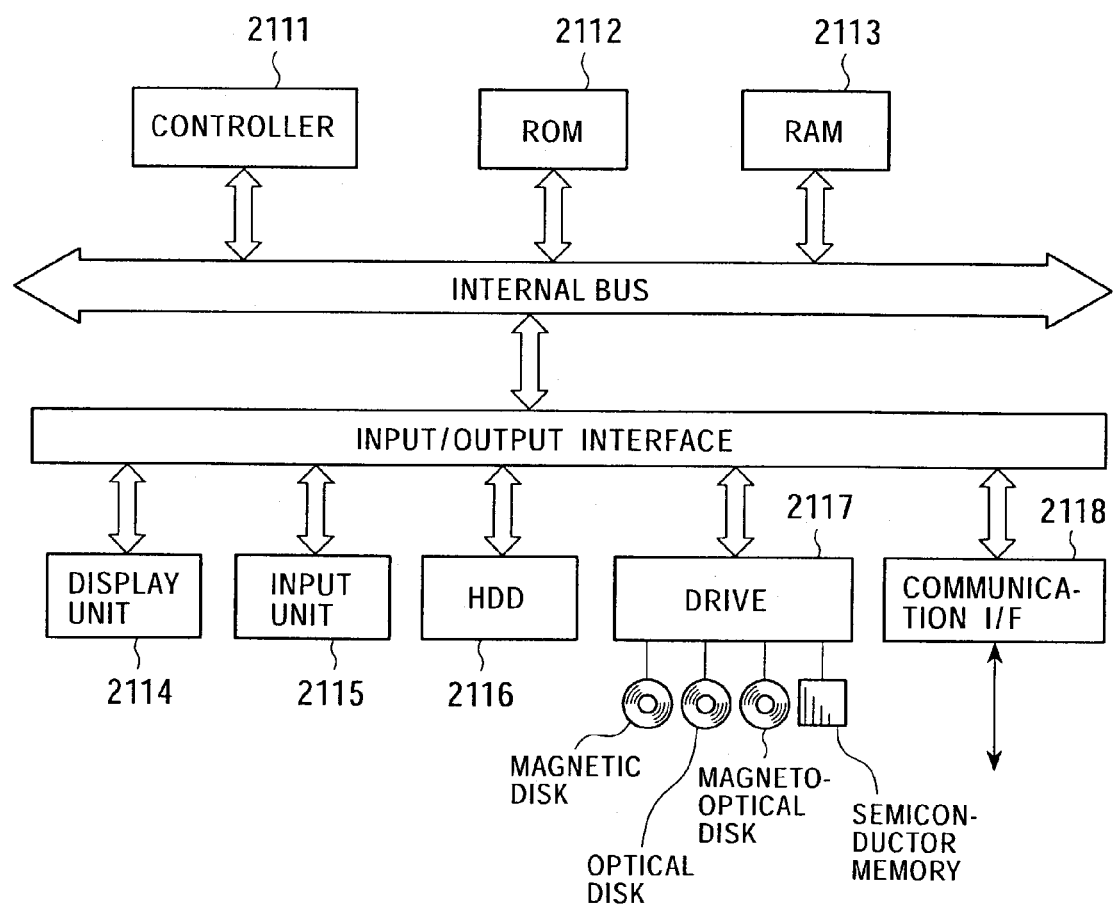
FIG. 8 is a diagram illustrating the configuration of device-manager control means in the system of the present invention.

The control means 211 and 221 are both configured in a manner similar to a PC, which serves as, for example, data processing means, and more specifically, the control means 211 and 221 are configured as shown in FIG. 8. The configuration of the control means is as follows. A controller 2111 is formed of a central processing unit (CPU) that executes various processing programs. A ROM (Read only Memory) 2112 is a memory storing execution processing programs, such as an encryption processing program. A RAM (Random Access Memory) 2113 is used as a storage area for the programs executed by the controller 2111, for example, a data base management program, an encryption processing program, a communication program, and an execution program, and is also used as a work area for performing the above-described processing programs.

A display unit 2114 has display means, such as a liquid crystal display or a CRT, and displays data when various programs are executed, for example, the processed data content, under the control of the controller 2111. An input unit 2115 has a keyboard and a pointing device, for example, a mouse, and outputs commands and data input from such input devices to the controller 2111. An HDD (Hard Disk Drive) 2116 stores programs, such as a database management program, an encryption processing program, and a communication program, and various data.

A drive 2117 has the function of controlling access to various recording media, such as magnetic disks, for example, HDDs (Hard Disks) and FDs (Floppy Disks), optical discs, for example, CD-ROMs (Compact Disk ROMs), magneto-optical disks (mini disks), and semiconductor memory, for example, ROMs and flash memory. The various recording media, such as magnetic disks, store programs and data. A communication interface 2118 serves as a cable or wireless interface performing communication via a network, a cable connection, or a telephone line, and serves as a communication interface with the individual entities, such as the user device, the partition managers, and the certificate authorities.

[A4. Partition Manager Configuration]

The configuration of the partition manager is discussed below with reference to FIG. 9. The partition manager is the management entity for the partitions set in the device to be provided (sold or loaned) to the user.

The partition manager 300 sets the partitions as the divided areas in the memory of the user device by using the partition registration ticket (PRT) assigned from the device manager according to the rules recorded in the assigned PRT, and then provides the services by using the set partitions.

Files corresponding to the services and data can be set in the partitions. For performing the file setting processing, it is necessary to obtain a file registration ticket (FRT), and for making data access, such as reading and writing, it is necessary to obtain a service permission ticket (SPT). The file setting processing and the data access processing are performed by a ticket user, and more specifically, by a reader/writer, which serves as a dedicated data access unit, by using the tickets.

The partition manager 300 includes the file registration ticket (FRT) issuing means (FRT Issuer) 310 and the service permission ticket (SPT) issuing means (SPT Issuer) 320, which serve as the ticket issuing processing means for the user tickets.

The partition manager 300 also issues the partition public key certificate (CERT-PAR) for each partition of the device. The partition manager 300 receives a public-key-certificate issuing request from the device, checks the received issuing request, and then transfers the checked request to the certificate authority (CA(PAR)) 620. The partition manager 300 also serves as a registration authority (RA) for managing the issued public key certificate.

Figure 9:
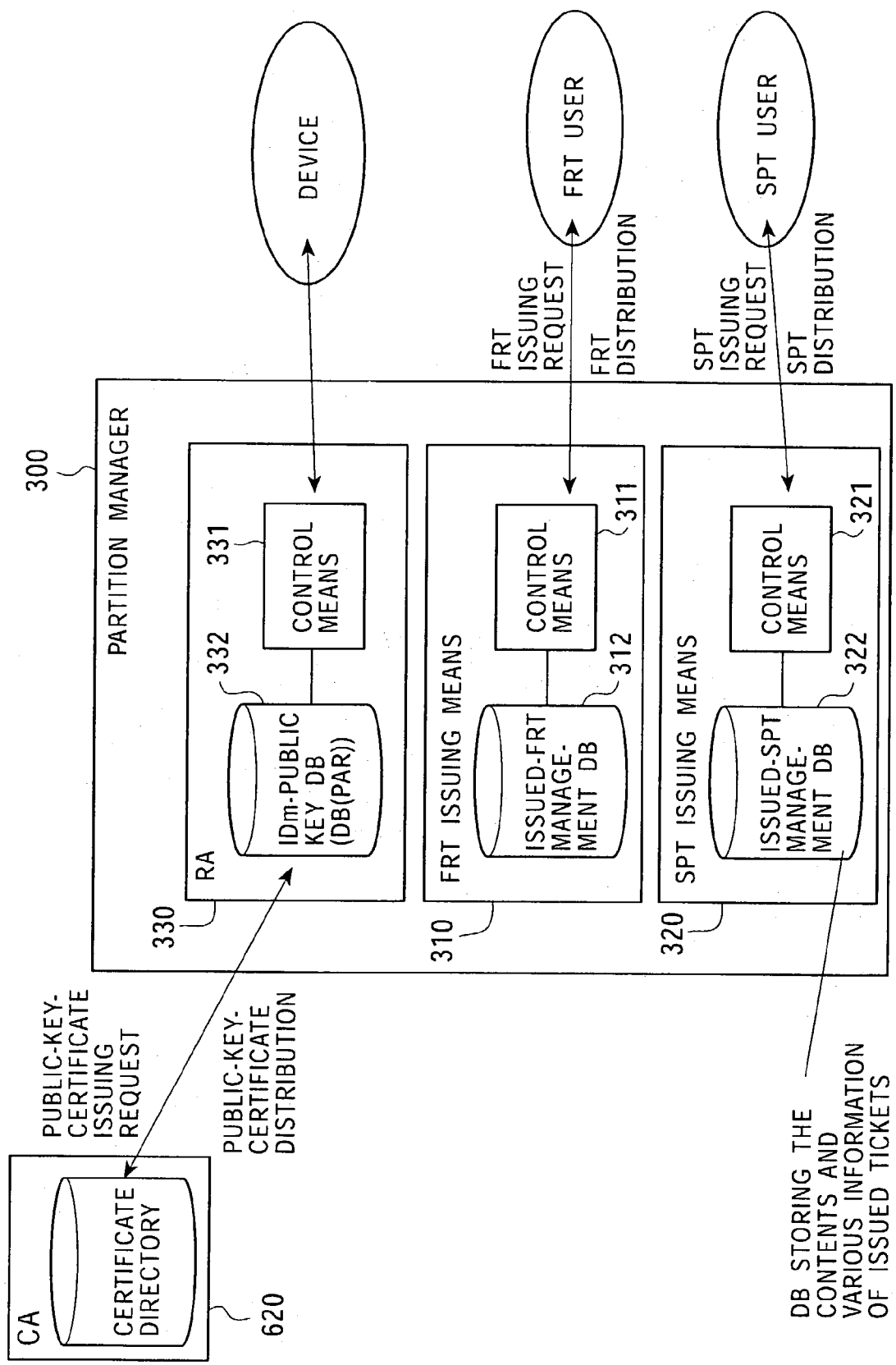
FIG. 9 is a diagram illustrating the configuration of a partition manager in the system of the present invention.

As shown in FIG. 9, the file registration ticket (FRT) issuing (FRT Issuer) 310 includes control means 311 and a database 312. The database 312 stores issued file registration ticket (FRT) management data, such as, issued-ticket management data in which, for example, a ticket user (ex. reader/writer, PC, etc.) identifier of the ticket issuer and a ticket identifier are stored while being related to each other.

The service permission ticket (SPT) issuing means (SPT Issuer) 320 of the partition manager 300 includes control means 321 and a database 322. The database 322 stores issued service permission ticket (SPT) management data, such as issued-ticket management data in which, for example, a ticket user (ex. reader writer, PC, etc., as the device access unit) identifier of the ticket issuer and a ticket identifier are stored while being related to each other.

The registration authority (RA) 330 has a database 332 for managing issued public key certificates. In the database 332, issued-public-key-certificate management data in which, for example, a device identifier that has issued a public key certificate, a partition identifier, and a public-key-certificate identifier (serial number) are stored while being related to each other.

The control means 311 of the file registration ticket (FRT) issuing means (FRT Issuer) 310 of the partition manager 300 executes issuing processing of a file registration ticket (FRT) by performing data communication with the ticket user (ex. reader/writer, PC, etc., as the device access unit). The control means 321 of the service permission ticket (SPT) issuing means (Ticket Issuer) 320 executes issuing processing of a service permission ticket (SPT) by performing data communication with the ticket user (ex. reader/writer, PC, etc., as the device access unit). The control means 331 of the registration authority (RA) 330 executes issuing processing of a public key certificate for the device by performing communication with the device and the partition-manager certificate authority (CA(PAR)) 620. Details of these processings are discussed below.

The configuration of the control means 311, 321, and 331 of the partition manager 300 is similar to the control means of the above-described device manager discussed with reference to FIG. 8, and an explanation thereof is thus omitted.

[A5. Ticket User (Reader/Writer as Device Access Unit) Configuration]

The reader/writer as the device access unit is configured to perform various processings, such as device partition setting, file setting, data reading and writing, billing-data decrementing and incrementing, etc. The processing is performed on the device according to the rules recorded in the corresponding partition registration ticket (PRT), the file registration ticket (FRT), or the service permission ticket (SPT). That is, all the processings to be performed on the device are restricted by the corresponding tickets.

Figure 10:
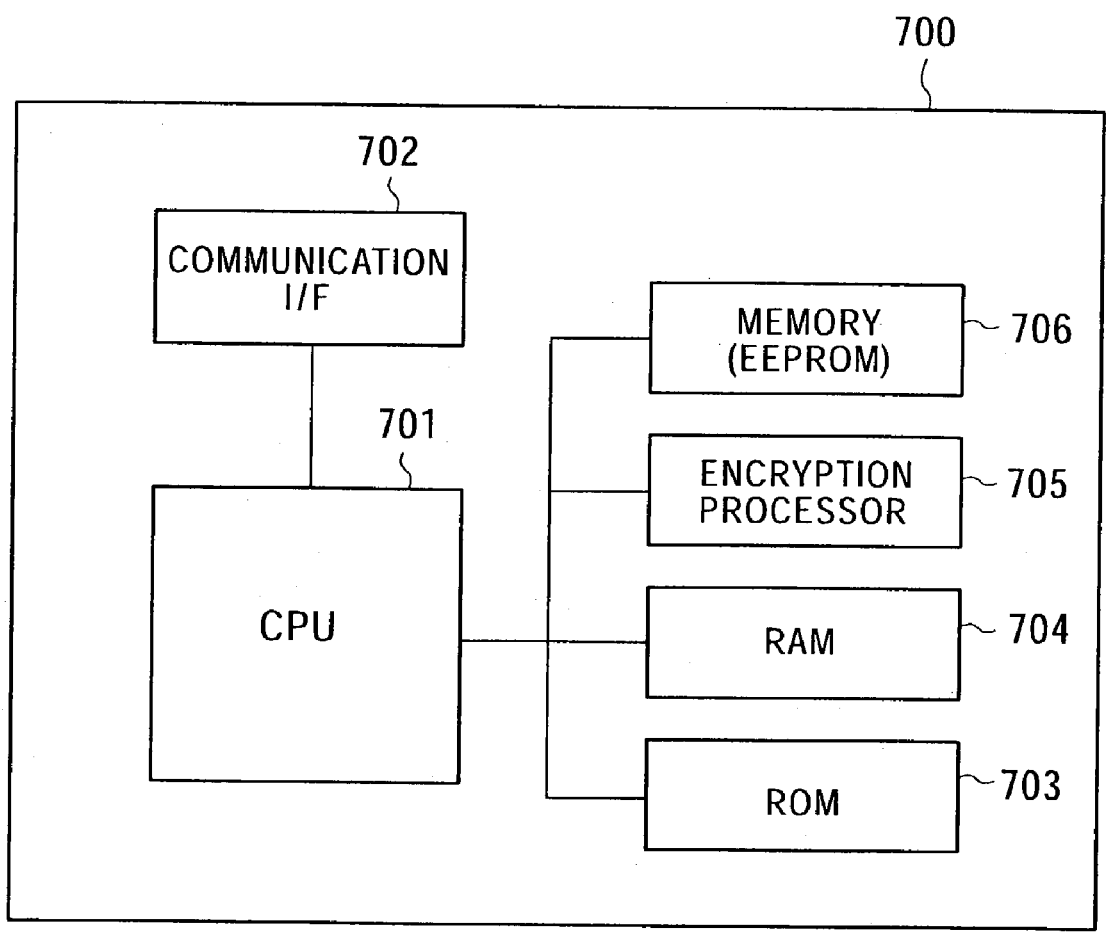
FIG. 10 is a diagram illustrating the configuration of a reader/writer (R/W) in the system of the present invention.

An example of the configuration of the reader/writer as the device access unit is shown in FIG. 10. As shown in FIG. 10, a reader/writer 700 includes: a CPU (Central Processing Unit) 701 having a program execution function and a computation processing function; a communication interface 702 having an interface function of performing communication processing with external devices, such as the device and the ticket issuing means (Ticket Issuer); a ROM (Read Only Memory) 703 storing various programs to be executed by the CPU 701, for example, an encryption processing program; a RAM (Random Access Memory) 704, which serves as a load area for programs to be executed, or a work area for the various types of program processings; an encryption processor 705 for performing encryption processing, such as authentication processing with external devices, digital signature creation, verification processing, encryption of storage data, and decoding processing; and a memory 706, which is formed of, for example, an EEPROM (Electrically Erasable Programmable ROM), storing various key data for authentication processing, encryption and decryption processing, etc., and unique information of the reader/writer.

[A6. Public Key Certificate]

In the use of the device having a memory provided with a plurality of partitions according to the present invention, when performing data communication among the entities, the ticket issuing means, the ticket users, and the devices, necessary information is transferred after checking whether both the data transmission side and the data receiving side are an authorized sender and an authorized receiver. To implement a security configuration for performing such data transfer, encryption processing, signature creation, and verification processing are performed on the transfer data.

Encrypted data can be decrypted into decoded data (plaintext) by decryption processing according to a predetermined procedure. Such a data encryption and decryption method using an encryption key for encrypting information and using a decryption key for decrypting the information is conventionally well known.

There are various modes for a data encryption/decryption method using an encryption key and a decryption key. As an example of such modes, a system, which is referred to as a "public key cryptosystem", is known. According to the public key cryptosystem, the key for the sender and the key for the receiver are different. One of the keys is used as a public key that can be used by unspecified users, and the other key is used as a private key that is kept private. For example, the public key is used for the encryption key, and the private key is used for the decryption key. Alternatively, the private key is used for the authenticator creation key, and the public key is used for the authenticator verification key.

Unlike a so-called common key cryptosystem in which the common key is used for encryption and decryption, in the public key cryptosystem, the private key that has to be kept private is possessed by a single specified user, which is thus advantageous in terms of the management of the key. However, the data processing rate of the public key cryptosystem is lower than that of the common key cryptosystem. Thus, the public key cryptosystem is suitable for processing a small amount of data, such as delivering a private key and creating a digital signature. A typical example of the public key cryptosystem is RSA (Rivest-Shamir-Adleman) encryption. In the RSA encryption, the product of two vary large prime numbers (for example, 150 digits) is employed, and the fact that it is very difficult to perform factorization of two large prime factors (for example, 150 digits) is utilized.

In the public key cryptosystem, the public key can be used for many unspecified users, and a certificate that certifies the integrity of the distributed public key, i.e., a public key certificate, is often employed. For example, in this system, user A creates a pair of a public key and a private key, sends the created public key to a certificate authority, and obtains a public key certificate from the certificate authority. The user A opens the public key certificate to the public. An unspecified user obtains the public key from the public key certificate according to the predetermined procedure, encrypts a document, and sends it to the user A. The user A decrypts the encrypted document by using the private key. Also, in this system, the user A attaches a signature to the document by using the private key, and an unspecified user obtains the public key from the public key certificate according to the predetermined procedure, and verifies the signature.

The public key certificate is a certificate issued by a certificate authority (CA) in the public key cryptosystem. For creating the public key certificate, the user submits the user ID and the public key to the certificate authority, and the certificate authority adds information, such as the ID of the certificate authority and the validity date, and the signature of the certificate authority.

FIG. 11 illustrates the overall format of the public key certificate. The individual data items are briefly discussed below.

The version number of the certificate indicates the version of the public key certificate format.

The serial number of the certificate is indicated by the serial number (SN), which is the serial number of the public key certificate set by the public key issuing authority (certificate authority: CA).

In the signature algorithm and the algorithm parameter in the signature algorithm identifier field, the signature algorithm of the public key certificate and the parameter thereof are recorded. As the signature algorithms, the elliptic curve cryptosystem and the RSA are known. If the elliptic curve cryptosystem is applied, the parameter and the key length are recorded. If the RSA is applied, the key length is recorded.

The issuing authority (certificate authority: CA) name is the field in which the issuer of the public key certificate, i.e., the name (Issuer) of the public key certificate issuing authority (CA) is recorded in the identifiable format (distinguished name).

In the certificate validity date, the start time and date and the end time and date, which is the validity date of the certificate, are recorded.

In the public-key-certificate user name (subject), the ID data of the user to be authorized is recorded. More specifically, for example, the identifier or the category, such as the user machine ID or the service providing entity ID, is recorded.

In the key algorithm (algorithm) and the key (subject public key) of the user public key field (Subject Public Key Info), the key algorithm and the key information itself are stored as the user public key information.

In the option area, the user attribute data, and other optional data concerning the issuing and the usage of the public key certificate are recorded. As the attribute data, the device manager code (DMC) or the partition manager code (PMC) as the user group information is recorded. The user is the user of the public key certificate, for example, the device manager, the partition manager, the ticket user, the ticket issuing means, or the device.

In the option area, the category indicating the entity type or the machine type, such as the ticket user, the ticket issuing means, the device, the device manager, or the partition manager, is also recorded as category information.

If the device manager also serves as the partition registration ticket issuing means (PRT Issuer), partition-registration-ticket-issuing-means code, which is discussed below, can be set as the device manager code (DMC). If the partition manager also serves as the file registration ticket issuing means and the service permission ticket issuing means, file-registration-ticket-issuing-means code (FRTIC: FRT Issuer Code) and service-permission-ticket-issuing-means code (SPTIC: SPT Issuer Code) can be set as the partition manager code (PMC). These codes are also recorded in the corresponding tickets (PRT, FRT, and SPT), which are discussed below.

Alternatively, a unique code, which is different from the device manager code (DMC) or the partition manager code (PMC), may be assigned to each ticket issuing means. In this case, code is assigned by the above-described code management institute.

The issuing authority signature is a digital signature assigned to the data of the public key certificate by using the private key of the public key certificate issuing authority (CA). The user of the public key certificate is able to check for the integrity of the public key certificate by using the public key of the public key certificate issuing authority (CA).

Figure 12:
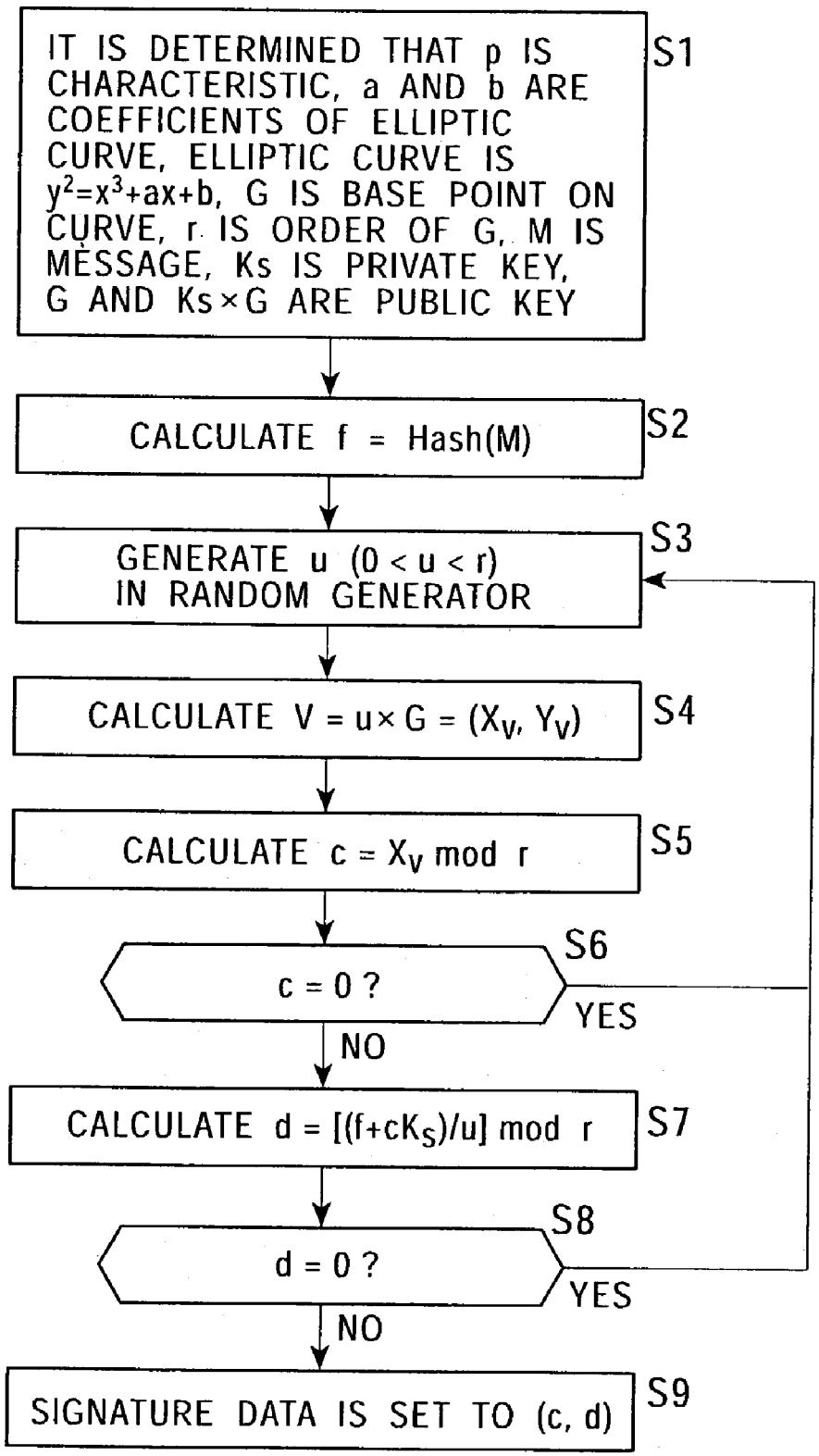
FIG. 12 is a flowchart illustrating a signature generation processing according to a public key system that can be used in the system of the present invention.

A digital-signature generating method using a public key cryptosystem is described below with reference to FIG. 12. The processing shown in FIG. 12 is a digital-signature-data generating processing flow using EC-DSA ((Elliptic Curve Digital Signature Algorithm), IEEE P1363/D3). In this method, the elliptic curve Cryptography (hereinafter referred to as "ECC") is employed as the public key cryptosystem. In the data processing apparatus of the present invention, another public key cryptosystem other than the ECC, for example, RSA encryption (Rivest, Shamir, Adleman) (ANSI X9.31) can be used.

The individual steps in FIG. 12 are as follows. In step S1, it is determined that p is a characteristic, a and b are coefficients of an elliptic curve (elliptic curve: $y^2=x^3+ax+b$, $4a^3+27b^2 \neq 0$ (mode p)), G is a base point on the elliptic curve, r is the order of G, and Ks is a private key (0<Ks<r). In step S2, the hash value of message M is calculated and is set to f=Hash(M).

A technique for determining the hash value by using a hash function is discussed below. The hash function is a function for inputting a message, compressing the message into a predetermined length of data, and outputting it as a hash value. In the hash function, it is difficult to predict the input from the hash value (output), and when one bit of the data input into the hash function changes, many bits of the hash value change. It is also difficult to find different input data having the same hash value. As the hash function, MD4, MD5, or SHA-1 may be used, and DES-CBC may be used. In this case, MAC (check value: corresponding to ICV), which is the final output value, is the hash value.

Subsequently, in step S3, a random number u (0<u<r) is generated, and in step S4, coordinates V ($X_V$, $Y_V$) obtained by multiplying the base point by u are calculated. The addition and the multiplication by two on the elliptic curve are defined as follows.

It is now assumed that P=(Xa, Ya), Q=(Xb, Yb), and R=(Xc, Yc)=P+Q.

When P≠Q (addition), $Xc=\lambda^2-Xa-Xb$ $Yc=\lambda \times (Xa-Xc)-Ya$ $\lambda=(Yb-Ya)/(Xb-Xa)$.

When P=Q (multiplication by two), $Xc=\lambda^2-2Xa$ $Yc=\lambda \times (Xa-Xc)-Ya$ $\lambda=(3(Xa)^2+a)/(2Ya)$.

By using these factors, the value obtained by multiplying the point G by u is calculated (the simplest calculation method although the speed is slow is as follows: G, 2×G, 4×G, . . . are calculated, u is expanded into a binary format, $2^i \times G$ (value obtained by two to the power of i (i is the bit position counted from the LSB of u) is applied to the bit positions having the value of 1, and the resulting values are added.

In step S5, $c=X_V \mod r$ is calculated, and it is determined in step S6 whether c is 0. If c is not 0, $d=[(f+cKs)/u] \mod r$ is calculated in step S7. Then, it is determined in step S8 whether d is 0. If d is not 0, c and d are output as digital signature data in step S9. If it is assumed that r has a length of 160 bits, the digital signature data has 320 bits.

If it is found in step S6 that c is 0, the process returns to step S3, and a new random number is re-generated. Similarly, if it is found in step S8 that d is 0, the process returns to step S3, and a random number is re-generated.

Figure 13:
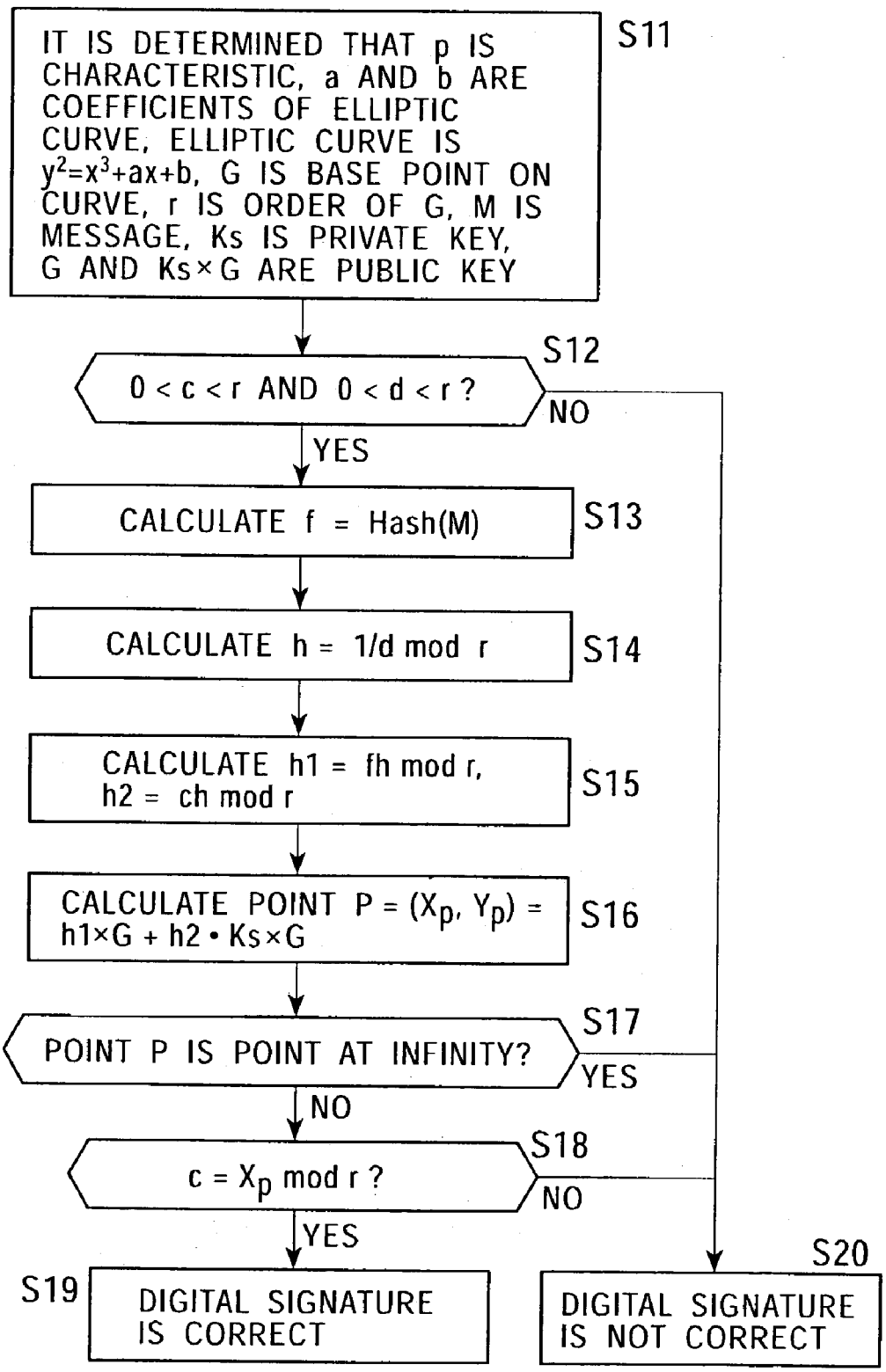
FIG. 13 is a flowchart illustrating signature verification processing according to a public key system that can be used in the system of the present invention.

A technique for verifying a digital signature using a public key cryptosystem is described below with reference to FIG. 13. In step S11, it is determined that M is a message, p is a characteristic, a and b are coefficients of an elliptic curve (elliptic curve: $y^2=x^3+ax+b$, $4a^3+27b^2 \neq 0$ (mode p)), G is a base point on the elliptic curve, r is the order of G, Ks is a private key (0<ks<r), and G and Ks×G are a public key (0<Ks<r). It is determined in step S12 whether digital signature data c and d satisfy 0<c<r and 0<d<r, respectively. If they are satisfied, in step S13, the hash value of the message M is calculated, and is set to f=Hash(M). Then, in step S14, h=1/d mod r is calculated, and in step S15, h1=fh mod r, h2=ch mod r are calculated.

In step S16, point P=(Xp, Yp)=h1×G+h2·Ks×G is calculated by h1 and h2 which have already been calculated. Since the digital signature verifier knows the base point G and Ks×G, it is possible to calculate the scalar product of the point on the elliptic curve, as in a manner similar to step S4 of FIG. 12. It is then determined in step S17 whether the point P is a point at infinity. If it is not a point at infinity, the process proceeds to step S18 (in reality, a determination as to whether the point P is a point at infinity can be made in step S16, that is, when P=(X, Y) and Q=(X, −Y) are added, λ cannot be calculated, and it is thus proved that P+Q is a point at infinity). In step S18, Xp mod r is calculated, and is compared with the digital signature data c. If the two values are the same, the process proceeds to step S19 in which it is determined that the digital signature is correct.

When the digital signature is found to be correct, it can be proved that the data has not been tampered with, and that the digital signature has been generated by the entity which has the secret key corresponding to the public key.

If the digital signature data c or d does not satisfy 0<c<r or 0<d<r in step S12, the process proceeds to step S20. If the point P is found to be a point at infinity in step S18, the process also proceeds to step S20. If Xp mod r is not equal to the digital signature data c in step S18, the process also proceeds to step S20.

When it is determined in step S20 that the digital signature is not correct, it can be proved that the data has been tampered with, or the digital signature has not been generated by the entity which has the private key corresponding to the public key.

In the system of the present invention, the device public key certificate (CERT-DEV) issued to the device via the device-manager management registration authority is stored in the device, and the partition public key certificate (CERT-PAR) issued to each device partition via the partition-manager management registration authority is stored in the corresponding partition. These public key certificates are used for performing mutual authentication, signature creation, and verification processing between the ticket user (ex. reader/writer as the device access unit) and the device when performing the processing on the device, i.e., the partition registration setting processing using the partition registration ticket (PRT), the file registration setting processing using the file registration ticket (FRT), and the data processing using the service permission ticket (SPT). Specific examples of these processings are discussed below by using flows.

[A7. Storage Data in Device Memory]

The storage data in the device having partitioned memory areas of the present invention is described below. As previously discussed with reference to FIG. 6, the device contains a memory, which is formed of, for example, an EEPROM. As the main areas, the memory has a partition area, an unused area, and a device-unique-information/device-partition-information area. The storage data in the individual areas are sequentially described below with reference to the drawing.

(A7.1. Device-Unique-Information/Device-Partition-Information Area)

Data in the device-unique-information/device-partition-information area is first discussed. In the device-unique-information/device-partition-information area, information concerning the device manufacturing entity, information concerning the device manager, setting partition information, key information required for executing the partition setting registration processing by accessing the device, etc., are stored.

Figure 14:
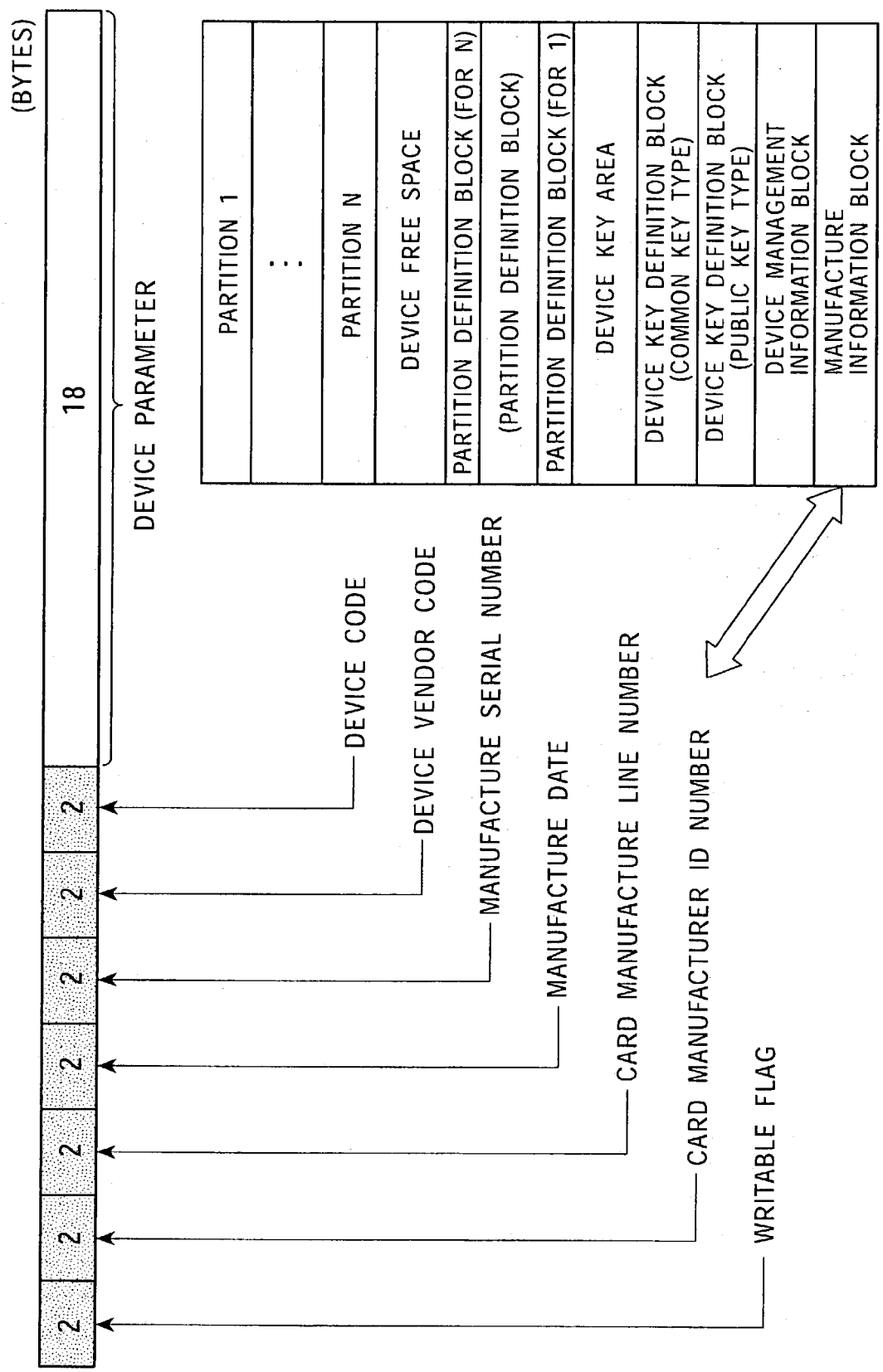
FIG. 14 is a diagram illustrating the data configuration of a manufacture information block of the data stored in the memory of the device of the present invention.

FIG. 14 illustrates the data structure of a manufacture information block. The number in each portion indicates the number of bytes. As discussed with reference to FIG. 6, one block has 32 bytes in the configuration of this embodiment. In the gray portions in FIG. 14, data may be encrypted or unencrypted.

The following items of data are stored in the manufacture information block:

Writable Flag: determination flag indicating whether the writing operation into the block is allowed (ex. 0xffff: allowed, others: not allowed);

Manufacture Code: card manufacturer ID number

Manufacture Equipment Code: card manufacture line number;

Manufacture Date: card manufacture date, for example, Jan. 1, 2001 being set to 0x0000;

Manufacture Serial Number: card manufacture serial number;

Device Vender Code: IC chip supply company number;

Device Code: IC chip model number; and

Device Parameter: other parameters.

Since these items of information written into the block are unique, the device unique identifier is defined as IDm based on these items of information. The device unique identifier may be acquired from the whole information or part of the information written into the manufacture information block, or from computed data obtained from the written information.

Figure 15:
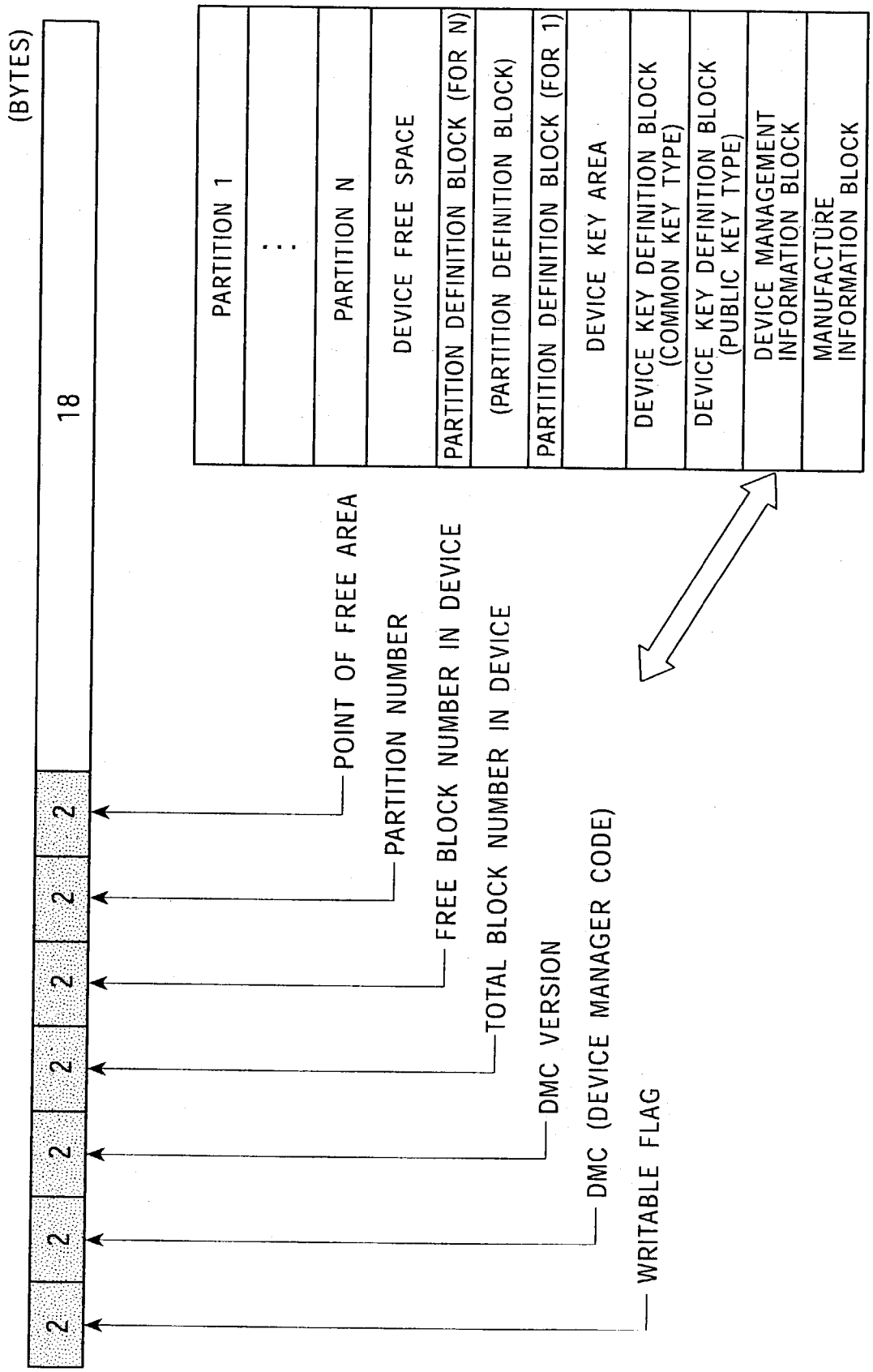
FIG. 15 is a diagram illustrating the data configuration of a device management information block of the data stored in the memory of the device of the present invention.

FIG. 15 illustrates the data configuration of the device management information block. The following items of data are stored in the device management information block:

Writable Flag: determination flag whether the writing operation into the block is allowed (ex. 0xffff: allowed, others: not allowed);

DMC (Device Manager Code): device manager (DM) ID number;

DMC Version: device manager code (DMC) version, which is used as, for example, comparison conditions when updating the DMC;

Total Block Number in Device: the number of all the blocks in the device;

Free Block Number in Device: the number of free blocks in the device;

Partition Number: the number of currently registered partitions; and

Pointer of Free Area: the pointer of the free area.

Figure 16:
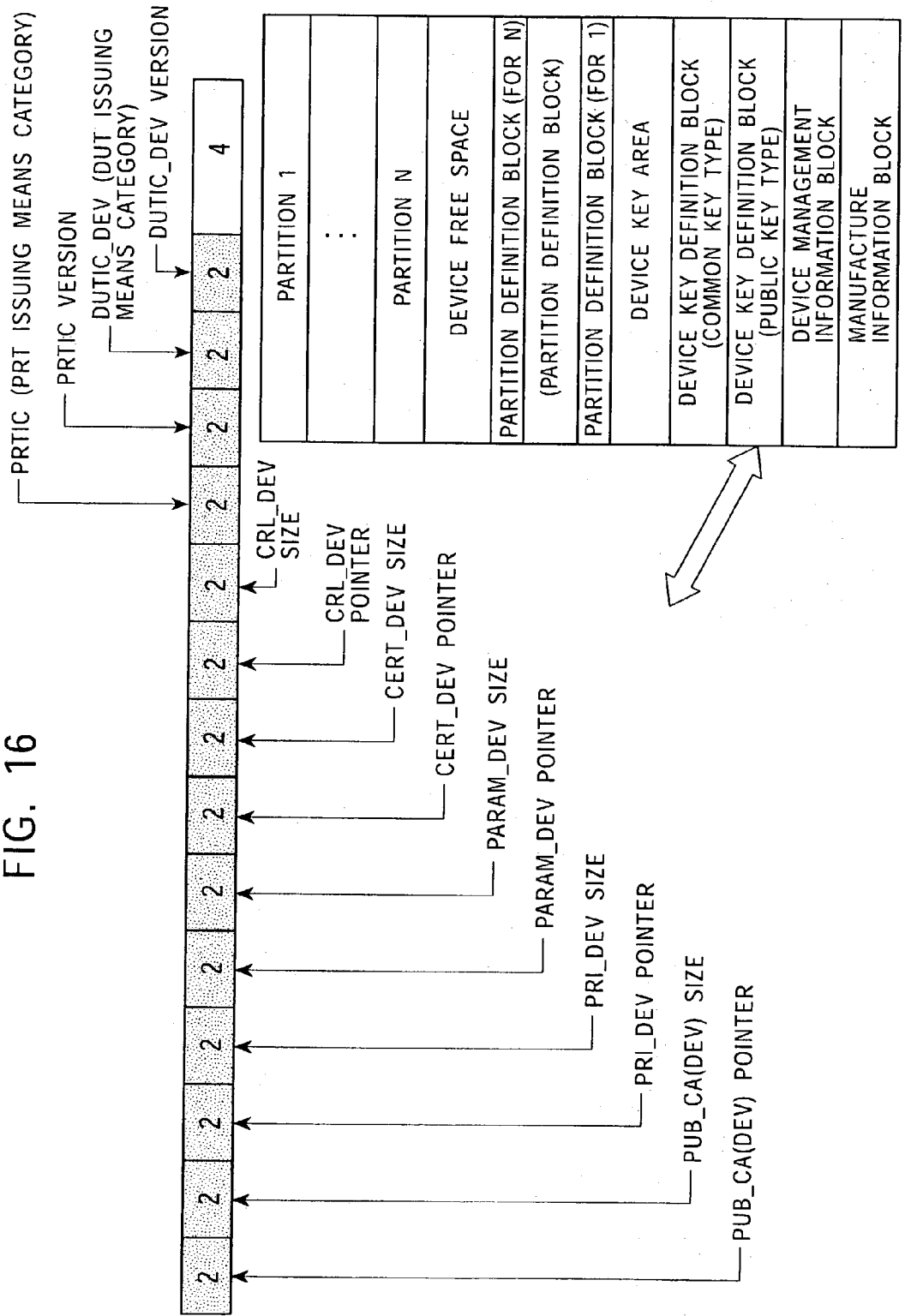
FIG. 16 is a diagram illustrating the data configuration of a public-key device key definition block of the data stored in the memory of the device of the present invention.

FIG. 16 illustrates the data configuration of the public-key device key definition block (Device Key Definition Block (PUB)). The following items of data are stored in the device key definition block (PUB):

PUB_CA(DEV) Pointer: the pointer to the block in which the public key of the device-manager certificate authority (CA(DEV)) that issues a public key certificate via a registration authority managed by the device manager is stored;

PUB_CA(DEV) Size: the size of the public key of the certificate authority CA(DEV);

PRI_DEV Pointer: the pointer to the block in which the private key of the device is stored;

PRI_DEV Size: the size of the private key of the device;

PARAM_DEV Pointer: the pointer to the block in which the public key parameter of the device is stored;

PARAM_DEV Size: the size of the public key parameter of the device;

CERT_DEV Pointer: the pointer to the block in which the public key certificate of the device issued by the certificate authority CA(DEV) is stored;

CERT_DEV Size: the size of the public key certificate of the device issued by the certificate authority CA(DEV);

CRL_DEV Pointer: the pointer to the block in which the revocation list of the device is stored;

CRL_DEV Size: the size of the revocation list of the device;

PRTIC (PRT Issuer Category): the issuer category of the partition registration ticket (RPT);

PRTIC Version: the version of the issuer category (PRTIC) of the partition registration ticket (PRT);

DUTIC_DEV (DUT Issuer Category): the issuer category of the data update ticket (DUT); and DUTIC_DEV Version: the version of the data update ticket (DUT) issuer (DUTIC).

The revocation list in the above-mentioned data items is a list of unauthorized devices, for example, a device revocation list issued by the issuer of a device distribution system, or a list of ID data indicating unauthorized devices. If a device which is set in a reader/writer as the device access unit is posted in the revocation list, the processing is terminated.

For example, the latest revocation list is constantly distributed to all the readers/writers as the device access units, and the reader/writer determines whether the processing is to be executed or terminated by checking the list when performing the processing for the device. Alternatively, the reader/writer views the latest revocation list via a network by using a communication function of the reader/writer so as to obtain unauthorized device information indicated in the list, thereby determining whether the processing is to be executed or terminated. The specific processing using the revocation list is described below by using a flow.

The data update ticket (DUT) in the above-mentioned data items is an access restricting ticket for permitting and restricting the updating processing when updating various data stored in the device. Access rules for the device are recorded in the data update ticket, as in the above-described PRT, FRT, and SPT. The data update ticket (DUT) is discussed in detail below.

Figure 17:
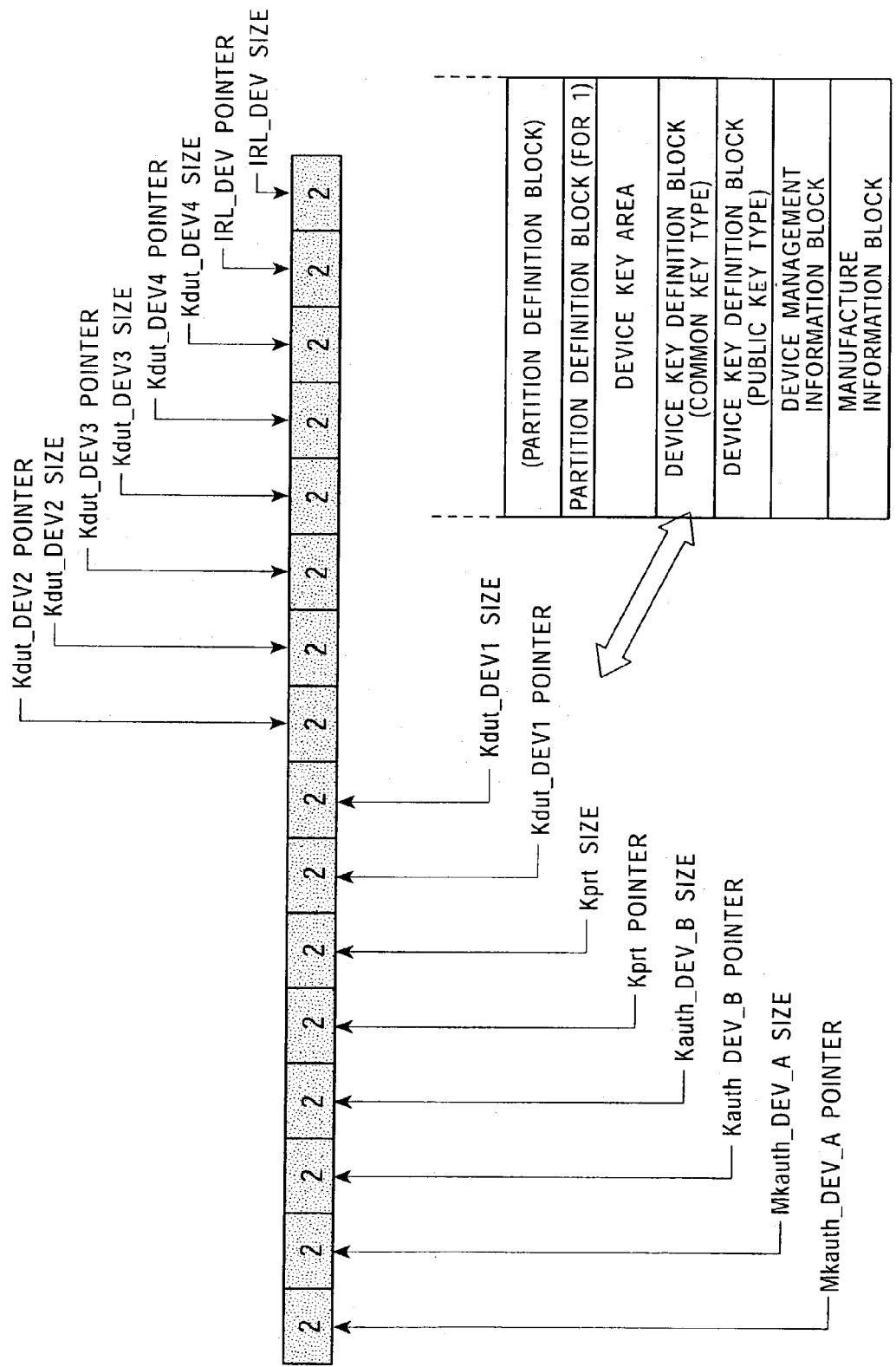
FIG. 17 is a diagram illustrating the data configuration of a common-key device key definition block of the data stored in the memory of the device of the present invention.

FIG. 17 illustrates the data structure of the common-key device key definition block (Device Key Definition Block (Common)). The following items of data are stored in the common key definition block (Common):

Mkauth_DEV_A Pointer: the pointer to a two-way individual key authentication master key (MKauth_DEV_A);

Mkauth_DEV A Size: the size of the two-way individual key authentication master key (MKauth_DEV_A);

Kauth_DEV_B Pointer: the pointer to a two-way individual key authentication key (Kauth_DEV_B);

Kauth_DEV_B Size: the size of the two-way individual key authentication key (Kauth_DEV_B);

Kprt Pointer: the pointer to the block in which the MAC checking key (Kprt) for the partition registration ticket (PRT) is stored;

Kprt Size: the size of the MAC checking key (Kprt) for the partition registration ticket (PRT);

Kdut_DEV1–4 Pointer: the pointer to the block in which the MAC checking key (Kdut) for the data update ticket (DUT) is stored;

Kdut_DEV1–4 Size: the size of the MAC checking key (Kdut) for the data update ticket (DUT);

IRL_DEV Pointer: the pointer to the block in which the device IDs of the unauthorized devices are stored as the revocation list of the devices; and IRL_DEV Size: the size of the revocation list of the devices.

The authentication method for the two-way individual key and the checking processing for the MAC (Message Authentication Code) in the above-mentioned data items are described in detail below.

There are four types of Kdut_DEV, which are used by pairs, such as (Kdut_DEV1, Kdut_DEV2) and (Kdut_DEV3, Kdut_DEV4). For example, Kdut_DEV1, 3 are used for MAC generation, and the Kdut_DEV2, 4 are used for encryption.

Figure 18:
FIG. 18 is a diagram illustrating the data configuration of a device key area of the data stored in the memory of the device of the present invention.

FIG. 18 illustrates the data structure of a device key area. The following items of data are stored in the device key area. In each key stored in the device key area, version information is stored together. When updating a key, the version is updated together.

IRL_DEV: the revocation list (device ID) in which the IDs of revoked devices and revoked units (a reader/writer as a device access unit, a ticket user, such as a PC, or ticket issuing means) are registered;

CRL_DEV: the revocation list (certificate) in which the public key certificate identifiers (ex. serial number: SN) of revoked devices and revoked units (a reader/writer as a device access unit, a ticket user, such as a PC, or ticket issuing means) are registered;

Kdut_DEV1: the MAC checking key for the data update ticket (DUT);

Kdut_DEV2: the data updating encryption key;

Kdut_DEV3: the MAC checking key for the data update ticket (DUT);

Kdut_DEV4: the data updating encryption key;

Kprt: the MAC checking key for the partition registration ticket (PRT);

CERT_DEV: the device public key certificate issued by the certificate authority CA(DEV) that issues the device-manager public key;

PRI_DEV: the private key of the device;

PARAM_DEV: the public key parameter of the device;

PUB_CA(DEV): the public key of the certificate authority CA(DEV) that issues the device-manager public key;

Kauth_DEV_B: the two-way individual key authentication common key; and

MKauth_DEV_A: the two-way individual key authentication master key.

In the device key area shown in FIG. 18, Kauth_DEV_A: the two-way individual key authentication common key and MKauth_DEV_B: the two-way individual key authentication master key are stored. However, these keys do not have to be stored if the device does not receive a request to perform common key authentication processing. Also, if the device does not perform the ticket checking processing, Kprt: the MAC checking key for the partition registration ticket (PRT) does not have to be stored.

IRL_DEV: the revocation list (device ID) in which the device IDs of revoked devices are registered and CRL_DEV: the revocation list (certificate) in which the public key certificate identifiers (ex. serial number: SN) of revoked devices are registered do not have to be stored if there is no revoked device, or if the revocation lists are obtained by using another source.

Figure 19:
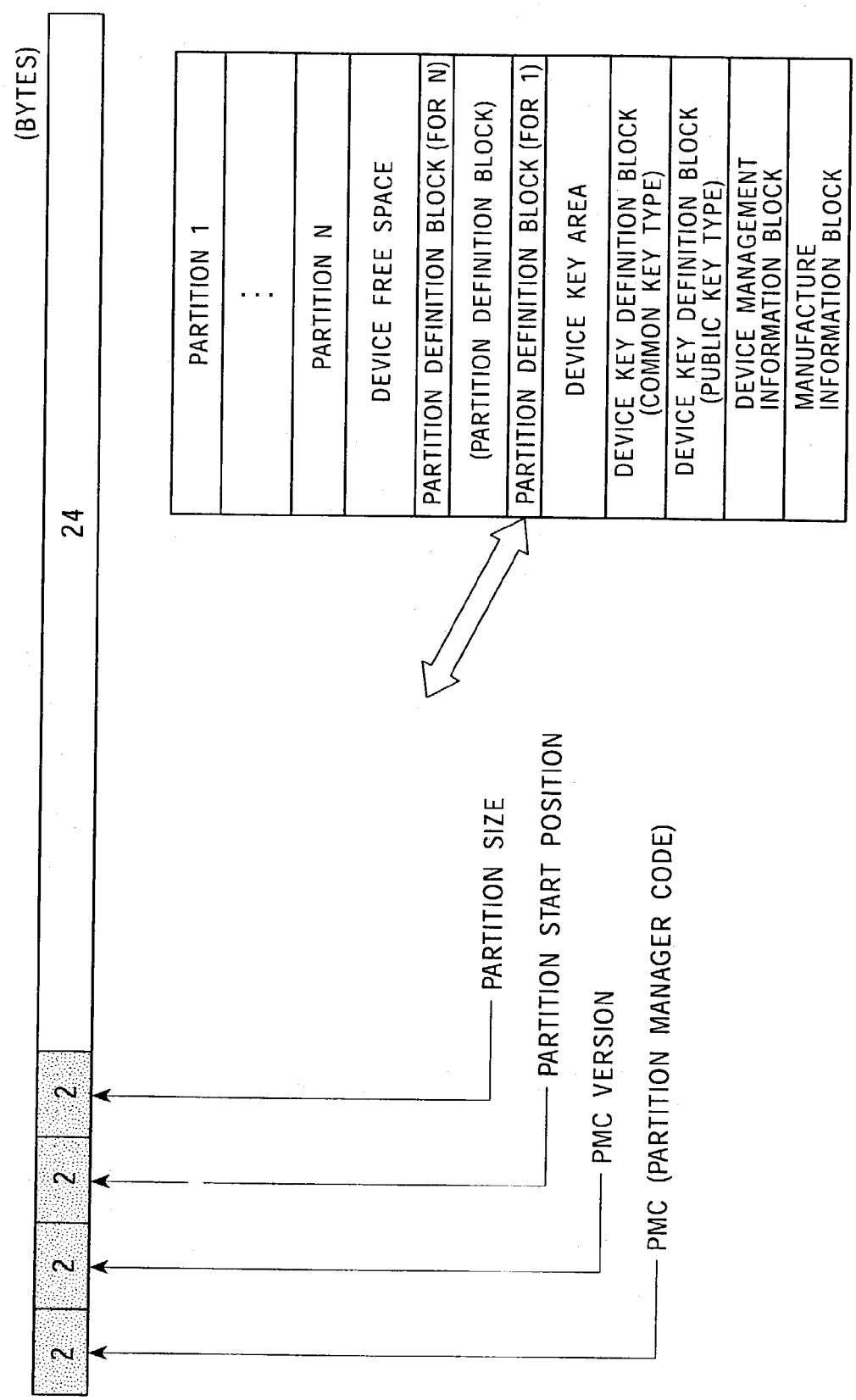
FIG. 19 is a diagram illustrating the data configuration of a partition definition block of the data stored in the memory of the device of the present invention.

FIG. 19 illustrates the data structure of the partition definition block. The following items of data are stored in the partition definition block.

PMC (Partition Manager Code): the code (PMC) assigned to the partition manager, for example, the number;

PMC Version: the version of the partition manager code (PMC);

Partition Start Position: the partition storage start address; and

Partition Size: the size of the partition.

The above-described items are the data items stored in the device-unique-information/device-partition-information area of the device memory.

(A7.2. Partition Area)

The data items in the partition area are now discussed. The partition area is the area managed by a partition manager. As discussed above, a partition manager, which serves as a service entity, stores data in the device memory according to the predetermined procedure, i.e., the rules set in the partition registration ticket (PRT) based on the PRT ticket issued by the partition registration ticket (PRT) issuing means (PRT Issuer). The data configuration of the partition area is as follows.

Figure 20:
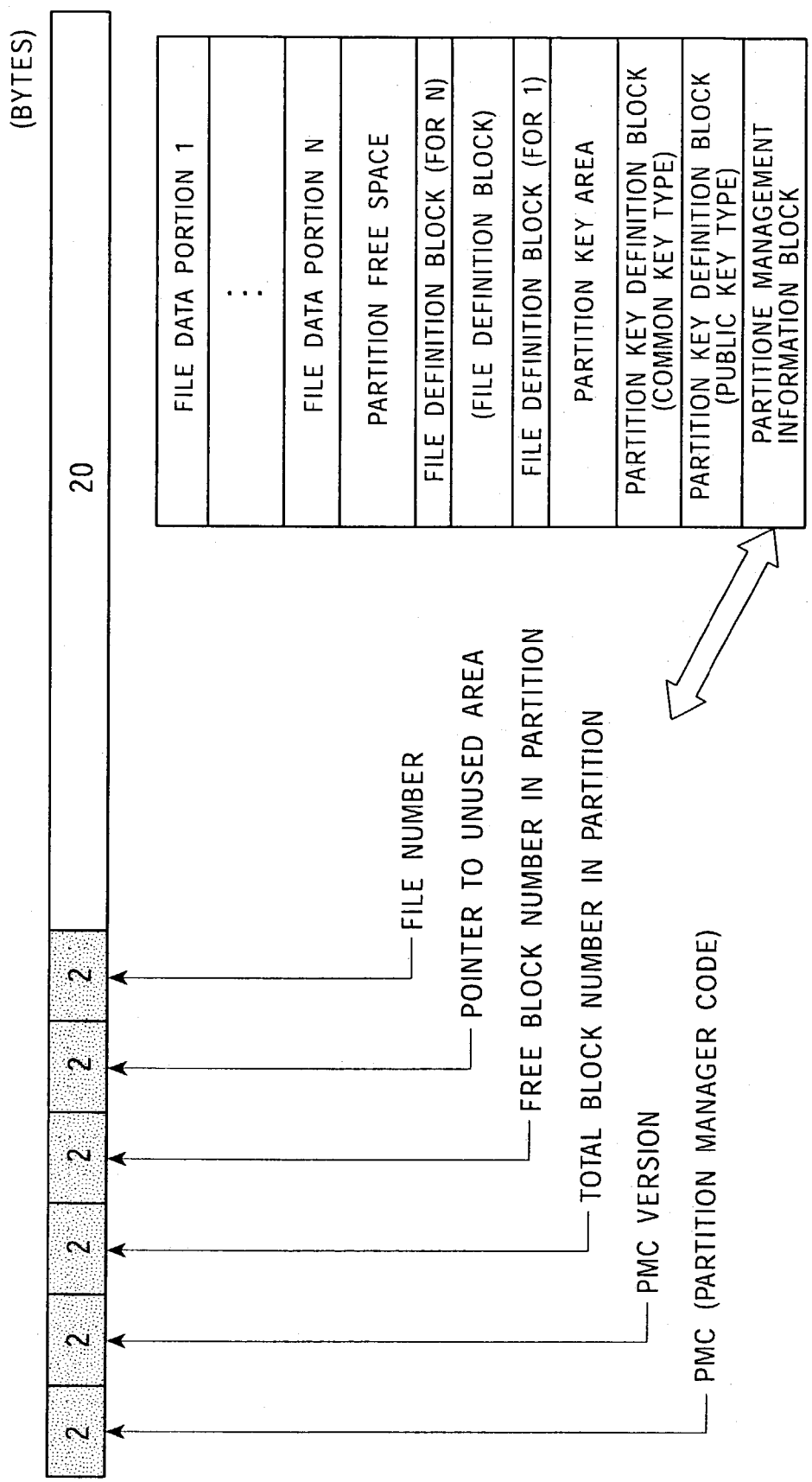
FIG. 20 is a diagram illustrating the data configuration of a partition management information block of the data stored in the memory of the device of the present invention.

FIG. 20 illustrates the data structure of the partition management information block. The following items of data are stored in the partition management information block:

PMC (partition manager code): the number of the partition possessor;

PMC Version: the version of the partition manager code (PMC);

Total Block Number in Partition: the number of all the blocks in the partition;

Free Block Number in Partition: the number of free blocks in the partition;

Pointer of Free Area: the pointer to the unused area in the partition; and

File Number: the number of files currently registered in the partition.

Figure 21:
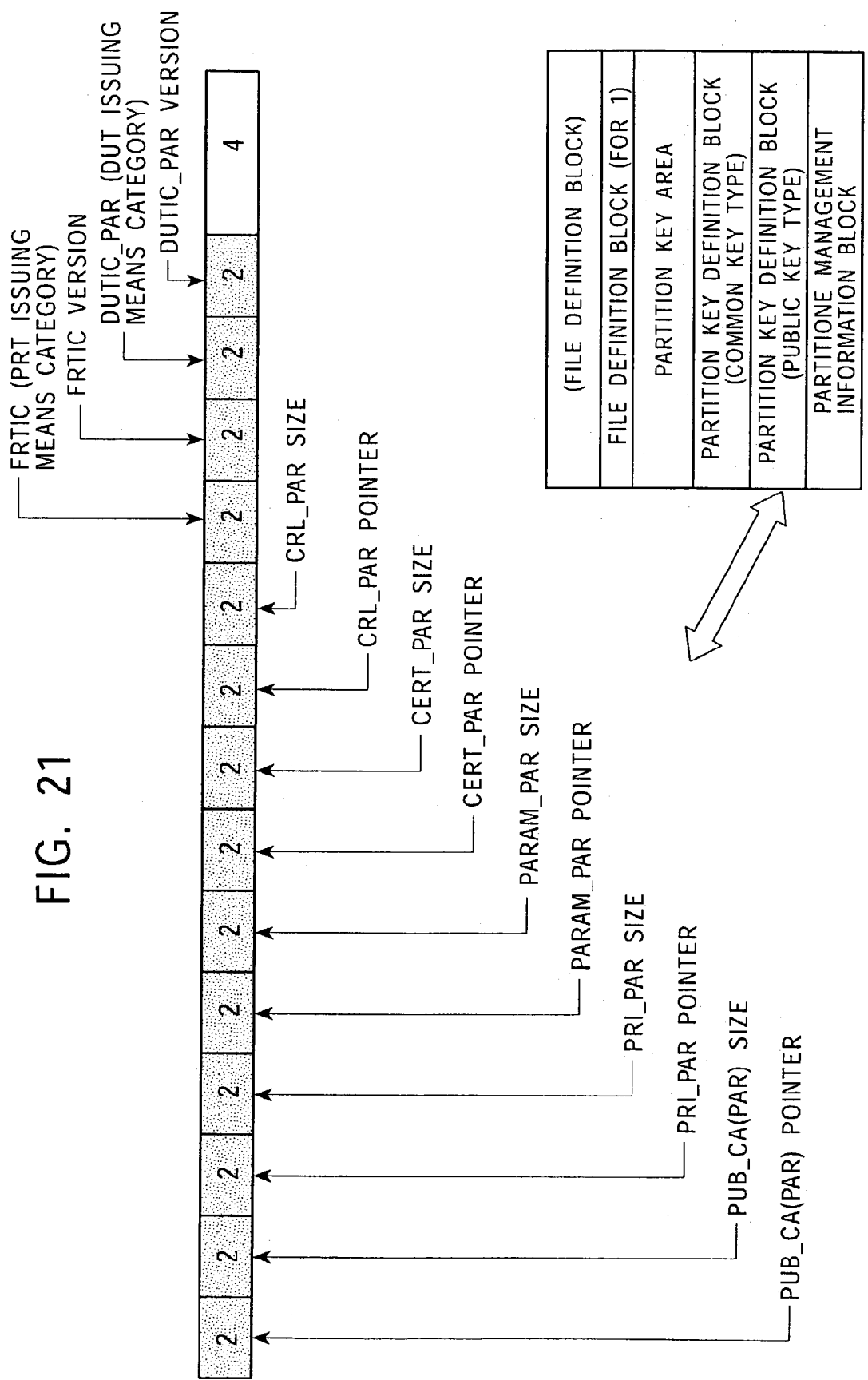
FIG. 21 is a diagram illustrating the data configuration of a public-key partition key definition block of the data stored in the memory of the device of the present invention.

FIG. 21 illustrates the data structure of the public-key partition key information block (Partition Key Definition Block (PUB)). The following items of data are stored in the public-key partition key information block (Partition Key Definition Block (PUB)):

PUB_CA(PAR) Pointer: the pointer to the block in which the public key of the certificate authority CA(PAR) that issues the public key certificate via the partition-manager registration authority is stored;

PUB_CA(PAR) Size: the size of the public key of the certificate authority CA(PAR);

PRI_PAR Pointer: the pointer to the block in which the private key of the partition is stored;

PRI_PAR Size: the size of the private key of the partition;

PARAM_PAR Pointer: the pointer to the block in which the public key parameter of the partition is stored;

PARAM_PAR Size: the size of the public key parameter of the partition;

CERT_PAR Pointer: the pointer to the block in which the public key certificate of the partition issued by the certificate authority CA(PAR);

CERT_PAR Size: the size of the public key certificate of the partition issued by the certificate authority CA(PAR);

CRL_PAR Pointer: the pointer to the block in which the revocation list of the partition is stored;

CRL_PAR Size: the size of the revocation list of the partition;

FRTIC (FRT Issuer Category): the file registration ticket (FRT) issuer category;

FRTIC Version: the version of the file registration ticket (FRT) issuer category (PRTIC);

DUTIC_PAR (DUT Issuer Category): the data update ticket (DUT) issuer category; and DUTIC_PAR Version: the version of the data update ticket (DUT) issuer category (DUTTC).

Figure 22:
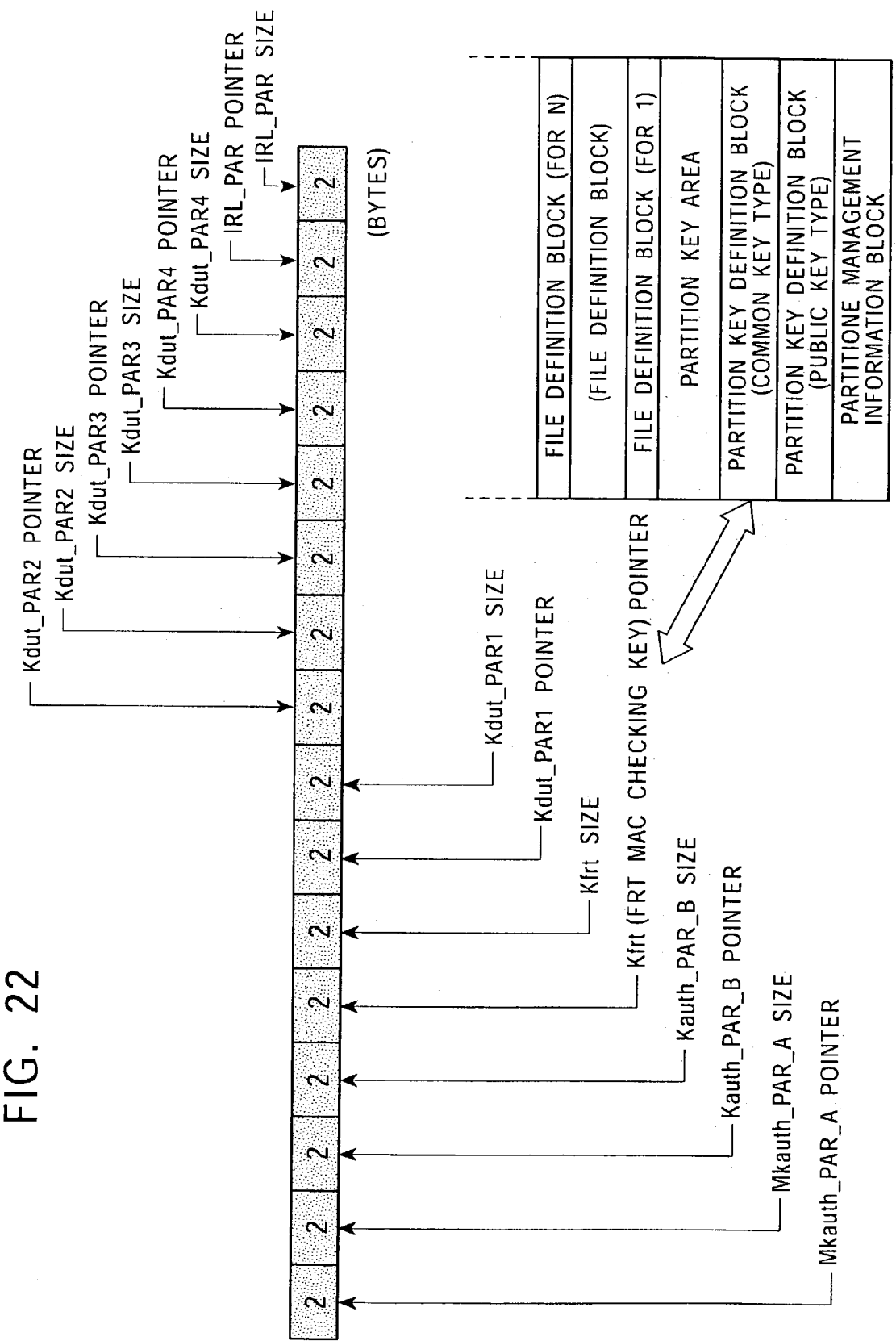
FIG. 22 is a diagram illustrating the data configuration of a common-key partition key definition block of the data stored in the memory of the device of the present invention.

FIG. 22 illustrates the data structure of the common-key partition key information block (Partition Key Definition Block (Common)). The following data items are stored in the common-key partition key information block (partition Key Definition Block (Common)):

Mkauth_PAR_A Pointer: the pointer to the two-way individual key authentication master key (MKauth_PAR_A);

Mkauth_PAR_A Size: the size of the two-way individual key authentication master key (MKauth_PAR_A);

Kauth_PAR_B Pointer: the pointer to the two-way individual key authentication key (Kauth_PAR_B);

Kauth_PAR_B Size: the size of the two-way individual key authentication key (Kauth_PAR_B);

Kfrt Pointer: the pointer to the block in which the MAC checking key (Kfrt) for the file registration ticket (FRT) is stored;

Kfrt Size: the size of the MAC checking key (Kfrt) for the file registration ticket (FRT);

Kdut_PAR1–4 Pointer: the pointer to the block in which the MAC checking key (Kdut) for the data update ticket (DUT) is stored;

KDUT_PAR1–4 Size; the size of the MAC checking key (Kdut) for the data update ticket (DUT);

IRL_PAR Pointer: the pointer to the block in which the partition revoked-device-ID revocation list (Revocation List-Device ID) is stored; and IRL_PAR Size: the size of the partition revoked-device-ID revocation list (Revocation List-Device ID).

The two-way individual key authentication method and the MAC (Message Authentication Code) checking method in the above-mentioned data items are described in detail below.

There are four types of Kdut_PAR, which are used as pairs, such as (Kdut_PAR1, Kdut_PAR2) and (Kdut_PAR3, Kdut_PAR4). For example, Kdut_PAR1, 3 are used for MAC generation, and Kdut_PAR2, 4 are used for encryption.

FIG. 23 illustrates the data structure of the partition key area. The following items of data are stored in the partition key area. In each key stored in the partition key area, version information is stored together. When updating a key, the version is updated together.

IRL_PAR: the revocation list (Revocation List (Device ID)) in which the identifiers (IDs) of the partition access revoked devices and the partition access revoked units (a reader/writer as a device access unit, a ticket user, such as a PC, or ticket issuing means) are registered;

CRL_PAR: the revocation list (Revocation list (Certificate)) in which the public key certificate identifiers (ex. serial number: SN) of the partition access revoked devices and the partition access revoked units (a reader/writer as a device access unit, a ticket user, such as a PC, or ticket issuing means) are registered;

Kdut_PAR1: the MAC checking key for the data update ticket (DUT);

Kdut_PAR2: the data updating encryption key:

Kdut_PAR3: the MAC checking key for the data update ticket (DUT);

Kdut_PAR4: data updating encryption key;

Kfrt: the MAC checking key for the file registration ticket (FRT);

CERT_PAR: the public key certificate of the partition issued by the certificate authority CA(PAR);

PRI_PAR: the private key of the partition;

PARAM_PAR: the public key parameter of the partition;

PUB_CA(PAR): the public key of the certificate authority CA(PAR);

Mkauth_PAR_A: the two-way individual key authentication master key; and

Kauth_PAR_B: the two-way individual key authentication common key.

Figure 24:
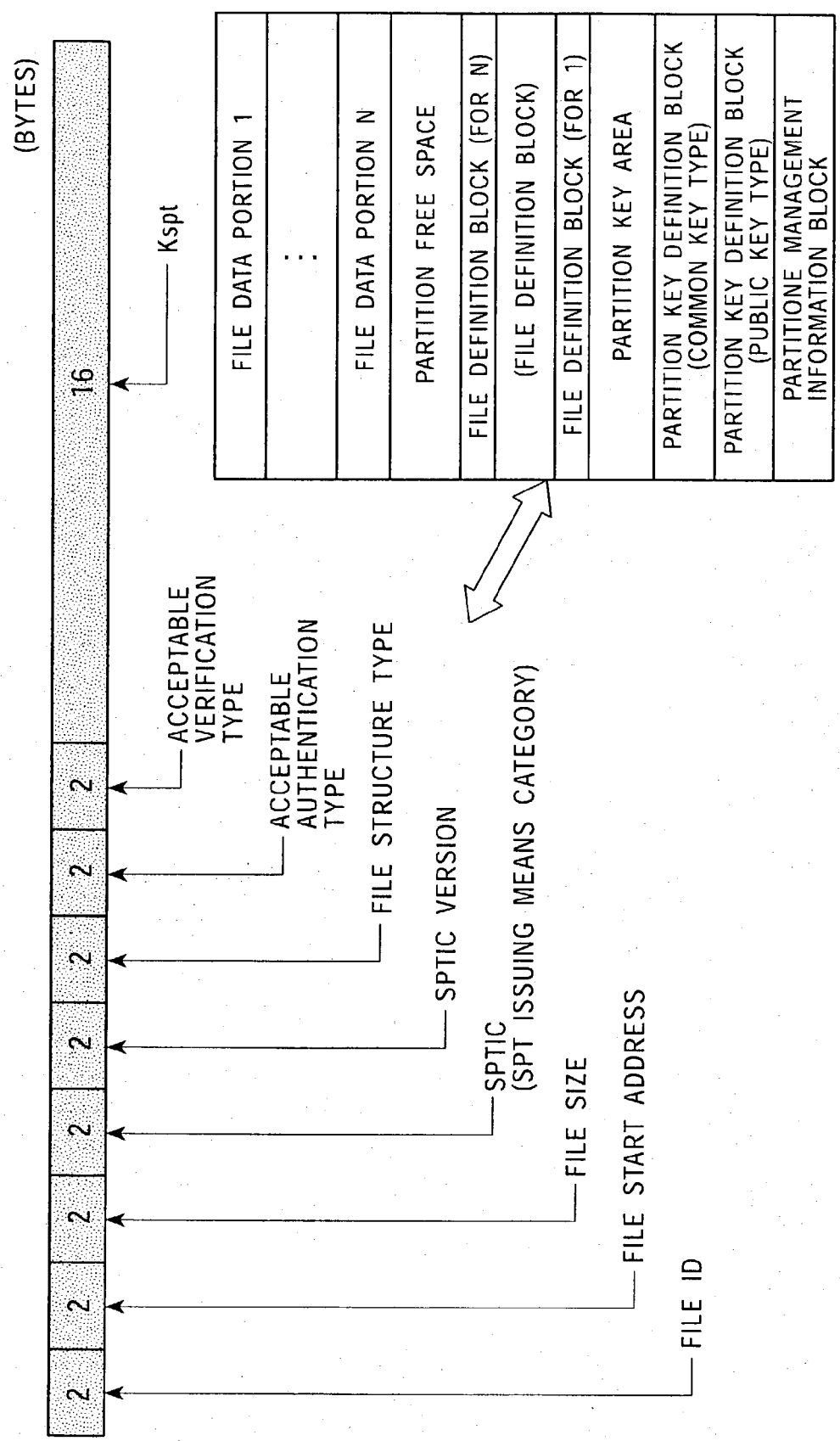
FIG. 24 is a diagram illustrating the data configuration of a file definition block of the data stored in the memory of the device of the present invention.

FIG. 24 illustrates the data structure of the file definition block (FDB). The following data items are stored in the file definition block:

File ID: the file identifier name;

File Start Position: the file start address;

File Size: the file size;

SPTIC (SPT Issuer Category): the service permission ticket (SPT) issuer category (SPTIC);

SPTIC Version: the version of the service permission ticket (SPT) issuer category (SPTIC);

File Structure Type code: the code of the file structure type;

Acceptable Authentication Type: the acceptable authentication type in which the access modes defined for the individual file structure types are associated with the corresponding bits in this field (a maximum of 16 pairs in this example) (details are as follows);

Acceptable Verification Type: the acceptable verification type in which the access modes defined for the individual file structure types are associated with the corresponding bits in this field (a maximum of 16 pairs in this example) (details are as follows); and Kspt: the MAC checking key (Kspt) for the service permission ticket (SPT).

The acceptable authentication type is the type in which the access modes defined for the individual file structure types are associated with the corresponding bits in this field (a maximum of 16 pairs in this example). For example, when executing a certain access mode, and if the bit corresponding to this mode is 1, the access mode is not executed if the public key is not authenticated. Accordingly, when executing a command having a higher degree of the importance (for example, money depositing processing), the public key must be authenticated, thereby ensuring the security. It may be controlled to perform the above-described processing by using the tickets. However, unlike the tickets, the acceptable authentication type is stored in the device as part of the file definition block, and this information cannot be changed after the file is created. Thus, the acceptable authentication type can be used when a strong restriction is desirably imposed by prohibiting a change in the acceptable authentication type, and then, the minimal degree of security can be ensured.

The above-described acceptable verification type is the type in which the access modes defined for the individual file structure types are associated with the corresponding bits in this field (a maximum of 16 pairs in this example). For example, when executing a certain access mode, and if the bit corresponding to this mode is 1, the access mode is not executed if the ticket is not verified according to a public key cryptosystem. In this example, each field has two bytes, and thus, a maximum of 16 access modes are associated with the corresponding bits. However, by increasing the field size according to the necessity, more commands can be associated.

In this embodiment, in the acceptable authentication type or the acceptable verification type, when the bit is 1, the authentication or verification using a public key system is required. Alternatively, each field may be set to 2 bits, and the settings may be made more precisely, for example, as follows. When the value is "11", the authentication or verification using a public key system is required; when the value is "01", the authentication or verification using a common key system is required, and when the value is "00" or "10", the authentication or verification using either a public key system or a common key system is required.

The file structure type in the above-described data items is the code indicating the file structure created in the partition. An example of the relationship between the file structure and the code is shown in FIG. 25.

As the file structure, there are various structures shown in FIG. 25, and codes 0001 through 0007 are assigned. The meanings of the individual files structures are as follows:

Random: all the data having this file structure can be randomly read and written;

Purse: the data having this file structure is billing information data, which can be changed, such as subtracted and added;

Cyclic: the data having this file structure can be cyclically written;

Log: the data having this file structure is a log data file, or a recording information file concerning each data processing information;

Key: the data file having this file structure is a key information file; and

Composite file: a file having a composite structure of the above-described various files (ex. Purse and Log), and different codes are assigned to the composite files according to the combination pattern (in FIG. 25, 0006: composite file 1 and 0007: composite file 2).

The data stored in the device memory have been discussed as above. The specific processing using the data is discussed below.

[A8. Data Format of each Ticket]

As discussed above, for performing the partition setting registration processing for the device, the partition registration ticket (PRT) issued by authorized ticket issuing means (Ticket Issuer) is required. For performing the file setting registration processing in the partitions set in the device, the file registration ticket (FRT) issued by authorized ticket issuing means (Ticket Issuer) is required. For accessing a file, the service permission ticket (SPT) issued by authorized ticket issuing means (Ticket Issuer) is required. As has been briefly discussed in the column of Storage Data in Memory Device, the data update ticket (DUT) is required for updating the device storage data.

Each ticket is formed of a data string in which the device access rules are indicated as binary data. The ticket is sent to the device from, for example, a reader/writer, which is a ticket user as the device access unit, according to the processing to be performed on the device. Upon receiving the ticket, the device performs the verification processing for the integrity of the ticket, and if the verification is successfully performed, various processings (ex. partition creation, file creation, and data access) are executed according to the rules recorded in the ticket. The data formats of these tickets are as follows.

(A8.1. Partition Registration Ticket (PRT))

The partition registration ticket (PRT) is the access control ticket used for performing the partition setting registration processing for the device. The device is accessed by a ticket user (ex. reader/writer as a device access unit) under the management of the partition manager by using the PRT issued by ticket issuing means (Ticket Issuer) managed by an authorized device manager according to the procedure recorded in the PRT, thereby making it possible to set the partitions within the permission recorded in the PRT.

FIG. 26 illustrates the data format of the partition registration ticket (PRT). The following items of data are stored in the partition registration ticket (PRT):

Ticket Type: the type of ticket;

Format Version: the format version of the ticket;

Ticket Issuer: the identifier of the device manager (=DMC);

Serial Number: the serial number of the ticket;

Size of Ticket: the size of the ticket;

Authentication Flag: the flag indicating whether mutual authentication with the device is required for using the ticket;

Ticket User Group: the group to which the ticket user belongs;

Authentication Type: the type of mutual authentication (public key authentication, common key authentication, or either type (Any)) of the device;

Ticket User Identifier: ID data (category or identifier) for determining the ticket user, this field being associated with [Authentication Type] (when [Authentication Type] is the public key authentication, the ID name (DN: Distinguished Name), the category, or the serial number (SN) is stored; when [Authentication Type] is the common key authentication, the authentication ID is stored; and when authentication is not required, it is not essential that ID data be stored);

PMC: the code indicated in the partition definition block as the partition manager code;

PMC Version: the version of the partition manager code (PMC);

Operation Type: specifying whether the partition is generated or deleted ((Generate)/(Delete));

Partition Size: the size of the partition;

Integrity Check Type: the type of integrity check value of the ticket (public key system (Public)/common key system (Common)); and Integrity Check Value: the integrity check value of the ticket (public key system: (signature), and common key system: (MAC)).

When sending the ticket issued by the partition registration ticket (PRT) issuing means (PRT Issuer) to the ticket user, the public key certificate (CERT_PRTI) of the partition registration ticket (PRT) issuing means (PRT Issuer) is also sent together with the ticket if the public key system is employed. The attribute of the public key certificate (CERT- _PRTI) of the PRT issuing means coincides with the identifier (PRTIC) of the PRT issuing means (PRT Issuer).

In [Authentication Type] in which the type of mutual authentication (public key authentication, common key authentication, or either type (Any)) of the device is recorded, the authentication type to be performed as mutual authentication using the ticket is recorded. More specifically, information indicating whether the device authentication, the partition authentication, or both types of authentication are to be performed, and information indicating whether the public key system or the common key system is to be performed, or whether either system is to be allowed are recorded, though details are described below.

In the [Integrity Check Value] field in which the integrity check value (public key system: signature, common key system: MAC) of the ticket is recorded, the signature based on the private key of the partition registration ticket issuing means (PRT Issuer) is generated (see FIG. 12) and stored if the public key system is employed. If the device manager also serves as the partition registration ticket issuing means (PRT Issuer), the signature is generated by using the private key of the device manager. When performing signature verification processing (see FIG. 13), the public key of the corresponding CA(DEV) is used. Accordingly, it is necessary for the device which performs the ticket verification to obtain the public key (public key certificate) of the partition registration ticket issuing means (PRT Issuer) (ex. device manager) when or before receiving the ticket.

After verifying the public key certificate (CERT_PRTI) of the partition registration ticket (PRT) issuing means (PRT Issuer), the signature of the ICV (integrity check value) can be verified by using the public key of the partition registration ticket (PRT) issuing means (PRT Issuer) extracted from the public key certificate (CERT_PRTI). These processings are discussed below by using flows.

(A8.2. File Registration Ticket (FRT))

The file registration ticket (FRT) is the access control ticket used for setting and registering files in the partitions set in the device. The ticket user (ex. reader/writer as a device access unit) accesses the device by using the FRT issued by the ticket issuing means (Ticket Issuer) managed by an authorized partition manager according to the procedure recorded in the FRT, thereby making it possible to set the files within the permission recorded in the FRT.

FIG. 27 illustrates the data format of the file registration ticket (FRT). The following items of data are stored in the file registration ticket (FRT):

Ticket Type: the type of ticket;
Format Version: the format version of the ticket;
Ticket Issuer: the identifier of the partition manager (=PMC);
Serial Number: the serial number of the ticket;
Size of Ticket: the size of the ticket;
Authentication Flag: the flag indicating whether mutual authentication with the device is required for using the ticket;
Ticket User Group: the group to which the ticket user belongs;
Authentication Type: the type of mutual authentication (public key authentication, common key authentication, or either type (Any)) of the device;
Ticket User Identifier: ID data (category or identifier) for determining the ticket user,
this field being associated with [Authentication Type] (when [Authentication Type] is the public key authentication, the ID name (DN: Distinguished Name), the category, or the serial number (SN) is stored; when [Authentication Type] is the common key authentication, the authentication ID is stored; and when authentication is not required, it is not essential that ID data be stored);

SPTIC: the code of the service permission ticket issuing means;
SPTIC Ver: the version of the code (SPTIC) of the service permission ticket issuing means;
File ID: the identifier (ID) of the file created in the partition;
Operation Type: specifying whether the file is generated or deleted ((Generate)/(Delete));
File Size: the size of the file to be created;
File Structure: the file structure of the file to be created;
Acceptable Authentication Type: the bit string indicating the type of authentication (public key system, or either a public key system or a common key system is allowed) required for executing the access mode corresponding to the file defined in this ticket;
Acceptable Verification Type: the bit string indicating the type of verification (public key system, or either a public key system or a common key system is allowed) for the service permission ticket (SPT) required for executing the access mode corresponding to the file defined in this ticket;
Kspt_Encrypted: the data Kfrt(Kspt) obtained by encrypting the MAC checking key Kspt for the service permission ticket (SPT) indicated in the file definition block with the MAC checking key Kfrt for the file registration ticket for the same partition as the service permission ticket (SPT);
Integrity Check Type: the type of integrity check value of the ticket (public key system (Public)/common key system (Common)); and
Integrity Check Value: the integrity check value of the ticket (public key system: (signature), and common key system: (MAC)).

When sending the ticket issued by the file registration ticket (FRT) issuing means (FRT Issuer) to the ticket user, the public key certificate (CERT_FRTI) of the file registration ticket (FRT) issuing means (FRT Issuer) is sent together with the ticket if the public key system is employed. The attribute of the public key certificate (CERT_FRTI) of the FRT issuing means coincides with the identifier (FRTIC) of the file registration ticket (FRT) issuing means (FRT Issuer).

In [Authentication Type] in which the type of mutual authentication (public key authentication, common key authentication, or either type (Any)) of the device is recorded, the authentication type to be performed as mutual authentication using the ticket is recorded. More specifically, information indicating whether the device authentication, the partition authentication, or both types of authentication are to be performed, and information indicating whether a public key system or a common key system is to be performed, or whether either system is to be allowed are recorded, though details are described below.

In the [Integrity Check Value] field in which the integrity check value (public key system: signature, common key system: MAC) of the ticket is recorded, the signature based on the private key of the file registration ticket issuing means (FRT Issuer) is generated (see FIG. 12) and stored if the public key system is employed. If the partition manager also serves as the file registration ticket issuing means (FRT Issuer), the signature is generated by using the private key of the file partition manager. When performing the signature verification processing (see FIG. 13), the public key of the file registration ticket issuing means is used. Accordingly, it is necessary for the device which performs the ticket verification to obtain the public key (public key certificate) of the file registration ticket issuing means (FRT Issuer) (ex. partition manager) when or before receiving the ticket.

After verifying the public key certificate (CERT_FRTI) of the file registration ticket (FRT) issuing means (FRT Issuer), the signature of the ICV (integrity check value) can be verified by using the public key of the file registration ticket (FRT) issuing means (FRT Issuer) extracted from the public key certificate (CERT_PRTI). These processings are discussed below by using flows.

(A8.3. Service Permission Ticket (SPT))

The service permission ticket (SPT) is the access control ticket used for accessing the data items in the partition set in the device and for performing processing, such as data reading, data writing, and adding and subtracting billing data. The ticket user (ex. reader/writer as a device access unit) accesses the device by using the SPT issued by the ticket issuing means (Ticket Issuer) managed by an authorized partition manager according to the procedure recorded in the SPT, thereby making it possible to perform data processing within the permission recorded in the SPT.

The service permission ticket (SPT) has two types: one type in which access is allowed to only one file among the files set in the partition, and the other type in which access is allowed to a plurality of files among the files set in the partition. The two types are described below.

FIG. 28 illustrates the data format of the service permission ticket (SPT) of the type in which access is allowed to only one file among the files set in the partition. The following items of data are stored in the service permission ticket (SPT):

Ticket Type: the type of ticket;

Format Version: the format version of the ticket;

Ticket Issuer: the identifier of the partition manager (=PMC);

Serial Number: the serial number of the ticket;

Size of Ticket: the size of the ticket;

Authentication Flag: the flag indicating whether mutual authentication with the device is required for using the ticket;

Ticket User Group: the group to which the ticket user belongs;

Authentication Type: the type of mutual authentication (public key authentication, common key authentication, or either type (Any)) of the device;

Ticket User Identifier: ID data (category or identifier) for determining the ticket user, this field being associated with [Authentication Type] (when [Authentication Type] is the public key authentication, the ID name (DN: Distinguished Name), the category, or the serial number (SN) is stored; when [Authentication Type] is the common key authentication, the authentication ID is stored; and when authentication is not required, it is not essential that ID data be stored);

File ID: the identifier (ID) of the access file in the partition;

File Access Mode: the access mode of the file to be accessed;

Integrity Check Type: the type of integrity check value of the ticket (public key system (Public)/common key system (Common)); and Integrity Check Value: the integrity check value of the ticket (public key system: (signature), and common key system: (MAC)).

When sending the ticket issued by the service permission ticket (SPT) issuing means (SPT Issuer) to the ticket user, the public key certificate (CERT_SPTI) of the service permission ticket (SPT) issuing means (SPT Issuer) is sent together with the ticket if the public key system is employed. The attribute of the public key certificate (CERT_SPTI) of the SPT issuing means coincides with the identifier (SPTIC) of the SPT issuing means (SPT Issuer).

If the partition manager also serves as the service permission ticket (SPT) issuing means (SPT Issuer), the code of the service permission ticket (SPT) issuing means (SPT Issuer) may be set as the partition manager code (PMC).

In [Authentication Type] in which the type of mutual authentication (public key authentication, common key authentication, or either type (Any)) of the device is recorded, the authentication type to be performed as mutual authentication using the ticket is recorded. More specifically, information indicating whether the device authentication, the partition authentication, or both types of authentication are to be performed, and information indicating whether the public key system or the common key system is to be performed or whether either system is to be allowed are recorded, though details are described below.

In the [Integrity Check Value] field in which the integrity check value (public key system: signature, common key system: MAC) of the ticket is recorded, the signature based on the private key of the service permission ticket issuing means (SPT Issuer) is generated (see FIG. 12) and stored if the public key system is employed. If the partition manager also serves as the service permission ticket issuing means (SPT Issuer), the signature is generated by using the private key of the partition manager. When performing the signature verification processing (see FIG. 13), the public key of the service permission ticket (SPT) issuing means (SPT Issuer) is used. Accordingly, it is necessary for the device which performs the ticket verification to obtain the public key (public key certificate) of the service permission ticket issuing means (SPT Issuer) (ex. partition manager) when or before receiving the ticket.

After verifying the public key certificate (CERT_SPTI) of the service permission ticket (SPT) issuing means (SPT Issuer), the signature of the ICV (integrity check value) can be verified by using the public key of the service permission ticket (SPT) issuing means (SPT Issuer) extracted from the public key certificate (CERT_SPTI). These processings are discussed below by using flows.

In the description of the ticket format, the access modes to be recorded in the File Access Mode, which is the access mode of the file to be accessed, are discussed below with reference to FIG. 29.

The data to be created as files include various types of data, such as user ID data, billing data, encryption processing key data, log data, and composite file data. Access processing corresponding to each item, such as data reading, data writing, deleting, adding, subtracting, encryption, or decryption, is performed on the access data.

The file access mode of the service permission ticket (SPT) defines the type of access mode to be allowed among the above-described various access modes. A list of access modes is shown in FIG. 29. The access modes shown in FIG. 29 are example only, and other access modes corresponding to the data to be stored in the device can be set.

The processing defined in the file access mode can be executed on the file indicated by the [File ID: the identifier (ID) of the access file in the partition] set in the service permission ticket (SPT). If the file access mode set in the service permission ticket (SPT) is Read, the data in the file can be read. If the file access mode set in the service permission ticket (SPT) is Write, data can be written into the data in the file.

The mode that can be set in the access mode is restricted by the above-described file structure (see FIG. 25). For example, if the file structure is purse, the data is billing data, and the access mode, such as adding (add) and subtracting (Sub), can be set. Examples of the file structures, the access modes that can be set, and the commands sent from the reader/writer as the device access unit to the device are shown in FIG. 30.

FIG. 30 illustrates examples of the access modes and the commands when the file structure is random, and the access modes and the commands when the file structure is a composite file.

For example, when the file structure is random, and when the access mode is Read, the command that can be accepted by the device is only [Read]. Similarly, when the file structure is random, and when the access mode is encryption read, the command that can be accepted by the device is only [EncRead].

When the file structure is a composite file including purse and log, and when the access mode is money depositing, the command that can be accepted by the device is only [Deposit]. Similarly, when the file structure is a composite file including purse and log, and when the access mode is money withdrawing, the command that can be accepted by the device is only [Withdraw], [Make Receipt], or [Read Receipt].

The above-described deposit command is defined in the permission command (see FIG. 30) corresponding to the money deposit of the file access mode (see FIG. 29); [Deposit] is set in the file access mode of the access permission ticket; and a composite file including e-money is designated in the file ID. Then, an access permission ticket (SPT) is created and is sent from the file access device to the device. In this case, deposit billing data is sent together with the deposit command. Then, sequential processing can be performed, such as adding X yen to the file [Purse] in the composite file, and writing the processing record into the file [Log] in the composite file. Details of these processings are described below.

In addition to the combinations of access modes and commands shown in FIG. 30, other combinations of access modes and commands can be set according to the mode of the use for the device.

The device stores the definition data of the commands that can be accepted for the corresponding files stored in the memory, as a table, such as that shown in FIG. 30. Only when the command input from the access unit is the command defined in the definition data, the device executes the command. The definition data of the commands that can be accepted for a composite file includes a sequence command consisting of a plurality of commands to be executed on a plurality of files contained in a composite file.

A specific file to be processed is set in the file ID of the service permission ticket (SPT), and a predetermined access mode is set in the file access mode of the service permission ticket (SPT), thereby enabling the control of the file access using the service permission ticket (SPT). The specific processing is discussed below by using a flow.

Figure 31:
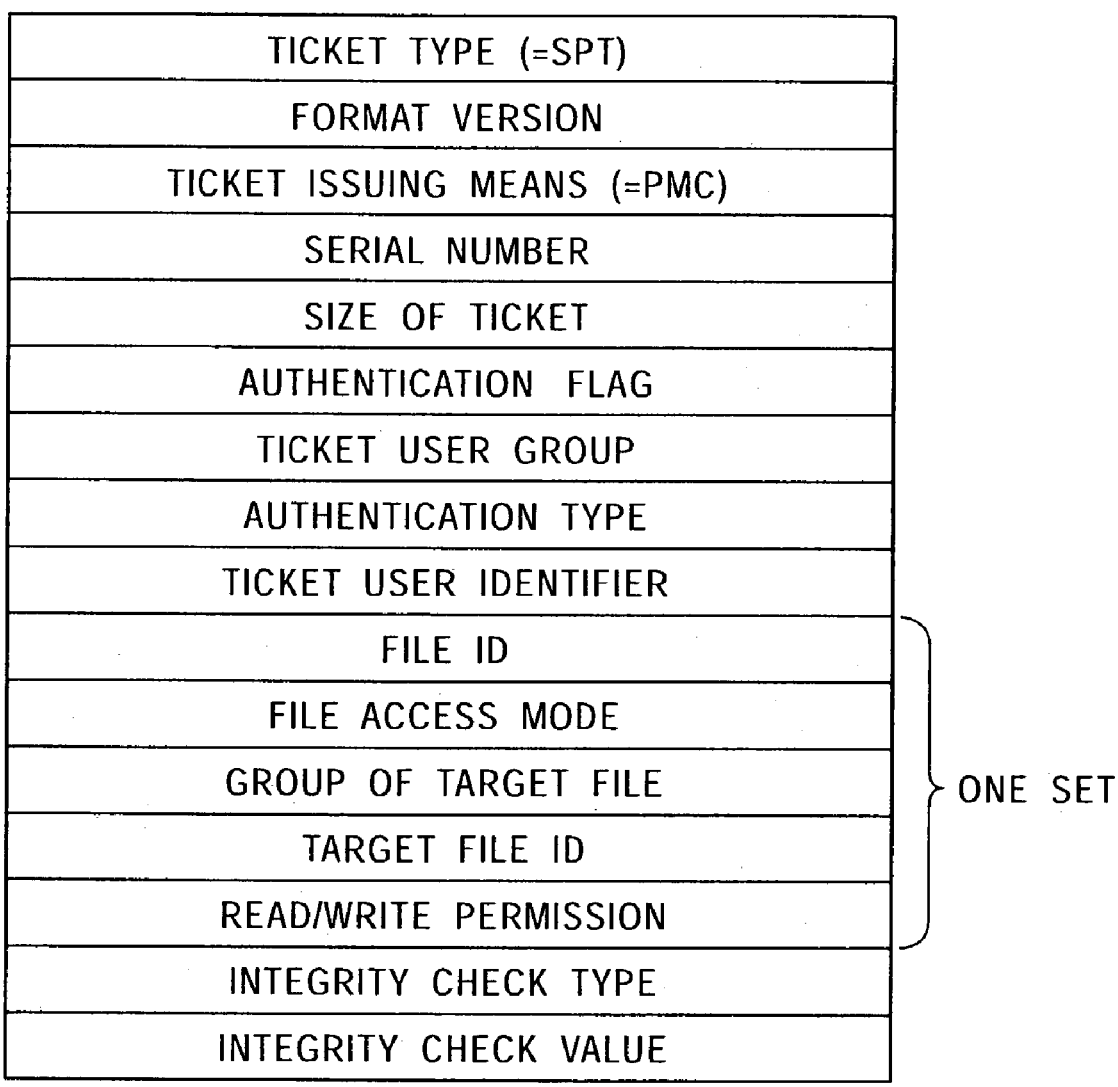
FIG. 31 is a diagram illustrating the format (second example) of a service permission ticket (SPT) as an access control ticket applied in the system of the present invention.

FIG. 31 illustrates the data format of the service permission ticket (SPT) of the type in which access is allowed to a plurality of files among the files set in the partition. The following items of data are stored in the service permission ticket (SPT):

Ticket Type: the type of ticket;
Format Version: the format version of the ticket;
Ticket Issuer: the identifier of the partition manager (=PMC);
Serial Number: the serial number of the ticket;
Size of Ticket: the size of the ticket;
Authentication Flag: the flag indicating whether mutual authentication with the device is required for using the ticket;
Ticket User Group: the group to which the ticket user belongs;
Authentication Type: the type of mutual authentication (public key authentication, common key authentication, or either type (Any)) of the device;
Ticket User Identifier: ID data (category or identifier) for determining the ticket user,
this field being associated with [Authentication Type] (when [Authentication Type] is the public key authentication, the ID name (DN: Distinguished Name) or the category is stored; when [Authentication Type] is the common key authentication, the authentication ID is stored; and when authentication is not required, it is not essential that ID data be stored);
File ID: the identifiers (IDs) of the access files in the partition;
File Access Mode: the access modes of the files to be accessed;
Group of Target File: the group of files to be accessed;
Target File ID: the identifiers (IDs) of the files to be accessed;
Read/Write Permission: the processing mode (read, write) of the files to be accessed (Target File);
Integrity Check Type: the type of integrity check value of the ticket (public key system (Public)/common key system (Common)); and
Integrity Check Value: the integrity check value of the ticket (public key system: (signature), and common key system: (MAC)).

By defining the group of files to be accessed and recording it in the ticket, as described above, a plurality of files in the partition can be accessed by a single service permission ticket (SPT).

When sending the ticket issued by the service permission ticket (SPT) issuing means (SPT Issuer) to the ticket user, the public key certificate (CERT_SPTI) of the service permission ticket (SPT) issuing means (SPT Issuer) is sent together with the ticket when the public key system is employed. The attribute of the public key certificate (CERT_SPTI) of the SPT issuing means coincides with the identifier (SPTIC) of the SPT issuing means (SPT Issuer).

In [Authentication Type] in which the type of mutual authentication (public key authentication, common key authentication, or either type (Any)) of the device is recorded, the authentication type to be performed as mutual authentication using the ticket is recorded. More specifically, information indicating whether the device authentication, the partition authentication, or both types of authentication are to be performed, and information indicating whether the public key system or the common key system is to be performed, or whether either system is to be allowed are recorded, though details are described below.

After verifying the public key certificate (CERT_SPTI) of the service permission ticket (SPT) issuing means (SPT Issuer), the signature of the ICV (integrity check value) can be verified by using the public key of the service permission ticket (SPT) issuing means (SPT Issuer) extracted from the public key certificate (CERT_SPTI). These processings are discussed below by using flows.

(A8.4. Data Update Ticket (DUT))

The data update ticket (DUT) is the access control ticket used for accessing and updating the various data stored in the device. The ticket user (ex. reader/writer as a device access unit) accesses the device by using the DUT issued by an authorized data update ticket (DUT) issuing means (Ticket Issuer) according to the procedure recorded in the DUT, thereby making it possible to perform data processing within the restriction recorded in the DUT.

There are two types of data update tickets (DUTs): a ticket DUT(DEV) used for updating data items managed by the device manager and a ticket DUT(PAR) used for updating data items in the partition managed by the partition manager. The ticket: DUT(DEV) issuing means is under the management of the device manager, and the ticket: DUT(PAR) is under the management of the partition manager.

FIG. 32 illustrates the data formats of the two data update tickets DUT(DEV) and DUT(PAR). The following data items are stored in the data update ticket (DUT):

Ticket Type: the type of ticket (DUT(DEV)/DUT(PAR));
Format Version: the format version of the ticket;
Ticket Issuer: the identifier of the device/partition manager (if the type of ticket is DUT(DEV), the ticket issuer is DMC, and if the type of ticket is DUT(PAR), the ticket issuer is PMC);
Serial Number: the serial number of the ticket;
Size of Ticket: the size of the ticket;
Ticket User Group: the group to which the ticket user belongs;
Ticket User Identifier: the ID data (category or identifier) for determining the ticket user;
this field being associated with [Authentication Type] (when [Authentication Type] is the public key authentication, the ID name (DN: Distinguished Name) or the category is stored; when [Authentication Type] is the common key authentication, the authentication ID is stored; and when authentication is not required, it is not essential that ID data be stored);
Authentication Type: the type of mutual authentication (public key authentication, common key authentication, or either type (Any)) of the device;
Encrypted Flag: indicating whether the data to be updated is encrypted (when it is encrypted: Encrypted/when it is not encrypted: none);
Old Data Code: the code of old data to be updated;
Data Version Rule: the version conditions when updating the data;
Data Version Condition: the version value when updating the data;
Size of New Data: the size of updating new data;
New Data: updating new data (may be encrypted);
New Data Version: the version of updating data;
Integrity Check Type: the type of integrity check value of the ticket (public key system (Public)/common key system (Common)); and
Integrity Check Value: the integrity check value of the ticket (public key system: (signature), and common key system: (MAC)).

When updating the data using the data update ticket (DUT), the conditions are indicated by a combination of two fields, such as [Data Version Rule: the version conditions when updating the data] and [Data Version Condition: the version value when updating the data].

There are three types of version conditions [Data Version Rule] when updating the data: Any, Exact, and Older.

"Any" means that data can be updated regardless of the version conditions.

"Exact" means that data can be updated when the version value is the same as the value designated in the subsequent filed [Data Version Condition].

"Older" means that data can be updated only when the new data version is newer.

If the version condition [Data Version Rule] is Any or Older, [Data Version Condition] is not used or ignored.

In [Authentication Type] in which the type of mutual authentication (public key authentication, common key authentication, or either type (Any)) of the device is recorded, the authentication type to be performed as mutual authentication using the ticket is recorded. More specifically, information indicating whether the device authentication, the partition authentication, or both types of authentication are to be performed, and information indicating whether the public key system or the common key system is to be performed or whether either system is to be allowed are recorded, though details are described below.

If the device manager also serves as the data update ticket-DUT(DEV) issuing means (DUT Issuer), the code (ticket user) of the data update ticket-DUT(DEV) issuing means (DUT Issuer) can be set as the device manager code (DMC). If the partition manager also serves as the data update ticket-DUT(PAR) issuing means (DUT Issuer), the code of the data update ticket-DUT(PAR) issuing means (DUT Issuer) can be set as the partition manager code (PMC).

In [Authentication Type] in which the type of mutual authentication (public key authentication, common key authentication, or either type (Any)) of the device is recorded, the authentication type to be performed as mutual authentication using the ticket is recorded. More specifically, information indicating whether the device authentication, the partition authentication, or both types of authentication are to be performed, and information indicating whether the public key system or the common key system is to be performed or whether either system is to be allowed are recorded, though details are described below.

In the [Integrity Check Value] field in which the integrity check value (public key system: signature, common key system: MAC) of the ticket is recorded, the signature based on the private key of the device update ticket issuing means (DUT Issuer) is generated (see FIG. 12) and stored if the public key system is employed. If the device manager also serves as the device update ticket issuing means (DUT Issuer), the signature is generated by using the private key of the device manager. If the partition manager also serves as the device update ticket issuing means (DUT Issuer), the signature is generated by using the private key of the partition manager. When performing the signature verification processing (see FIG. 13), the public key of the device manager or the partition manager is used. Accordingly, it is necessary for the device which performs the ticket verification to obtain the public key (public key certificate) of the device update ticket issuing means (DUT Issuer) (ex. the device manager or the partition manager) when or before receiving the ticket.

After verifying the public key certificate (CERT_DUTI) of the device update ticket (DUT) issuing means (DUT Issuer), the signature of the ICV (integrity check value) can be verified by using the public key of the data update ticket (DUT) issuing means (DUT Issuer) extracted from the public key certificate (CERT_DUTI).

An example of the data to be updated using the data update ticket (DUT) is shown in FIG. 33.

As shown in FIG. 33, the data to be updated includes the device manager code, the device manager code version, the partition manager code, the partition manager code version, the code of each ticket issuing means, the MAC generation key and the version of each ticket, the revocation list, etc.

These data items are updated by using the data update ticket (DUT) according to the rules recorded in the DUT. The specific procedure of the updating processing is described below by using a flow. The version information, such as the device manager code version and the partition manager code version, is updated when updating the data provided with the version. These items of version information are stored in the data update ticket (DUT).

[B. Detailed Description of Device Distribution to User, Various Settings for Device, and Device Usage Processing]

A description is given below, with reference to the flow charts and other drawings, of the processing performed until the device provided with a memory area having divided partitions is used, and details of the device usage processing. A description is given in the following order.

B1. Flow from Device Initial registration to Usage
B2. Initial Registration processing by Device Manufacturing Entity
B3. Device Manager Management Processing
B3.1. Device Registration processing by Device Manager
B3.2. Public Key Certificate Issuing Processing under Device Manager Control
B4. Partition Manager Management Processing
B4.1. Partition Setting Registration and Deletion Processing Using Partition Registration Ticket (PRT) under Partition Manager Control
B4.2. Public Key Certificate Issuing Processing under Partition Manager Control
B4.3. File Creation and Deletion Processing Using File Registration Ticket (FRT)
B5. Service (File Access) Processing Using Service Permission Ticket (SPT)
B6. Device Data Updating Processing Using Data Update Ticket (DUT)

[B1. Flow from Device Initial Registration to Usage]

A device having an EEPROM (flash memory) is manufactured by the device manufacturing entity (manufacturer), and the initial data is written into the device by the device manager. Then, the device is provided (ex. sold or loaned) to the user and is utilized. For receiving the services using the device from various service entities by the user, partitions must be set in the device memory by a partition manager, and files in which service providing data is stored must be set in the partitions.

When performing various processings on the device, such as the partition setting using the partition registration ticket (PRT), the file setting using the file registration ticket (FRT), and the data access using the service permission ticket (SPT), various procedures are conducted between the device and the ticket user (ex. reader/writer as a device access unit) that performs processings on the device. For example, the processings on the device include mutual authentication processing for verifying that the device and the ticket user are authorized devices, signature creation and verification processing for ensuring and verifying the integrity of transfer data, and data encryption and decryption processing. In the configuration of the present invention, a public key certificate is employed for performing these processings. Accordingly, before the use of the services by using the device, a public key certificate for the device is issued and is stored in the device.

For example, various processings, such as the partition setting using the partition registration ticket (PRT), the file setting using the file registration ticket (FRT), and the data access using the service permission ticket (SPT), are performed on the condition that the integrity of the device and the ticket user (ex. reader/writer as a device access unit) performing the processing on the device is verified after performing the mutual authentication between the device and the user ticket. Also, a digital signature is added to data to be transferred between the device and the user ticket according to the necessity, and the data is verified. The data to be transferred is also encrypted and decrypted according to the necessity.

Figure 34:
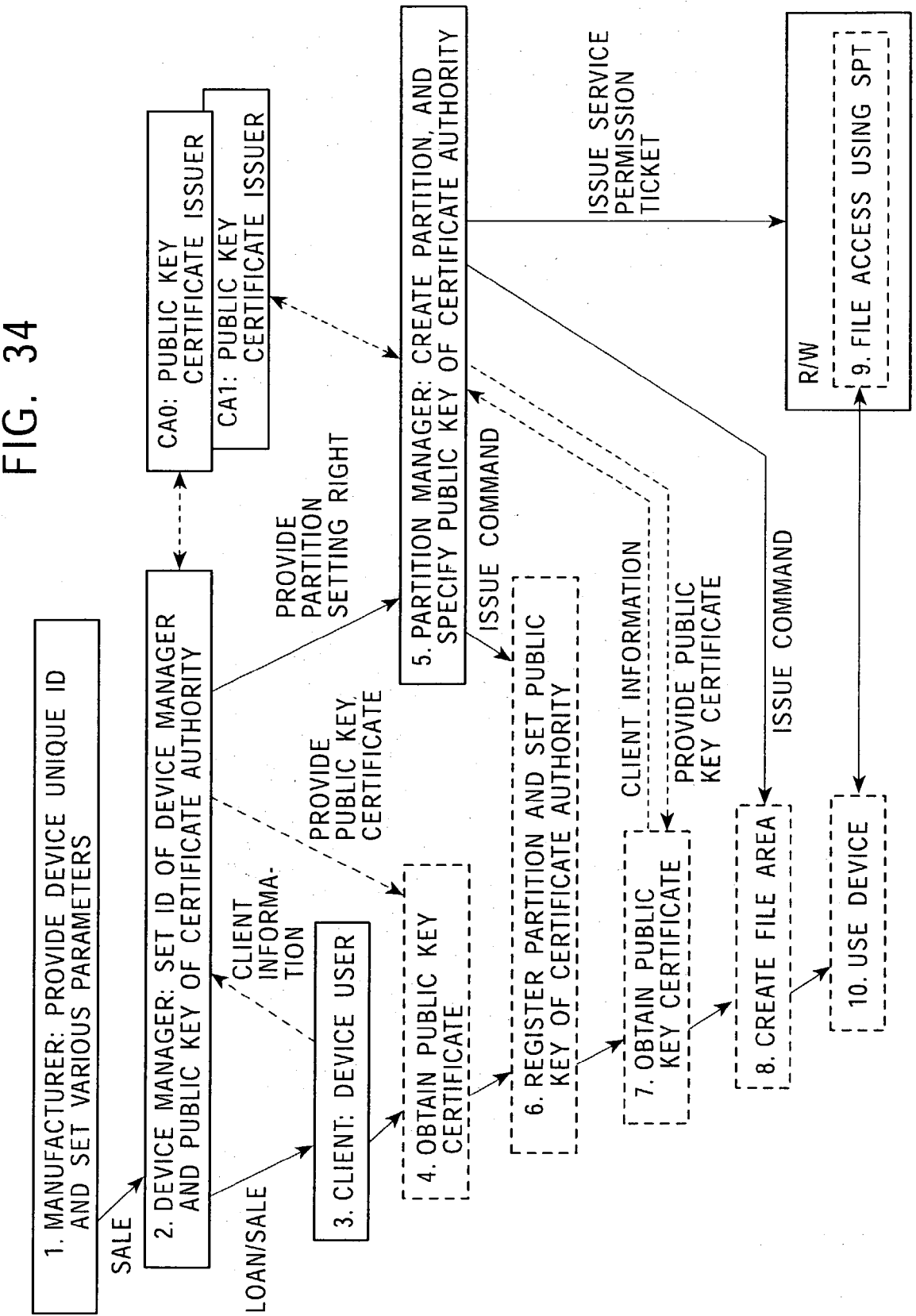
FIG. 34 is a diagram illustrating an overview of the processing until the use of the device in the system of the present invention.

FIG. 34 schematically illustrates the flow from the manufacturing of the device to the use of the device. For the understanding of the overall processing, the individual steps shown in FIG. 34 are briefly described below, though details thereof are given below by using flows.

1. The device is manufactured by the device manufacturing entity (manufacturer). When manufacturing the device, the device code is added to the device as the ID data (ID) of the device. During the manufacturing process, various items of manufacture information (Manufacture Information Block (see FIG. 14)), such as the device code and the manufacture code, are stored in the device memory.

2. Before providing the device to the user, the device manager stores, the device management information (see FIG. 15), such as the ID of the device manager and the public key of the certificate authority (PUB CA(DEV)), and the device key (see FIG. 18), in the memory.

3. The device into which the management information is written by the device manager is provided to the user.

4. Then, the user obtains the device public key certificate, and stores the device public key certificate (CERT DEV) into the device key area (see FIG. 18) of the device.

5. The service entity (partition manager) which is to set a partition in the device memory and provide the services makes a partition setting request to the device manager, receives an acknowledgement and the partition registration ticket (PRT). The partition manager also specifies the public key (PUB CA(PAR)) of the certificate authority used for communicating with the device.

6. The device communicates with the ticket user (ex. reader/writer as a device access unit) managed by the partition manager, and performs the partition registration processing by using the partition registration ticket (PRT), and also stores the public key (PUB CA(PAR)) of the certificate authority in the partition key area (see FIG. 23).

7. The device in which the partition is set sends a request to issue a partition public key certificate to the partition manager, and stores the obtained partition public key certificate (CERT PAR) in the partition key area (see FIG. 23).

The partition setting and other processings in the above-described steps 5 through 7 are performed for each partition manager which is to set a partition and provide the services, and a plurality of partitions are registered in the device.

8. Then, the partition manager performs the file setting registration processing corresponding to the services to be provided by using the file registration ticket (FRT) in the partition set in the device.

9. 10. By registering files in the set partition, various services defined by the file data, such as e-money and a commuter ticket, can be provided. Processing, such as data reading and data writing, can be performed by using the service permission ticket (SPT). That is, the data reading and the data writing can be performed according to the rules recorded in the SPT only when the service permission ticket (STP) issued by authorized ticket issuing means is employed.

Although it is not shown, the data (ex. the device manager code, the device manager code version, the partition manager code, the partition manager code version, the code of each ticket issuing means, the MAC generation key and its version of each ticket, or the revocation list) stored in the device is updated by using the data update ticket (DUT) according to the necessity. The version information, such as the device manager code version and the partition manager code version, is updated when updating the corresponding data provided with the version. The version information is stored in the data update ticket (DUT).

Details of the individual processings are described below with reference to the flows and the other drawings.

[B2. Initial Registration Processing by Device Manufacturing Entity]

Figure 35:
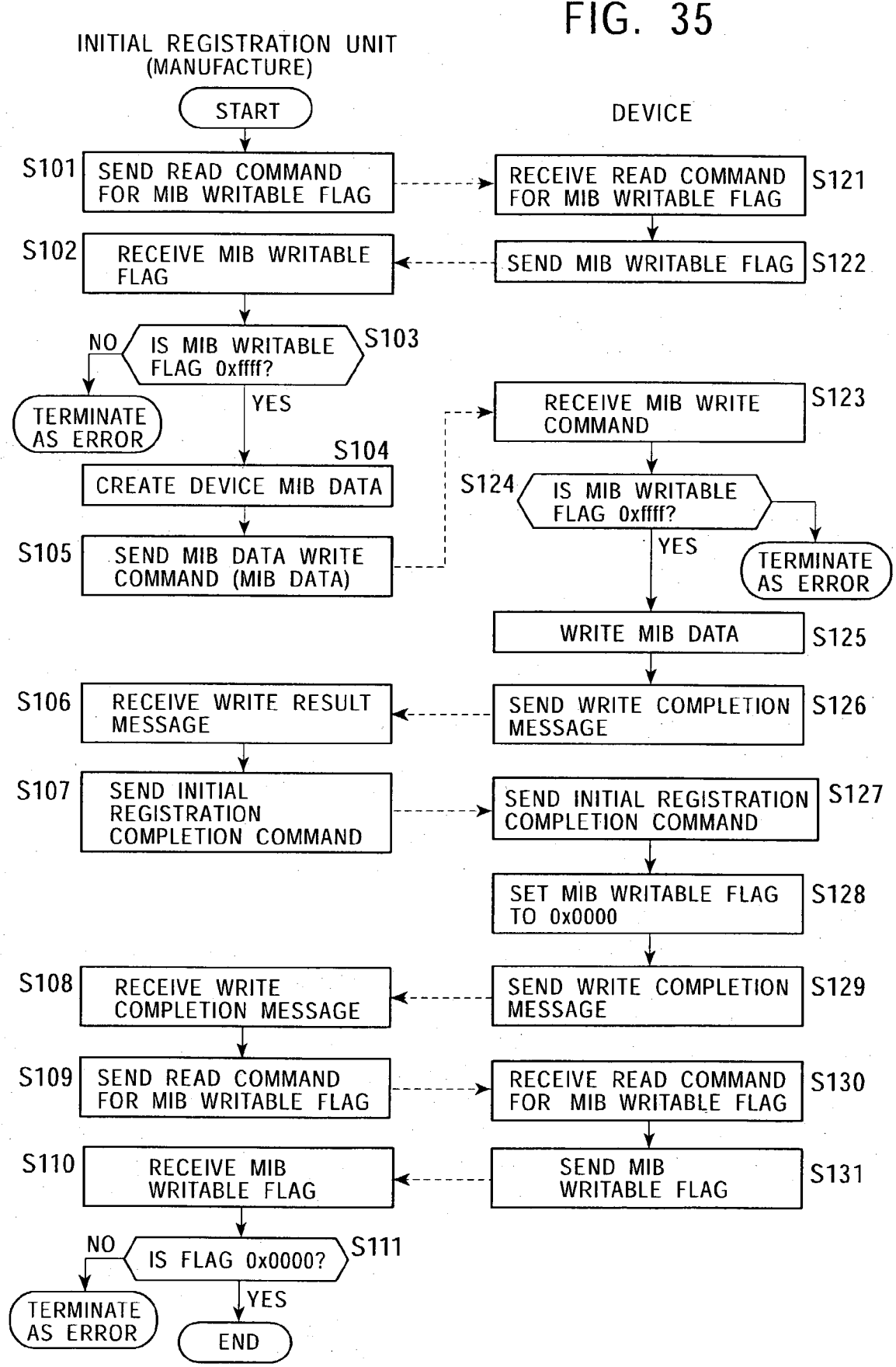
FIG. 35 is a flowchart illustrating device initial registration processing performed by a device manufacturing entity in the system of the present invention.

The initial registration processing by the device manufacturing entity is first described with reference to FIG. 35. The processing of a registration unit of the device manufacturing entity (Manufacture) is shown at the left side of FIG. 35, and the processing of the device (see FIG. 5) is shown at the right side of FIG. 35. The registration unit of the device manufacturing entity (Manufacture) is configured as the reader/writer (see FIG. 10), which serves as a dedicated device access unit for reading and writing data from and into the device.

In step S101, the registration unit sends a read command for a writable flag of the manufacture information block (MIB (see FIG. 14)) to the device. Upon receiving the command (S121), the device sends the writable flag in the manufacture information block of the device memory (S122).

Upon receiving the writable flag in the manufacture information block (MIB) (S102), the registration unit determines whether the writable flag is set to write enable (0xffff) (S103). If the writable flag is not set to write enable (0xffff), the subsequent writing processing for the manufacture information block (MIB) cannot be executed, and the process is terminated as an error.

If the writable flag is set to write enable (0xffff), the manufacture information block (MIB) (see FIG. 14) of the device is generated (S104), and MIB data is sent to the device together with an MIB write command (S105).

Upon receiving the MIB write command and the MIB data (S123), the device verifies the integrity of the MIB writable flag (S124). If the writable flag is not set to write enable (0xffff), the subsequent writing processing for the manufacture information block (MIB) cannot be executed, and the process is terminated as an error. If the writable flag is set to write enable (0xffff), the received MIB data is written into the MIB area (S125).

Upon completing the MIB data writing processing, a write complete message is sent to the registration unit (S126). Upon receiving the write complete message (S106), the registration unit sends an initial registration completion command to the device (S107). Upon receiving the initial registration completion command (S127), the device sets the writable flag of the manufacture information block (MIB) to write disable (0x0000) (S128), and sends a write completion message to the registration unit (S129).

Upon receiving the write completion message (S108), the registration unit sends a read command for the writable flag of the manufacture information block (MIB) (see FIG. 14) to the device (S109). Upon receiving the command (S130), the device sends the writable flag in the manufacture information block (MIB) of the device memory to the registration unit (S131).

Upon receiving the writable flag in the manufacture information block (MIB) (S110), the registration unit determines whether the writable flag is set to write disable (0x0000) (S111). If the writable flag is not set to write disable (0x0000), it means that the MIB data writing processing has not been successfully finished, and the process is terminated as an error. If the writable flag is set to write disable (0x0000), it means that the MIB data writing processing has been successfully finished, and the process is completed.

[B3. Device Manager Management Processing]

The management processing of the device manager is as follows. The processing to be executed before the start of the use of the device is discussed. The processing to be executed by the device manager before the start of the use of the device includes the device registration processing and the issuing processing of the device public key certificate (CERT DEV) for the device. The device registration processing is executed as writing data into the device management information block (DMIB), the public-key device key definition block (DKDB(PUB)), the common-key device key definition block (DKDB(Common)), and the device key area of the device memory. Details of the processings are described below.

[B3.1. Device Registration Processing by Device Manager]

Figure 36:
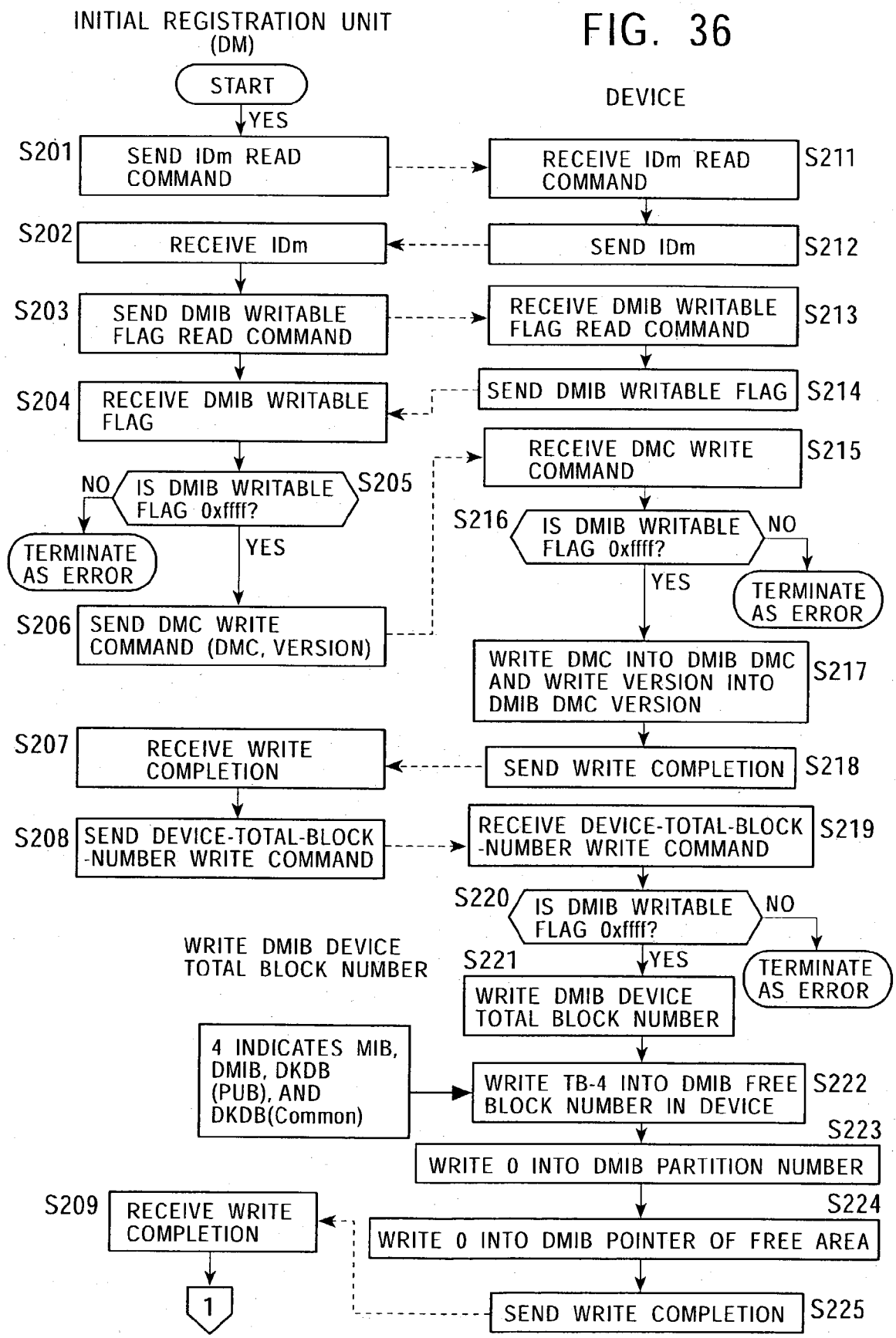
FIG. 36 is a first flowchart illustrating device initial registration processing performed by a device manager in the system of the present invention.

A description is given below, with reference to the flow of FIG. 36, of the initial registration processing accompanied by the storing of the device management information and other information in the device by the device manager. In the flows of FIG. 36 and the subsequent drawings, the processing of the initial registration unit of the device manager (DM) is shown at the left side, and the processing of the device (see FIG. 5) is shown at the right side. The initial registration unit of the device manager (DM) is a unit that can read and write data from and into the device (ex. a reader/writer or a PC as a device access unit), and has the configuration of a reader/writer as a device access unit, such as that shown in FIG. 10.

First, in step S201, a read command for the device identifier IDm is output to the device. The device receives the command (S211), and sends the device identifier IDm to the registration unit (S212).

Upon receiving the device identifier IDm (S202), the registration unit sends a read command for the writable flag of the device management information block (DMIB (see FIG. 15)) to the device (step S203). The device receives the command (S213), and sends the writable flag in the device management information block (DMIB) of the device memory to the registration unit (S214).

Upon receiving the writable flag in the device management information block (DMIB) (S204), the registration unit determines whether the writable flag is set to write enable (0xffff) (S205). If the writable flag is not set to write enable (0xffff), the subsequent writing processing for the device management information block (DMIB) cannot be executed, and the process is terminated as an error.

If the writable flag is set to write enable (0xffff), a write (DMC Write) command containing a device manager code (DMC) and DMC version is sent to the device (S206). This code is preassigned to the device manager by the code management institution (see FIGS. 1 through 3).

Upon receiving the DMC Write command (S215), the device verifies the DMIB writable flag (S216). If the writable flag is not set to write enable (0xffff), the subsequent writing processing for the device management information block (DMIB) cannot be executed, and the process is terminated as an error. If the writable flag is set to write enable (0xffff), the received device manager code (DMC) and the DMC version are written into the DMIB area (S217).

Upon completing the writing of the device manager code (DMC) and the DMC version, the write completion message is sent to the registration unit (S218). The registration unit receives the write completion message (S207), and then sends a device-total-block-number write command to the device (S208).

Upon receiving the device-total-block-number write command (S219), the device verifies the DMIB writable flag (S220). If the writable flag is not set to write enable (0xffff), the subsequent writing processing for the device management information block (DMIB) cannot be executed, and the process is terminated as an error. If the writable flag is set to write enable (0xffff), the received device total block number is written into the DMIB area (S221). The device also writes TB-4 into the free block number in device of the DMIB area (S222). TB indicates the device total block number. The four blocks of TB-4 indicate the manufacture information block (MIB), the device management information block (DMIB), the public-key device key definition block (DKDB(PUB)), and the common-key device key definition block (DKDB (Common)).

Then, the device writes 0 into the partition number area of the device management information block (DMTB) (S223) since partitions are not set in the device at this point. The device also writes 0 into the pointer of free area of DMIB (S224), and sends the writing processing completion to the registration unit (S225).

The registration unit receives the writing processing completion message from the device (S209), and then determines whether a common key is used for device authentication (S231). For the authentication processing, either a public key authentication system or a common key authentication system is employed, and details thereof are given below. The device manager is able to set the authentication system required for the device. If the device executes the common key authentication, the device manager sets the information required for the common key authentication (ex. master key for creating an authentication key) in the device. If the device does not execute the common key authentication, the device manager does not set the above information in the device. The device manager sets data for implementing either the common key authentication or the public key authentication, or both types of authentication in the device according to the authentication system employed in the device.

Figure 37:
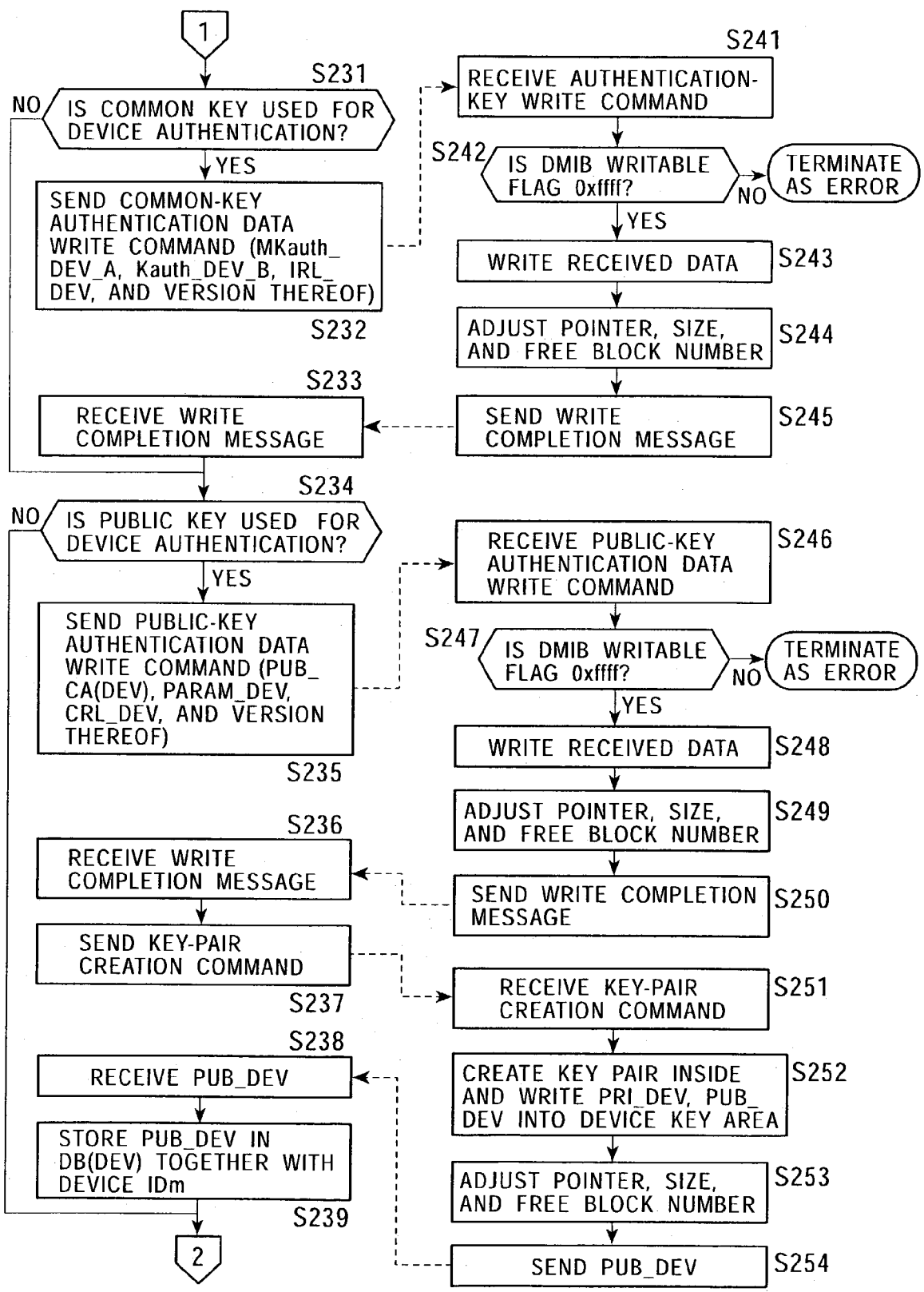
FIG. 37 is a second flowchart illustrating device initial registration processing performed by the device manager in the system of the present invention.

As shown in FIG. 37, if the common key is used for device authentication, steps S232 and S233, and steps S241 through S245 are executed, and if the common key is not used for device authentication, these steps are skipped.

If the common key is used for device authentication, in step S232, the registration unit sends a common-key authentication data write command, such as MKauth_DEV_A: the two-way individual key authentication master key, Kauth_DEV_B: the two-way individual key authentication common key, IRL_DEV: the revocation list in which the device identifiers (IDs) of revoked devices are registered, and the version information thereof, to the device.

The device receives the above-described write command in step S241, and after checking that the DMIB writable flag is write enable in step S242, the device writes the received data into the device key area (see FIG. 18) (S243). Then, the device makes adjustments of the pointer, the size, and the free block number in device, which are required due to the data writing (S244), and sends a write completion message to the registration unit (S245).

Upon receiving the write completion message (S233), the registration unit determines in step S234 whether a public key is to be employed for device authentication. As shown in FIG. 37, if a public key is employed for device authentication, steps S235 through S239 and steps S246 through S254 are executed. If a public key is not employed for device authentication, these steps are skipped.

If the public key is employed for device authentication, in step S235, the registration unit sends a public-key authentication data write command, such as PUB_CA(DEV): the public key of the certificate authority CA(DEV) that issues the device-manager public key, PARAM_DEV: the public key parameter of the device, CRL_DEV: the revocation list (Revocation List Certificate) in which the public key certificate identifiers (ex. serial number: SN) of the revoked devices are registered, and the version information thereof, to the device.

The device receives the above-described write command in step S246, and after checking that the DMIB writable flag is write enable in step S247, the device writes the received data into the device key area (see FIG. 18) (S248). Then, the device makes adjustments of the pointer, the size, and the free block number in device, which are required due to the data writing (S249), and sends a write completion message to the registration unit (S250).

Upon receiving the write completion message (S236), the registration device sends a key-pair creation command for creating a public key and a private key to the device (S237). Although in this embodiment the device creates a key pair, the registration unit, for example, may create a key pair, and provides it to the device.

Upon receiving the key-pair creation command (S251), the device creates a key pair of the public key (PUB DEV) and the private key (PRI DEV) in the encryption processor (see FIG. 5) of the device, and writes the created key into the device key area (see FIG. 18) (S252). The public key (PUB DEV) is temporarily stored in the CERT DEV area of the device key area, and when the public key certificate in which the public key (PUB DEV) is stored is received, the public key (PUB DEV) is substituted by the public key certificate (CERT). The device then makes adjustments of the pointer, the size, and the free block number in device, which are required due to the data writing (S253), and sends the generated and stored public key to the registration unit (S254).

The registration unit receives the public key (PUB DEV) from the device, and stores it in the database (DB(DEV) (see FIG. 7)) in the device manager, together with the device identifier IDm previously received from the device.

Then, the registration unit of the device manager determines whether a common key is to be used for verifying the partition registration ticket (PRT) (S261). For verifying the ticket, either a common key system to verify the ticket with a MAC value or a public key system to generate a signature by using a private key and to verify the signature by using a public key, which has been discussed with reference to FIGS. 12 and 13, can be employed. Details of ticket verification are discussed below. The device manager is able to set the verification processing method to be used in the device. The device manager sets data for implementing a common key system or a public key system, or both types, according to the PRT ticket verifying method used in the device.

If the device is able to execute common key authentication, the device manager sets information required for common-key PRT verification (ex. PRT verification common key) in the device. If the device does not execute common key authentication, the device manager does not store such information in the device.

Figure 38:
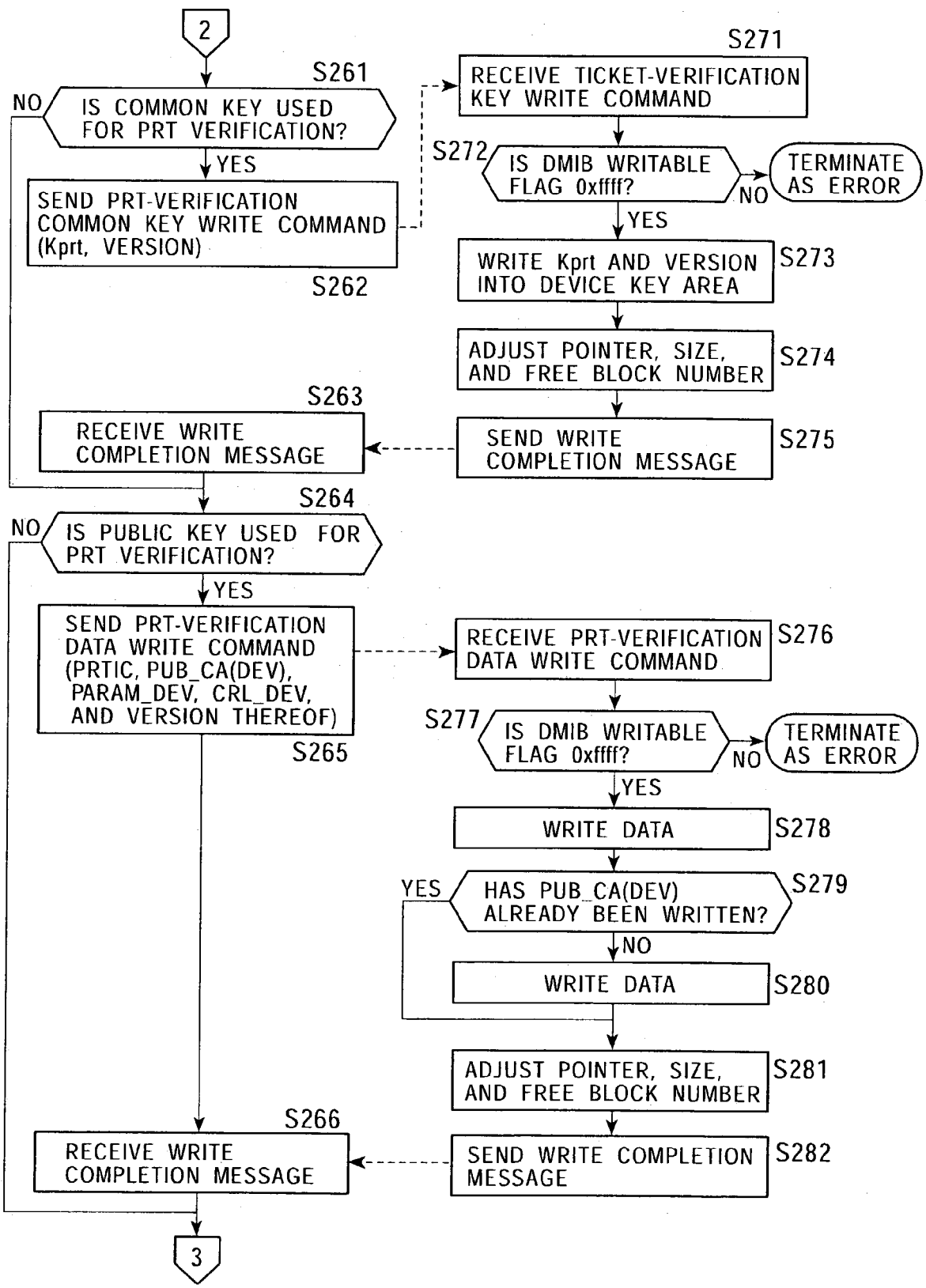
FIG. 38 is a third flowchart illustrating device initial registration processing performed by the device manager in the system of the present invention.

As shown in FIG. 38, if the common key system is used for PRT verification, steps S262 and S263 and steps S271 through S275 are executed. If the common key is not used for PRT verification, these steps are skipped.

When the common key is employed for PRT verification, in step S262, the registration unit sends a PRT-verification common key write command, such as Kprt: the MAC checking key of the partition registration ticket (PRT) and the version information, to the device.

The device receives the above-described write command in step S271, and after checking in step S272 that the DMIB writable flag is write enable, the device writes the received data into the device key area (see FIG. 18) (S273). Then, the device makes adjustments of the pointer, the size, and the free block number in device, which are required due to the data writing (S274), and sends a write completion message to the registration unit (S275).

Upon receiving the write completion message (S263), the registration unit determines in step S264 whether a public key is to be used for PRT verification. As shown in FIG. 38, if a public key is used for PRT verification, steps S265 and S266 and steps S276 through S282 are executed. If a public key is not used for PRT verification, these steps are skipped.

If the public key is employed from PRT verification, in step S265, the registration unit sends a PRT-verification data write command, such as PRTIC (PRT Issuer Category): the partition registration ticket (PRT) category, PUB_CA (DEV): the public key of the certificate authority CA(DEV) that issues the device-manager public key, PARAM_DEV: the public key parameter of the device, CRL_DEV: the revocation list (Revocation List (Certificate)) in which the public key certificate identifiers (ex. serial number: SN) of revoked devices are registered, and the version information thereof, to the device.

The device receives the above-described write command in step S276, and after checking that the DMIB writable flag is write enable in step S277, the device writes PRTIC (PRT Issuer Category): the partition registration ticket (PRT) issuer category in the received data into the public-key device key definition block (DKDB(PUB)) (see FIG. 16), and writes the version information into the version area of the same block in step S278.

Then, the device determines in step S279 whether PUB_CA(DEV): the public key data of the certificate authority CA(DEV) that issues the device-manager public key has been written. If PUB_CA(DEV) has not been written, in step S280, the device writes PUB_CA(DEV), PARAM_DEV, and CRL_DEV into the device key area (see FIG. 18). Then, the device makes adjustments of the pointer, the size, and the free block number in device, which are required due to the data writing (S281), and sends a write completion message to the registration unit (S282).

Upon receiving the write completion message (S266), the registration unit determines in step S291 whether the device is a device which supports the updating of the common key data. Among the data items stored in the device, there are items that can be updated by using the above-described data update ticket (DUT) (see FIG. 32). The data items to be updated have been discussed above with reference to FIG. 33. For the updating processing using the data update ticket (DUT), either a common key system or a public key cryptosystem can be employed. The device manager sets data for implementing either type or data for implementing both types according to the device.

If the device is a device that performs data updating by a common key system, the device manager sets information required for the data updating using the common key system (ex. MAC checking key of the data update ticket (DUT)) in the device. If the device does not execute the common key authentication, the device manager does not set such information in the device.

Figure 39:
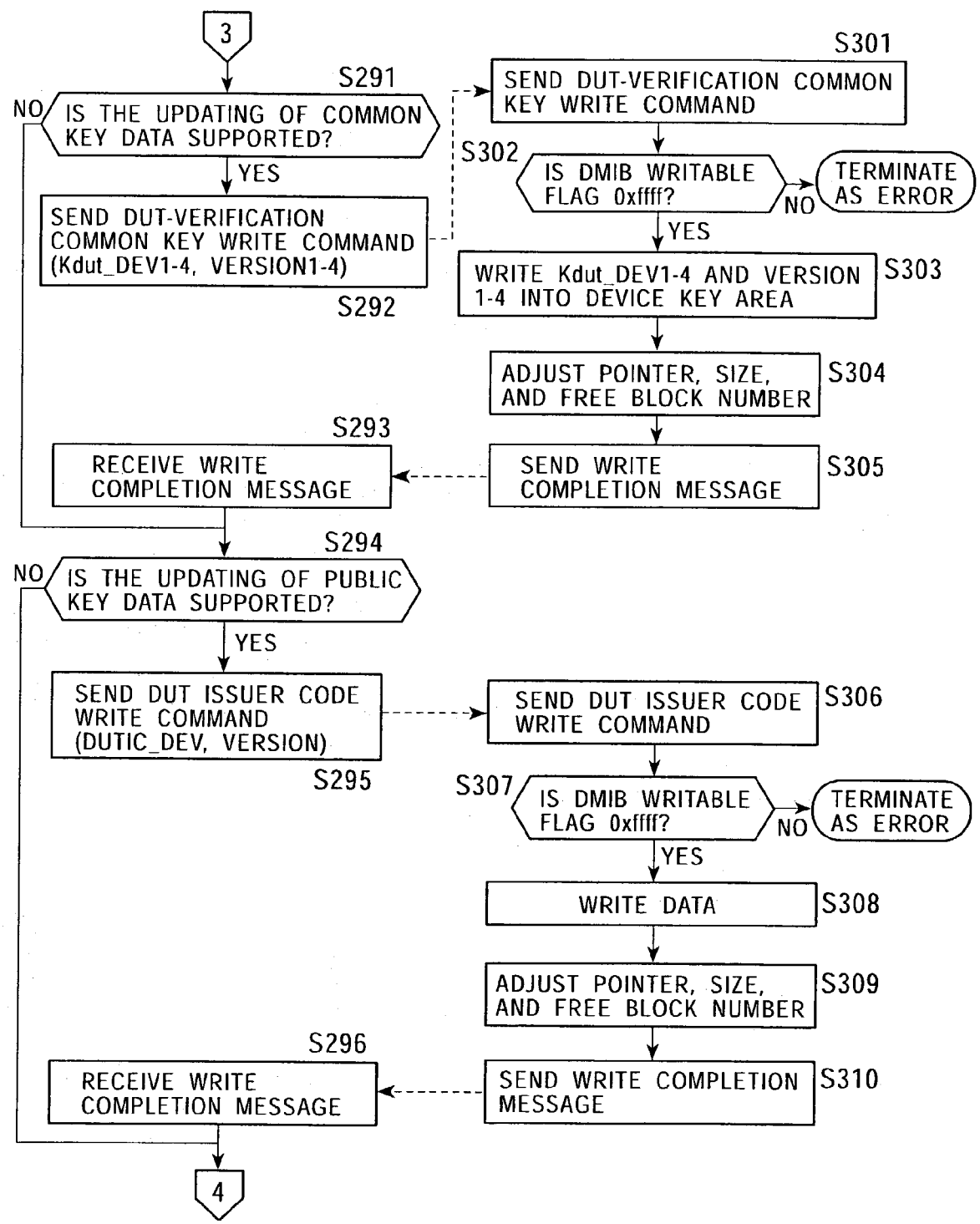
FIG. 39 is a fourth flowchart illustrating device initial registration processing performed by the device manager in the system of the present invention.
Figure 40:
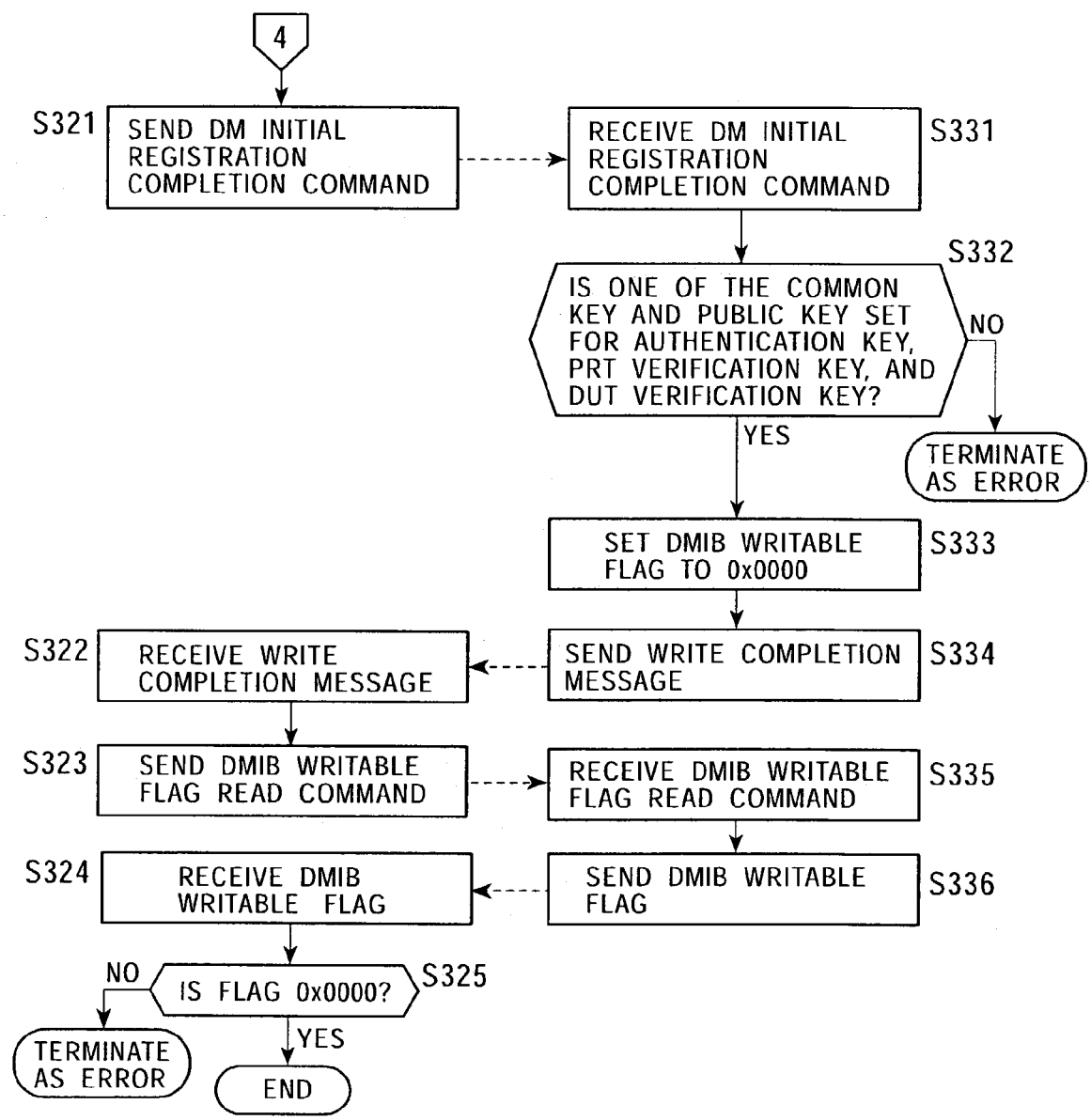
FIG. 40 is a fifth flowchart illustrating device initial registration processing performed by the device manager in the system of the present invention.

As shown in FIG. 39, if the common key system is employed for data updating by using the data update ticket (DUT), steps S292 and S293 and steps S301 through S305 are executed. If the common key system is not employed for data updating, these steps are skipped.

If the common key is used for data updating, in step S292, the registration unit sends a data update ticket (DUT)-verification common key write command, such as Kdut_DEV1: the MAC checking key of the data update ticket (DUT), Kdut_DEV2: the data updating encryption key, Kdut_DEV3: the MAC checking key of the data update ticket (DUT), and Kdut_DEV4: the data updating encryption key, and the version information thereof, to the device.

In step S301, the device receives the above-described write command, and after determining that the DMIB writable flag is write enable in step S302, the device writes the received data into the device key area (see FIG. 18) (S303). Then, the device makes adjustments of the pointer, the size, and the free block number in device, which are required due to the data writing (S304), and sends a write completion message to the registration unit (S305).

Upon receiving the write completion message (S293), the registration unit determines in step S294 whether the device supports the data updating using the data update ticket (DUT) according to the public key system. As showh in FIG. 39, if the device supports the public key system, steps S295 and S296 and steps S306 through S310 are executed. If the device does not support the public key system, these steps are skipped.

If the device supports the public key system, in step S295, the registration unit sends a data update ticket (DUT) issuer code write command, such as DUTIC_DEV (DUT Issuer Category): the data update ticket (DUT) issuer category and the version information, to the device.

In step S306, the device receives the above-described write command, and after checking that the DMIB writable flag is write enable in step S307, in step S308, the device writes the received data into the public-key device key definition block (DKDB(PUB)) (S308). Then, the device makes adjustment of the pointer, the size, and the free block number in device, which are required due to the data writing (S309), and sends a write completion message to the registration unit (S310).

Upon receiving the write completion message (S296), the registration unit sends a device manager (DM) initial registration completion command to the device in step S321. Upon receiving the command (S331), the device determines in step S332 whether data for implementing at least one of the public key system and the common key system has been set for each of the mutual authentication, the verification of the partition registration ticket (PRT), and the verification of the data update ticket (DUT). If the data is insufficient, the processings cannot be completely performed. Then, the initial registration by the device manager is determined to be an error, and the process is terminated.

If it is found in step S332 that the data for implementing at least one of the public key system and the common key system has been set for each of the mutual authentication, the verification of the partition registration ticket (PRT), and the verification of the data update ticket (DUT), in step S333, the device sets the writable flag of the device management information block (DMIB) to write disable (0x0000), and sends a write completion message to the registration unit (S334).

Upon receiving the write completion message (S322), the registration unit sends a read command for the writable flag of the device management information block (DMIB) (see FIG. 15) to the device (S323). The device receives the command (S335), and then sends the writable flag in the device management information block (DMIB) of the device memory (S336).

Upon receiving the writable flag in the device management information block (DMIB) (S324), the registration unit determines whether the writable flag is set to write disable (0x0000). If the writable flag is not set to write disable (0x0000), it means that the DMIB data writing processing has not been successfully finished, and the process is terminated as an error. If the writable flag is set to write disable (0x0000), it means that the DMIB data writing processing has been successfully finished, and the process is completed.

Figure 41:
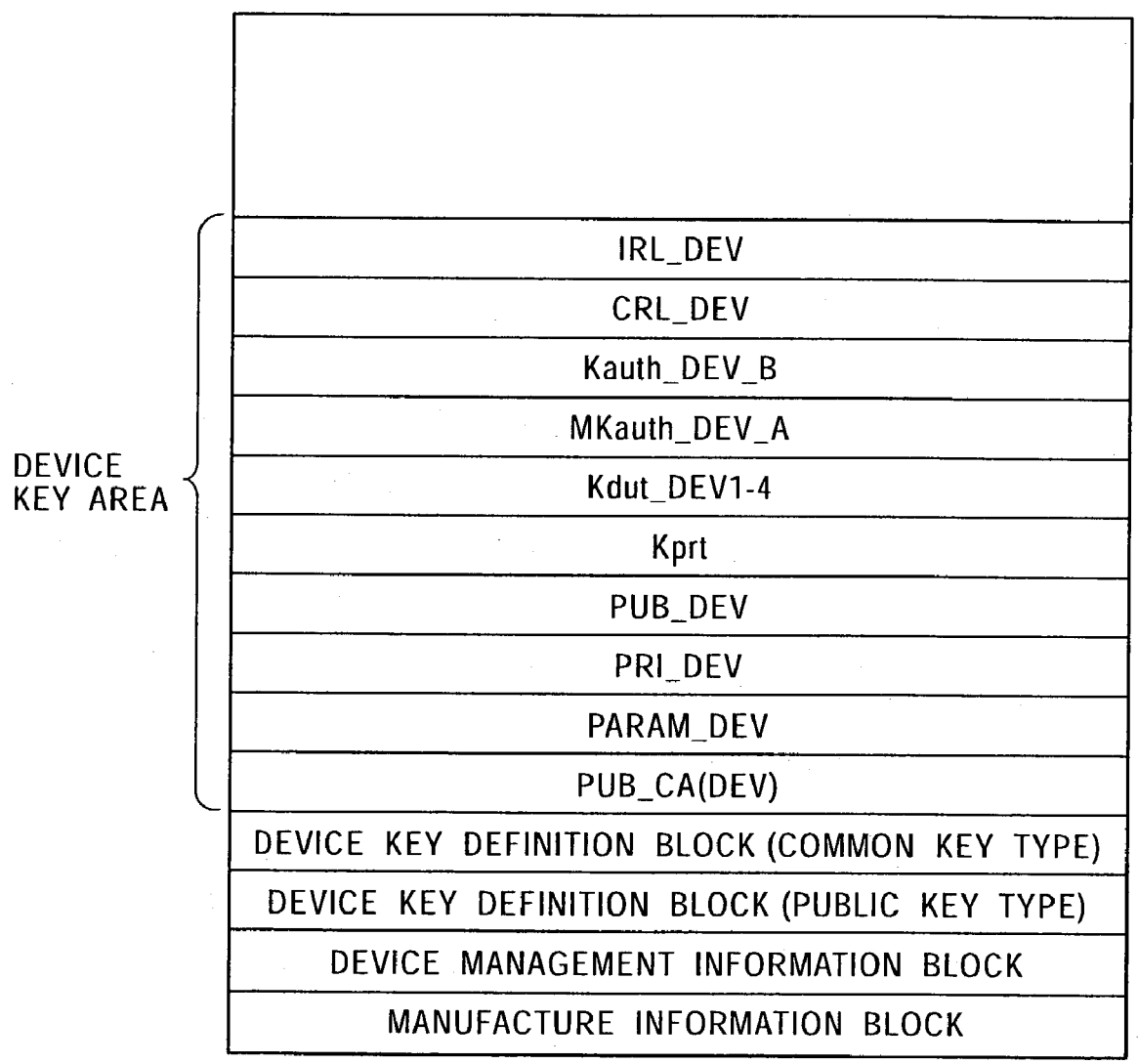
FIG. 41 is a diagram illustrating data stored in the device after the device initial registration processing is performed by the device manager in the system of the present invention.

FIG. 41 illustrates an example of the data stored in the memory device in the state in which the initial registration by the device manufacturing entity (Manufacture) (the processing flow in FIG. 35) and the initial registration processing by the device manager (the processing flows from FIGS. 36 to 40) are completed. FIG. 41 illustrates the manufacture information block, the device management information block, the public-key device key definition block (PUB), the common-key device key definition block (Common), and the device key area, which are discussed with reference to FIGS. 6, 14 through 18. At this point, partitions are not formed in the memory.

The device code and other information are written into the manufacture information block as the device unique information, as discussed with reference to FIG. 14. The information or part of the information written into the manufacture information block, or computation data obtained based on the written information, corresponds to the device identifier (IDm).

In the device key area shown in FIG. 41, Kauth_DEV_B: the two-way individual key authentication common key, and MKauth_DEV_A: the two-way individual key authentication master key are stored. However, these keys do not have to be stored if the device does not receive a request to perform common key authentication processing. Also, Kprt: the MAC checking key of the partition registration ticket (PRT) does not have to be stored if the device does not perform the ticket checking processing using the common key.

Moreover, IRL_DEV: the revocation list (Revocation List (Device ID)) in which the device identifiers (IDs) of the revoked devices are registered, and CRL_DEV: the revocation list (Revocation List (Certificate)) in which the public key certificate identifiers (ex. serial number: SN) of the revoked devices are registered do not have to be stored if there is no revoked device when the device is issued, or if the revocation lists are obtained by another source.

[B3.2. Public Key Certificate Issuing Processing under Device Manager Control]

The processing for issuing a device public key certificate by the device manager is described below with reference to FIG. 42 and the subsequent drawings. In the device, the device public key certificate (CERT DEV) used for authenticating the entire device and for performing processing based on the device, and the partition public key certificate (CERT PAR) used for authentication and verification when performing the processing on a specific partition in the device are stored. The partition public key certificate (CERT PAR) can be stored in each partition set in the device.

The device public key certificate (CERT DEV) is stored in the device key area (see FIG. 18), which is the memory area managed by the device manager, and the partition public key certificate (CERT PAR) is stored in the partition key area (see FIG. 23), which is the memory area managed by each partition manager.

The device public key certificate (CERT DEV) is issued by a procedure for providing the public key certificate issued by the certificate authority (CA for DM) (see FIGS. 2 and 3) via the registration authority managed by the device manager, and the database 222 (see FIG. 7) storing the public key certificate (CERT DEV) issued by the registration authority managed by the device manager is managed.

The partition public key certificate (CERT PAR) is issued by a procedure for providing the public key certificate issued by the certificate authority (CA for PM) (see FIGS. 2 and 3) via the registration authority managed by the partition manager, and the database 332 (see FIG. 9) storing the public key certificate (CERT PAR) issued by the registration authority managed by the partition manager is managed.

Figure 42:
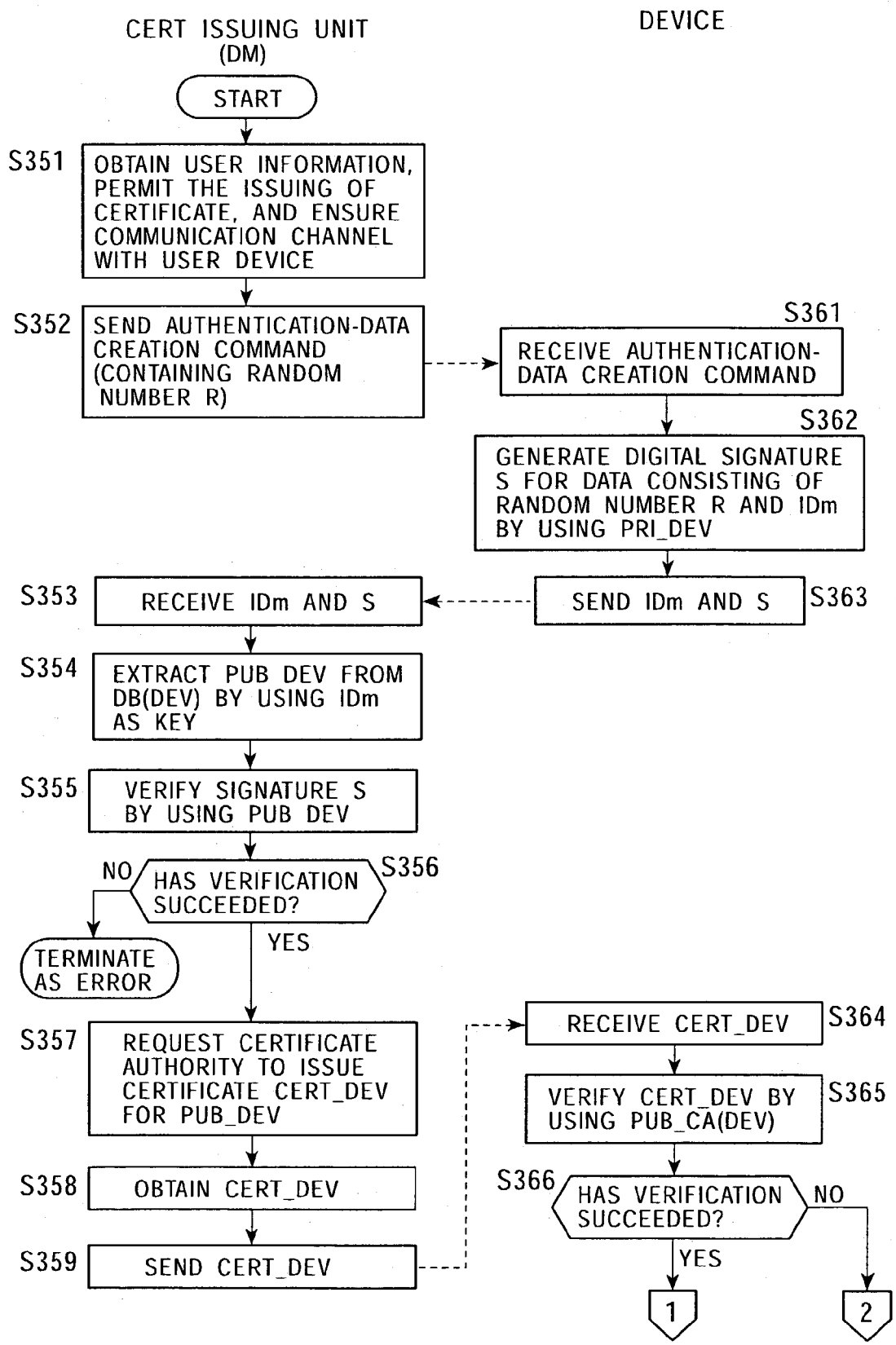
FIG. 42 is a first flowchart illustrating public key certificate issuing processing performed by the device manager in the system of the present invention.
Figure 43:
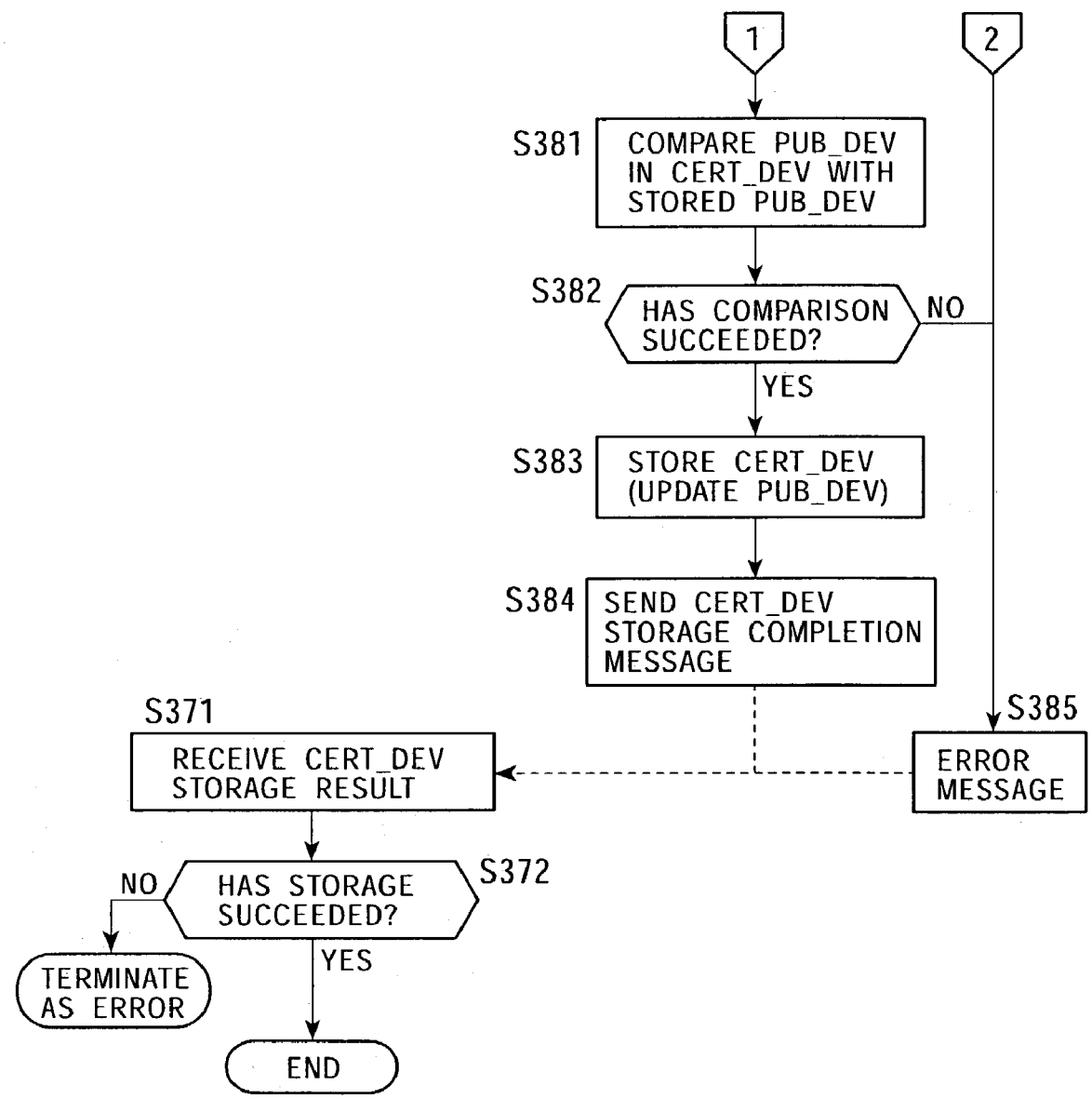
FIG. 43 is a second flowchart illustrating public key certificate issuing processing performed by the device manager in the system of the present invention.
Figure 44:
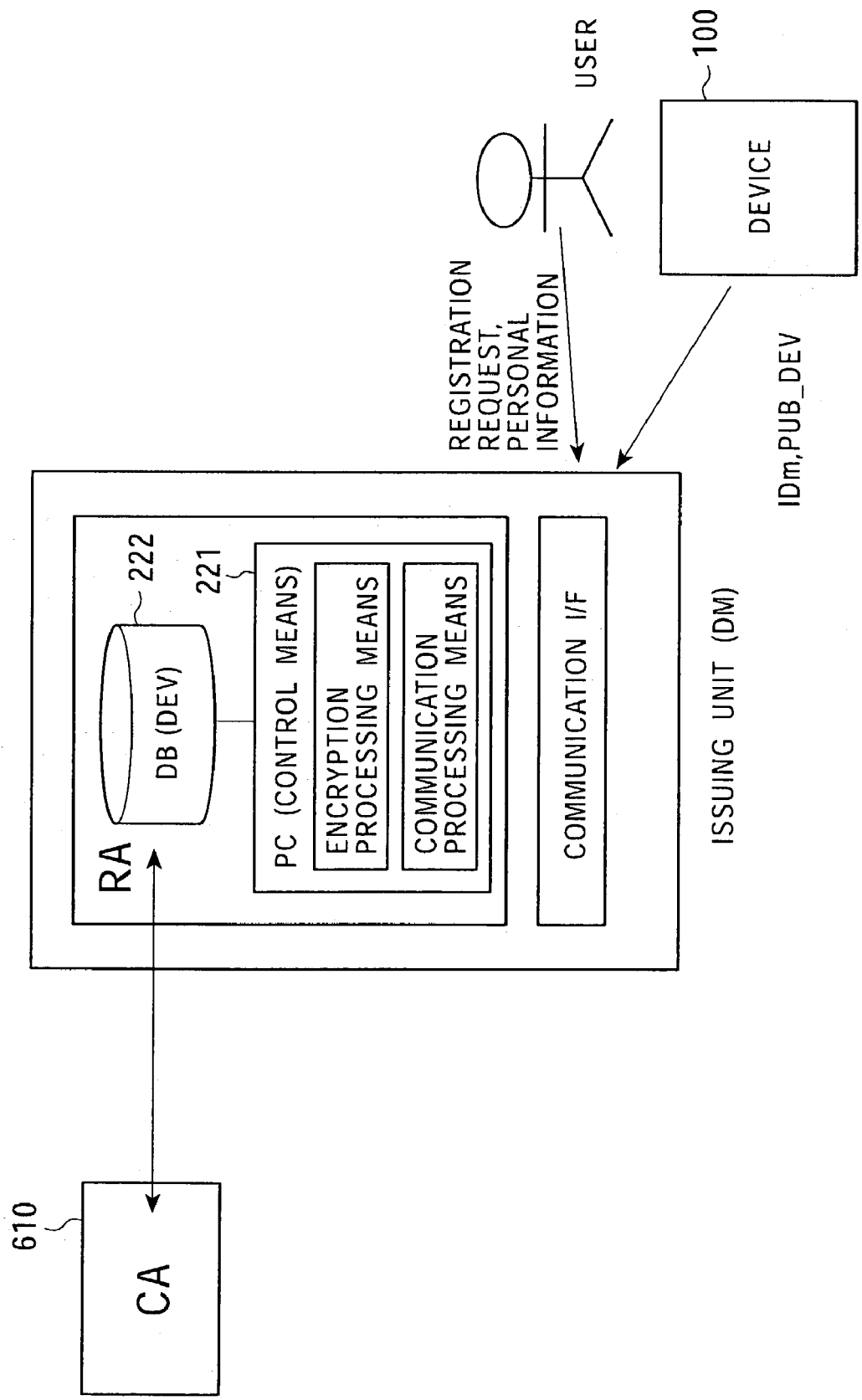
FIG. 44 is a flowchart illustrating public key certificate issuing processing performed by the device manager in the system of the present invention.

A description is now given, with reference to FIGS. 42 and 43, of a procedure for issuing the device public key certificate (CERT DEV) to the device by the registration authority managed by the device manager. The relationship among the issuing unit (DM) (only the configuration of the registration authority (RA) of the device manager is shown), the certificate authority (CA), and the user device is shown in FIG. 44. As shown in FIG. 44, the control means 221 contains encryption processing means. The encryption processing is performed by executing the encryption processing program under the control of the controller (CPU (2111 in FIG. 8)).

In FIGS. 42 and 43, the processing of the CERT (public key certificate) issuing unit of the registration authority managed by the device manager, and more specifically, the processing of the control means 221 of the device manager shown in FIG. 7, is shown at the left side, and the processing of the device is shown at the right side.

In step S351, the CERT issuing unit obtains user information of the device for which the device public key certificate (CERT DEV) is to be issued, permits (determines) the issuing of the certificate, and ensures a communication channel with the device. The user information of the device for which the device public key certificate (CERT DEV) is to be issued can be obtained by, for example, the data generated when the device initial registration is performed. Alternatively, the user name, the user address, the telephone number, the e-mail address, etc. may be separately obtained by another source. The user information may be obtained from the device after the communication channel with the device is set. The communication channel may be a cable or wireless communication channel through which data can be sent and received.

Then, in step S352, the CERT issuing unit sends an authentication-data creation command containing a random number to the device. Upon receiving the authentication-data creation command (S361), the device executes the digital-signature (S) generating processing (see FIG. 12) by applying the device private key (PRI DEV) to the coupling data of the received random number R and the device identifier (IDm) (S362). The device sends the device ID data (ID) and the signature (S) to the CERT issuing unit.

Upon receiving the ID data (IDm) and the signature (S) from the device (S353), the CERT issuing unit obtains the device public key (PUB DEV) stored in the database DB(DEV) 222 by using the received device ID data (IDm) as a search key. The CERT issuing unit then executes the signature (S) verification processing (see FIG. 13) by applying the obtained device public key (PUB DEV) (S355). If the signature (S) has not been successfully verified, it is determined that the data sent from the device is unauthorized data, and the process is terminated.

If the signature (S) has been successfully verified, the CERT issuing unit requests the certificate authority (CA for DM) 610 to perform the issuing processing of the device public key certificate (CERT DEV) (S357). The device manager receives the device public key certificate (CERT DEV) issued by the certificate authority 610 (S358), and sends it to the device (S359).

Upon receiving the device public key certificate (CERT DEV) from the device manager (registration authority), the device verifies the signature of the received device public key certificate (CERT DEV) by using the public key (PUB CA(DEV)) of the certificate authority that is prestored in the device key area. That is, the public key certificate is provided with a signature created by the private key of the certificate authority (see FIG. 11), and this signature is verified (S366).

If the signature verification has failed, it is determined that the public key certificate is not an authorized certificate, and an error message is sent to the CERT issuing unit (S385).

If the signature verification has succeeded, the device compares the device public key (PUB DEV) stored in the device public key certificate (CERT DEV) with the device public key (PUB DEV) stored in the device (S382). If the two keys do not coincide with each other, an error message is sent, and if the two keys coincide with each other, the device public key certificate (CERT DEV) is stored in the device key area (see FIG. 18) (S383). Before the issuing of the device public key certificate (CERT DEV), the public key (PUB DEV) created by the device is stored in this area, and when the authorized device public key certificate (CERT DEV) is issued, the public key (PUB DEV) is overwritten by the device public key certificate (CERT DEV).

Upon completion of the storage of the device public key certificate (CERT DEV), the device sends a storage completion message to the CERT issuing unit (S384). The CERT issuing unit receives the storage completion message (S371), and determines whether the storage processing has been successfully finished (S372). The CERT issuing unit then completes the process. If it cannot be determined that the storage processing has been successfully finished, the process is terminated as an error.

Figure 45:
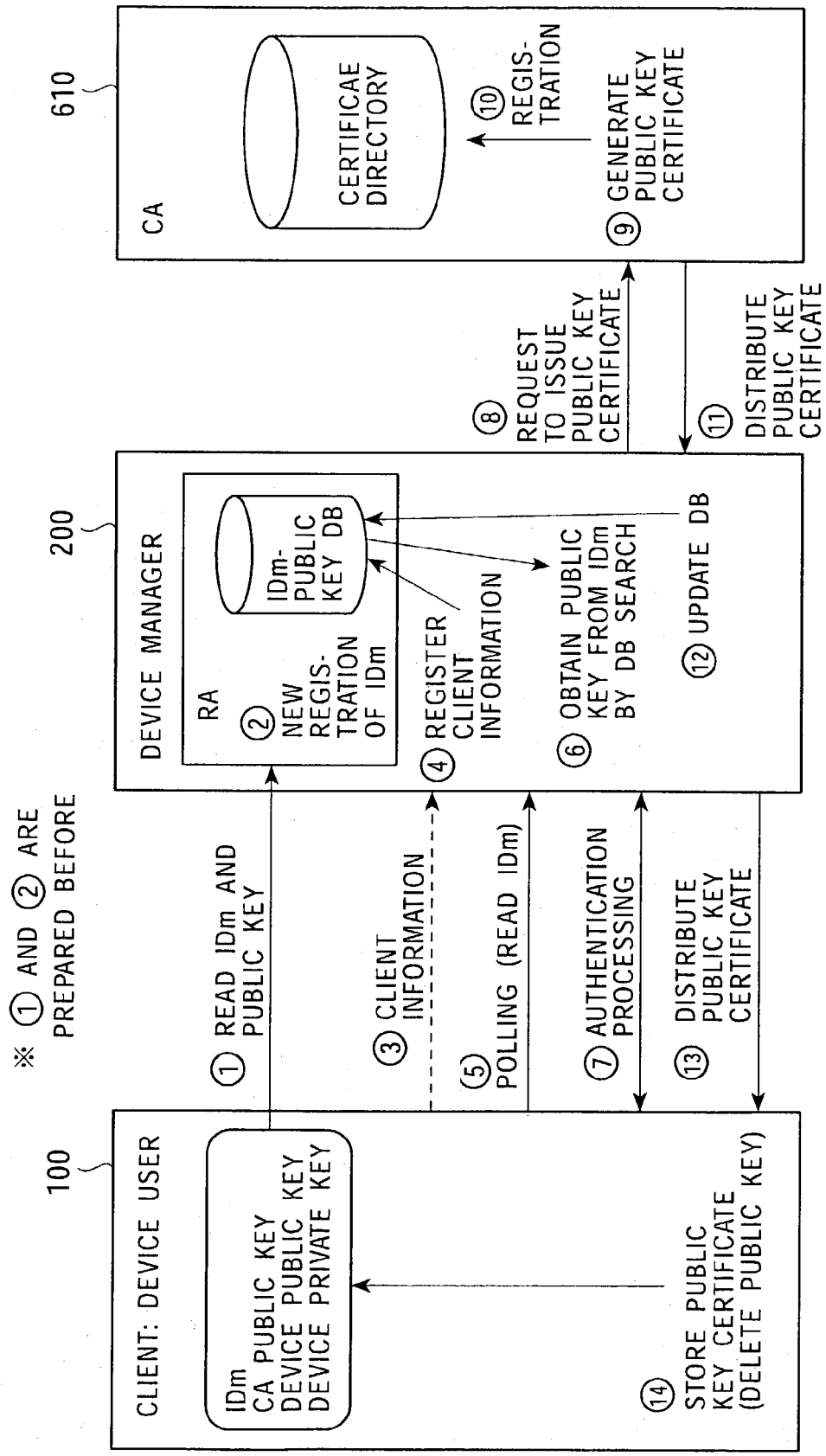
FIG. 45 is a flowchart illustrating public key certificate issuing processing performed by the device manager in the system of the present invention.

FIG. 45 illustrates the data sending and receiving processing among the entities, such as the device manager 200, the device 100, and the certificate authority (CA) 610, when performing the processing for issuing the device public key certificate (CERT DEV).

The processing is executed in the order of Nos. 1 to 14 in FIG. 45. Process No. 1 in which the device manager 200 obtains the device identifier (IDm) and the device public key (PUB DEV) from the device 100 and process No. 2 in which the device identifier (IDm) is registered are executed in the initial registration by the device manager.

The procedure for issuing the device public key certificate (CERT DEV) starts from process No. 3. 3. The device manager obtains the client information from the device. 4. The client information is registered (which is not necessary if the client information is already registered). 5. The device identifier (IDm) is obtained from the device. 6. The corresponding public key (PUB DEV) is obtained by searching the database based on the obtained device identifier (IDm). 7. Authentication processing between the device and the device manager is performed. This processing is omitted in the processing shown in FIGS. 42 and 43. In FIGS. 42 and 43, since the signature is verified when obtaining the device identifier (IDm) from the device, the authentication is omitted by checking the data sent and received between the issuing unit and the device. Either the signature verification in FIGS. 42 and 43 or the authentication in FIG. 45, or both processings are desirably performed. Details of the authentication processing are discussed below in Section B.4. Partition Manager Management Processing.

8. A request to issue the device public key certificate is made from the device manager to the certificate authority. 9. The device public key certificate (CERT DEV) is generated. 10. Data of the generated public key certificate is registered by the certificate authority (CA). 11. The public key certificate is distributed from the certificate authority (CA) 610 to the device manager 200. 12. The database of the device manager is updated (registering the public-key-certificate issued information). 13. The device public key certificate (CERT DEV) is sent from the device manager to the device. 14. The device public key certificate (CERT DEV) is stored in the device: it is stored in the device key area, as discussed above.

Figure 46:
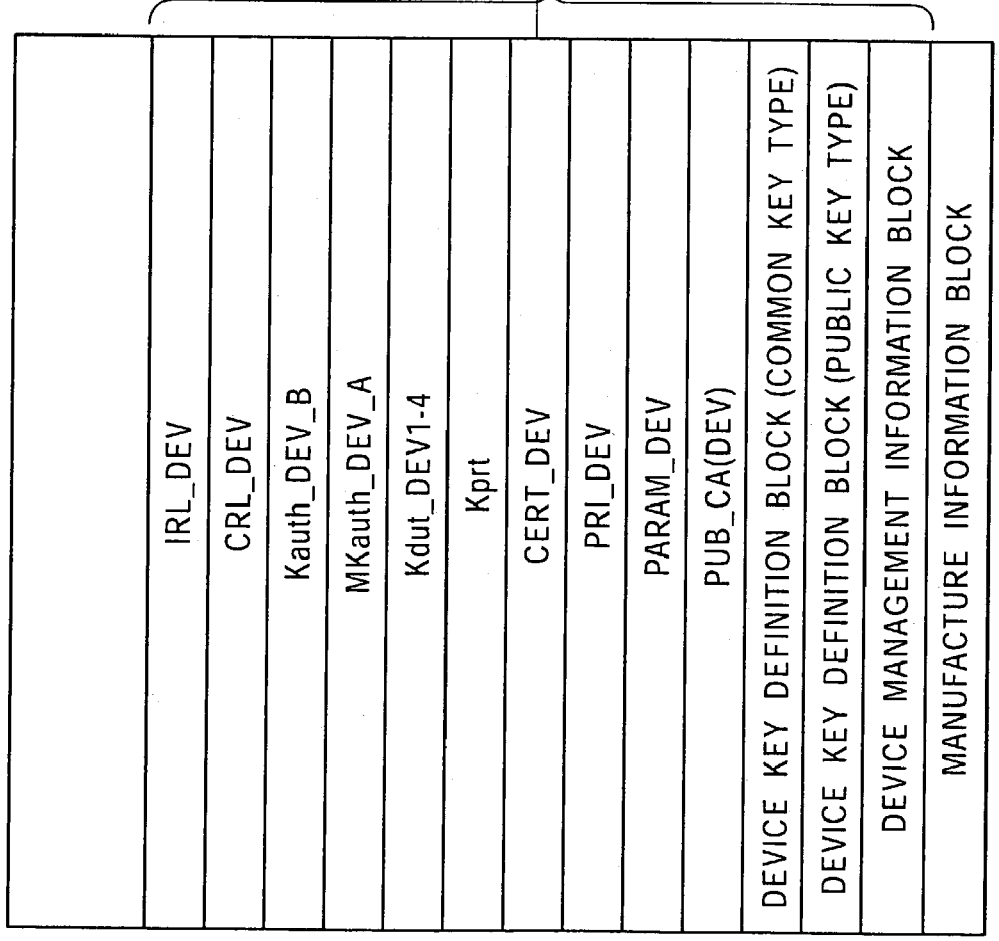
FIG. 46 is a diagram illustrating data stored in the device after public key certificate issuing processing is performed by the device manager in the system of the present invention.

According to the above-described processing, the device obtains the device public key certificate (CERT DEV) and stores it in the memory. The data storage configuration of the individual blocks of the memory after the device public key certificate (CERT DEV) is stored in the device key storage area of the memory is shown in FIG. 46. FIG. 46 illustrates the manufacture information block, the device management information block, the public-key device key definition block (PUB), the common-key device key definition block (Common), and the device key area, which have been discussed with reference to FIGS. 6, 14 through 18. At this point, partitions are not formed in the memory.

In the device key area shown in FIG. 46, the device public key certificate (CERT DEV) is stored. Before the issuing of the device public key certificate (CERT DEV), the public key (PUB DEV) created by the device is stored in this area, and upon receiving the device public key certificate (CERT DEV), the public key (PUB DEV) is overwritten by the device public key certificate (CERT DEV). If it is necessary to change the pointer, the size, and the management data b this updating processing, they are also updated.

[B4. Partition Manager Management Processing]

The partition manager management processing is described below. The processing to be executed before the start of the use of the device is discussed. The processing to be executed before the start of the use of the device includes the setting of partitions in the device memory and the issuing of the partition public key certificate (CERT PAR) to the device. Details of these processings are as follows. The partition setting processing includes mutual authentication processing (device authentication or partition authentication) between the device and the partition manager, and the processing for verifying the integrity of the partition registration ticket (PRT). Basically, the partition deletion processing can be executed according to a procedure similar to the partition creation. Accordingly, the partition deletion processing is also discussed below together with the partition creation processing.

[B4.1. Partition Setting Registration and Deletion Processing Using Partition Registration Ticket (PRT) under Partition Manager Control]

Figure 47:
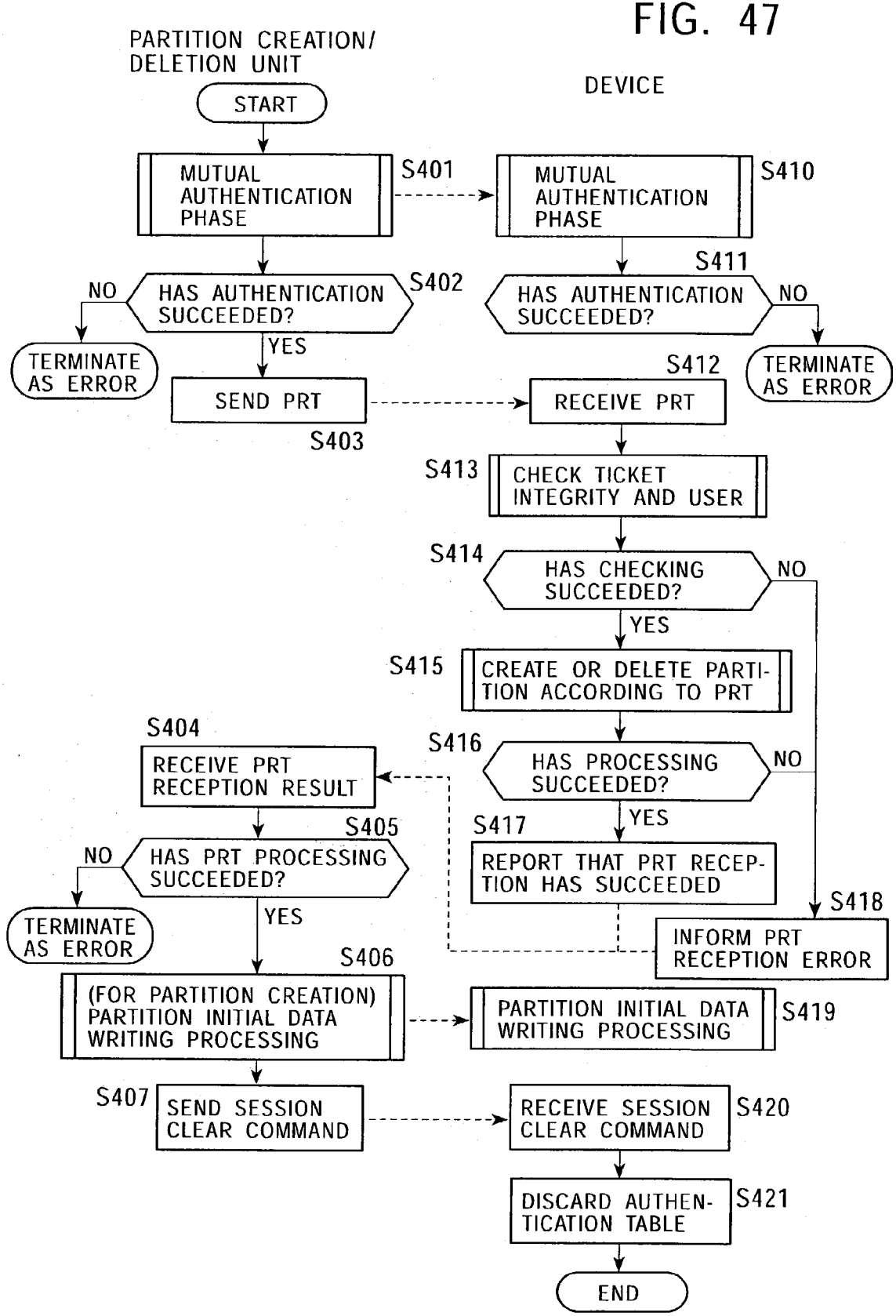
FIG. 47 is a flowchart illustrating partition creation/deletion processing for the device in the system of the present invention.

A description is first given of the partition setting registration and deletion processing using the partition registration ticket (PRT) (see FIG. 26) with reference to the flow of FIG. 47 and other drawings. As discussed above, the partition setting processing includes the mutual authentication processing (device authentication or partition authentication) between the device and the partition manager, and the verification processing for the integrity of the partition registration ticket (PRT). These processings are also discussed.

The partition setting registration processing and deletion processing flow shown in FIG. 47 is described below. In FIG. 47, the processing of a partition creation/deletion unit of the partition manager is shown at the left side, and the processing of the device (see FIG. 5) is shown at the right side. The partition creation/deletion unit of the partition manager is a unit that can read and write data from and into the device (ex. a reader/writer or a PC as a device access unit), and corresponds to the reader/writer shown in FIG. 10, which serves as the device access unit. An overview of the partition creation/deletion processing is first discussed with reference to FIG. 47, and details of the individual processings included in the partition creation/deletion processing are sequentially discussed with reference to the flows of FIG. 48 and the subsequent drawings.

First, in steps S401 and S410 of FIG. 47, the mutual authentication processing is performed between the partition creation/deletion unit and the device. Between the two means for performing data sending and receiving, it is first checked with each other whether they are authorized data communication means, and then, data transfer is performed according to the necessity. The mutual authentication processing is to check whether the other party is authorized data communication means. In one of the preferable data transfer methods in the mutual authentication processing, a session key is created, and data is encrypted by using the session key as the common key. Then, the data is transferred.

In the mutual authentication processing in the system of the present invention, device authentication or partition authentication is performed. A common key system or a public key system is used for the device authentication or the partition key authentication, which is discussed below.

The processing to be executed as the mutual authentication processing is determined by:

Authentication Flag: the flag indicating whether mutual authentication with the device is required for using the ticket; and Authentication Type: the type of mutual authentication (public key authentication, common key authentication, or either type (Any)) of the device; of the partition registration ticket (PRT) (see FIG. 26) to be used.

If the authentication processing has failed (No in steps S402 and S411), it means that it cannot be verified that the two means are authorized device and unit. Accordingly, the subsequent processing is not executed, and the process is terminated as an error.

If the authentication processing has succeeded, the partition creation/deletion unit sends the partition registration ticket (PRT) to the device. The partition registration ticket (PRT) is the ticket issued by the partition registration ticket (PRT) issuing means (PRT Issuer) managed by the device manager to the partition manager in response to a request from the partition manager. The partition registration ticket (PRT) is the access control ticket for the device, and has the above-described data format configuration shown in FIG. 26.

When the partition registration ticket (PRT) is sent to the ticket user, the public key certificate (CERT_PRTI) of the partition registration ticket (PRT) issuing means (PRT Issuer) is sent together if the public key system is employed. The attribute of the public key certificate (CERT_PRTI) of the PRT issuing means coincides with the identifier (PRTIC) of the partition registration ticket (PRT) issuing means (PRT User).

Upon receiving the partition registration ticket (PRT) (S412), the device verifies the integrity of the ticket and also checks the user (S413). The integrity verification processing of the ticket is performed by using the MAC checking of the common key system or the signature verification processing of the public key system. The user checking is performed by verifying the integrity of the entity (ticket user) that has sent the ticket, and, after the mutual authentication has succeeded, it is determined whether the ID data of the entity and the ticket user identifier (see FIG. 26) recorded in the ticket coincide with each other. These processings are discussed in detail below.

In the device, if the integrity of the received ticket (PRT) and the authenticity of the user cannot be successfully verified (No in S414), a partition registration ticket (PRT) reception error is reported to the partition creation/deletion unit (S418). If the integrity of the ticket and the authenticity of the user are verified (Yes in S414), a partition is created or deleted in the device memory according to the rules indicated in the received partition registration ticket (PRT). Details of this processing are also discussed below by using a different flow.

If the partition creation/deletion processing has succeeded according to the description of the partition registration ticket (PRT) (Yes in S416), it is reported to the partition creation/deletion unit that the PRT reception has succeeded (S417). If the partition creation/deletion processing has failed (No in S416), a PRT reception error is reported to the partition creation/deletion unit (S418).

The partition creation/deletion unit receives the PRT reception result (S404), and identifies the PRT processing result. If the PRT reception result indicates an error (No in S405), the process is terminated as an error. If the PRT reception result indicates a success (Yes in S405), and if the processing is the partition creation processing, the partition initial data is written (S406, S419). Details of the writing processing of the initial data are described below by using a different flow. If the partition initial data has been written, and if the PRT reception result indicates a success (Yes in S405) and if the processing is the partition deletion processing, a session clear command is sent and received (S407, S420). Then, the authentication table created in the device is discarded (S421), and the process is completed. The authentication table is created for the mutual authentication processing in steps S401 and S410 and details are discussed below.

As discussed above, by using the partition registration ticket (PRT), a new partition is created in the device or the created partition is deleted from the device. The mutual authentication processing (S401, S410), the ticket verification and user checking (S413), the partition creation and deletion processing (S415), and the partition initial data writing processing (S406, S419) included in the processing shown in FIG. 47 are described in detail below.

(Mutual Authentication Processing)

The mutual authentication processing executed in steps S401 and S410 in FIG. 47 is discussed below. The subsequent mutual authentication processing can also be performed in the device access processing using a different ticket, such, as the file registration ticket (FRT), the service permission ticket (SPT), or the data update ticket (DUT) if necessary.

Figure 48:
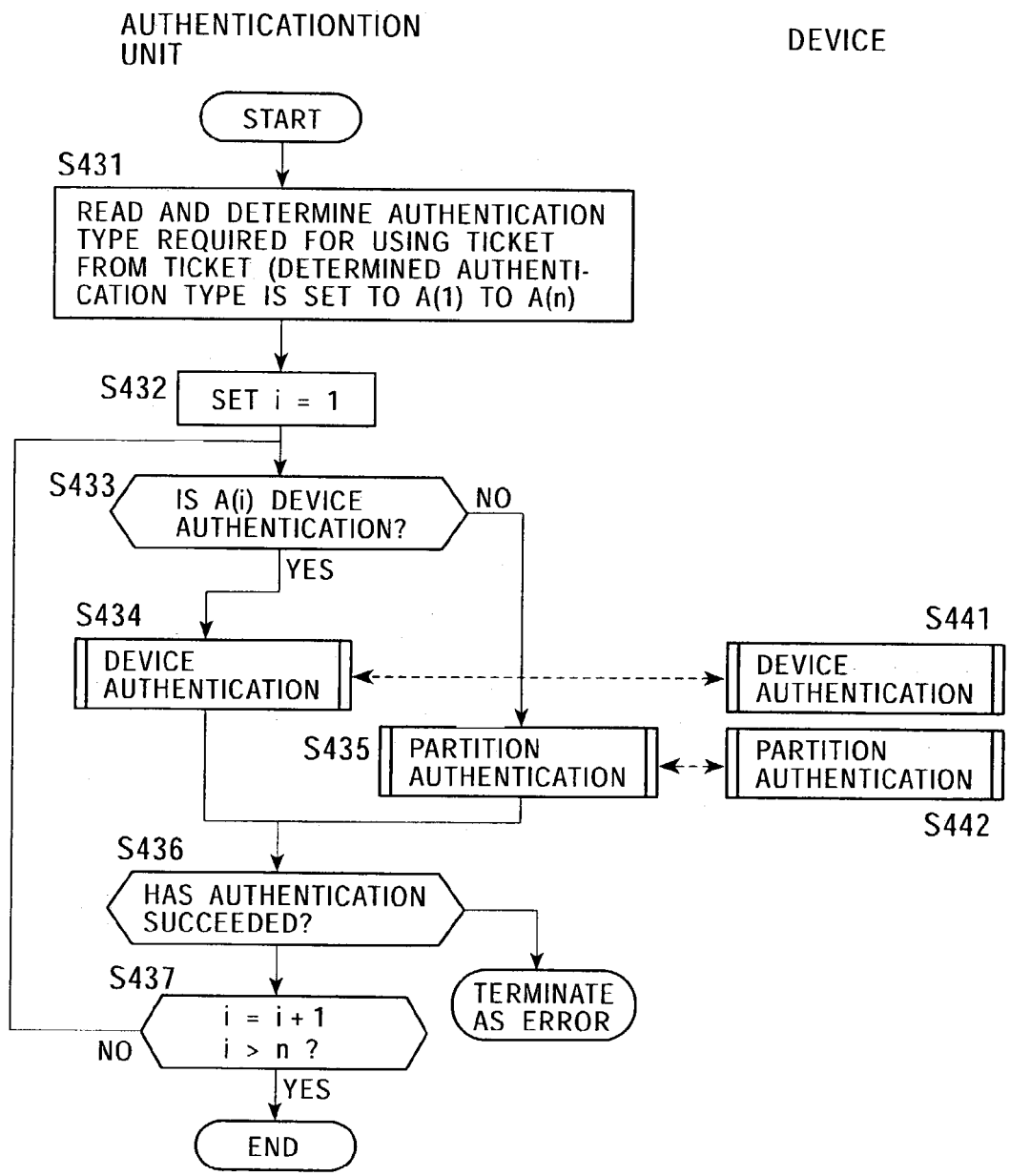
FIG. 48 is a first flowchart illustrating mutual authentication processing with the device in the system of the present invention.

The flow of the mutual authentication processing is shown in FIG. 48. In FIG. 48, the processing of the authentication unit of the partition manager is shown at the left side, and the processing of the device (see FIG. 5) is shown at the right side. The authentication unit of the partition manager is a unit that can read and write data from and into the device (ex. a reader/writer or a PC as a device access unit), and has the configuration of a reader/writer, such as that shown in FIG. 10.

In step S431 of FIG. 48, the authentication unit reads and determines the authentication type required for using the partition registration ticket (PRT) from the ticket. The authentication mode is not restricted to the authentication type indicated in the ticket, and the device authentication or the partition authentication may be determined according to the type specified by the access unit (ex. reader/writer).

The determined authentication type is indicated by A(1) through A(n). Various authentication processing modes can be set in the partition setting registration or deletion processing using the partition registration ticket (PRT). For example, for the partition registration setting, device, authentication is required for the device. For the partition deletion, both the device authentication and the partition authentication, which is for the partition to be deleted, are required. Accordingly, it is possible to indicate that either authentication type is required or both authentication types are required in the partition registration ticket (PRT) according to the processing. The authentication type required for using the PRT is indicated in [Authentication Type] of the partition registration ticket (PRT), and the authentication unit reads and determines the authentication type required for using the partition registration ticket (PRT) from the ticket, and defines the authentication processing procedure as A(i): A(1) through A(n).

In step S432, the authentication unit reads the first authentication processing type A(1), and determines whether the authentication type A(1) is device authentication or partition authentication (S433). If it is device authentication, device authentication is executed (S434, S441). If it is partition authentication, partition authentication is executed (S435, S442). If authentication has not succeeded after performing authentication processing with the device, the process is terminated as an error. If authentication has succeeded, i is incremented in step S437, and the process returns to step S433. Then, the subsequent authentication type is determined and authentication is executed according to the authentication type. Such processing is executed from A(1) through A(n), and when all the authentications have succeeded, the process proceeds to the subsequent step.

Figure 49:
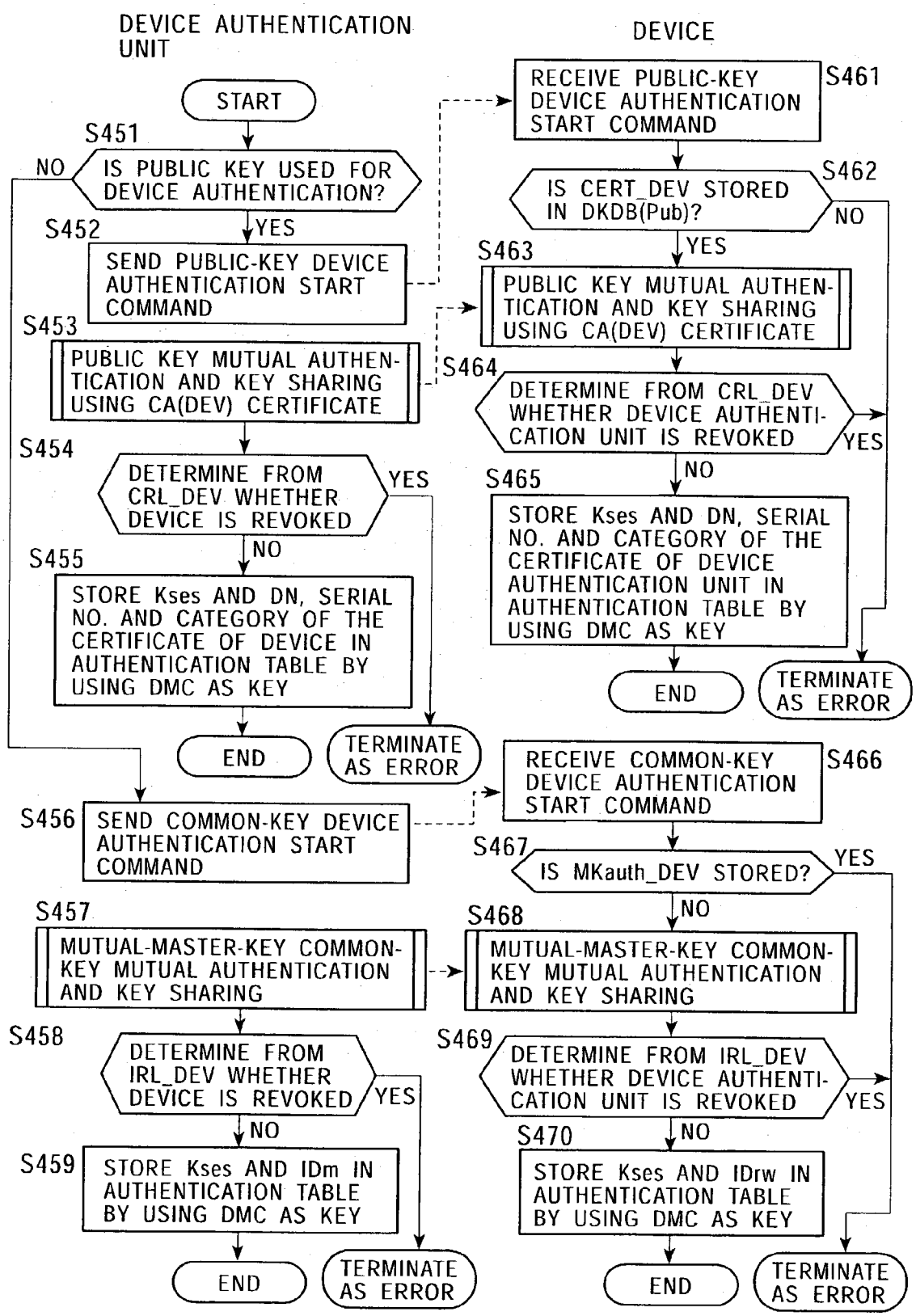
FIG. 49 is a second flowchart illustrating mutual authentication processing (device authentication) with the device in the system of the present invention.

The device authentication processing is described below with reference to the flow of FIG. 49. In FIG. 49, the processing of a device authentication unit of the partition manager is shown at the left side, and the processing of the device (see FIG. 5) is shown at the right side. The device authentication unit of the partition manager is a unit that can read and write data from and into the device (ex. a reader/writer or a PC as the device access unit), and has the configuration of a reader/writer, such as that shown in FIG. 10, which serves as the device access unit.

In step S451, the device authentication unit determines based on the partition registration ticket (PRT) whether a public key system using a public key is to be employed for the device authentication processing. The device authentication is performed by either the public key system or the common key system, and the execution type is indicated in the ticket.

If the common key system is specified, steps S452 through S455, and steps S461 through S465 of FIG. 49 are not executed, and the process proceeds to step S456. If the public key system is specified, the device authentication unit sends a public-key device authentication start command to the device in step S452. Upon receiving the command (S461), the device determines whether the device public key certificate (CERT DEV) is stored by referring to the public-key device key definition block (see FIG. 16) of the device memory (S462). If the device public key certificate (CERT DEV) is not stored, the mutual authentication of the public key system cannot be executed, and the process is terminated as an error.

If it is determined that the device public key certificate (CERT DEV) is stored, in steps S453 and S463, the mutual authentication and key sharing processing is performed by using the public key certificate issued by the device-manager certificate authority (CA(DEV)).

Figure 50:
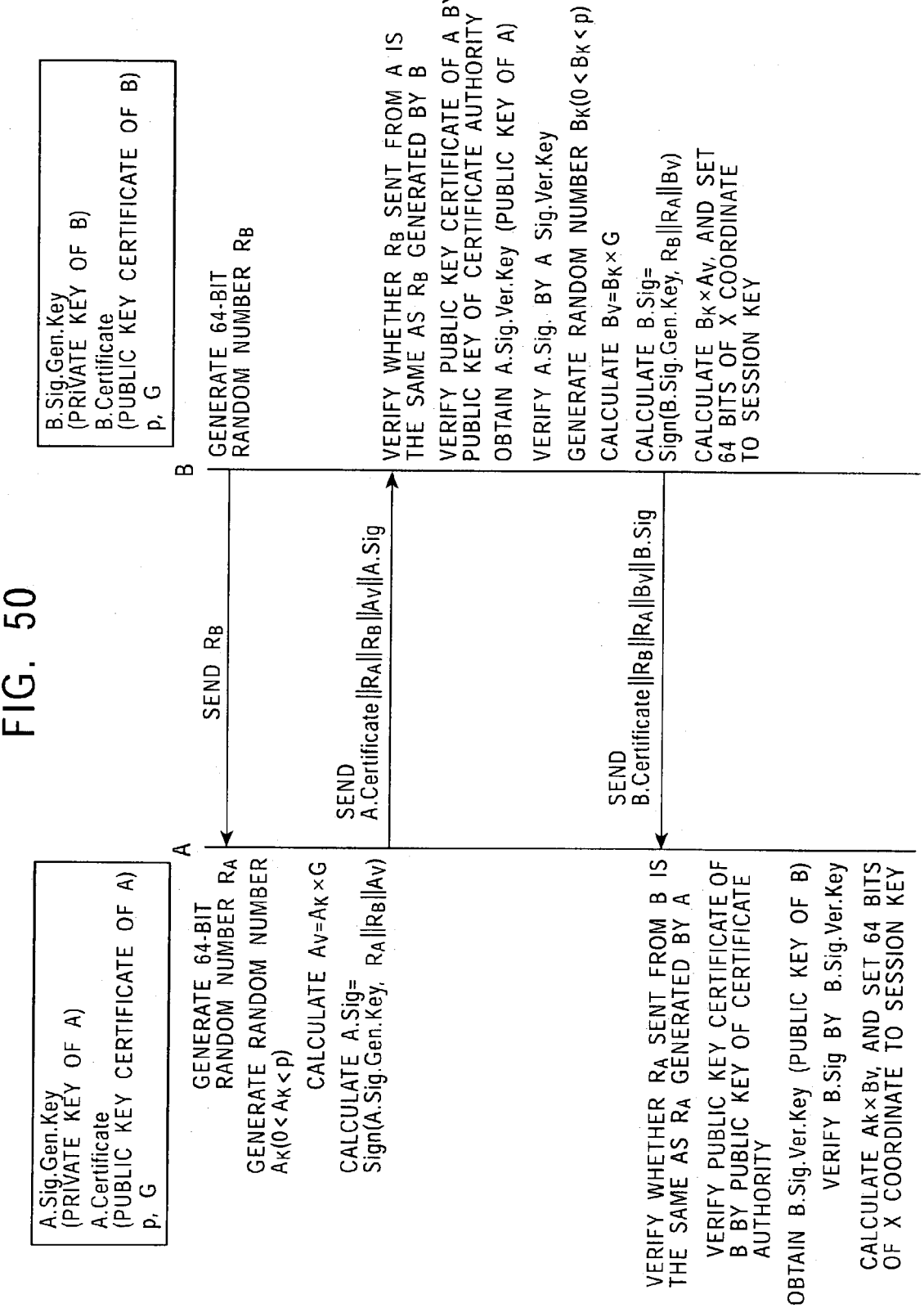
FIG. 50 is a diagram illustrating mutual authentication processing according to a public key system with the device in the system of the present invention.

The mutual authentication and key sharing using the public key system is described below with reference to FIG. 50. FIG. 50 illustrates the mutual authentication sequence using a 160-bit-length elliptic curve cryptosystem (ECC), which is a public key cryptosystem. Although in FIG. 50 ECC is used as the public key cryptosystem, another type of public key cryptosystem may be employed. Also, the key size does not have to be 160 bits. In FIG. 50, B generates a 64-bit random number Rb, and sends it to A. A receives the random number Rb and generates a new 64-bit random number Ra and a new random number Ak, which is smaller than the characteristic p. Then, the point Av is calculated by multiplying the base point G by Ak (Av=Ak×G), and the digital signature A. Sig for the Ra, Rb, and Av (X coordinate and Y coordinate) is generated. A then sends the digital signature A. Sig to B together with the public key certificate of A. Since Ra and Rb have each 64 bits, and the X coordinate and the Y coordinate of Av each have 160 bits, a digital signature for a total of 448 bits is generated.

When using the public key certificate, the user verifies the digital signature of the public key certificate by using the public key of the public key certificate issuing authority (CA) owned by the user. After succeeding in authenticating the digital signature, the user extracts the public key from the public key certificate and utilizes it. Accordingly, it is necessary that all the users of the public key certificate possess the common public key of the public key certificate issuing authority (CA). The verification method of the digital signature has been discussed with reference to FIG. 13, and details thereof are thus omitted.

Upon receiving the public key certificate of A, Ra, Rb, Av, and the digital-signature A. Sig, B determines whether Rb sent from A coincides with Rb generated by B. After determination, if two Rb coincide with each other, B verifies the digital signature of the public key certificate of A by using the public key of the certificate authority, and extracts the public key of A. Then, B verifies the digital signature A. Sig by using the extracted public key of A. After succeeding in the verification of the digital signature, B determines that A is authenticated.

Then, B generates a random number Bk, which is smaller than the characteristic p. Then, the point Bv is calculated by multiplying the base point G by Bk (Bv=Bk×G), and the digital signature B. Sig for Rb, Ra, and Bv (X coordinate and Y coordinate) is generated. B sends the digital signature B. Sig to A together with the public key certificate of B.

Upon receiving Rb, Ra, Bv, and the digital signature B. Sig, A determines whether Ra sent from B coincides with Ra generated by A. After determination, if two Ra coincide with each other, A verifies the digital signature of the public key certificate of B by using the public key of the certificate authority, and extracts the public key of B. Then, A verifies the digital signature B. Sig by using the extracted public key of B. After succeeding in the verification of the digital signature, A determines that B is authenticated.

If the authentication of both A and B has succeeded, B calculates Bk×Av (since Av is the point on the elliptic curve, the scalar product calculation on the point on the elliptic curve is required, though Bk is a random number), and A calculates Ak×Bv. Then, the lower 64 bits of the X coordinate of these points are used as the session key, which is used for the subsequent communication (when a 64-bit common key is used for the common key cryptosystem). The session key may be generated by the Y coordinate, and the lower 64 bits do not have to be used for the session key. In the private communication after mutual authentication, the transmitting data is not only encrypted, but also may be provided with a digital signature.

If the illegalities or the inconsistencies are found during the verification of the digital signature or the received data, it is determined that the mutual authentication has failed, and the process is terminated.

In the mutual authentication processing, the transmitting data is encrypted by using the generated session key, and mutual data communication is then performed.

Referring back to FIG. 49, a description of the flow is continued. After the above-described mutual authentication and key sharing processing has succeeded in steps S453 and S463, the device determines in step S464 whether the device authentication unit to be communicated is not revoked, by referring to the CRL_DEV: the revocation list (Revocation List (Certificate)) stored in the device key area (see FIG. 18) of the device memory, in which the public key certificate identifiers (ex. serial number: SN) of the revoked devices and the revoked units (a ticket user, such as a reader/writer or a PC as the device access unit, or ticket issuing means) are registered. If the device authentication unit is revoked, the partition creation processing cannot be permitted, and thus, the process is terminated as an error.

If the device authentication unit is not revoked, in step S465, the session key Kses generated in the mutual authentication and key sharing processing, the ID name (DN: Distinguished Name), the serial number, and the category in the public key certificate of the entity to be communicated (a reader/writer or a PC forming the device authentication unit as a device access unit) are stored in the authentication table in such a manner that they are related to each other by using the device manager code (DMC) as a key.

Meanwhile, in step S454, the device authentication unit determines whether the device is not revoked by referring to CRL_DEV: the revocation list (Revocation List (Certificate)) in which the public key certificate identifiers (ex. serial number: SN) of the revoked devices and the revoked units (a ticket user, such as a reader/writer or a PC as the device access unit, or ticket issuing means) are registered. The device authentication unit is able to obtain the revocation list (CRL_DEV) from the registration authority (RA (PAR)). If the device is revoked, the partition creation processing cannot be permitted, and the process is terminated as an error.

If the device is not revoked, in step S455, the session key Kses generated in the mutual authentication and key sharing processing, the ID name (DN: Distinguished Name), the serial number, and the category in the public key certificate of the entity to be communicated (device) are stored in the authentication table in such a manner that they are related to each other by using the device manager code (DMC) as a key.

FIG. 51 illustrates an example of the authentication table created in the device. FIG. 52 illustrates an example of the authentication table created in the reader/writer (may be a PC) as the device access unit, which serves as the authentication unit.

FIG. 51 illustrates an example of the authentication table created in the device when the device authentication and the authentication of partitions 1 and 2 as the partition authentication, which is described below, are finished. As the group, the device manager code (DMC) is recorded for the device authentication, and the partition manager code (PMC) is recorded for the partition authentication. Data of each group is stored according to the executed authentication type. When the public key authentication type is employed, as discussed above, the session key Kses generated in the mutual authentication and key sharing processing, the ID name (DN: Distinguished Name), the serial number, and the category in the public key certificate of the entity to be communicated (reader/writer as the device access unit) are stored in the authentication table in such a manner that they are related to each other by using the device manager code (DMC) as a key. When the common key authentication type is employed, the session key Kses and the identifier (ID RW) of the entity to be communicated (reader/writer as the device access unit) are stored.

The authentication table is discarded when the session is cleared. The device is able to check the authentication status of the device and that of each partition by referring to the table information, and is able to check the session key to be used.

FIG. 52 illustrates the authentication table in the reader/writer as the device access unit. FIG. 52 also illustrates the authentication table when the device authentication and the authentication of partitions 1 and 2 as the partition authentication are finished. The basic configuration of this authentication table is similar to that of the device. As the group, the device manager code (DMC) is recorded for the device authentication, and the partition manager code (PMC) is recorded for the partition authentication. Data of each group is stored according to the executed authentication type. When the public key authentication type is employed, as discussed above, the session key Kses, the ID name (DN: Distinguished Name), the serial number, and the category in the public key certificate of the entity to be communicated (device) are stored in the table. When the common key authentication type is employed, the session key Kses and the identifier (ID RW) of the entity to be communicated (device) are stored. The authentication table of the reader/writer is also discarded when the session is cleared. The reader/writer as the device access unit is also able to determine the authentication status of the device and that of each partition by referring to the information of the authentication table, and is able to check the session key to be used.

Referring back to FIG. 49, a description of the device authentication processing is continued. If it is determined in step S451 that the device authentication type is not a public key type, the device authentication unit outputs a common-key device authentication command to the device in step S456. Upon receiving the command (S466), the device checks whether the two-way individual key authentication master key (MKauth_DEV) used for the common key authentication is stored by referring to the common-key device key definition block (see FIG. 16) of the device memory (S467). If the two-way individual key authentication master key (MKauth_DEV) is not stored, the common-key mutual authentication cannot be executed, and the process is terminated as an error.

If it is determined that the two-way individual key authentication master key (MKauth_DEV) is stored, the mutual authentication using the master key and key sharing processing is executed in steps S457 and S468.

Figure 53:
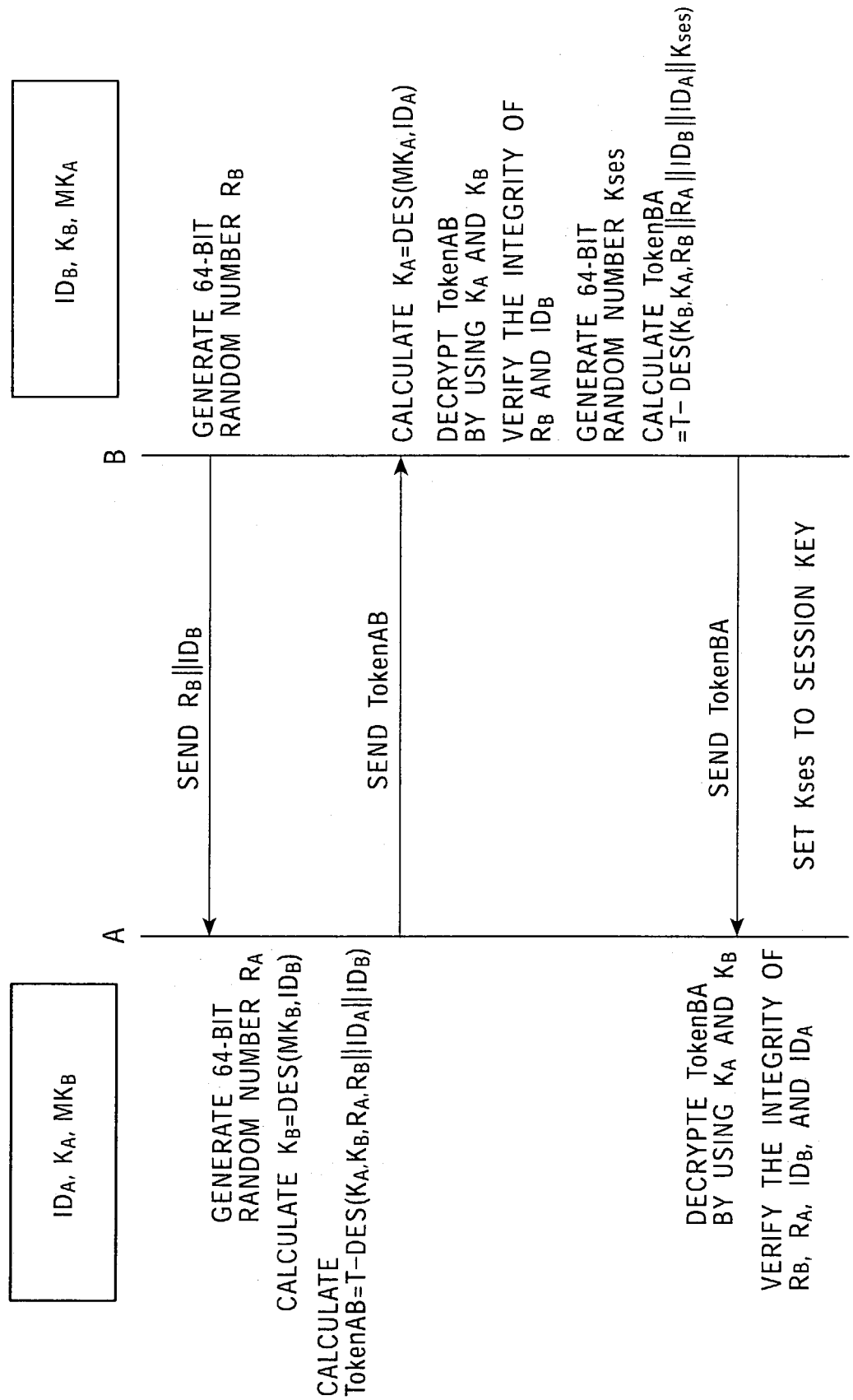
FIG. 53 is a diagram illustrating mutual authentication processing according to a common key system with the device in the system of the present invention.

The mutual authentication and key sharing processing according to the common key using the master key is described below with reference to FIG. 53. In FIG. 53, A and B indicate entities that execute the common key authentication by using the master key. A possesses the identifier of A IDa, the two-way individual key authentication common key Ka, and the two-way individual key authentication master key MKb, and B possesses the identifier IDb of B, the two-way individual key authentication common key Kb, and the two-way individual key authentication master key MKa. In the example shown in FIG. 53, the DES algorithm (ex. DES or triple DES) is used as the common key cryptosystem. However, another type of common key cryptosystem similar to DES may be used.

First, B generates a 64-bit random number Rb, and sends Rb and IDb, which is the ID of B, to A. Upon receiving Rb and IDb, A generates a new 64-bit random number Ra, and obtains the two-way individual key authentication common key Kb by DES-encrypting IDb with the two-way individual key authentication master key MKb. A then encrypts data in the CBC mode of DES by using the keys Ka and Kb in the order of Ra, Rb, IDa, and IDb, and returns the encrypted data to B together with the identifier IDa of A.

Upon receiving the data, B obtains the two-way individual key authentication common key Ka by DES-encrypting IDa with the two-way individual key authentication master key MKa. B also decrypts the received data with the keys Ka and kb. B then verifies whether Rb and IDb among the decrypted Ra, Rb, IDa, and IDb coincide with those sent from B. If the verification has succeeded, B determines that A is authenticated.

Then, B generates a 64-bit random number Kses used as the session key, encrypts the data in the CBC mode of DES by using the keys Kb and Ka in the order of Rb, Ra, IDb, IDa, and Kses, and returns the data to A.

Upon receiving the data, A decrypts the received data with the keys Ka and Kb, and verifies whether the decrypted Ra, Rb, IDa, and TDb coincide with those sent from A. If the verification has succeeded, A determines that B is authenticated. After authenticating A and B each other, the session key Kses is used as the common key for performing private communication after authentication.

If the illegalities or the inconsistencies are found during the verification of the received data, it is determined that the mutual authentication has failed, and the process is terminated.

Figure 54:
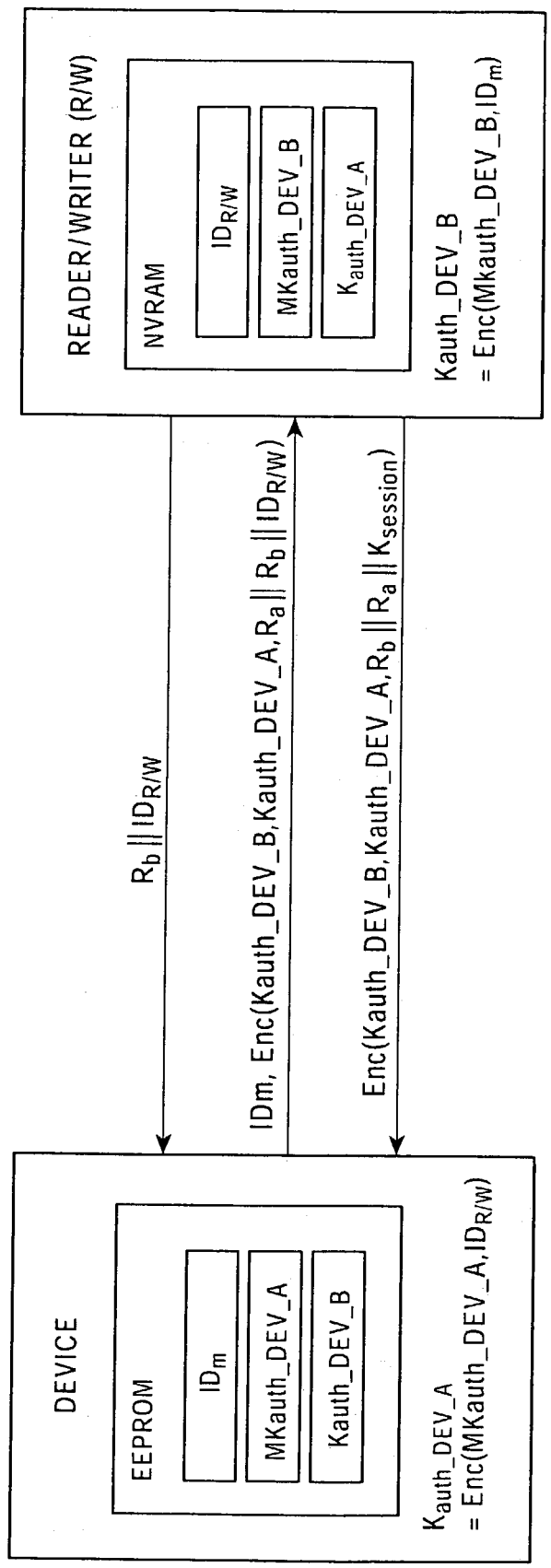
FIG. 54 is a diagram illustrating mutual authentication processing according to a common key system with the device in the system of the present invention.

FIG. 54 illustrates the data flow in the common key authentication using the master key in correspondence with the storage data of the system of the present invention. As shown in FIG. 54, the reader/writer (R/W) as the device access unit generates a 64-bit random number Rb, and sends Rb and IDrw, which is the ID of the reader/writer, to the device. Upon receiving Rb and IDrw, the device generates a new 64-bit random number Ra, and obtains the two-way individual key authentication common key Kauth_DEV_A by DES-encrypting IDrw with the two-way individual key authentication master key MKauth_DEV_A. The device then encrypts the data, for example, in the DES-CBC mode as the encryption algorithm, by using the keys Kauth_DEV_A and Kauth_DEV_B in the order of Ra, Rb, and IDrw, and returns the encrypted data to the reader/writer (R/W) as the device access unit together with the identifier IDm of the device.

Upon receiving the encrypted data and the identifier IDm, the reader/writer (R/W) obtains the two-way individual key authentication common key Kauth_DEV_B by DES-encrypting IDm with the two-way individual key authentication master key MKauth_DEV_B. The reader/writer then decrypts the received data with the keys Kauth_DEV_A and Kauth_DEV_B, and verifies whether the decrypted Rb and IDrw coincide with those sent from the reader/writer (R/W) as the device access unit. After the verification has succeeded, the reader/writer (R/W) determines that the device is authenticated.

Subsequently, the reader/writer (R/W) generates a 64-bit random number Kses used as the session key, encrypts the data, for example, in the triple DES mode as the DES algorithm, by using the two-way individual key authentication common keys Kauth_DEV_A and Kauth_DEV_B in the order of Rb, Ra, and Kses, and returns the encrypted data to the device.

Upon receiving the data, the device decrypts the received data with the two-way individual key authentication common keys Kauth_DEV_A and Kauth_DEV_B. The device verifies whether the decrypted Ra, Rb, and IDrw coincide with those sent from the device. After the verification has succeeded, the device determines that the reader/writer (R/W) is authenticated, and the session key Kses is used as the common key for the private communication after authentication.

Concerning IDm, which is the unique value of the device, the values of the storage data in the device manager management area can be used for IDm, as previously discussed by using the device memory format of FIG. 6.

As discussed above, according to the mutual authentication and key sharing processing by employing the common key type using the master key, two keys, such as the individual key of one of the two entities to be communicated, and the individual key of the other entity, which is generated by the processing based on the master key of the other entity, are set as the common key, and mutual authentication is performed according to the common key type by using the two keys. It is thus possible to implement a more secure authentication system and method than a known common key authentication system, which is configured such that a common key is prestored in a device or an access unit.

Referring back to FIG. 49, a description of the flow is continued. If the above-described mutual authentication and key sharing processing have succeeded in steps S457 and S468, the device verifies in step S469 whether the entity to be communicated, i.e., the device authentication unit, is not revoked by referring to IRL_DEV: the revocation list (Revocation List (ID)), stored in the device key area (see FIG. 18) of the device memory, in which the identifiers (IDs) of the revoked devices and the revoked units (a ticket user, such as a reader/writer or a PC as the device access unit, or ticket issuing means) are registered. If the device authentication unit is revoked, the partition creation processing cannot be permitted, and the process is terminated as an error.

If the device authentication unit is not revoked, the device stores the session key Kses created in the mutual authentication and key sharing processing, in step S470, the ID information (IDrw) of the entity to be communicated (a reader/writer or a PC forming the device authentication unit as the device access unit) in the authentication table (see FIG. 51) in such a manner that they are related to each other by using the device manager code (DMC) as a key.

Meanwhile, in step S458, the device authentication unit also verifies whether the device is not revoked by referring to IRL_DEV: the revocation list (Revocation List (ID)) in which the identifiers (IDs) of the revoked devices and the revoked units (a ticket user, such as a reader/writer or a PC as the device access unit, or ticket issuing means) are registered. The device authentication unit is able to obtain the revocation list (IRL_DEV) from the registration authority (RA(PAR)). If the device is revoked, the partition creation processing cannot be permitted, and the process is terminated as an error.

If the device is not revoked, in step S459, the device authentication unit stores the session key Kses created in the mutual authentication and key sharing processing and the ID information (IDm) of the entity to be communicated (device) in the authentication table (see FIG. 52) in such a manner that they are related to each other by using the device manager code (DMC) as a key.

The above-described processing is the device authentication processing between the device and the reader/writer as the device access unit managed by the partition manager.

The partition authentication processing executed in step S435 or S442 of FIG. 48 is described below with reference to FIGS. 55 and 56. As previously discussed, for performing the partition setting registration or deletion processing using the partition registration ticket, either the device authentication or the partition authentication or both authentications are required according to the type of processing. Such setting is indicated in the partition registration ticket (PRT). If the partition registration ticket (PRT) indicates that the partition authentication is to be performed, the partition authentication is executed.

Figure 55:
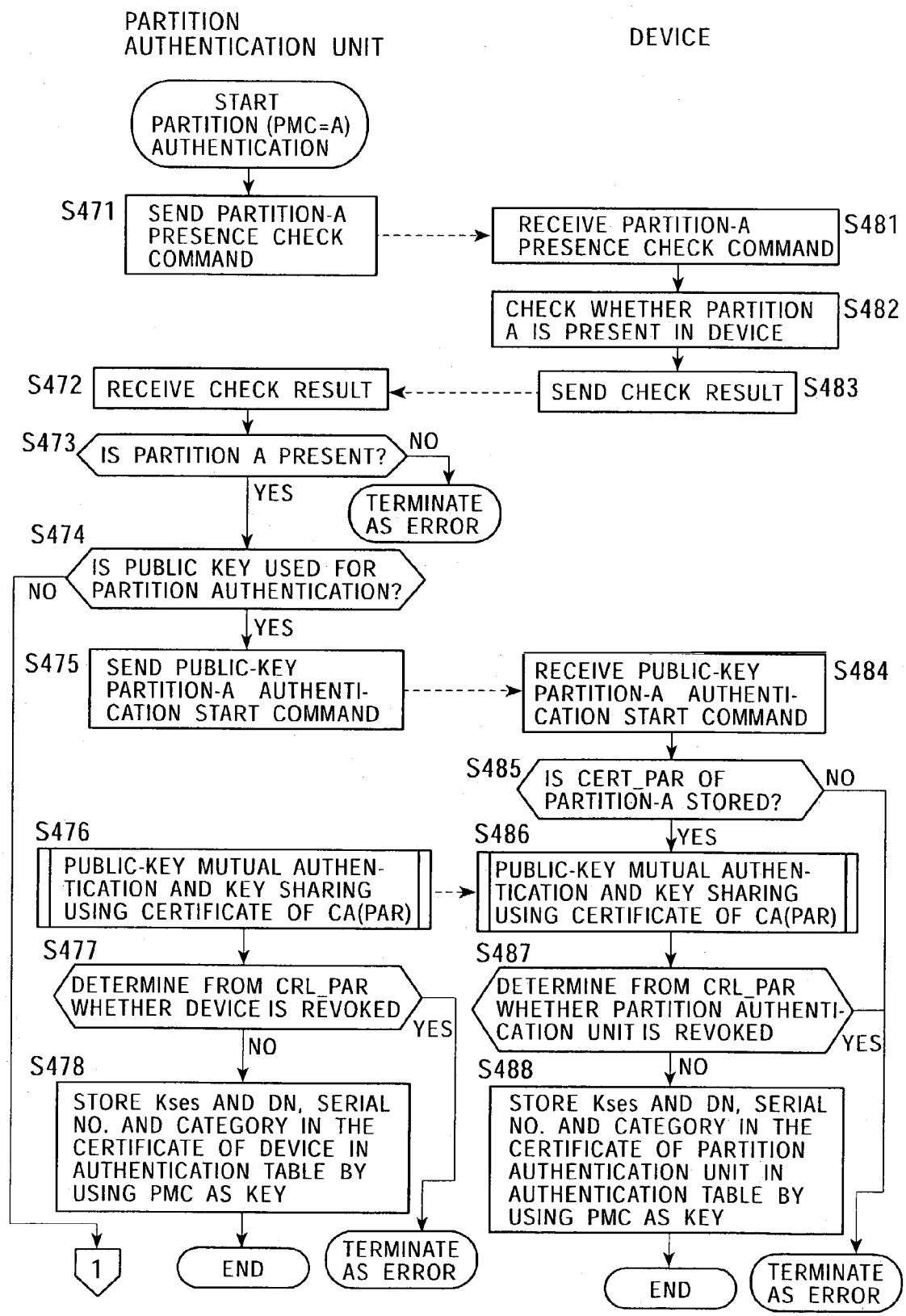
FIG. 55 is a third flowchart illustrating mutual authentication processing (partition authentication) with the device in the system of the present invention.
Figure 56:
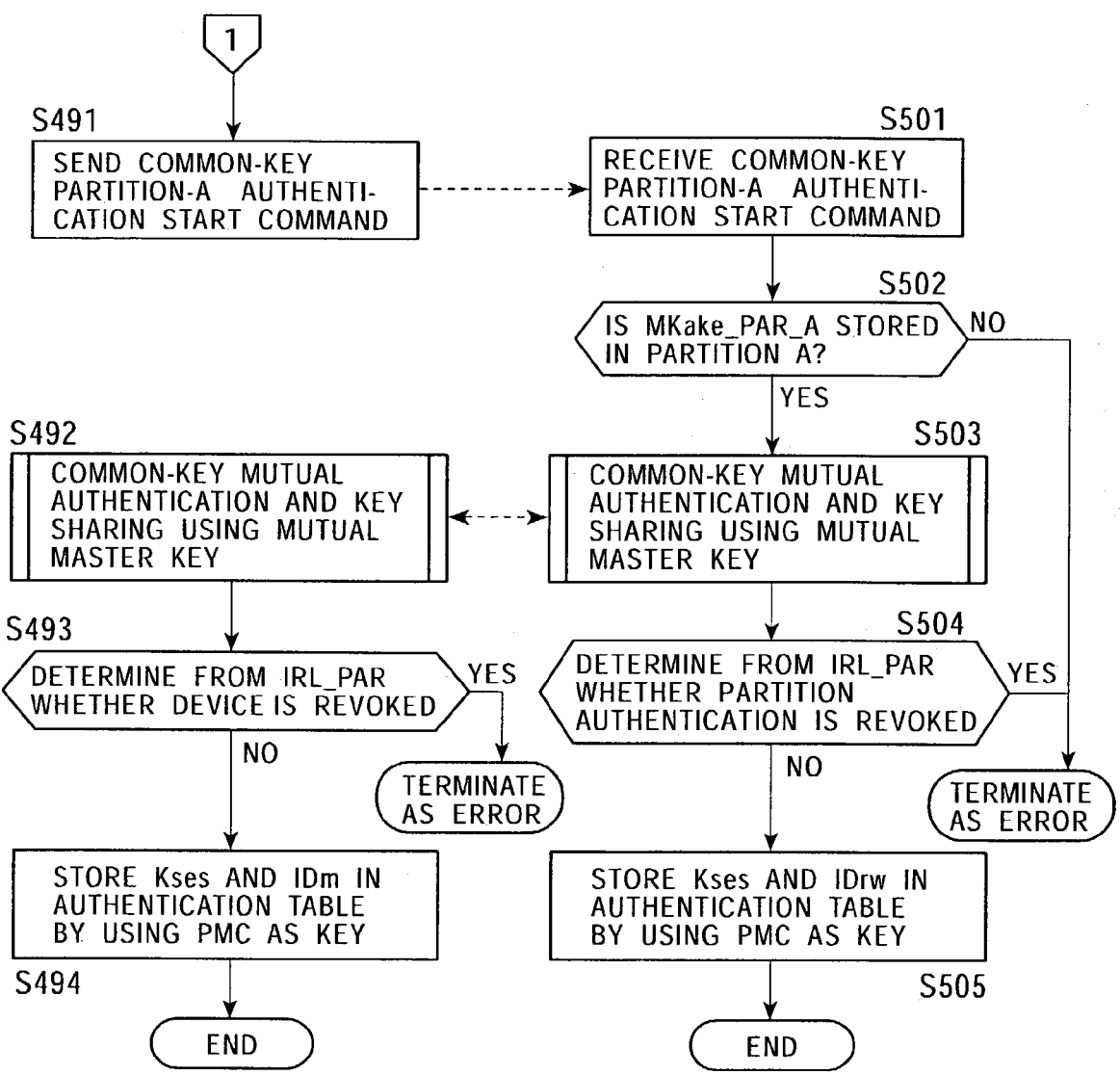
FIG. 56 is a fourth flowchart illustrating mutual authentication processing (partition authentication) with the device in the system of the present invention.

The individual steps of the processing flows of FIGS. 55 and 56 are discussed below. In FIG. 55, the processing of the partition authentication unit of the partition manager is shown at the left side, and the processing of the device (see FIG. 5) is shown at the right side. The partition authentication unit of the partition manager is a unit that can read and write data from and into the device (ex. a reader/writer or a PC as the device access unit), and has the configuration of a reader/writer, such as that shown in FIG. 10, which serves as the device access unit.

In step S471, the partition authentication unit outputs a partition-A presence check command for identifying the presence of partition A, which is to be authenticated, to the device. Upon receiving the command (S481), the device checks for the presence of the partition A in the device memory (S482). In this case, as the partition identifier A, for example, the partition manager code (PMC) is used, and the device is able to check for the presence of the partition based on the PMC stored in the partition definition block (PDB). When determining the presence or the absence of the partition, the check result is sent to the partition authentication unit.

Upon receiving the check result (S472), the partition authentication unit determines the check result (S473). If the result indicates that the partition is not present, the authentication cannot be performed, and thus, the process is terminated as an error. If the check result indicates that the partition is present, in step S474, the partition authentication unit determines based on the partition registration ticket (PRT) whether the public key cryptosystem using a public key is to be employed for the partition authentication processing. As in the above-described device authentication, either the public key system or the common key system is used for the partition authentication, and the execution type is specified in the ticket.

If the common key system is specified, steps S475 through S478 and steps S484 through S488 of FIG. 55 are not executed, and the process proceeds to step S491. If the public key system is specified, in step S475, the partition authentication unit sends a public-key partition-A authentication start command to the device. Upon receiving the command (S484), the device refers to the public-key partition key definition block (see FIG. 21) of the device memory, and determines whether the partition-A public key certificate (CERT PAR) is stored (S485). If the partition-A public key certificate (CERT PAR) is not stored, the public-key mutual authentication cannot be performed, and the process is terminated as an error.

If it is determined that the partition-A public key certificate (CERT PAR) is stored, in steps S476 and S486, the mutual authentication and key sharing processing is performed by using the public key certificate issued by the partition-manager certificate authority (CA(PAR)).

The public-key mutual authentication and key sharing processing is similar to the sequence shown in FIG. 50 discussed in the device authentication processing, and an explanation thereof is thus omitted. However, the pubic key certificate used in the partition authentication is a public key certificate issued by the partition-manager certificate authority (CA(PAR)), and the signature of this public key certificate is verified by the public key (PUB CA(PAR)) of the partition-manager certificate authority (CA(PAR)). The public key (PUB CA(PAR)) is stored in the partition key area (see FIG. 23). In the mutual authentication processing, the data to be sent is encrypted by using the generated session key, and the data communication is then performed.

If the mutual authentication and key processing according to the sequence shown in FIG. 50 has succeeded in steps S476 and S486, the device verifies in step S487 whether the entity to be communicated, i.e., the partition authentication unit, is not revoked by referring to CRL_PAR: the revocation list (Revocation List (Certificate)), which is stored in the partition key area (see FIG. 23) of the device memory, in which the public key certificate identifiers (ex. serial number: SN) of the revoked devices and the revoked units (a ticket user, such as a reader/writer or a PC, as the device access unit, or ticket issuing means) are registered. If the partition authentication unit is revoked, the partition creation processing or deletion processing cannot be permitted, and the process is terminated as an error.

If the partition authentication unit is not revoked, in step S488, the session key Kses generated in the mutual authentication and key sharing processing, and the ID name (DN: Distinguished Name), the serial number, and the category in the public key certificate of the entity to be communicated (a reader/writer or a PC forming the partition authentication unit, which serves as the device access unit) are stored in the authentication table in such a manner that they are related to each other by using the partition manager code (PMC) as a key.

Meanwhile, in step S477, the partition authentication unit also determines whether the device is not revoked by referring to CRL_PAR: the revocation list (Revocation List (Certificate)) in which the public key certificate identifiers (ex. serial number: SN) of the revoked devices and the revoked units (a ticket user, such as a reader/writer or a PC as the device access unit, or ticket issuing means) are registered. The device authentication unit is able to obtain the revocation list (CRL_PAR) from the registration authority (RA(PAR)). If the device is revoked, the partition creating processing or deletion processing cannot be permitted, and the process is terminated as an error.

If the device is not revoked, in step S478, the session key Kses generated in the mutual authentication and key sharing processing, and the ID name (DN: Distinguished Name), the serial number, and the category in the public key certificate of the entity to be communicated (device) are stored in the authentication table in such as manner that they are related to each other by using the partition manager code (PMC) as a key. As a result, for example, the authentication table shown in FIG. 51 is created in the device, and the authentication table shown in FIG. 52 is created in the reader/writer (may be a PC) as the device access unit, which serves as the partition authentication unit. FIGS. 51 and 52 illustrate examples of the authentication tables created in the device and the reader/writer as the device access unit, respectively, when the device authentication and the authentication of partitions 1 and 2 are finished.

In the partition authentication, the partition manager code (PMC) is recorded, and data is stored according to the executed authentication type. For the public key authentication type, as discussed above, the session key Kses, and the ID name (DN: Distinguished Name), the serial number, and the category in the public key certificate of the entity to be communicated are stored in the table. For the common key authentication, as discussed above, the session key Kses and the identifier of the entity to be communicated are stored. The authentication table is discarded when the session is cleared. The device and the reader/writer as the device access unit are able to check the authentication status of the device and that of each partition by referring to the table information so that they can check the session key to be used.

A description of the partition authentication processing is continued by using the flows of FIGS. 55 and 56. If it is determined in step S474 that the public key system is not used as the partition authentication type, the partition authentication unit outputs a common-key partition-A authentication command to the device in step S491. Upon receiving the command (S501), the device verifies whether the two-way individual key authentication master key (MKauth_PAR_A) used for the common key authentication is stored by referring to the common-key partition key definition block (see FIG. 22) of the device memory (S502). If the two-way individual key authentication master key (MKauth_PAR_A) is not stored, the common-key mutual authentication cannot be executed, and the process is terminated as an error.

If it is determined that the two-way individual key authentication master key (MKauth_PAR_A) is stored, in steps S492 and S503, the mutual authentication and key sharing processing using the master key is performed. The mutual authentication and key sharing processing according to the common key type is similar to the sequence described in the foregoing device authentication with reference to FIGS. 53 and 54, and an explanation thereof is thus omitted. However, the keys used for the partition authentication are defined in the partition key definition block (see FIG. 22), and they are the two-way individual key authentication common key (Kauth_PAR_B) and the two-way individual key authentication master key (MKauth_PAR_A) stored in the partition key area (see FIG. 23).

If the common-key mutual authentication and key sharing processing has succeeded in steps S492 and S503, the device verifies in step S504 whether the entity to be communicated, i.e., the partition authentication unit, is not revoked by referring to IRL_PAR: the revocation list (Revocation List (ID)), which is stored in the partition key area (see FIG. 23) of the device memory, in which the identifiers (IDs) of the revoked devices and the revoked units (a ticket user, such as a reader/writer or a PC, as the device access unit, or the ticket issuing means) are registered. If the partition authentication unit is revoked, the partition creating processing or deletion processing cannot be permitted, and the process is terminated as an error.

If the partition authentication unit is not revoked, in step S505, the session key Kses created in the mutual authentication and key sharing processing, and the ID information (IDrw) of the entity to be communicated (a reader/writer or a PC forming the device authentication unit, which serves as the device access unit) are stored in the authentication table (see FIG. 51) in such a manner that they are related to each other by using the partition manager code (PMC) as a key.

Meanwhile, in step S493, the partition authentication unit also determines whether the device is not revoked by referring to IRL_PAR: the revocation list (Revocation List (ID)) in which the identifiers (IDs) of the revoked devices and the revoked units (a ticket user, such as a reader/writer or a PC, which serves as the device access unit, or the ticket issuing means) are registered. The partition authentication unit is able to obtain the revocation list (IRL_PAR) from the registration authority (RA(PAR)). If the device is revoked, the partition creation processing or deletion processing cannot be permitted, and the process is terminated as an error.

If the device is not revoked, in step S494, the session key Kses created in the mutual authentication and key sharing processing, and the ID information (IDm) of the entity to be communicated (device) are stored in the authentication table (see FIG. 52) in such a manner that they are related to each other by using the partition manager code (PMC) as a key.

The foregoing processing is the partition authentication processing executed between the device and the reader/writer as the device access unit managed by the partition manager. According to this authentication processing, the authentication has conducted between the device or the partition and the reader/writer as the device access unit, and the sharing of the session key is achieved, thereby making is possible to perform encrypted data communication by using the session key.

The above-described device authentication processing and partition authentication processing can also be performed as required when conducting a device access using a different ticket, such as the file registration ticket (FRT), the service permission ticket (SPT), or the data update ticket (DUT). This is discussed below while describing the processings performed using such tickets.

(Integrity Checking of Ticket and User)

In the flow of the partition creation/deletion processing shown in FIG. 47, details of the integrity checking of the ticket and the user by the device in step S413 are discussed below with reference to the flows of FIGS. 57 and 58.

The subsequent integrity checking of the ticket and the user can also be performed for device access processing using a different ticket, such as the file registration ticket (FRT), the service permission ticket (SPT), or the data update ticket (DUT), as required. Thus, the flows shown in FIGS. 57 and 58 are formed as the common processing flows for the tickets.

The integrity checking of the ticket and the user is the processing executed by the device (see FIG. 5) based on the ticket received from a ticket user (ex. a reader/writer or a PC as the device access unit) that is communicating with the device. After verifying the integrity of the ticket and the user, which is the ticket user (a reader/writer or a PC as the device access unit) in the integrity checking processing of the ticket and the user, the device permits the processing within the restriction indicated in the ticket.

Details of the integrity checking processing of the ticket and the user are described below with reference to the flows of FIGS. 57 and 58. Upon receiving a ticket from the ticket user (ex. a reader/writer or a PC as the device access unit), in step S511 of FIG. 57, the device checks the ticket type and determines whether the ticket is a partition registration ticket (PRT). The ticket type is recorded in each ticket (see FIGS. 26, 27, 28, 31, and 32).

If the ticket type is the partition registration ticket (PRT), the steps S512 through S514 are executed, and if the ticket type is not the partition registration ticket (PRT), the process proceeds to step S515.

If the ticket type is the partition registration ticket (PRT), it is determined in step S512 whether the setting of the integrity check type (public key system (Public)/common key system (Common)) indicated in the ticket is the public key system (Public).

If the integrity check type is the public key system (Public), the process proceeds to step 513 in which the various processings are performed. The processing executed in step S513 is started by verifying the public key certificate (CERT) of the ticket issuer using the public key PUB CA(DEV) of the device-manager certificate authority (CA (DEV)).

As discussed above, when sending the ticket issued by the partition registration ticket (PRT) issuing means (PRT Issuer) to the ticket user, the public key certificate (CERT_PRTI) of the partition registration ticket (PRT) issuing means (PRT Issuer) is also sent together to the device if the public key system is employed. The attribute of the public key certificate (CERT_PRTI) of the PRT issuing means coincides with the identifier (PRTIC) of the partition registration ticket (PRT) issuing means (PRT User).

The signature implemented by the private key of the device-manager certificate authority (CA(DEV)) is added to the public key certificate (see FIG. 11), and this signature is verified by using the public key PUB CA(DEV) of the device-manager certificate authority (CA(DEV)). The signature creation and verification is executed according to the flows shown in FIGS. 12 and 13. By this signature verification, it can be determined whether the public key certificate (CERT) of the ticket issuer is an authorized public key certificate (CERT) without being tampered with.

In step S513, it is also determined whether the code as the user category recorded in the option area of the public key certificate (CERT), which is verified by the signature verification of the ticket issuing means, of the ticket issuing means coincides with the ticket issuing means code (PRTIC: PRT Issuer Code) recorded in DKDB (Device Key Definition Block)(PUB) in the device.

As discussed in the section of the public key certificate shown in FIG. 11, in the public key certificate, the code of the ticket issuing means (Ticket Issuer), which is the ticket (PRT, FRT, or SPT) issuing means, is recorded, and in this case, the PRTIC (PRT Issuer Code) is recorded. By checking the consistency between the code in this option area and the ticket issuing means code (PRTIC: PRT Issuer Code) recorded in the DKDB (Device Key Definition Block)(PUB) in the device, it is determined whether the received ticket (PRT) is a ticket issued by the authorized ticket issuing means.

The device also determines whether the ticket issuing means (Ticket Issuer) is not revoked by referring to CRL_DEV: the revocation list (Revocation List (Certificate)), which is stored in the device key area (see FIG. 18) of the device memory, in which the pubic key certificate identifiers (ex. serial number: SN) of the revoked devices and revoked units (a ticket user, such as a reader/writer or a PC, as the device access unit, or ticket issuing means) are registered.

It is also determined whether the ticket has not been tampered with by verifying the signature recorded in the partition registration ticket (PRT) (see FIG. 26), i.e., the integrity check value (public key system: signature) of the ticket. The signature integrity is performed in a manner similar to the signature integrity of the public key certificate, for example, according to the sequence of the flow shown in FIG. 13.

Accordingly, it has been checked that: (1) the public key certificate (CERT) of the ticket issuer is an authorized public key certificate (CERT) without being tampered with; (2) the code recorded in the option area of the public key certificate (CERT) of the ticket issuer coincides with the ticket issuing means code (PRTIC: PRT Issuer Code) recorded in DKDB (Device Key Definition Block)(PUB) in the device; (3) the ticket issuing means (Ticket Issuer) is not revoked; and (4) the ticket has not been tampered with by verifying the signature of the received ticket (PRT). Only when all the conditions (1) through (4) are satisfied, it can be determined that the ticket integrity has been successfully verified. If any of the conditions (1) through (4) is not satisfied, it is determined that the ticket integrity has not been successfully verified, and the processing using the partition registration ticket (PRT) is terminated.

If it is determined in step S512 that the setting of the integrity check type (public key system (Public)/common key system (Common) of the ticket is the common key system, the process proceeds to step S514 in which the MAC (Message Authentication Code) checking is performed. The device performs the MAC checking processing of the ticket by using the MAC checking key of the partition registration ticket (PRT): Kprt, which is stored in the device key area (see FIG. 18) of the device.

Figure 59:
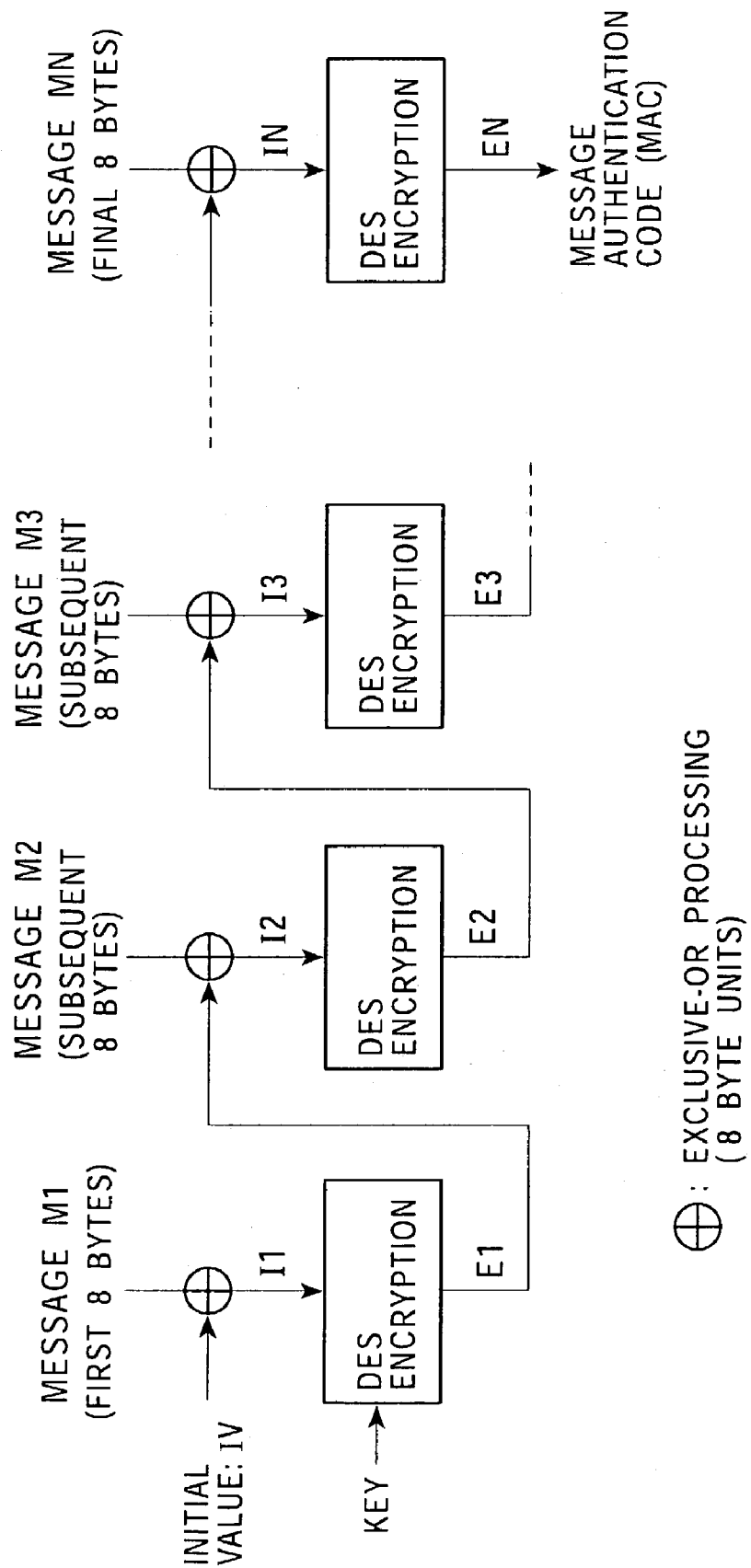
FIG. 59 is a first flow illustrating a method for creating a MAC that can be used for the integrity of the ticket in the system of the present invention.

FIG. 59 illustrates an example of a MAC value, which is created by using a DES encryption configuration. In the configuration shown in FIG. 59, a target message is divided into 8-byte units (hereinafter the divided messages are indicated by M1, M2, . . . , MN), and the exclusive OR is performed on the initial value (hereinafter referred to as "IV") and M1 (the resulting value is set to I1). Then, I1 is input into a DES encryption unit, and is encrypted by using the MAC checking key: Kprt (the output is set to E1). Subsequently, the exclusive OR is performed on E1 and M2, and the resulting output I2 is input into a DES encryption unit and is encrypted by using the key Kprt (output E2). Subsequently, the above-described process is repeated to encrypt all the messages. The final output EN is set to the message authentication code (MAC). As the message, part of the data to be checked can be used.

The integrity-guaranteed ICV (Integrity Check Value) generated by, for example, a data sender in the data sender, is compared with the ICV generated based on the received data by a data receiver. If the two ICVs coincide with each other, it can be guaranteed that the data has not been tampered with. If the two ICVs are different, it is determined that the data has been tampered with. The integrity-guaranteed ICV generated in the data creation by the data sender is stored in the ICV (Integrity Check Value) field in the PRT, as has been discussed in the description of the partition registration ticket (PRT) format shown in FIG. 26. If the ICV generated by the device coincides with the ICV stored in the received ticket (PRT) after comparison, it is determined that the integrity of the ticket has been verified. If the two ICVs are different, it is determined that the ticket has been tampered with, and the processing using the ticket is terminated.

According to the above-described processing, the ticket checking processing when the integrity check type is the common key system is completed.

Figure 57:
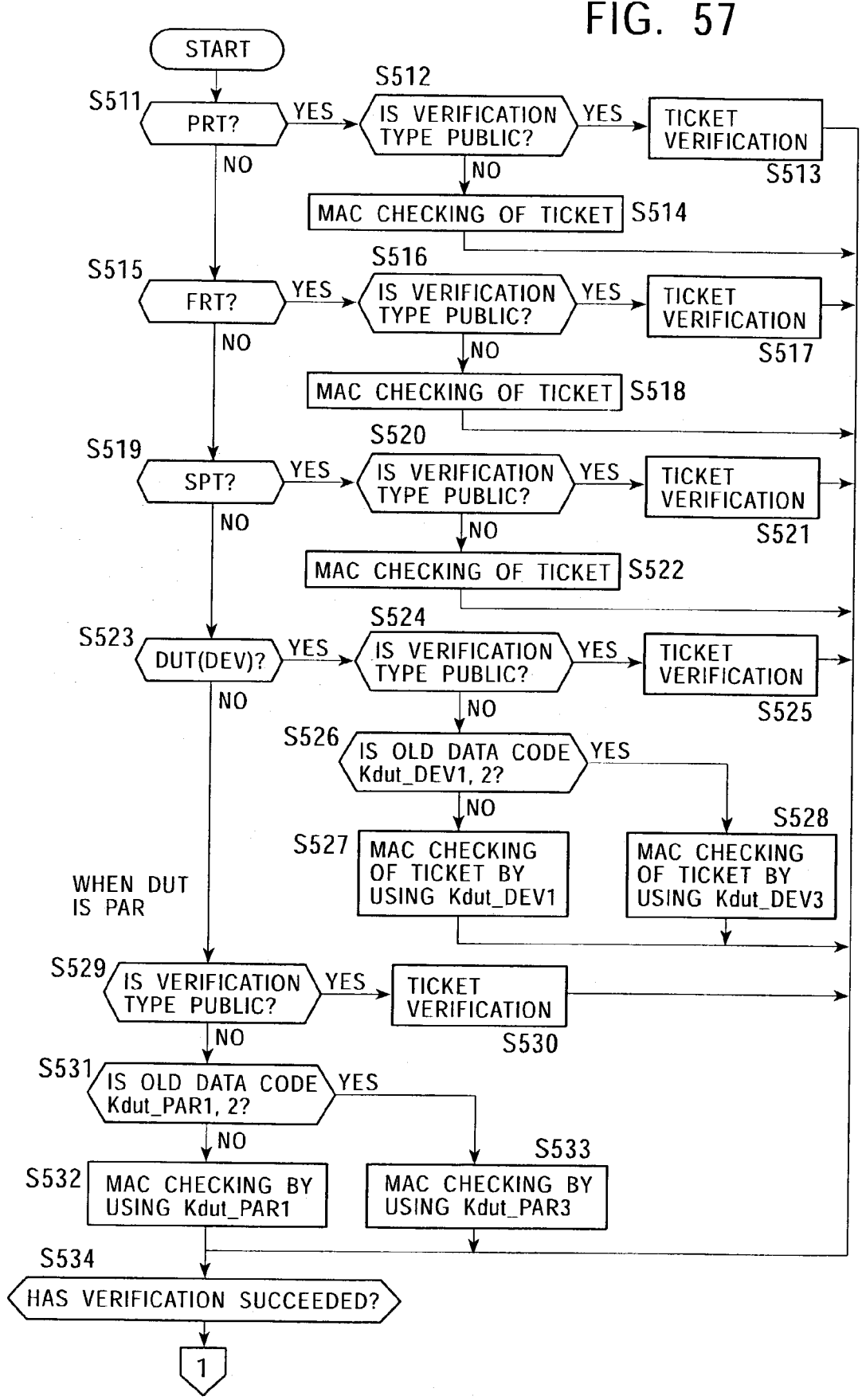
FIG. 57 is a first flowchart illustrating ticket integrity/user checking in the system of the present invention.

Referring back to the flow of FIG. 57, a description of the integrity checking of the ticket and the user is continued. If it is determined in step S511 that the ticket type is not the partition registration ticket (PRT), it is determined in step S515 whether the ticket type is the file registration ticket (FRT).

If the ticket type is the file registration ticket (FRT), steps S516 through S518 are executed, and if the ticket type is not the file registration ticket (FRT), the process proceeds to step S519.

If the ticket type is the file registration ticket (FRT), it is determined in step S516 whether the setting of the integrity check type (public key system (Public)/common key system (Common)) indicated in the ticket is the public key system (Public).

If the integrity check type is the public key system (Public), the process proceeds to step S517 in which various processings are executed. The processing executed in step S517 is started by verifying the public key certificate (CERT) of the ticket issuer by using the public key PUB CA(PAR) of the partition-manager certificate authority (CA(PAR)).

When sending the ticket issued by the file registration ticket (FRT) issuing means (FRT Issuer) to the ticket user, the public key certificate (CERT_FRTI) of the file registration ticket (FRT) issuing means (FRT Issuer) is also sent together to the device. The attribute of the public key certificate (CERT_FRTI) of the FRT issuing means coincides with the identifier (FRTIC) of the file registration ticket (FRT) issuing means (FRT Issuer).

The signature implemented by the private key of the partition-manager certificate authority (CA(PAR)) is added to the public key certificate (see FIG. 11), and this signature is verified by using the public key PUB CA(PAR) of the partition-manager certificate authority (CA(PAR)). The signature creation and verification is executed according to the above-described flows of FIGS. 12 and 13. By this signature verification, it can be determined whether the public key certificate (CERT) of the ticket issuer is an authorized public key certificate (CERT) without being tampered with.

In step S517, it is also determined whether the user category code recorded in the option area of the public key certificate (CERT), which has been verified by the signature verification, of the ticket issuing means coincides with the ticket issuing means code (FRTIC: FRT Issuer Code) recorded in PKDB (Partition Key Definition Block)(PUB) in the device.

In the public key certificate, the category code of the ticket issuing means (Ticket Issuer), which is the issuing means of each ticket (PRT, FRT, or SPT), in this case, the FRTIC (FRT Issuer Code), is recorded, as discussed in the description of the public key certificate with reference to FIG. 11. By checking the consistency between the code in the option area and the ticket issuing means code (FRTIC: FRT Issuer Code) recorded in PKDB (Partition Key Definition Block)(PUB) in the device, it can be determined that the received ticket (FRT) is a ticket issued by the authorized ticket issuing means.

The device also determines whether the ticket issuing means (Ticket Issuer) is not revoked by referring to CRL_PAR: the revocation list (Revocation List (Certificate)), which is stored in the partition key area (see FIG. 23) of the device memory, in which the public key certificate identifiers (ex. serial number: SN) of the revoked devices and the revoked units (a ticket user, such as a reader/writer or a PC, as the device access unit, or ticket issuing means) are registered.

The device also verifies the signature recorded in the file registration ticket (FRT) (see FIG. 27), which is the received ticket, i.e., the integrity check value (public key system: signature), and determines whether the ticket has not been tampered with. As in the above-described signature verification of the public key certificate, the signature verification is executed according to the sequence similar to the flow of FIG. 13.

Thus, it has been checked that: (1) the public key certificate (CERT) of the ticket issuer is an authorized public key certificate (CERT) without being tampered with; (2) the code recorded in the option area of the public key certificate (CERT) of the ticket issuer coincides with the ticket issuing means code (FRTIC: FRT Issuer Code) recorded in PKDB (Partition Key Definition Block)(PUB) in the device; (3) the ticket issuing means (Ticket Issuer) is not revoked; and (4) the ticket has not been tampered with by verifying the signature of the received ticket (FRT). Only when all the conditions (1) through (4) are satisfied, it can be determined that the integrity of the received ticket (FRT) has been successfully verified. If any of the conditions (1) through (4) is not satisfied, it is determined that the integrity of the file registration ticket (FRT) has not been successfully verified, and the processing using the file registration ticket (FRT) is terminated.

If it is determined in step S516 that the setting of the integrity check type (public key system (Public)/common key system (Common)) of the ticket is the common key system (Common), the process proceeds to step S518 in which the MAC (Message Authentication Code) checking is performed. The device performs the MAC checking processing of the ticket by using the MAC checking key of the file registration ticket (FRT): Kfrt, which is stored in the partition key area (see FIG. 23) of the device. The MAC checking processing is executed according to the above-described MAC-value creation processing using the DES encryption configuration shown in FIG. 59.

The integrity-guaranteed ICV (Integrity Check Value) generated by, for example, a data sender, during the data creation is compared with the ICV generated based on the received data by a data receiver. If the two ICVs coincide with each other, it is verified that the data has not been tampered with. If the two ICVs are different, it is determined that the data has been tampered with. The integrity guaranteed ICV generated by, for example, a data sender, during the data creation is stored in the ICV (Integrity Check Value) field of FRT, as has been discussed in the description of the file registration ticket (FRT) format shown in FIG. 27. If the ICV generated by the device coincides with the ICV stored in the received ticket (FRT) after comparison, it is determined that the ticket integrity has been verified. If the ICVs are different, it is determined that the ticket has been tampered with, and the processing using the ticket is terminated.

According to the foregoing processing, the file registration ticket (FRT) verification processing when the integrity check type is the common key system is completed.

If it is determined it step S515 that the ticket type is not the file registration ticket (FRT), it is determined in step S519 whether the ticket type is the service permission ticket (SPT).

If the ticket type is the service permission ticket (SPT), steps S520 through S522 are executed. If the ticket type is not the service permission ticket (SPT), the process proceeds to step S523.

If the ticket type is the service permission ticket (SPT), it is determined in step S520 whether the integrity check type (public key system (Public)/common key system (Common)) indicated in the ticket is the public key system.

If the integrity check type is the public key system, the process proceeds to step S521 in which various processings are performed. The processing to be executed in step S521 is started by verifying the public key certificate (CERT) of the ticket issuer by using the public key PUB CA(PAR) of the partition-manager certificate authority (CA(PAR)).

When sending the ticket issued by the service permission ticket (SPT) issuing means (SPT Issuer) to the ticket user, the public key certificate (CERT_SPTI) of the service permission ticket (SPT) issuing means (SPT Issuer) is also sent together to the device if the public key system is employed. The attribute of the public key certificate (CERT_SPTI) of the SPT issuing means coincides with the identifier (SPTIC) of the service permission ticket (SPT) issuing means (SPT Issuer).

The signature implemented by the private key of the partition-manager certificate authority (CA(PAR)) is added to the public key certificate (see FIG. 11), and this signature is verified by using the public key PUB CA(PAR) of the partition-manager certificate authority (CA(PAR)). The signature creation and verification is performed according to, for example, the above-described flows shown in FIGS. 12 and 13. By this signature verification, it is determined whether the public key certificate (CERT) of the ticket issuer is an authorized public key certificate (CERT) without being tampered with.

It is determined in step S521 whether the user category code recorded in the option area of the public key certificate (CERT), which has been verified by the signature verification, of the ticket issuing means coincides with the ticket issuing means code (SPTIC: SPT Issuer Code) recorded in the file definition block (FDB) in the device.

As discussed in the section of the public key certificate in FIG. 11, in the public key certificate, the category code of the ticket issuing means (Ticket Issuer), which is the issuing means of the ticket (PRT, FRT, or SPT), in this case, SPTIC (SPT Issuer Code), is recorded. By checking the consistency between the code in the option area and the ticket issuing means code (SPTIC: SPT Issuer Code) recorded in FDB (File Definition Block) in the device, it is determined whether the received ticket (SPT) is issued by authorized ticket issuing means.

The device also determines whether the ticket issuing means (Ticket Issuer) is not revoked by referring to CRL_PAR: the revocation list (Revocation List (Certificate)), which is stored in the partition key area (see FIG. 23) of the device memory, in which the public key certificate identifiers (ex. serial number: SN) of the revoked devices and the revoked units (a ticket user, such as a reader/writer or a PC, as the device access unit, or ticket issuing means) are registered.

The device also verifies the signature recorded in the service permission ticket (SPT) (see FIGS. 28 and 31), which is the received ticket, i.e., the integrity check value of the ticket (public key system: signature), and determines whether the ticket has not been tampered with. In the above-described signature verification of the public key certificate, the signature verification is performed according to, for example, the sequence similar to the flow shown in FIG. 13.

Thus, it has been checked that: (1) the public key certificate (CERT) of the ticket issuer is an authorized public key certificate (CERT) without being tampered with; (2) the code recorded in the option area of the public key certificate (CERT) of the ticket issuer coincides with the ticket issuing means code (SPTIC: SPT Issuer Code) recorded in FDB (File Definition Block) in the device; (3) the ticket issuing means (Ticket Issuer) is not revoked; and (4) the ticket has not been tampered with by verifying the signature of the received ticket (SPT). Only when all the conditions (1) through (4) are satisfied, it can be determined that the integrity of the service permission ticket (SPT) has been successfully verified. If any of the conditions (1) through (4) is not satisfied, it is determined that the integrity of the service permission ticket (SPT) has not been successfully verified, and the processing using the service permission ticket (SPT) is terminated.

If it is determined in step S520 that the setting of the integrity check type (public key system (Public)/common key system (Common) of the ticket is the common key system (Common), the process proceeds to step S522 in which the MAC (Message Authentication Code) checking is performed. The device performs the MAC checking processing of the ticket by using the MAC checking key of the service permission ticket (SPT): Kspt, which is stored in the file definition block (see FIG. 24) of the device. The MAC checking processing is executed according to the above-described MAC-value creation processing using the DES encryption configuration shown in FIG. 59.

The integrity-guaranteed ICV (Integrity Check Value) generated by, for example, a data sender, during the data creation is compared with the ICV generated based on the received data by a data receiver. If the two ICVs coincide with each other, it is verified that the data has not been tampered with. If the two ICVs are different, it is determined that the data has been tampered with. The integrity-guaranteed ICV generated by, for example, a data sender, during the data creation is stored in the ICV (Integrity Check Value) field of SPT, as has been discussed in the description of the service permission ticket (SPT) format in FIGS. 28 and 31. If the ICV generated by the device coincides with the ICV stored in the received ticket (SPT) after comparison, it is determined that the ticket integrity has been verified. If the ICVs are different, it is determined that the ticket has been tampered with, and the processing using the service permission ticket (SPT) is terminated.

According to the foregoing processing, the service permission ticket (SPT) verification processing when the integrity check type is the common key system is completed.

If it is determined in step S519 that the ticket type is not the service permission ticket (SPT), it is determined in step S523 whether the ticket type is the data update ticket-DEV (DUT(DEV)) (see FIG. 32). The data update ticket (DUT) is the access permission ticket, which is stored in the device memory, used for updating various data, as described above. The data update ticket (DUT) includes the data update ticket-DEV (DUT(DEV)) used for updating the management data of the device manager and the data update ticket-PAR (DUT(PAR)) used for updating the management data of the partition manager.

If the ticket type is the data update ticket-DEV (DUT(DEV)), steps S524 through S528 are executed. If the ticket type is not the data update ticket (DEV) (DUT(DEV)), the process proceeds to step S529.

If the ticket type is the data update ticket-DEV (DUT(DEV)), it is determined in step S524 whether the integrity check type (public key system (Public)/common key system (Common)) indicated in the ticket is the public key system.

If the integrity check type is the public key system, the process proceeds to step S525 in which various processings are performed. The processing to be executed in step S525 is started by verifying the public key certificate (CERT) of the ticket issuer by using the public key PUB CA(DEV) of the device-manager certificate authority (CA(DEV)).

When sending the ticket issued by the data update ticket-DEV (DUT(DEV)) issuing means (DUT Issuer) to the ticket user, the public key certificate (CERT_DUTI) of the data update ticket (DUT) issuing means (DUT Issuer) is also sent together to the device if the public key system is employed. The attribute of the public key certificate (CERT_DUTI) of the DUT issuing means coincides with the identifier (DUTIC) of the ticket issuing means code (DUTIC_DEV) recorded in DKDB(PUB) (Device Key Definition Block) (PUB) in the device.

The signature implemented by the private key of the device-manager certificate authority (CA(DEV)) is added to the public key certificate (see FIG. 11), and this signature is verified by using the public key PUB CA(DEV) of the device-manager certificate authority (CA(DEV)). The signature creation and verification is performed according to, for example, the above-described flows shown in FIGS. 12 and 13. By this signature verification, it is determined whether the public key certificate (CERT) of the ticket issuer is an authorized public key certificate (CERT) without being tampered with.

It is determined in step S525 whether the user category code recorded in the option area of the public key certificate (CERT), which has been verified by the signature verification, of the ticket issuing means coincides with the ticket issuing means code (DUTIC_DEV: DUT Issuer Category for Device) recorded in DKDB(PUB) (Device Key Definition Block)(PUB) in the device.

As discussed in the section of the public key certificate in FIG. 11, in the public key certificate, the category code of the ticket issuing means (Ticket Issuer), which is the issuing means of the ticket (PRT, FRT, SPT, or DUT), in this case, DUTIC (DUT Issuer Code), is recorded. By checking the consistency between the code in the option area and the ticket issuing means code (DUTIC_DEV: DUT Issuer Category for Device) (see FIG. 16) recorded in DKDB(PUB) (Device Key Definition Block)(PUB) in the device, it is determined whether the received ticket (DUT) is issued by authorized ticket issuing means.

The device also determines whether the ticket issuing means (Ticket Issuer) is not revoked by referring to CRL_DEV, the revocation list (Revocation List (Certificate)), which is stored in the device key area (see FIG. 18) of the device memory, in which the public key certificate identifiers (ex. serial number: SN) of the revoked devices and the revoked units (a ticket user, such as a reader/writer or a PC, as the device access unit, or ticket issuing means) are registered.

The device also verifies the signature recorded in the data update ticket-DEV (DUT(DEV)) (see FIG. 32), which is the received ticket, i.e., the integrity check value of the ticket (public key system: signature), and determines whether the ticket has not been tampered with. As in the above-described signature verification of the public key certificate, the signature verification is performed according to, for example, the sequence similar to the flow of FIG. 13.

Thus, it has been checked that: (1) the public key certificate (CERT) of the ticket issuer is an authorized public key certificate (CERT) without being tampered with; (2) the code recorded in the option area of the public key certificate (CERT) of the ticket issuer coincides with the ticket issuing means code (DUTIC_DEV: DUT Issuer Category for Device) recorded in DKDB(PUB) (Device Key Definition Block)(PUB) in the device; (3) the ticket issuing means (Ticket Issuer) is not revoked; and (4) the ticket has not been tampered with by verifying the signature of the received ticket (DUT). Only when all the conditions (1) through (4) are satisfied, it can be determined that the integrity of the data update ticket-DEV (DUT(DEV)) has been successfully verified. If any of the conditions (1) through (4) is not satisfied, it is determined that the integrity of the data update ticket (DUT(DEV)) has not been successfully verified, and the processing using the data update ticket-DEV (DUT(DEV)) is terminated.

If it is determined in step S524 that the integrity check type (public key system (Public)/common key system (Common)) indicated in the ticket is the common key system, it is determined in step S526 whether the data indicated by the old data code recorded in the data update ticket-DEV (DUT(DEV)) is Kdut_DEV1 (MAC checking key of the data update ticket (DUT)) or Kdut_DEV2 (data updating encryption key) stored in the device key area (see FIG. 18).

If the data indicated by the old data code (the code of the old data to be updated) recorded in the data update ticket-DEV (DUT(DEV)) is Kdut_DEV1 (MAC checking key of the data update ticket (DUT)) or Kdut_DEV2 (data updating encryption key) stored in the device key area (see FIG. 18), the MAC checking processing is performed in step S528 by using Kdut_DEV3 (MAC checking key of the data update ticket (DUT)) stored in the device key area (see FIG. 18). If the data indicated by the old data code (the code of the old data to be updated) recorded in the data update ticket-DEV (DUT(DEV)) is not Kdut_DEV1 (MAC checking key of the data update ticket (DUT)) or Kdut_DEV2 (data updating encryption key) stored in the device key area (see FIG. 18), the MAC checking processing is performed in step S527 by using Kdut_DEV1 (MAC checking key of the data update ticket (DUT)) stored in the device key area (see FIG. 18).

The reason for using the different MAC checking keys, as described above, is as follows. If the data to be updated is Kdut_DEV1 (MAC checking key of the data update ticket (DUT)) or Kdut_DEV2 (data updating encryption key), the use of such data is to be prohibited for some reason, for example, due to a leakage of key information. Accordingly, the MAC checking using such data must be avoided. The MAC checking processing is executed according to the above-described MAC-value creation processing using the DES encryption configuration shown in FIG. 59.

If Kdut_DEV1 (MAC checking key of the data update ticket (DUT)) is newly stored in the device key area (see FIG. 18) of the device, the device swaps Kdut_DEV1 and previously stored Kdut_DEV3 (MAC checking key of the data update ticket (DUT). If Kdut_DEV2 (data updating encryption key) is newly stored, the device swaps Kdut_DEV2 and previously stored Kdut_DEV4 (data updating encryption key).

By swapping Kdut_DEV1 and Kdut_DEV3 and swapping Kdut_DEV2 and Kdut_DEV4, a pair of Kdut_DEV3

(MAC checking key of the data update ticket (DUT)) and Kdut_DEV4 (data updating encryption key) is always maintained to be newer versions than a pair of Kdut_DEV1 (MAC checking value of the data update ticket (DUT)) and Kdut_DEV2 (data updating encryption key). That is, Kdut_DUV1 and Kdut_DEV2 are keys that are normally used, and Kdut_DEV3 and Kdut_DEV4 are keys that update Kdut_DEV1 and Kdut_DEV2, respectively, in the event of an emergency, which serve as backup keys to replace currently used Kdut_DEV1 and Kdut_DEV2, respectively. This is further described below while referring to the data updating processing using the data update ticket (DUT).

The integrity-guaranteed ICV (Integrity Check Value) generated by, for example, a data sender, during the data creation is compared with ICV generated based on the received data by a data receiver. If the two ICVs are the same, it is verified that the data has not been tampered with. If the two ICVs are different, it is determined that the data has been tampered with. The integrity-guaranteed ICV generated by, for example, a data sender, during the data creation is stored in the ICV (Integrity Check Value) field of the data update ticket (DUT), as has been discussed in the description of the data update ticket (DUT) format in FIG. 32.

If the ICV generated by the device coincides with the ICV stored in the data update ticket-DEV (DUT(DEV)) after comparison, it is determined that the integrity of the ticket has been verified. If the two ICVs are different, it is determined that the ticket has been tampered with, and the processing using the data update ticket-DEV (DUT(DEV)) is terminated.

According to the above-described processing, the data update ticket-DEV (DUT(DEV)) checking processing when the integrity check type indicated in the data update ticket-DEV (DUT(DEV)) is the common key system is completed.

If it is determined in step S523 that the ticket type is not the data update ticket-DEV (DUT(DEV)), it is determined that the ticket is the data update ticket-PAR (DUT(PAR)) (see FIG. 32). The data update ticket-PAR (DUT(PAR)) is the ticket used for updating the management data of the partition manager.

In this case, it is determined in step S529 whether the setting of the integrity check type (public key system (Public)/common key system (Common)) indicated in the ticket is the public key system.

If the integrity check type is the public key system, the process proceeds to step S530 in which various processings are executed. The processing to be executed in step S530 is started by verifying the public key certificate (CERT) of the ticket issuer by using the public key PUB CA(PAR) of the partition-manager certificate authority (CA(PAR)).

When sending the ticket issued by the data update ticket-PAR (DUT(PAR)) issuing means (DUT Issuer) to the ticket user, the public key certificate (CERT_DUTI) of the data update ticket (DUT) issuing means (DUT Issuer) is also sent together to the device if the public key system is employed. The attribute of the public key certificate (CERT_DUTI) of the DUT issuing means coincides with the ticket issuing means code (DUTIC_PAR) recorded in PDKB(PUB) (Partition Key Definition block) in the device.

The signature implemented by the private key of the partition-manager certificate authority (CA(PAR)) is added to the public key certificate (see FIG. 11), and this signature is verified by using the public key PUB CA(PAR) of the partition-manager certificate authority (CA(PAR)). The signature creation and verification is performed according to, for example, the above-described flows shown in FIGS. 12 and 13. By this signature verification, it is determined whether the public key certificate (CERT) of the ticket issuer is an authorized public key certificate (CERT) without being tampered with.

It is also determined in step S530 whether the user category code recorded in the option area of the public key certificate (CERT), which is verified by the signature verification, of the ticket issuing means coincides with the ticket issuing means code (DUTIC_PAR: DUT Issuer Category for Partition) recorded in PKDB(PUB) (Partition Key Definition block) in the device.

As has been discussed in the section of the public key certificate in FIG. 11, in the public key certificate, the category code of the ticket issuing means (Ticket Issuer), which is the ticket (PRT, FRT, SPT, or DUT) issuing means, in this case, DUTIC (DUT Issuer Code), is recorded. By checking the consistency between the code in the option area and the ticket issuing means code (DUTIC: DUT Issuer Category) (see FIG. 21) recorded in PKDB(PUB) (Partition Key Definition block) in the device, it is checked whether the received ticket (DUT) is the ticket issued by an authorized ticket issuing means.

The device also determines whether the ticket issuing means (Ticket Issuer) is not revoked by referring to CRL_DEV: the revocation list (Revocation List (Certificate)), which is stored in the device key area (see FIG. 18) of the device memory, in which the public key certificate identifiers (ex. serial number: SN) of the revoked devices and the revoked units (a ticket user, such as a reader/writer or a PC, as the device access unit, or ticket issuing means) are registered.

The device also checks the signature recorded in the data update ticket-PAR (DUT(PAR)) (see FIG. 32), which is the received ticket, i.e., the integrity check value (public key system: signature) of the ticket, and determines whether the ticket has not been tampered with. As in the above-described signature verification of the public key certificate, the signature verification is executed according, for example, to the sequence similar to the flow in FIG. 13.

Thus, it has been checked that: (1) the public key certificate (CERT) of the ticket issuer is an authorized public key certificate (CERT) without being tampered with; (2) the code recorded in the option area of the public key certificate (CERT) of the ticket issuer coincides with the ticket issuing means code (DUTIC_PAR: DUT Issuer Category for Partition) recorded in PKDB(PUB) (Partition Key Definition block) in the device; (3) the ticket issuing means (Ticket Issuer) is not revoked; and (4) the ticket has not been tampered with by verifying the signature of the received ticket (DUT). Only when all the conditions (1) through (4) are satisfied, it can be determined that the integrity of the data update ticket-PAR (DUT) has been successfully verified. If any of the conditions (1) through (4) is not satisfied, it is determined that the integrity of the data update ticket-PAR (DUT(PAR)) has not been verified, and the processing using the data update ticket-PAR (DUT(PAR)) is terminated.

If it is determined in step S529 that the integrity check type (public key system (Public)/common key system (Common)) indicated in the ticket is the common key system, it is determined in step S531 whether the data indicated by the old data code (the code of the old data to be updated) recorded in the data update ticket-PAR (DUT(PAR)) is Kdut_PAR1 (MAC checking key of the data update ticket (DUT)) or Kdut_PAR2 (data updating encryption key) stored in the partition key area (see FIG. 23).

If the data indicated by the old data code (the code of the old data to be updated) recorded in the data update ticket- PAR (DUT(PAR)) is Kdut_PAR1 (MAC checking key of the data update ticket (DUT)) or Kdut_PAR2 (data updating encryption key) stored in the partition key area (see FIG. 23), the MAC checking processing is performed in step S533 by using Kdut_PAR3 (MAC checking key of the data update ticket (DUT)) stored in the partition key area (see FIG. 23). If the data indicated by the old data code (the code of the old data to be updated) recorded in the data update ticket-PAR (DUT(PAR)) is not Kdut_PAR1 (MAC checking key of the data update ticket (DUT) or KPAR_DEV2 (data updating encryption key) stored in the partition key area (see FIG. 23), the MAC checking processing is performed in step S532 by using Kdut_PAR1 (MAC checking key of the data update ticket (DUT)) stored in the partition key area (see FIG. 23).

The reason for using the different MAC checking keys, as described above, is as follows. If the data to be updated is Kdut_PAR1 (MAC checking key of the data update ticket (DUT)) or Kdut_PAR2 (data updating encryption key), the use of such key data is to be prohibited for some reason, for example, due to a leakage of key information. Accordingly, the MAC checking using such data must be avoided. The MAC checking processing is executed according to the above-described MAC-value creation processing using the DES encryption configuration shown in FIG. 59.

The integrity-guaranteed ICV (Integrity Check Value) generated by, for example, a data sender, during the data creation is compared with ICV generated based on the received data by a data receiver. If the two ICVS are the same, it is verified that the data has not been tampered with. If the two ICVs are different, it is determined that the data has been tampered with. The integrity-guaranteed ICV generated by, for example, a data sender, during the data creation is stored in the ICV (Integrity Check Value) field of the data update ticket (DUT), as has been discussed in the description of the data update ticket (DUT) format in FIG. 32.

If the ICV generated by the device coincides with the ICV stored in the data update ticket-PAR (DUT(PAR)) after comparison, it is determined that the integrity of the ticket has been verified. If the two ICVs are different, it is determined that the ticket has been tampered with, and the processing using the data update ticket-PAR (DUT(PAR)) is terminated.

According to the foregoing processing, the data update ticket-PAR (DUT(PAR)) checking processing when the integrity check type indicated in the data update ticket-PAR (DUT(PAR)) is the common key system is completed.

Figure 58:
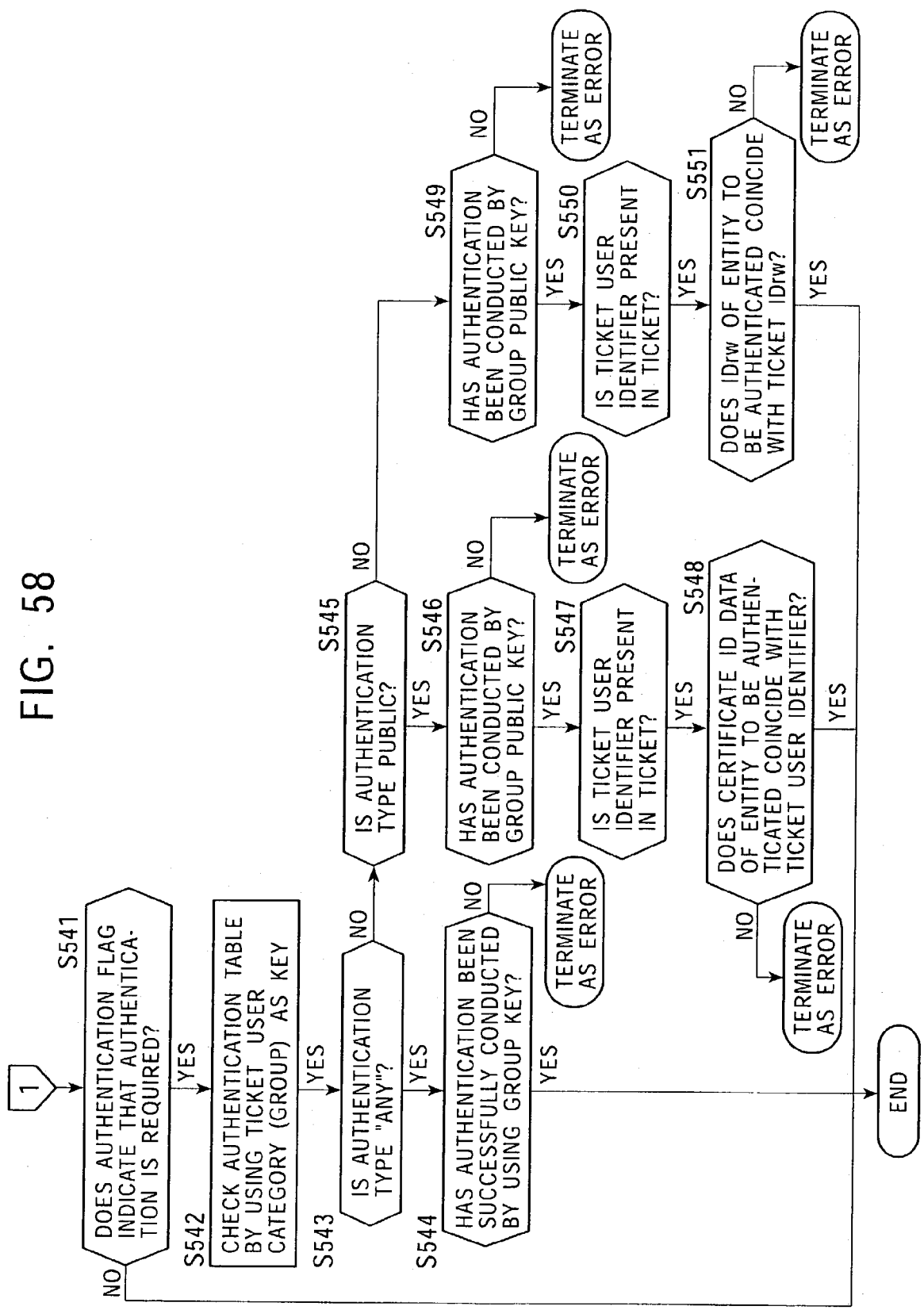
FIG. 58 is a second flowchart illustrating ticket integrity/user checking in the system of the present invention.

After verifying the integrity of the ticket in the above-described processing, the process proceeds to step S541 of FIG. 58. Then, the user checking, that is, the checking of the reader/writer (or a PC), which is communicating with the device, as the ticket user, which serves as the device access unit, is performed.

In step S541, the device checks the authentication flag (the flag indicating whether mutual authentication with the device is required for using the ticket) of the received ticket (PRT, FRT, SPT, or DUT). If the flag indicates that the authentication is not required, the process is completed without executing the processing.

If the flag indicates that the authentication is required in the flag checking processing in step S541, the process proceeds to step S542. In step S542, the authentication table (see FIG. 51) is checked by using the category (group) of the ticket user (a reader/writer or a PC as the device access unit, which is to execute the processing on the device by using the ticket).

Subsequently, in step S543, the authentication type of the received ticket (data indicating the type of authentication type, i.e., the public key authentication or the common key authentication, or any type of authentication) is checked. If the authentication type indicates "any type", the process proceeds to step S544 in which it is determined whether the mutual authentication data of the group checked in step S542 is stored in the authentication table (see FIG. 51). If it is determined that the mutual authentication information of the corresponding group is stored in the table and that mutual authentication has been conducted between the ticket user (a reader/writer or a PC as the device access unit, which is to execute the processing on the device by using the ticket) and the device, it is determined that the integrity of the ticket user (ex. reader/writer as the device access unit) has been verified, i.e., that the user checking has been successfully conducted. The process is then completed. If the mutual authentication information of the corresponding group is not stored in the authentication table (see FIG. 51), it is determined that the user checking has not been conducted, and the process is terminated as an error.

If it is found in step S543 that the authentication type (the mutual authentication type of the device (public key authentication or the common key authentication, or any type) of the received ticket does not indicate "any type", it is determined in step S545 whether the authentication type is the public key authentication.

If the authentication type is the public key authentication, the process proceeds to step S546 in which the public-key mutual authentication data of the group checked in step S542 is stored in the authentication table (see FIG. 51). If it is determined that the public-key mutual authentication information of the corresponding group is stored in the table and that mutual authentication has been conducted between the ticket user (a reader/writer or a PC as the device access unit, which is to execute the processing on the device by using the ticket) and the device as the public-key authentication processing, the process proceeds to step S547. In step S547, it is checked for the presence of the ticket user identifier in the ticket to be processed (PRT, FRT, SPT, or DUT). If the ticket user identifier is present, it is determined in step S548 whether the identifier, the category, or the serial (SN) recorded as the ID data (DN) in the public key certificate of the entity to be authenticated (reader/writer as the device access unit, which serves as the ticket user) coincides with the identifier, the category, or the serial (SN) recorded as the ID data of the ticket user stored in the ticket. If both ID data coincide with each other, it is determined that the user checking has been successfully conducted, and the process is completed.

If it is determined in step S546 that the public-key mutual authentication data of the group checked in step S542 is not stored in the authentication table (see FIG. 51) and that mutual authentication has not been conducted between the ticket user (a reader/writer or a PC as the device access unit, which is to execute the processing on the device by using the ticket) and the device, it is determined that the user checking has not been conducted, and the process is terminated as an error.

If it is determined in step S548 that the identifier, the category, or the serial (SN) recorded as the ID data (DN) in the public key certificate of the entity to be authenticated (reader/writer as the device access unit, which serves as the ticket user) does not coincide with the ticket user identifier stored in the ticket, it is determined that the ticket checking has not been conducted, and the process is terminated as an error.

If the ticket user identifier is not present in the ticket, the processing of step S548 is not executed, and it is determined that the user checking has been successfully conducted, and the process is completed.

If it is determined in step S545 that the authentication type (the type of mutual authentication of the device (the public key authentication or the common key authentication, or any type)) of the received ticket is not the public key authentication, the process proceeds to step S549 in which it is determined whether the common-key mutual authentication data of the group checked in step S542 is stored in the authentication table (see FIG. 51). If it is determined that the common-key mutual authentication information of the corresponding group is stored in the table and that mutual authentication has been conducted between the user ticket (a reader/writer or a PC as the device access unit, which is to execute the processing on the device by using the ticket) and the device as the common-key authentication processing, the process proceeds to step S550. In step S550, it is checked for the ticket user identifier in the ticket to be processed (PRT, FRT, SPT, or DUT). If the ticket user identifier is present, it is determined in step S551 whether the ID data (IDrw) of the entity to be authenticated (reader/writer as the device access unit, which serves as the ticket user) coincides with the ticket user identifier stored in the ticket. If the ID data and the ticket user identifier coincide with each other, it is determined that the user checking has been successfully conducted, and the processing is completed.

If it is determined in step S549 that the common-key mutual authentication data of the group checked in step S542 is not stored in the authentication table (see FIG. 51) and that mutual authentication has not been conducted between the ticket user (a reader/writer or a PC as the device access unit, which is to execute the processing on the device by using the ticket) and the device as the common-key authentication processing, it is determined that the user checking has not been conducted, and the process is terminated as an error.

If it is determined in step S551 that the ID data (IDrw) of the entity to be authenticated (reader/writer as the device access unit, which serves as the ticket user) does not coincide with the ticket user identifier stored in the ticket, it is determined that the user checking has not been conducted, and the process is terminated as an error.

If the ticket user identifier is not present in the ticket, or if all the ticket users are allowed to use the ticket, the processing of step S550 is not executed. It is then determined that the user checking has been successfully conducted, and the process is completed.

The foregoing processing is the ticket integrity and user checking processing performed in step S413 in the flow of FIG. 47.

(Partition Creation/Deletion Processing)

Details of the partition creation/deletion processing based on the partition registration ticket (PRT) executed in step S415 in the flow of FIG. 47 are discussed below with reference to the processing flows of FIGS. 60 and 61. The partition creation/deletion processing is the processing executed by the device, which has received the partition registration ticket (PRT) from the ticket user (ex. a reader/writer or a PC as the device access unit), based on the partition registration ticket (PRT).

Figure 60:
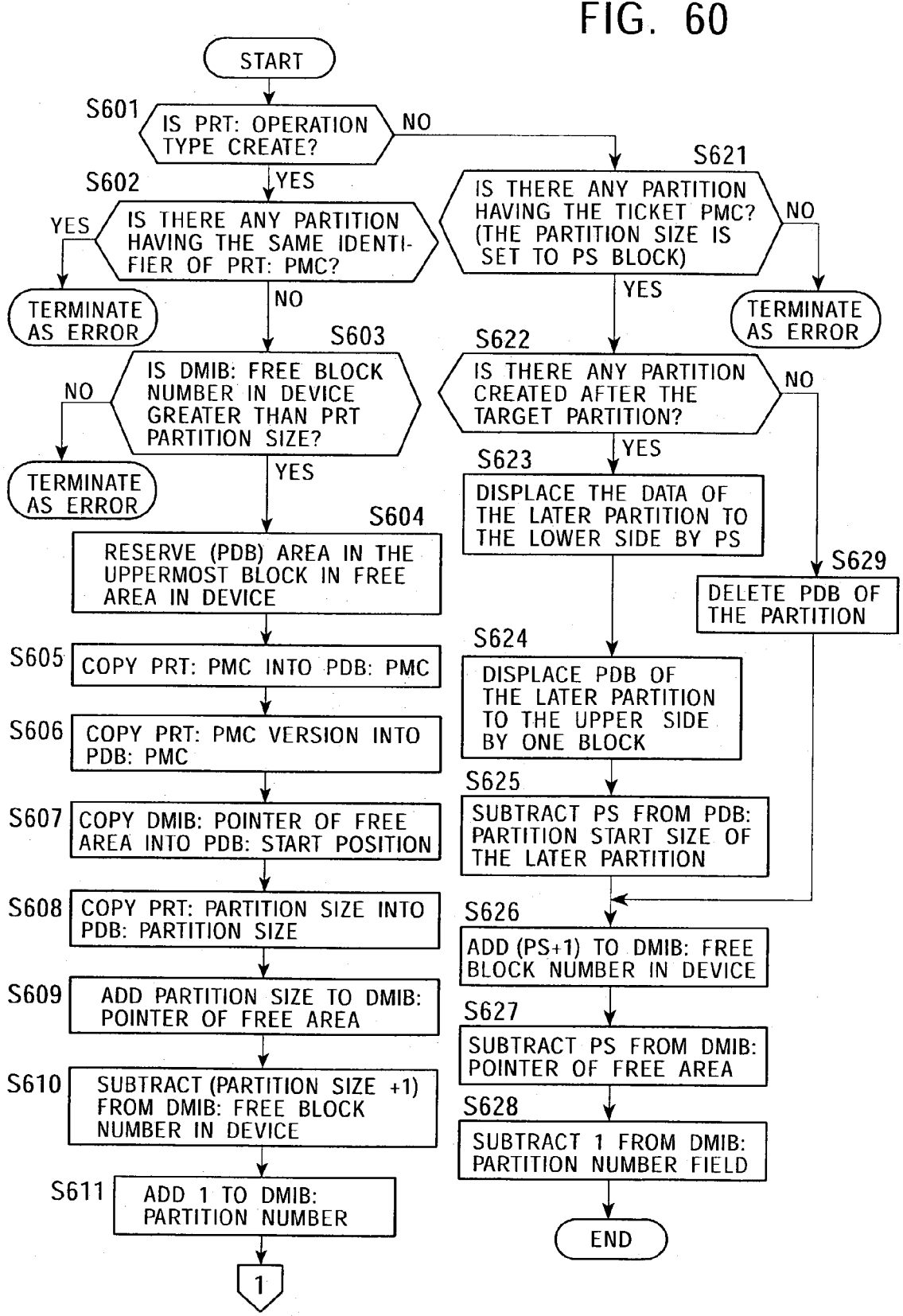
FIG. 60 is a first flowchart illustrating a partition creation/deletion operation in the system of the present invention.

In step S601 of FIG. 60, the device checks the processing type recorded in the received partition registration ticket (PRT), i.e., the operation type (generate/delete), and determines whether a partition is to be created or deleted. If the operation type is to create a partition, step S602 and the subsequent steps are executed. If the operation type is to delete a partition, step S621 and the subsequent steps are executed.

The partition creation processing is first discussed. In step S602, the device determines whether there is a partition having the same code as the partition manager code (PMC) indicated in the partition registration ticket (PRT). This determination can be made by checking whether the same code as the description code of the received ticket (PRT) is indicated in the partition definition block (see FIG. 19) of the device memory.

If there is a partition having the same code (PMC) in the device, the partition creation cannot be performed since the duplication of the partitions having the same code is not permitted, and the processing is terminated as an error. If there is no partition having the same code in the device, in step S603, the free block number in device in the device management information block (see FIG. 15) is compared with the partition size indicated in the partition registration ticket (PRT), and it is determined whether if there is a free block area greater than or equal to the partition size indicated in the ticket (PRT) in the device memory. If there is no free block area greater than or equal to the partition size, a partition having the size indicated in the PRT cannot be created, and thus, the process is terminated as an error.

If it is determined that there is a free block area greater than or equal to the partition size indicated in the ticket (PRT) in the device memory, the process proceeds to step S604. In step S604, the pointer of free area in the device management information block is checked, and the partition definition block (PDB) area (see FIG. 19) is reserved in the uppermost block of the free area in device.

Then, the device copies the partition manager code (PMC) indicated in the partition registration ticket (PRT) into the reserved partition definition block (PDB) area (S605), and also copies the PMC version indicated into the PRT in the partition definition block (PDB) area (S606).

The device also copies the pointer of free area in the device management information block (see FIG. 15) into the partition start position of the partition definition block (PDB) area (S607), and also copies the partition size indicated in the partition registration ticket (PRT) into the partition size of the partition definition block (PDB) area (S608).

Then, the device adds the value copied in the partition size of the partition definition block (PDB) area to the pointer of free area in the device management information block (see FIG. 15) (S609), and subtracts the partition size +1 from the free block number in device in the device management information block (see FIG. 15) (S610), where +1 means a block for the partition definition block (PDB).

Subsequently, the device adds 1, i.e., the number of created partition (1) to the partition number in the device management information block (see FIG. 15) (S611).

Figure 61:
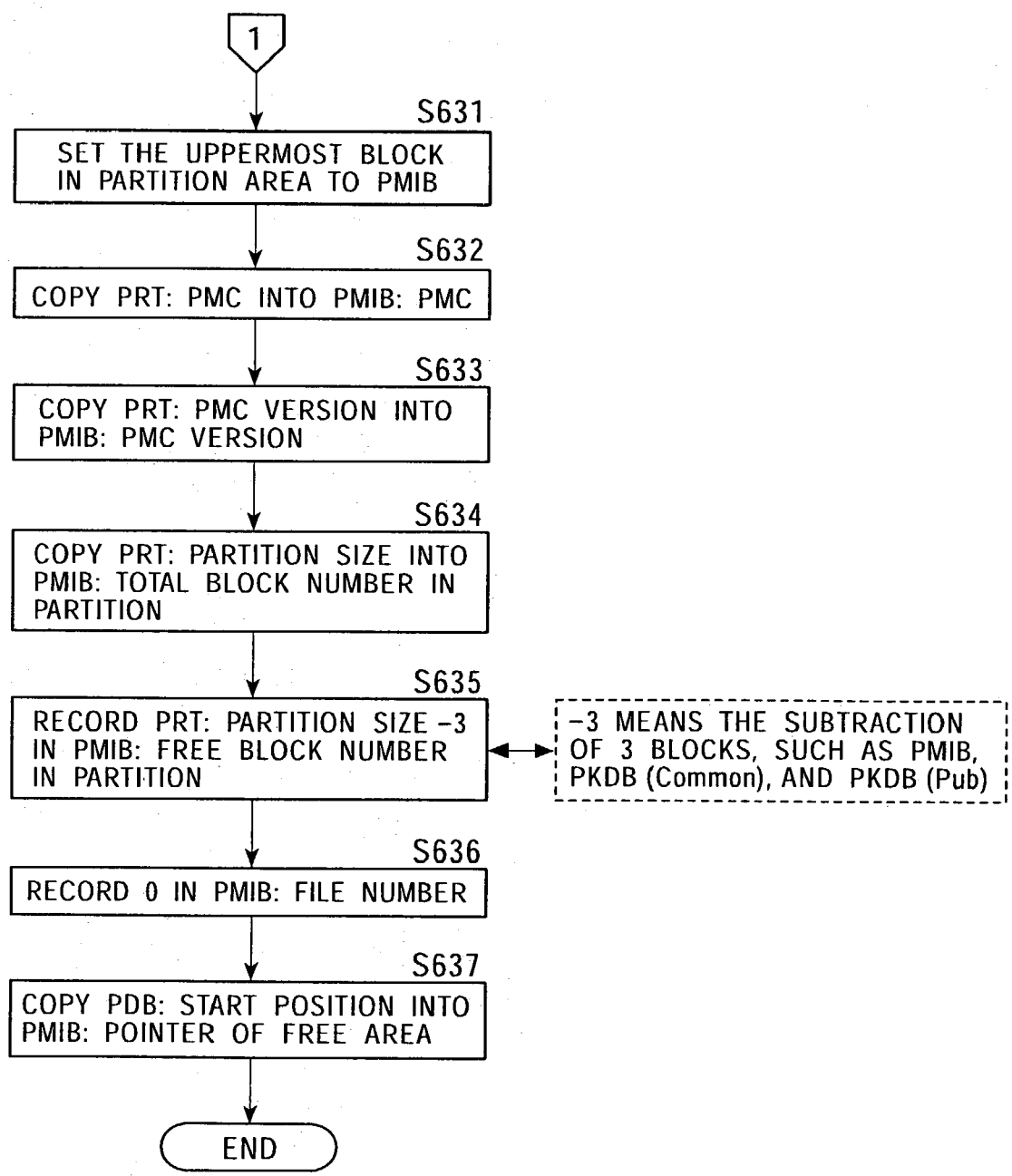
FIG. 61 is a second flowchart illustrating the partition creation/deletion operation in the system of the present invention.

Then, in step S631 of FIG. 61, the device sets the uppermost block of the created partition area as the partition management information block (PMIB) (see FIG. 20). The device also copies the PMC of the partition registration ticket (PRT) into the partition manager code (PMC) field of the set partition management information block (PMIB) (S632), copies the PMC version of the partition registration ticket (PRT) into the PMC version field of the partition management information block (PMIB) (S633), and copies the partition size of the partition registration ticket (PRT) into the field of the total block number in partition of the partition management information block (PMIB) (S634).

Moreover, the device records the partition size −3 of the partition registration ticket (PRT) in the field of the free block number in partition of the partition management information block (PMIB) (S635), where −3 means that three block, such as the partition management information block (PMIB), the common-key partition key definition block (PKDB(common)), and the public-key partition key definition block (PKDB(PUB)), which are to be used, are subtracted.

The device also records 0 in the file number of the partition management information block (PMIB) (S636). At this point, there are no files set in the partition. The file setting can be performed by using the file registration ticket (FRT). The file registration processing using the file registration ticket (FRT) is described below.

The device also copies the start position of the partition definition block (PDB) into the pointer of free area of the partition management information block (PMIB), and the partition setting registration is completed.

The partition deletion processing in steps S621 through S628 of FIG. 60 is described below. In step S621, it is determined whether there is a partition having the same code as the partition manager code (PMC) indicated in the partition registration ticket (PRT) in the device memory. This determination can be made by checking whether the same code as the description code of the received ticket (PRT) is indicated in the partition definition block (see FIG. 19) of the device memory.

If there is no partition having the same code (PMC) in the device, the partition cannot be deleted, and the process is terminated as an error. If there is a partition having the same code in the device, it is determined in step S622 whether there is a partition which is created after the partition to be deleted. If there is no partition created after the partition to be deleted, the partition to be deleted is the latest partition, and the partition definition block (PDB) (see FIG. 19) of the target partition is deleted in step S629.

If it is determined in step S622 that there is a partition which is created after the partition to be deleted in the device, the data of the later partition is displaced to the lower side by the size of the partition (PS) to be deleted (S623), and the partition definition block (PDB) of the later partition is displaced to the upper side by one block (S624). Moreover, the size of the partition to be deleted (PS) is subtracted from the partition start position recorded in the partition definition block (PDB) of the later partition (S625).

After the processing of step S625 or S629, in step S626, the size of the partition to be deleted (PS) +1 is added to the free block number in device of the device management information block (DMIB) (see FIG. 15), where +1 means a block for the partition definition block of the partition to be deleted.

Subsequently, in step S627, the size of the partition to be deleted (PS) is subtracted from the value of the pointer of free area in the device management information block (see FIG. 15). In step S628, 1, i.e., the number of deleted partition (1), is subtracted from the partition number of the device management information block (see FIG. 15), and then, the partition deletion processing based on the partition registration ticket (PRT) is completed.

The foregoing processing is the partition creation/deletion processing based on the partition registration ticket (PRT) in step S415 of the processing flow of FIG. 47.

(Partition Initial Registration)

Figure 62:
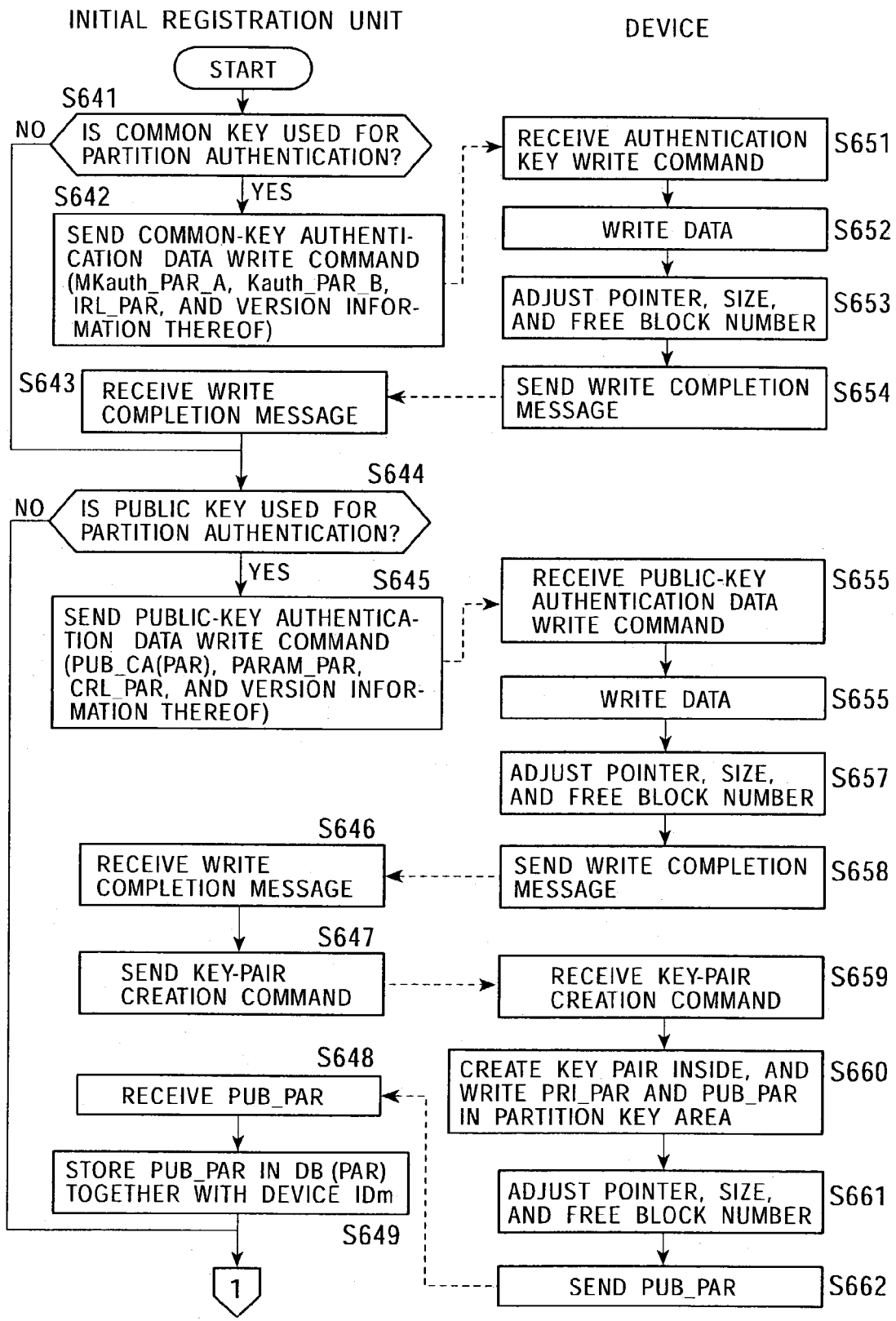
FIG. 62 is a first flowchart illustrating partition initial registration processing in the system of the present invention.

A description is now given, with reference to the flow of FIG. 62 and the subsequent drawings, of details of the partition initial data writing processing in step S406 or S419 of the processing flow of FIG. 47, that is, the partition initial registration processing based on the partition registration ticket (PRT).

Figure 63:
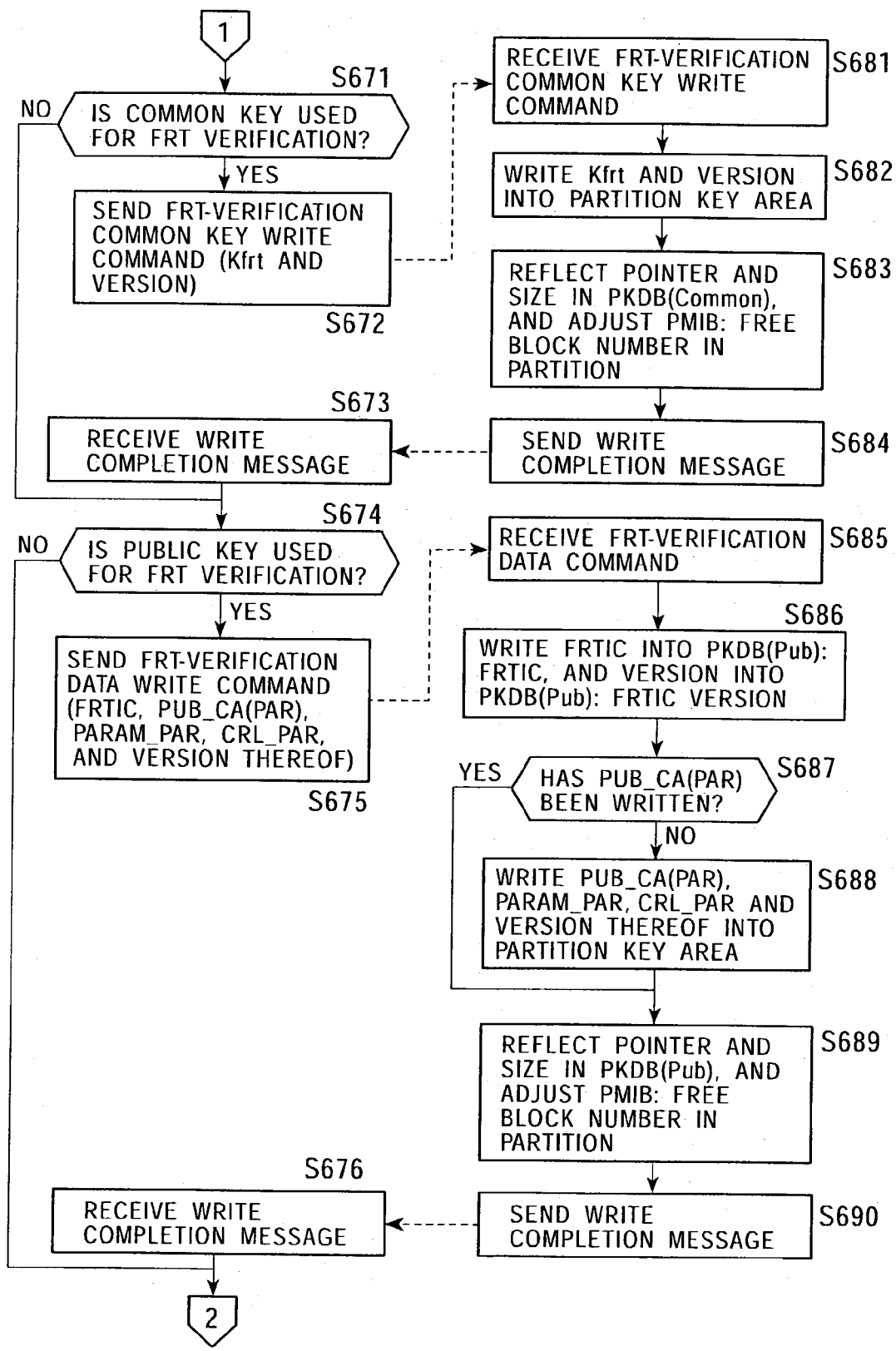
FIG. 63 is a second flowchart illustrating partition initial registration processing in the system of the present invention.
Figure 64:
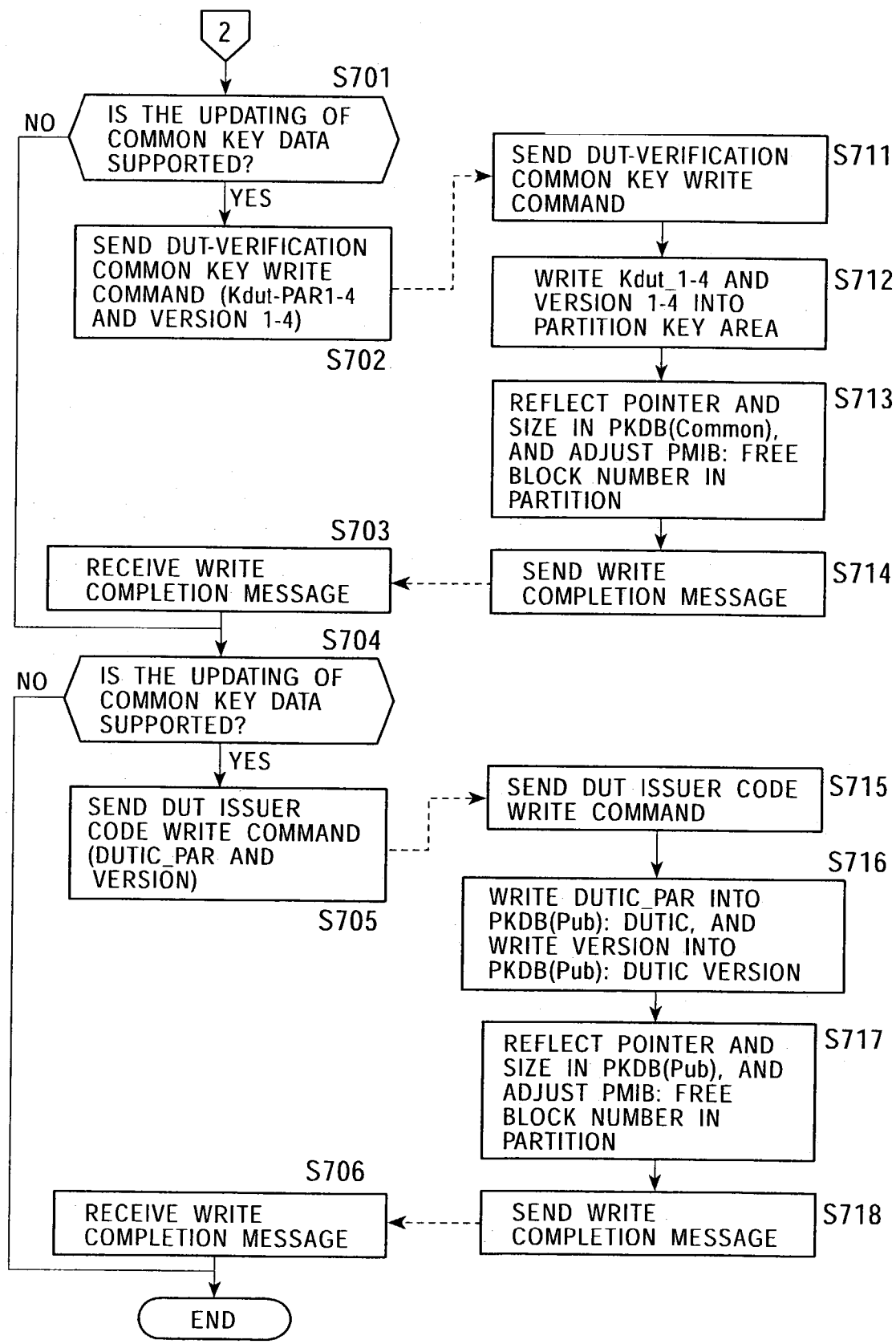
FIG. 64 is a third flowchart illustrating partition initial registration processing in the system of the present invention.

In the processing flows of FIGS. 62, 63, and 64, the processing of the initial registration managed by the partition manager is shown at the left side, and the processing of the device (see FIG. 5) is shown at the right side. The initial registration unit managed by the partition manager is the unit (ex. a reader/writer or a PC as the device access unit) that can read and write data from and into the device, and has the configuration corresponding to the reader/writer as the device access unit shown in FIG. 10. As indicated in the processing flow of FIG. 47, it is assumed that, before the start of the processing in FIG. 62, mutual authentication has been conducted between the initial registration unit and the device, and that the integrity of the ticket and the user (for example, a reader/writer as the device access unit, which serves as the ticket user) has been verified in the user checking, and that the partition creation processing based on the partition registration ticket (PRT) has been completed. In the data sending and receiving between the initial registration unit and the device shown in FIGS. 62, 63, and 64, data encrypted by using the session key Kses created in the mutual authentication is sent and received.

In step S641 of FIG. 62, the initial registration unit determines whether the common key is used for partition authentication. This determination can be made by checking the field of the mutual authentication type (the public key authentication, the common key authentication, or any type) of the device of the partition registration ticket (PRT) (see FIG. 26) to be used.

As shown in FIG. 62, if the common key is used for partition authentication, steps S642 and 643 and steps S651 through S654 are executed, and if the common key is not used for partition authentication, these steps are skipped.

If the common key is used for partition authentication, in step S642, the initial registration unit sends a common-key authentication data write command, such as MKauth_PAR_A: the two-way individual key authentication master key, Kauth_PAR_B: the two-way individual key authentication common key, IRL_PAR: the revocation list (Revocation List (Device ID)) in which the device identifiers (IDs) of the revoked devices are registered, and version information thereof to the device.

Upon receiving the above-mentioned write command in step S651, the device writes the received data into the partition key area (see FIG. 23) in step S652. Then, the device makes adjustments of the pointer, the size, and the free block number in device, which are required due to the data writing (S653), and sends a write completion message to the registration unit (S654).

Upon receiving the write completion message (S643), the registration unit determines in step S644 whether the public key is used for partition authentication As shown in FIG. 62, if the public key is used for partition authentication, steps S645 through 649 and steps S655 through S662 are executed. If the public key is not used for partition authentication, these steps are omitted.

When the public key is used for partition authentication, in step S645, the registration unit sends a public-key authentication data write command, such as PUB_CA(PAR): the public key of the certificate authority CA(PAR) that issues the partition-manager public key certificate, PARAM_PAR: the pubic key parameter of the partition, CRL_PAR: the revocation list (Revocation List (Certificate)) in which the public key certificate identifiers (ex. serial number: SN) of the revoked devices are registered, and version information thereof to the device.

Upon receiving the above-mentioned write command in step S655, the device writes the received data into the partition key area (see FIG. 23) in step S656. Then, the device makes adjustments of the pointer, the size, and the free block number in device, which are required due to the data writing (S657), and sends a write completion message to the registration unit (S658).

Upon receiving the write completion message (S646), the registration unit sends a key-pair creation command for creating a public key and a private key to the device (S647). In this embodiment, the device creates a key pair. However, the registration unit may create a key pair and send it to the device.

Upon receiving the key-pair creation command (S659), the device creates a pair of a public key (PUB PAR) and a private key (PRI PAR) by using the encryption processor (see FIG. 5) in the device, and writes the created keys into the partition key area (see FIG. 23) (S660). Then, the device makes adjustments of the pointer, the size, and the free block number in device, which are required due to the data writing (S661), and sends the created and stored public key to the registration unit (S662).

The registration unit receives the public key (PUB PAR) from the device (S648), and stores it in the database (DB (PAR)) (see FIG. 9) within the partition manager, together with the device identifier IDm previously received from the device.

The registration unit of the partition manager then determines whether the common key is used for verifying the file registration ticket (FRT) (S671). As described above, ticket verification can be performed according to the common key system by using the MAC value checking or the public key system in which the signature is created by the private key and is verified by the public key. The partition manager is able to set the verification type to be used by the device. The partition manager sets data for implementing the common key or the public key or data for implementing either key in the device according to the FRT ticket verification type employed by the device.

If the common key authentication is employed for verifying the file registration ticket (FRT), the partition manager sets information required for FRT verification using the common key system (ex. FRT-verification common key). If the device does not execute the common key authentication, the partition manager does not store such information in the device.

As shown in FIG. 63, if the common key system is used for FRT verification, steps S672 and 673 and steps S681 through S684 are executed, and if the common key is not used for FRT verification, these steps are skipped.

If the common key is used for FRT verification, in step S672, the registration unit sends an FRT-verification common key write command, such as Kfrt: the MAC checking key of the file registration ticket (FRT) and version information thereof to the device.

Upon receiving the above-mentioned write command in step S681, the device writes the received data into the partition key area (see FIG. 23) in step S682. Then, the device makes adjustments of the pointer, the size, and the free block number in device, which are required due to the data writing, (S683), and sends a write completion message to the registration unit (S684).

Upon receiving the write completion message (S673), the registration unit determines in step S674 whether the public key is used for FRT verification. As shown in FIG. 63, if the public key is used for FRT verification, steps S675 and 676 and steps S685 through S690 are executed, and if the public key is not used for FRT verification, these steps are skipped.

If the public key is used for FRT verification, in step S675, the registration unit sends an FRT-verification data write command, such as FRTIC (FRT Issuer Category): the file registration ticket (FRT) issuer category, PUB_CA(PAR): the public key of the certificate authority CA(PAR) that issues the partition-manager public key certificate, PARAM_PAR: the public key parameter of the partition, CRL_PAR: the revocation list (Revocation List (Certificate)) in which the public key certificate identifiers (ex. serial number: SN) of the revoked devices are registered, and version information thereof to the device.

The device receives the above-mentioned write command in step S685, and in step S686, the device writes FRTIC (FRT Issuer Category): the file registration ticket (FRT) issuer category in the received data into the public-key partition key definition block (PKDB(PUB)) (see FIG. 22), and writes the version information into the version area of the same block.

Then, the device determines in step S687 whether PUB_CA(PAR): the public key data of the certificate authority CA(PAR) that issues the partition-manager public key certificate has been written. If PUB_CA(PAR) has not been written, PUB_CA(PAR), PARAM_PAR, and CRL_PAR are written into the partition key area (see FIG. 23) in step S688. The device then makes adjustments of the pointer, the size, and the free block number in device, which are required due to the data writing, (S689), and sends a write completion message to the registration unit (S690).

Upon receiving the write completion message (S676), the registration unit determines in step S701 whether the updating of the common key data is supported. Among the data stored in the device, part of the data can be updated by using the above-described data update ticket (DUT) (see FIG. 32). The data that can be updated has been discussed with reference to FIG. 33. Either the common key system or the public key system can be used for the updating processing using the data update ticket (DUT). The partition manager sets data for implementing the public key system or the common key system or data for implementing either type in the device according to the set partition.

If the set partition is configured such that the data can be updated according to the common key system, the partition manager sets information required for updating the data according to the common key system (ex. the MAC checking key of the data update ticket (DUT)) in the partition key area of the device. If the device does not execute the common key authentication, the partition manager does not set such information in the partition key area.

As shown in FIG. 64, if the common key system is used for updating the data using the data update ticket (DUT), steps S702 and 703 and steps S711 through S714 are executed, and if the common key system is not used for updating the data, these steps are skipped.

If the common key is used for updating the data, in step S702, the registration unit sends a data update ticket (DUT)-verification common key write command, such as Kdut_PAR1: the MAC checking key of the data update ticket (DUT), Kdut_PAR2: the data updating encryption key, Kdut_PAR3: the MAC checking key of the data update ticket (DUT), Kdut_PAR4: the data updating encryption key, and version information thereof to the device.

Upon receiving the above-mentioned write command in step S711, the device writes the received data into the partition key area (see FIG. 23) in step S712. Then, the device makes adjustments of the pointer, the size, and the free block number in device, which are required due to the data writing (S713), and sends a write completion message to the registration unit (S714).

Upon receiving the write completion message (S703), the registration unit determines in step S704 whether the partition set in the device is configured such that the data updating using the data update ticket (DUT) according to the public key system can be supported. As shown in FIG. 64, if the public key system is supported, steps S705 and 706 and steps S715 through S718 are executed, and if the public key system is not supported, these steps are skipped.

If the public key system is supported, in step S705, the registration unit sends a data update ticket (DUT) issuer code write command, such as DUTIC_PAR (DUT Issuer Category): the data update ticket (DUT) issuer category, and version information to the device.

The device receives the above-described write command in step,S715, and writes the received data into the public-key partition key definition block (PKDB(PUB)) in step S716. The device then makes adjustments of the pointer, the size, and the free block number in device, which are required due to the data writing (S717), and sends a write completion message to the registration unit (S718). The registration unit receives the write completion message (S706), and the process is then completed.

Figure 65:
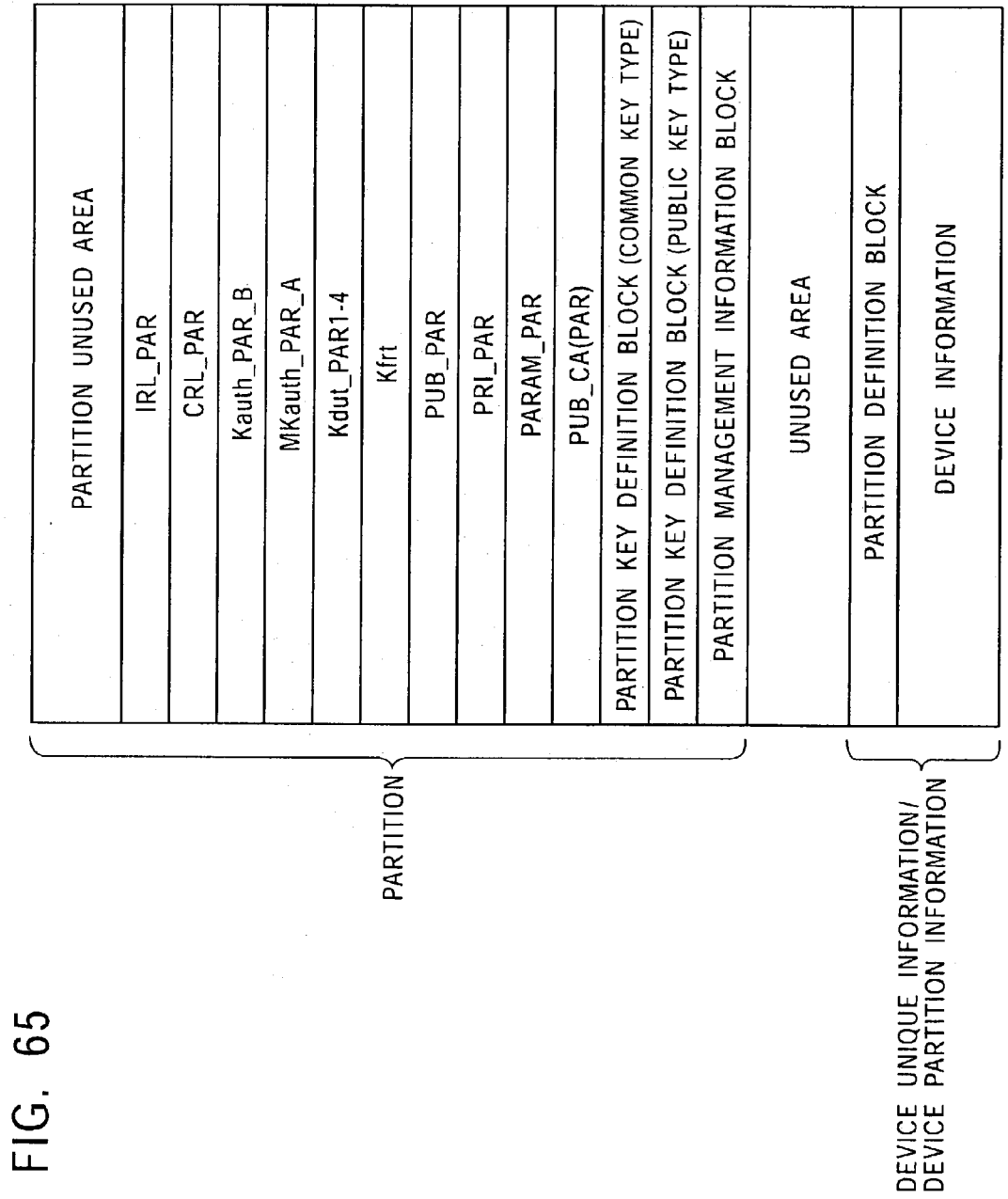
FIG. 65 is a diagram illustrating data stored in the device after partition initial registration processing is performed in the system of the present invention.

FIG. 65 illustrates an example of the data configuration stored in the memory device when the initial registration processing (the processing flows of FIGS. 62 through 64) by the partition manager is finished. In the partition area shown in FIG. 65, the following data are sent from the registration unit and are generated by the device and written in the partition key area in the flows (FIGS. 62 through 64):

IRL_PAR: the revocation list (Revocation List (Device ID)) in which the identifiers (IDs) of the revoked devices and the revoked units (a ticket user, such as a reader/writer or a PC, as the device access unit, or ticket issuing means) are registered;

CRL_PAR: the revocation list (Revocation List (Certificate)) in which the public key certificate identifiers (ex. serial number: SN) of the revoked devices and the revoked units (a ticket user, such as a reader/writer or a PC, as the device access unit, or ticket issuing means) are registered;

Kauth_PAR_B: the two-way individual key authentication common key;

Mkauth_PAR_A: the two-way individual key authentication master key;

Kdut_PAR1: the MAC checking key of the data update ticket (DUT);

Kdut_PAR2: the data updating encryption key;

Kdut_PAR3: the MAC checking key of the data update ticket (DUT);

Kdut_PAR4: the data updating encryption key;

Kfrt: the MAC checking key of the file registration ticket (FRT);

PUB_PAR: the public key of the partition; and

PRI_PAR: the private key of the partition.

The following data of the partition management information block are written during the partition creation (see the processing flows of FIGS. 60 and 61):

PARAM_PAR: the public key parameter of the partition;

PUB_CA(PAR): the public key of the certificate authority CA(PAR); and the data in the common-key partition key information block (Partition Key Definition Block (Common)), and the public-key partition key information block (Partition Key Definition Block(PUB)).

[B4.2. Public Key Certificate Issuing Processing Under Partition Manger Control]

Figure 66:
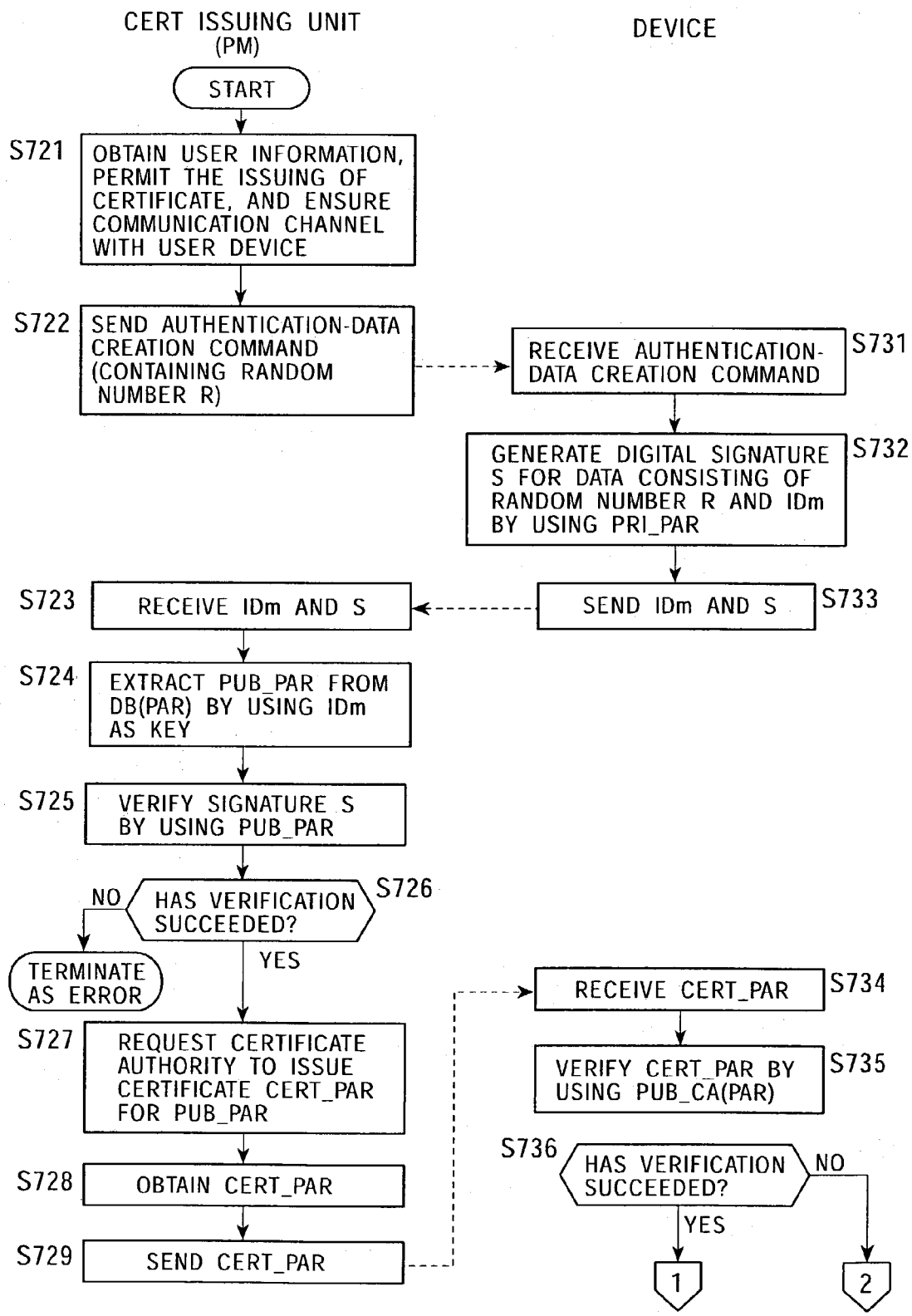
FIG. 66 is a first flowchart illustrating public key certificate issuing processing performed by a partition manager in the system of the present invention.

The issuing processing of the partition public key certificate by the partition manager is discussed below with reference to FIG. 66 and the subsequent drawings. In the device, the device public key certificate (CERT DEV) used for authenticating the entire device and performing the processing based on the device, and the partition public key certificate (CERT PAR) used for authenticating a specific partition in the device and for verifying the processing are stored. The partition public key certificate (CERT PAR) can be set for each partition set in the device.

The partition public key certificate (CERT PAR) is issued by a procedure for providing the public key certificate issued by the certificate authority (CA for PM) (see FIGS. 2 and 3) to the device via the registration authority managed by the partition manager. The registration authority manages the public key certificate (CERT PAR) issued by the registration authority managed by the partition manager (database 332 (see FIG. 9)).

Figure 67:
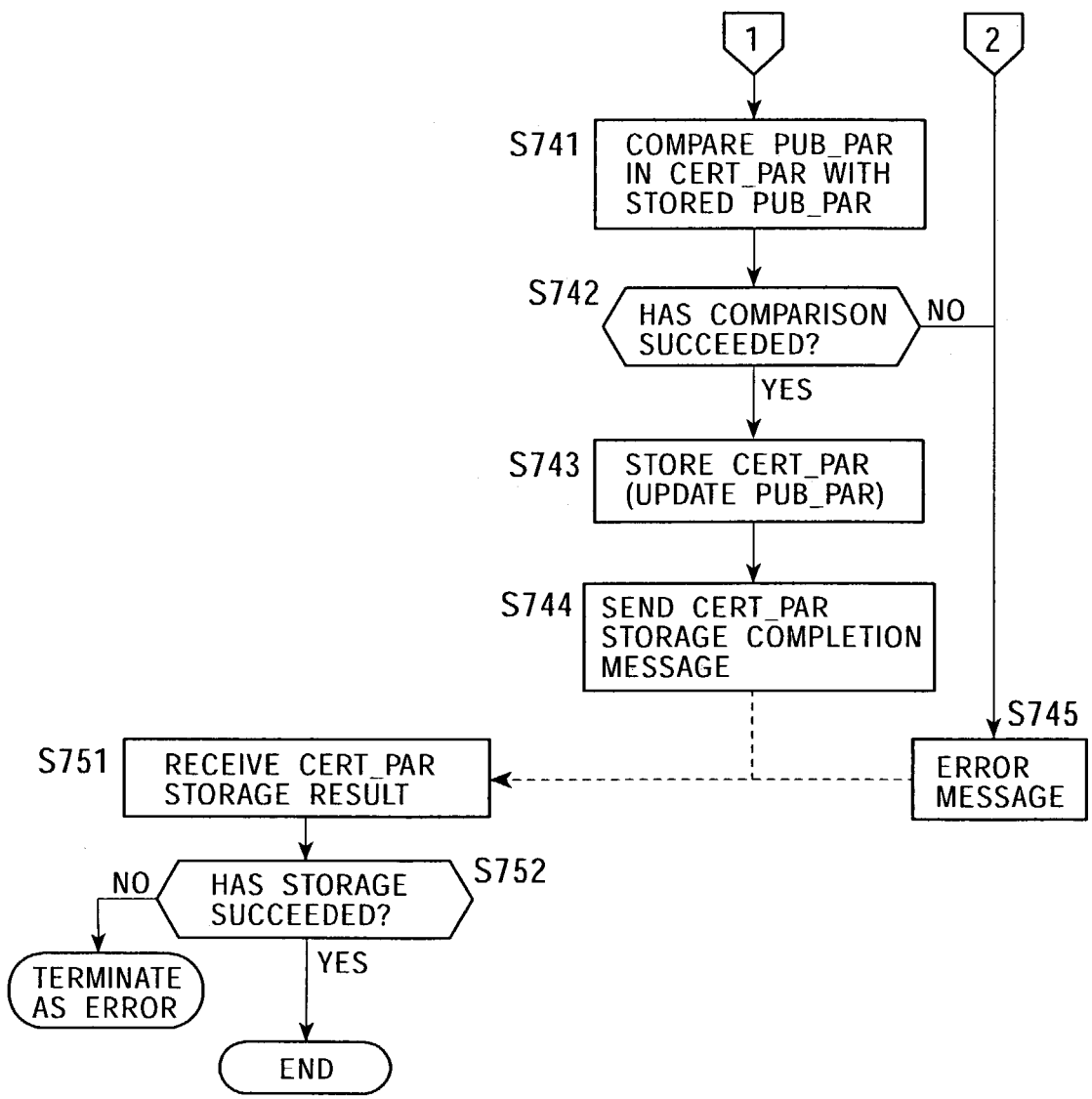
FIG. 67 is a second flowchart illustrating public key certificate issuing processing performed by the partition manager in the system of the present invention.

The procedure for issuing the partition public key certificate (CERT PAR) to the set partition by the registration authority managed by the partition manager is described below with reference to FIGS. 66 and 67. In FIGS. 66 and 67, the processing of the CERT (public key certificate) issuing unit of the registration authority managed by the partition manager, and more specifically, the processing of the control means 331 of the partition manager shown in the diagram of FIG. 9, is shown at the left side, and the processing of the device is shown at the right side.

In step S721, the CERT issuing unit first obtains user information of the device to which the partition public key certificate (CERT PAR) is to be issued, permits (determines) the issuing of the certificate, and ensures a communication channel with the target device. The user information of the device to which the partition public key certificate (CERT PAR) is to be issued can be obtained by, for example, the data generated in the device initial registration. The user information may be obtained from the device after a communication channel with the device is set. The communication channel may be a cable or wireless communication channel through which the data can be sent and received.

Then, in step S722, the CERT issuing unit sends an authentication-data creation command containing a random number R to the device. Upon receiving the authentication-data creation command (S731), the device generates a digital signature (S) by applying the device private key (PRI PAR) to the data consisting of the received random number R and the device identifier (IDm) (S732) (see FIG. 12). The device then sends the ID data (IDm) and the signature (S) of the device to the CERT issuing unit.

Upon receiving the ID data (IDm) and the signature (S) from the device (S723), the CERT issuing unit obtains the device public key (PUB PAR) from the database DB(PAR) 332 by using the received device ID data (IDm) as the search key. The CERT issuing unit also verifies the signature (S) by applying the obtained device public key (PUB PAR) (see FIG. 13) (S725). If the verification has not succeeded, it is determined that the data sent from the device is unauthorized data, and the process is terminated.

If the verification has succeeded, the CERT issuing unit requests the certificate authority (CA for PM) 620 to issue the partition public key certificate (CERT PAR) (S727). The partition manager receives the partition public key certificate (CERT PAR) issued by the certificate authority 620 (S728), and sends it to the device (S729).

Upon receiving the partition public key certificate (CERT PAR) from the partition manager (registration authority), the device verifies the signature of the received partition public key certificate (CERT PAR) by using the public key (PUB CA(PAR)) of the certificate authority, which is stored in the partition key area (see FIG. 23). That is, the signature (see FIG. 11) implemented by the private key of the certificate authority is added to the public key certificate, and this signature is verified (S735)

If the signature verification has failed, it is determined that the public key certificate is not an authorized public key certificate, and an error message is sent to the CERT issuing unit (S745).

If the signature verification has succeeded, the device public key (PUB PAR) stored in the partition public key certificate (CERT PAR) is compared with the device public key (PUB PAR) stored in the device (S741). If the two public keys do not coincide with each other, an error message is sent. If the two public keys coincide with each other, the received partition public key certificate (CERT PAR) is stored in the partition key area (see FIG. 23) (S743). Before the issuing of the partition public key certificate (CERT PAR), the public key (PUB PAR) generated by the device is stored in this area, and when the authorized partition public key certificate (CERT PAR) is issued, the public key (PUB PAR) is replaced by the partition public key certificate (CERT PAR).

Upon completing the storage of the partition public key certificate (CERT PAR), a storage completion message is sent to the CERT issuing unit (S744). Upon receiving the storage completion message (S751), the CERT issuing unit determines whether the storage processing has been successfully finished (S752), and the process is then completed. If it is determined that the storage processing has not been successfully finished, the process is terminated as an error.

[B4.3. Processing Procedure in Each Partition Creation Processing Method]

As described above, in the partition setting registration processing, mutual authentication is conducted between the device and the reader/writer as the device access unit managed by the partition manager, and the partition setting is performed based on the partition registration ticket (PRT). As discussed above, there are two types of mutual authentication modes, i.e., the public key mutual authentication and the common key mutual authentication. As the ticket (PRT) verification, the signature verification of the public key system or the MAC checking of the common key system is performed. That is, the following four processing modes are provided:

(A) mutual authentication (public key) and ticket (PRT) verification (public key);.

(B) mutual authentication (public key) and ticket (PRT) verification (common key);

(C) mutual authentication (common key) and ticket (PRT) verification (common key); and (D) mutual authentication (common key) and ticket (PRT) verification (public key).

The four processing modes are briefly discussed with reference to the drawings by emphasizing the data transfer processing executed among the entities, such as the certificate authority (CA(DM)), the device manager (DM), the partition manager (PM), and the device.

(A) Mutual Authentication (Public Key) and Ticket (PRT) Verification (Public Key)

A description is first given, with reference to FIG. 68, of the data transfer performed among the entities when the public key system is used for mutual authentication processing and the public key system is used for ticket (PRT) verification. For the sake of simplicity, as shown in FIG. 68, a single certificate authority (CA) is provided, a single registration authority is provided in the device manager, and the device-manager public key certificate (Cert. DM) and the partition-manager public key certificate (Cert. PM) are issued by the registration authority and the certificate authority. The device manager (DM) serves as the partition registration ticket (PRT) issuing means, and the signature of the partition registration ticket (PRT) is implemented by the private key of the device manager.

The data transfer is performed among the entities in the order of the numbers shown in FIG. 68. The processing is described below according to the numbers.

(1) Issuing of Public Key Certificate (Cert. DM) of Device Manager (DM)

In response to a request from the device manager, the public key certificate (Cert. DM) is issued by the certificate authority for the device manager according to a certificate issuing procedure via the registration authority.

(2) Issuing of Public Key Certificate (Cert. PM) of Partition Manager (PM)

In response to a request from the partition manager, the public key certificate (Cert. PM) is issued to the partition manager by the certificate authority (CA) according to a certificate issuing procedure via the registration authority.

(3) Issuing Processing of Partition Registration Ticket (PRT)

The partition registration ticket (PRT) is issued to the partition manager (PM) by the partition registration ticket (PRT) issuing means (PRT Ticket Issuer) managed by the device manager. In this case, for creating and verifying the public-key signature, the signature is created by the private key of the device manager (see FIG. 12), and is added to the PRT.

(4) Supply of PRT and DM Public Key Certificate (Cert. DM) to PM

The partition registration ticket (PRT) issued by the partition registration ticket issuing means (PRT Ticket Issuer) managed by the device manager is supplied to the partition manager together with the DM public key certificate (Cert. DM).

(5) Mutual Authentication Between PM and Device

The public-key mutual authentication (see FIG. 50) is performed between the device, which is to generate a partition according to the issued PRT, and the partition manager (and more specifically, a reader/writer as the device access unit, which serve as a ticket user).

(6) Supply of PRT and DM Public Key Certificate (Cert. DM) to Device

After the mutual authentication has been successfully conducted between the PM and the device, the partition manager (PM) sends the partition registration ticket (PRT) and the DM public key certificate (Cert. DM) to the device.

The device has checked the following factors concerning the received partition registration ticket (PRT): (1) the public key certificate (CERT) of the ticket issuer (DM) is an authorized public key certificate (CERT) without being tampered with; (2) the code recorded in the option area of the public key certificate (CERT) of the ticket issuer coincides with the ticket issuing means code (PRTTC: PRT Issuer Code) recorded in the device DKDB (Device Key Definition Block) (PUB); (3) the ticket issuing means (Ticket Issuer) is not revoked; and (4) the ticket has not been tampered with by verifying the signature of the received ticket (PRT). The PRT user (PM: a reader/writer as the device access unit) is also verified (see FIGS. 57 and 58) by checking whether the identifier, the category, or the serial (SN) of the PRT user (in this case, PM: a reader/writer as the device access unit, which serves as a ticket user) stored in the PRT ticket coincides with the identifier, the category, or the serial (SN) recorded as the ID data (DN) of the partition-manager public key certificate to check that mutual authentication has been conducted.

(7) Creation of Partition

After the verification of the partition registration ticket (PRT) and the verification of the PRT issuer and the PRT user have succeeded, a partition is created in the device memory according to the rules indicated in the partition registration ticket (PRT) (see FIGS. 60 and 61).

(8) Writing of Key Data

After creating the partition in the device memory, various keys are stored in the created partition.

(9) Reading of Public Key

(10) Issuing of Public Key Certificate

If the public key system is used for performing authentication (for using the services, such as partition creation, file creation, file access, and data updating), the device creates a key pair of a public key and a private key, sends the created public key to the partition manager, issues the public key certificate via the registration authority and the certificate authority, and stores the issued public key certificate in the partition key area (see FIG. 23). In this case, the public key certificate issued for the storage area of the created public key is stored. Steps (9) and (10) are executed when the public key system is employed for performing authentication on the created partition for the use of various services (partition creation, file creation, file access, data updating, etc.).

By performing the above-described processing, the partition creation processing in accordance with the mutual authentication (public key) and ticket (PRT) verification (public key) can be executed.

(B) Mutual Authentication (Public Key) and Ticket (PRT) Verification (Common Key)

The data transfer performed among the entities when the public key system is applied to the mutual authentication processing and the common key system is applied to the ticket (PRT) verification is described below with reference to FIG. 69. The data transfer is performed among the entities in the order of the numbers shown in FIG. 69. The processing is discussed below according to the numbers.

(1) Public Key Certificate (Cert. PM) of Partition Manager (PM)

In response to a request from the partition manager, the public key certificate (Cert. PM) is issued to the partition manager by the certificate authority (CA) according to a certificate issuing procedure via the registration authority.

(2) Issuing Processing of Partition Registration Ticket (PRT)

In response to a request from the partition manager, the partition registration ticket (PRT) is issued to the partition manager (PM) by the partition registration ticket issuing means (PRT Ticket Issuer) managed by the device manager. In this case, the MAC (Message Authentication Code) (see FIG. 59) is added to the PRT as the common-key verification value.

(3) Supply of PRT to PM

The partition registration ticket (PRT) issued by the partition registration ticket issuing means (PRT Ticket Issuer) managed by the device manager is supplied to the partition manager.

(4) Mutual Authentication Between PM and Device

The public-key mutual authentication (see FIG. 50) is performed between the device, which is to generate a partition according to the issued PRT, and the partition manager (and more specifically, a reader/writer as the device access unit, which serve as a ticket user).

(5) Sending of PRT

The partition manager sends the issued partition registration ticket (PRT) to the device. The device performs MAC verification for the received partition registration ticket (PRT), and verifies the PRT issuer. The device also verifies the PRT user (PM: a reader/writer as the device access unit) (see FIGS. 57 and 58) by checking whether the identifier, the category, or the serial (SN) of the PRT user (in this case, PM: a reader/writer as the device access unit, which serves as a ticket user) stored in the PRT ticket coincides with the identifier, the category, or the serial (SN) recorded as the ID data (DN) of the partition-manager public key certificate to determine that mutual authentication has been conducted.

(6) Creation of Partition

After the verification of the partition registration ticket (PRT) and the verification of the PRT issuer and the PRT user have succeeded, a partition is created in the device memory according to the rules indicated in the partition registration ticket (PRT) (see FIGS. 60 and 61).

(7) Writing of Key Data

After creating the partition in the device memory, various keys are stored in the created partition.

(8) Reading of Public Key (9) Issuing of Public Key Certificate

If the public key system is employed for performing authentication on the created partition (for the use of services, such as partition creation, file creation, file access, and data updating), the device creates a key pair of a public key and a private key, sends the created public key to the partition manager, issues the public key certificate via the registration authority and the certificate authority, and stores the issued public key certificate in the partition key area (see FIG. 23). In this case, the public key certificate issued for the storage area of the created public key is stored. Steps (8) and (9) are executed when the public key system is employed for performing authentication on the created partition for the use of various services (partition creation, file creation, file access, data updating, etc.).

By performing the above-described processing, the partition creation processing according to the mutual authentication (public key) and ticket (PRT) verification (common key) can be executed.

(C) Authentication Processing (Common Key) and Ticket (PRT) Verification (Common Key)

Figure 70:
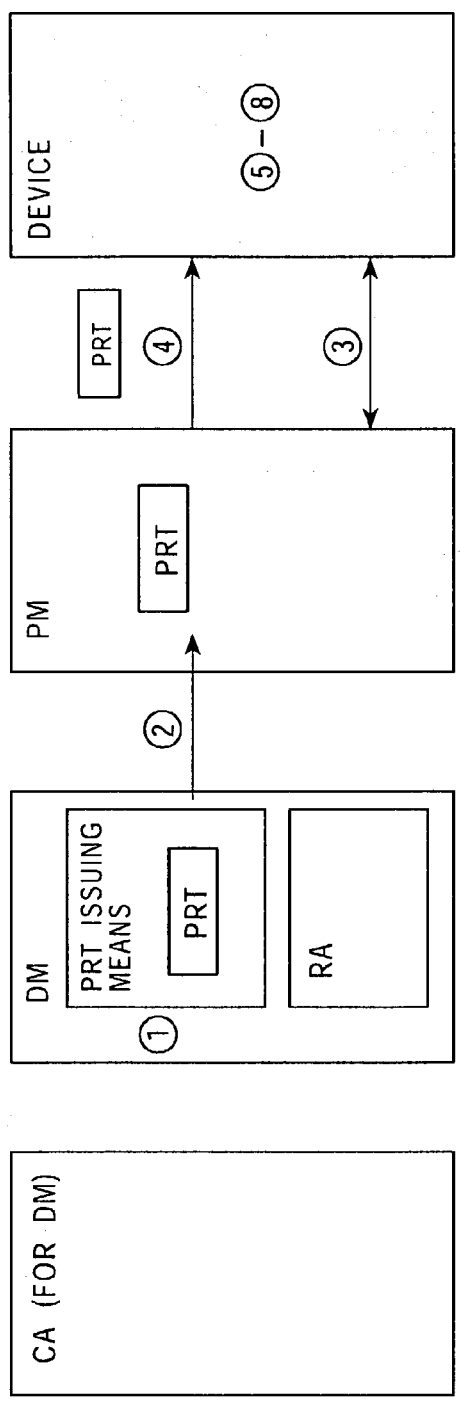
FIG. 70 is a diagram illustrating partition creation processing performed by the partition manager in the system of the present invention when common-key authentication and common-key ticket verification are performed.

The data transfer performed among the entities when the common key system is applied to the mutual authentication processing and the common key system is applied to ticket (PRT) verification is described below with reference to FIG. 70. The data transfer is performed among the entities in the order of the numbers indicated in FIG. 70. The processing is described according to the numbers.

(1) Issuing Processing of Partition Registration Ticket (PRT)

The partition registration ticket (PRT) is issued to the partition manager (PM) by the partition registration ticket issuing means (PRT Ticket Issuer) managed by the device manager. In this case, the MAC (see FIG. 59) is added to the PRT as the common-key verification value.

(2) Supply of PRT to PM

The partition registration ticket (PRT) issued by the partition registration ticket issuing means (PRT Ticket Issuer) managed by the device manager is sent to the partition manager.

(3) Mutual Authentication Between PM and Device

The common-key mutual authentication (see FIGS. 53 and 54) is performed between the device, which is to create a partition according to the issued PRT, and the partition manager (and more specifically, a reader/writer as the device access unit, which serves as a ticket user).

(4) Sending of PRT

The partition manager sends the issued partition registration ticket (PRT) to the device. The device performs MAC checking processing for the received partition registration ticket (PRT), verifies the PRT issuer, and also verifies the PRT user (PM: a reader/writer as the device access unit) (see FIGS. 57 and 58) by checking the consistency between the identifier of the PRT user (in this case, PM: a reader/writer as the device access unit, which serves as a ticket user) stored in the PRT ticket and the identifier of the partition manager to check whether the mutual authentication has been conducted.

(5) Creation of Partition

After the verification of the partition registration ticket (PRT) and the verification of the PRT issuer and the PRT user have succeeded, a partition is created in the device memory according to the rules indicated in the partition registration ticket (PRT) (see FIGS. 60 and 61).

(6) Writing of Key Data

After creating the partition in the device memory, various keys are stored in the created partition.

(7) Reading of Public Key (8) Issuing of Public Key Certificate

If the public key system is employed for performing authentication for the use of services (partition creation, file creation, file access, and data updating), the device creates a key pair of a public key and a private key, sends the created public key to the partition manager, issues the public key certificate via the registration authority and the certificate authority, and stores the issued public key certificate in the partition key area (see FIG. 23). In this case, the public key certificate issued for the storage area of the created public key is stored. Steps (7) and (8) are executed when the public key system is employed for performing authentication on the created partition for the use of various services (partition creation, file creation, file access, data updating, etc.).

By performing the above-described processing, the partition creation processing according to the mutual authentication (common key) and ticket (PRT) verification (public key) is executed.

(D) Mutual Authentication (Common Key) and Ticket (PRT) Verification (Public Key)

Figure 71:
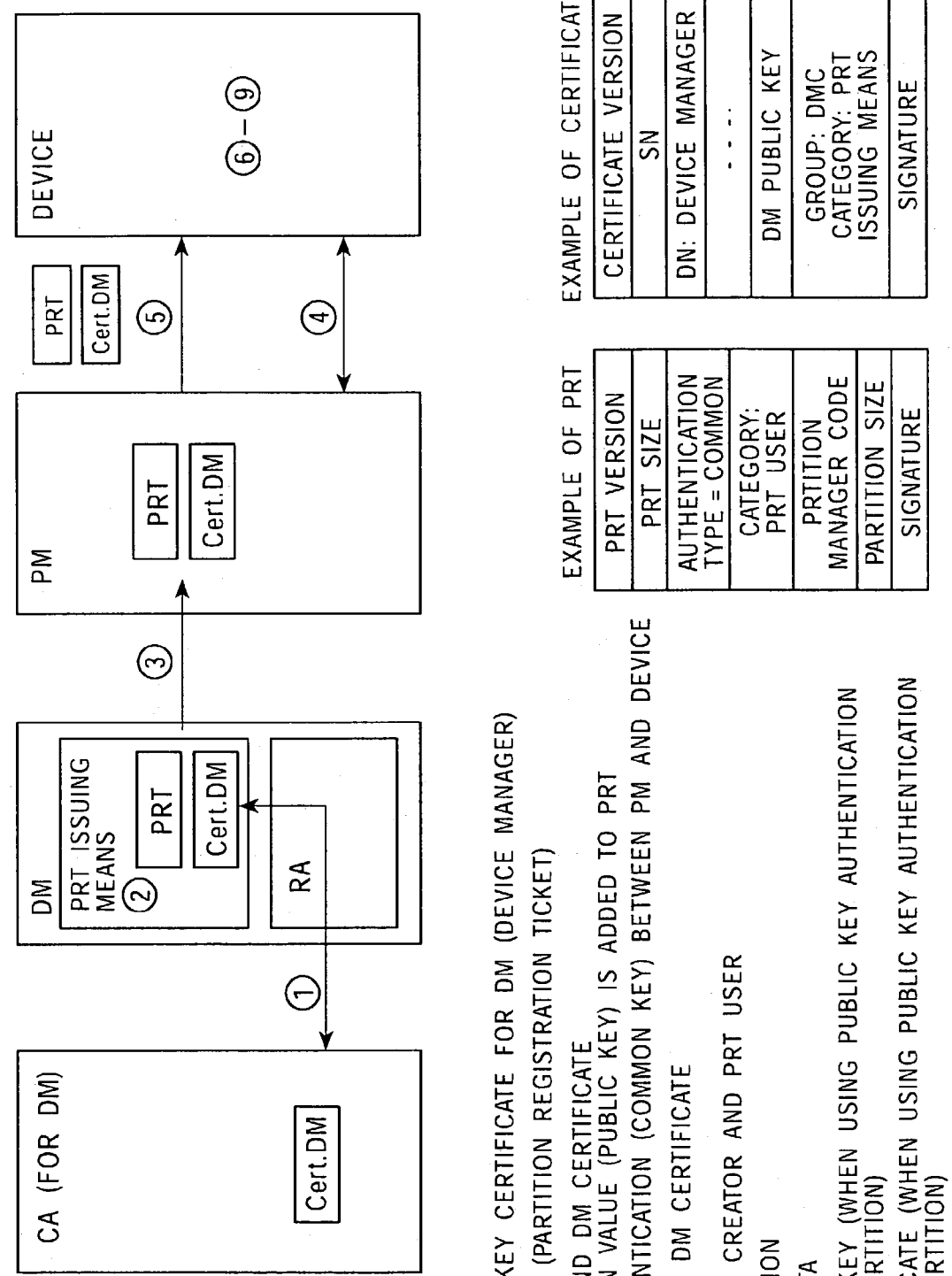
FIG. 71 is a diagram illustrating partition creation processing performed by the partition manager in the system of the present invention when common-key authentication and public-key ticket verification are performed.

The data transfer performed among the entities when the common key system is applied to the mutual authentication processing and the public key system is applied to the ticket (PRT) verification is described below with reference to FIG. 71. The data transfer is performed among the entities in the order of the numbers shown in FIG. 71. The processing is described below according to the numbers.

(1) Issuing of Public Key Certificate (Cert. DM) of Device Manager (DM)

In response to a request from the device manager, the public key certificate (Cert. DM) is issued to the device manager by the certificate authority (CA) according to a certificate issuing procedure via the registration authority.

(2) Issuing Processing of Partition Registration Ticket (PRT)

The partition registration ticket (PRT) is issued to the partition manager (PM) by the partition registration ticket issuing means (PRT Ticket Issuer) managed by the device manager. In this case, for creating and verifying a public-key signature, a signature is created by the private key of the device manager (see FIG. 12) and is added to the PRT.

(3) Supply of PRT and DM Public Key Certificate (Cert. DM) to PM

The partition registration ticket (PRT) issued by the partition registration ticket issuing means (PRT Ticket Issuer) managed by the device manager is sent to the partition manager together with the DM public key certificate (Cert. DM).

(4) Mutual Authentication Between PM and Device

The common-key mutual authentication (see FIGS. 53 and 54) is performed between the device, which is to create a partition according to the issued PRT, and the partition manager (and more specifically, a reader/writer as the device access unit, which serves as a ticket user).

(5) Supply of PRT and DM Public Key Certificate (Cert. DM) to Device

After the mutual authentication has been successfully conducted between the PM and the device, the partition manager (PM) sends the partition registration ticket (PRT) and the DM public key certificate (Cert. DM) to the device.

The device has checked the following factors concerning the received partition registration ticket (PRT): (1) the public key certificate (CERT) of the ticket issuer (DM) is an authorized public key certificate (CERT) without being tampered with; (2) the code recorded in the option area of the public key certificate (CERT) of the ticket issuer coincides with the ticket issuing means code (PRTIC: PRT Issuer Code) recorded in the device DKDB (Device Key Definition Block)(PUB); (3) the ticket issuing means (Ticket Issuer) is not revoked; and (4) the ticket has not been tampered with by verifying the signature of the received ticket (PRT). The PRT user (PM: a reader/writer as the device access unit) is also verified (see FIGS. 57 and 58) by checking whether the identifier, the category, or the serial (SN) of the PRT user (in this case, PM: a reader/writer as the device access unit, which serves as a ticket user) stored in the PRT ticket coincides with the identifier, the category, or the serial (SN) recorded as the ID data (DN) of the partition-manager public key certificate to check that mutual authentication has been conducted.

(6) Creation of Partition

After the verification of the partition registration ticket (PRT) and the verification of the PRT issuer and the PRT user have succeeded, a partition is created in the device memory according to the rules indicated in the partition registration ticket (PRT) (see FIGS. 60 and 61).

(7) Writing of Key Data

After creating the partition in the device memory, various keys are stored in the created partition.

(8) Reading of Public Key (9) Issuing of Public Key Certificate

If the public key system is employed for performing authentication on the created partition for the use of services (partition creation, file creation, file access, and data updating), the device creates a key pair of a public key and a private key, sends the created public key to the partition manager, issues the public key certificate via the registration authority and the certificate authority, and stores the issued public key certificate in the partition key area (see FIG. 23). In this case, the public key certificate issued for the storage area of the created public key is stored. Steps (8) and (9) are executed when the public key system is employed for performing authentication on the created partition for the use of various services (partition creation, file creation, file access, data updating, etc.).

By performing the above-described processing, the partition creation processing according to the mutual authentication (common key) and ticket (PRT) verification (public key) is executed.

[B4.4. File Creation and Deletion Processing Using File Registration Ticket (FRT)]

Figure 72:
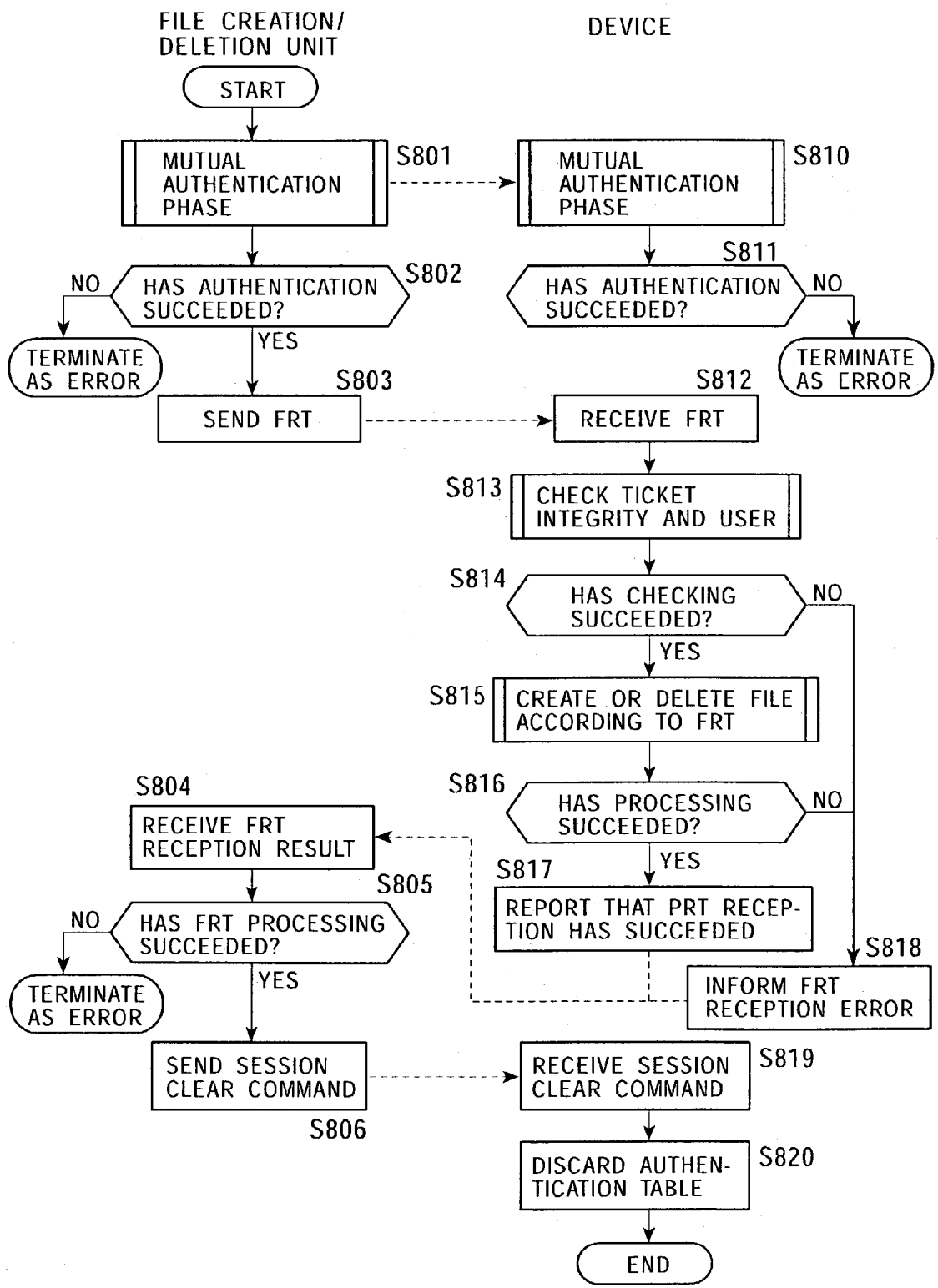
FIG. 72 is a flowchart illustrating file creation/deletion processing using a file registration ticket (FRT) in the system of the present invention.

A description is now given, with reference to the flow of FIG. 72 and the subsequent drawings, of the processing for creating or deleting a file in the partition generated in the device by applying the file registration ticket (FRT). The file creation/deletion processing includes mutual authentication processing (device authentication or partition authentication) between the device and the reader/writer (partition manager) as the device access unit and integrity verification processing of the partition registration ticket (FRT).

The file creation/deletion flow in FIG. 72 is described below. In FIG. 72, the processing of the file creation/deletion unit of the partition manager is shown at the left side, and the processing of the device (see FIG. 5) is shown at the right side. The file creation/deletion unit of the partition manager is a unit that can read and write data from and into the device (ex. a reader/writer or a PC as the device access unit) and corresponds to the reader/writer as the device access unit shown in FIG. 10. An overview of the file creation/deletion processing is discussed below with reference to FIG. 72, and then, details of the file creation/deletion processing included in the processing shown in FIG. 72 is discussed with reference to the flow of FIG. 73.

First, in steps S801 and S810 of FIG. 72, the mutual authentication processing is performed between the file creation/deletion unit and the device. Between the two means for performing data sending and receiving, it is first checked with each other whether they are authorized data communication means, and then, data transfer is performed according to the necessity. The mutual authentication processing is to check whether the other party is authorized data communication means. In the mutual authentication processing, a session key is created, and data is encrypted by using the session key as the common key. Then, the data is transferred.

As the mutual authentication processing, the partition authentication is performed, as has been discussed in the section of the partition creation/deletion processing. A common key system or a public key system is used for the file creation/deletion processing. The mutual authentication is similar to the processing discussed with reference to FIGS. 48 through 56, and an explanation thereof is thus omitted.

The processing to be executed as the mutual authentication processing is determined by:

Authentication Flag: the flag indicating whether mutual authentication with the device is required for using the ticket; and Authentication Type: the type of mutual authentication (public key authentication, common key authentication, or either type (Any)) of the device; of the file registration ticket (FRT) (see FIG. 27) to be used.

If the authentication processing has failed (No in steps S802 and S811), it means that it cannot be verified that the two means are authorized device and unit. Accordingly, the subsequent processing is not executed, and the process is terminated as an error.

If the authentication processing has succeeded, the file creation/deletion unit sends the file registration ticket (FRT) to the device. The file registration ticket (FRT) is the ticket issued by the file registration ticket (FRT) issuing means (FRT Issuer) managed by the partition manager. The file registration ticket (FRT) is the access control ticket for the device, and has the above-described data format configuration shown in FIG. 27.

When the file registration ticket (FRT) is sent to the ticket user, the public key certificate (CERT_FRTI) of the file registration ticket (FRT) issuing means (FRT Issuer) is also sent together if the public key system is employed. The attribute of the public key certificate (CERT_FRTI) of the FRT issuing means coincides with the identifier (FRTIC) of the file registration ticket (FRT) issuing means (FRT User).

Upon receiving the file registration ticket (FRT) (S812), the device verifies the integrity of the ticket (FRT) and also checks the user (S813). The integrity verification processing of the ticket is performed by using the MAC checking of the common key system or the signature verification processing of the public key system. The user checking is performed by verifying the integrity of the entity (ticket user) that has sent the ticket, and, after the mutual authentication has succeeded, it is determined whether the ID data of the entity and the ticket user identifier (see FIG. 27) recorded in the ticket coincide with each other. These processings are similar to the processings using the partition registration ticket (PRT) discussed with reference to FIGS. 57 through 59, and an explanation thereof is thus omitted.

In the device, if the integrity of the received ticket (FRT) and the authenticity of the user cannot be successfully verified (No in S814), a file registration ticket (FRT) reception error is reported to the file creation/deletion unit (S818). If the integrity of the ticket and the authenticity of the user are verified (Yes in S814), a file is created or deleted in the device memory according to the rules indicated in the received file registration ticket (FRT). Details of this processing are discussed below by using a different flow.

If the file creation/deletion processing has succeeded according to the description of the file registration ticket (FRT) (Yes in S816), it is reported to the file creation/deletion unit that the FRT reception has succeeded (S817). If the file creation/deletion processing has failed (No in S816), an FRT reception error is reported to the file creation/deletion unit (S818).

The file creation/deletion unit receives the FRT reception result (S804), and identifies the FRT processing result. If the FRT reception result indicates an error (No in S805), the process is terminated as an error. If the FRT reception result indicates a success (Yes in S805), a session clear command is sent and received (S806, S819). Then, the authentication table created in the device is discarded (S820), and the process is completed. The authentication table is created for the mutual authentication processing in steps S801 and S810, and has the configuration shown in FIG. 51 discussed in the section of the processing using the partition registration ticket (PRT).

As discussed above, by using the file registration ticket (FRT), a file is created in the partition set in the device or the created file is deleted from the partition in the device. The file creation and deletion processing (S815) included in the processing shown in FIG. 72 is described in detail below with reference to FIG. 73.

(File Creation/Deletion Processing)

Figure 73:
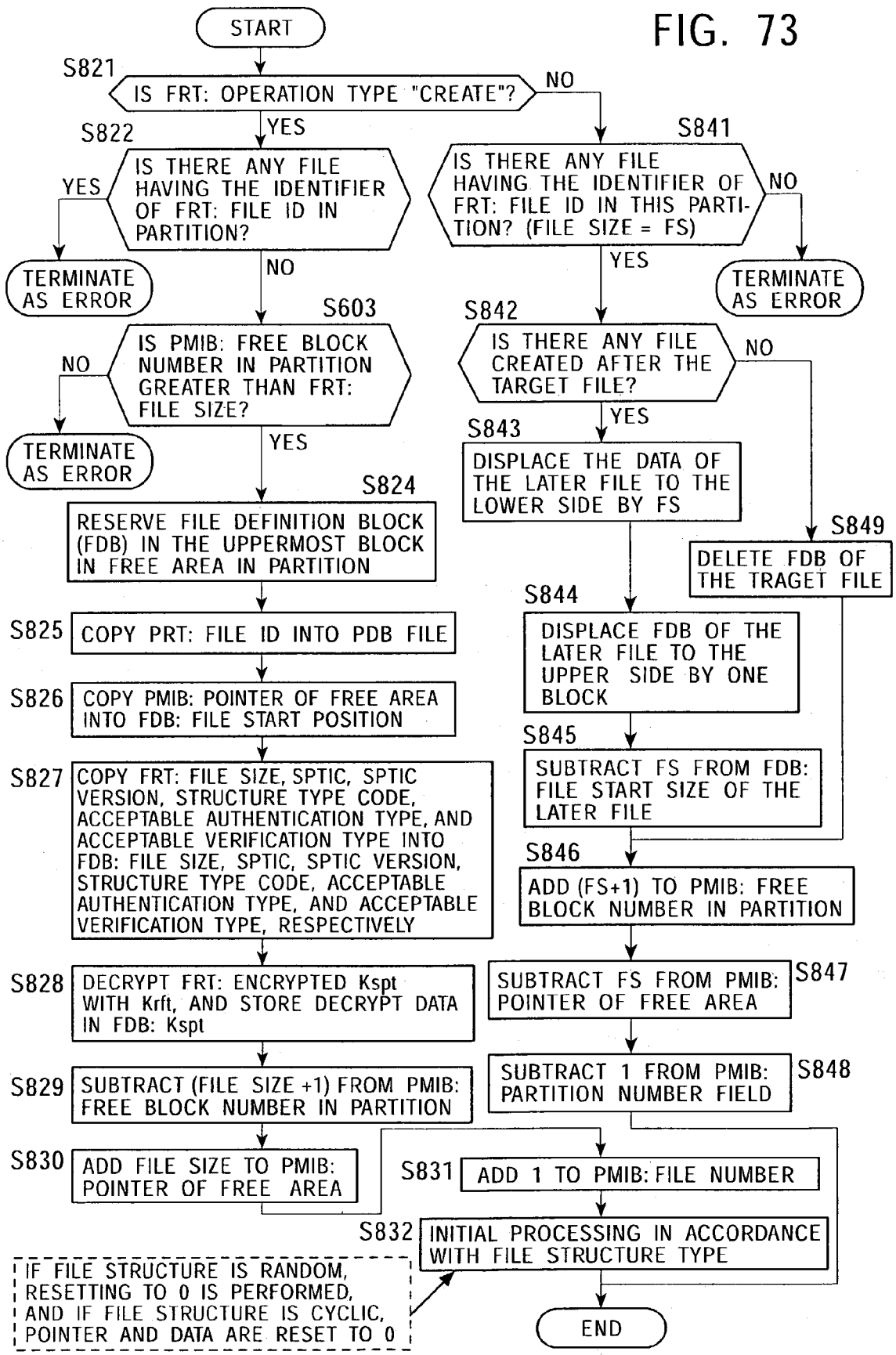
FIG. 73 is a flowchart illustrating file creation/deletion processing using a file registration ticket (FRT) in the system of the present invention.

Details of the partition creation/deletion processing based on the file registration ticket (FRT) performed in step S815 of the flow in FIG. 72 are described by using the processing flow of FIG. 73. The file creation/deletion processing is the processing performed by the device, which has received the file registration ticket (FRT) from the ticket user (ex. a reader/writer or a PC as the device access unit), based on the file registration ticket (FRT).

In step S821 of FIG. 73, the device checks the processing type recorded in the received file registration ticket (FRT), i.e., the operation type (indicating whether the partition is to be generated or deleted). If the operation type is file creation, step S822 and the subsequent steps are executed, and if the operation type is file deletion, step S841 and the subsequent steps are executed.

The file creation processing is as follows. In step S822, the device determines whether there is a file having the same ID as the file identifier (ID) indicated in the file registration ticket (FRT) in the partition to be processed by the device. This determination can be made by checking whether the same file ID as the file ID indicated in the received ticket (FRT) is recorded in the file definition block (see FIG. 24) of the partition area set in the device memory.

If there is a file having the same code (PMC) in the device, the file creation cannot be performed since the duplication of files having the same code in the same partition is not permitted, and the processing is terminated as an error. If there is no file having the same code in the partition to be processed, in step S823, the free block number in partition in the partition management information block (see FIG. 20) is compared with the file size indicated in the file registration ticket (FRT), and it is determined whether there is a free block area which is greater than or equal to the file size indicated in the ticket (FRT) in the partition to be processed by the device. If there is no free block area which is greater than or equal to the partition size, a file having the size indicated in the FRT cannot be created, and thus, the process is terminated as an error.

If it is determined that there is a free block area which is greater than or equal to the file size indicated in the ticket (FRT) in the corresponding partition of the device memory, the process proceeds to step S824. In step S824, the pointer of free area in the partition management information block is checked, and the file definition block (FDB) area (see FIG. 24) is reserved in the uppermost block of the free area in partition.

Then, the device copies the file ID indicated in the file registration ticket (FRT) into the reserved file definition block (FDB) area (S825), and also copies the pointer of free area of the partition management information block (see FIG. 20) into the file start position of the file definition block (FDB) area (S826).

In step S827, the device also copies the corresponding data indicated in the file registration ticket (FRT) into the file size, the service permission ticket issuing means code (SPTIC) and version thereof (SPTIC Version), the file structure type code, and the acceptable authentication type and the acceptable verification type used for performing file access of the file definition block (PDB).

Then, in step S828, Kspt_Encrypted (data Kfrt(Kspt) obtained by encrypting the MAC checking key Kspt of the service permission ticket (SPT) indicated in the file definition block with the MAC checking key Kfrt of the file registration ticket (FRT) of the corresponding partition) stored in the file registration ticket (FRT) is decrypted by using the MAC checking key Kfrt of the file registration ticket, and is stored in the file definition block (FDB). The MAC checking key Kfrt of the file registration ticket has been stored in the partition key area when the partition is created.

Then, in step S829, the device subtracts the file size +1 from the free block number in partition in the partition management information block (see FIG. 20), where +1 means a block for the file definition block (FDB).

Subsequently, in step S830, the device adds the file size to the pointer of free area in the partition management information block (see FIG. 20), and in step S831, the device adds 1, i.e., the number of created file (1), to the file number of the partition management information block.

Then, in step S832, the device performs initial processing according to the file structure (the file to be created) stored in the file registration ticket (FRT). For example, if the file structure is random, resetting to 0 is performed, and if the file structure is cyclic, the pointer and the data are set to 0. According to this processing, a new file is created in the generated partition.

The file deletion processing in steps S841 through S848 of FIG. 73 is described below. In step S841, it is determined whether there is a file having the same ID as the file ID indicated in the file registration ticket (FRT) in the corresponding partition of the device memory. This determination can be made by checking whether the same file ID as the file ID of the received ticket (FRT) is indicated in the file definition block (see FIG. 24) of the device memory.

If there is no file having the same file ID in the corresponding partition, the file cannot be deleted, and the process is terminated as an error. If there is a file having the same ID in the corresponding partition, it is determined in step S842 whether there is a file which has been created after the file to be deleted. If there is no file which has been created after the file to be deleted, the file to be deleted is the latest file, and the file definition block (FDB) (see FIG. 24) of the target file is deleted in step S849.

If it is determined in step S842 that there is a file which has been created after the file to be deleted in the corresponding partition, the data of the later file is displaced to the lower side by the size of the file (FS) to be deleted (S843), and the file definition block (FDB) of the later file is displaced to the upper side by one block (S844). Moreover, the size of the file to be deleted (FS) is subtracted from the file start position recorded in the file definition block (FDB) of the later file (S845).

After the processing of step S845 or S849, in step S846, the size of the file to be deleted (FS) +1 is added to the free block number in partition of the partition management information block (PMIB) (see FIG. 20), where +1 means a block for the file definition block of the file to be deleted.

Subsequently, in step S847, the size of the file to be deleted (FS) is subtracted from the value of the pointer of free area in the partition management information block (PMIB) (see FIG. 20). In step S848, 1, i.e., the number of deleted file (1), is subtracted from the file number of the partition management information block (PMIB) (see FIG. 20), and then, the file deletion processing based on the file registration ticket (FRT) is completed.

The foregoing processing is the file creation/deletion processing based on the file registration ticket (FRT) in step S815 of the processing flow of FIG. 72.

Figure 74:
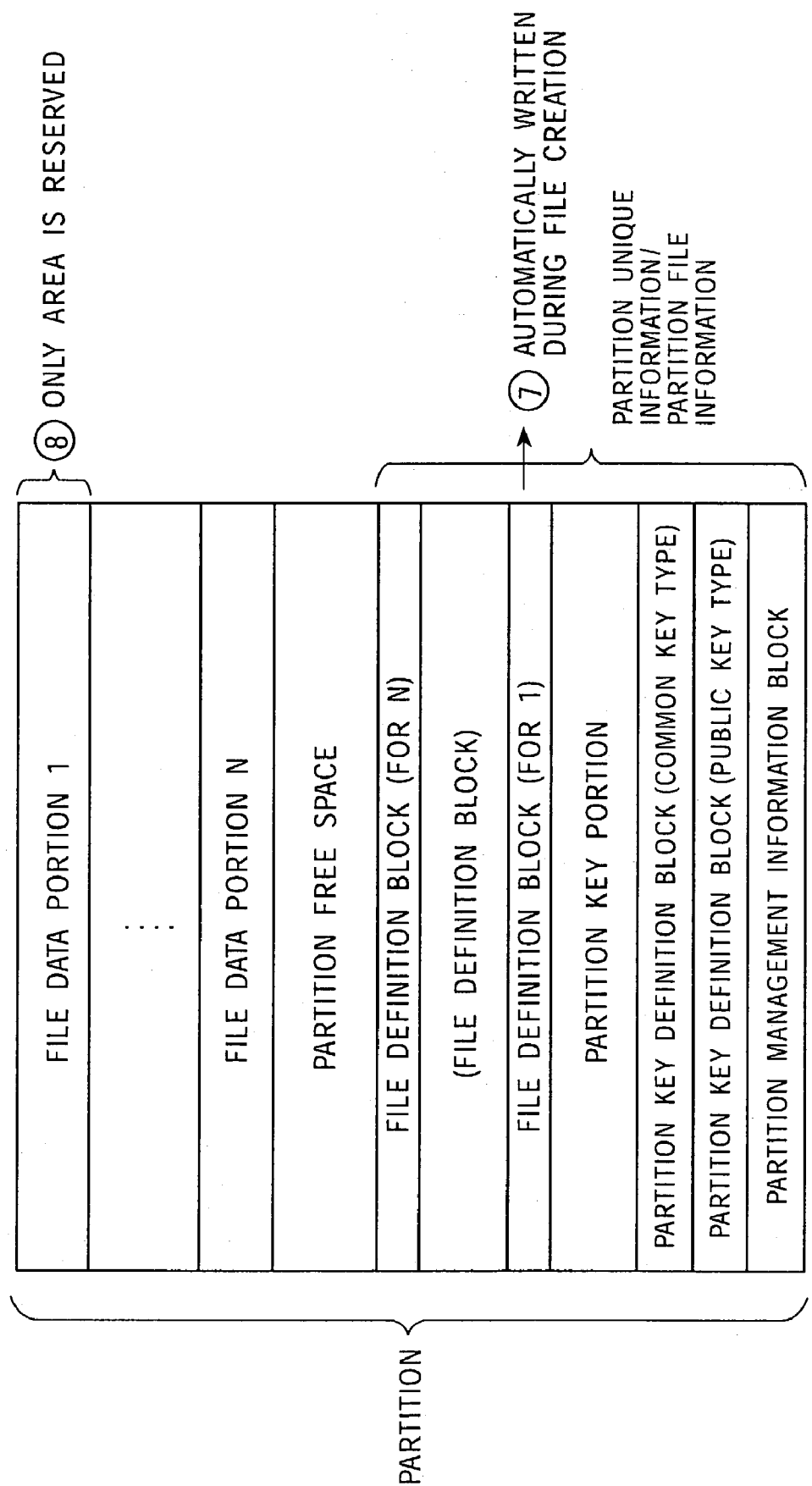
FIG. 74 is a diagram illustrating data stored in the device after a file is created by using a file registration ticket (FRT) in the system of the present invention.

An example of the data configuration stored in the device memory when the file creation processing by the partition manager is finished is shown in FIG. 74. In the partition area shown in FIG. 74, the data in the following block and area are written during the file creation or the partition creation:

file definition block (1-N);
partition key area;
common-key partition key information block (partition key definition block(Common));
public-key partition key information block (partition key definition block(PUB)); and
partition management information block. The file area (file data area 1-N) is reserved in the corresponding partition by the file creation processing.

[B4.5. Processing Procedure in Each File Creation Processing Method]

In the above-described file setting registration processing, mutual authentication is conducted between the device and the reader/writer as the device access unit, which serves as a file registration ticket user, managed by the partition manager, and a file is set based on the file registration ticket (FRT). There are two types of mutual authentication modes, i.e., the public-key mutual authentication and the common-key mutual authentication. There are also two types of ticket (FRT) verification processing modes, i.e., the public-key signature verification and the common-key MAC checking. That is, the following four processing modes are primarily provided:

(A) mutual authentication (public key) and ticket (FRT) verification (public key);

(B) mutual authentication (public key) and ticket (FRT) verification (common key);

(C) mutual authentication (common key) and ticket (FRT) verification (common key); and (D) mutual authentication (common key) and ticket (FRT) verification (public key).

The four processing modes are briefly discussed with reference to the drawings by emphasizing the data transfer processing executed among the entities, such as the certificate authority (CA(PM)), the partition manager (PM), and the device.

(A) Mutual Authentication (Public Key) and Ticket (FRT) Verification (Public Key)

Figure 75:
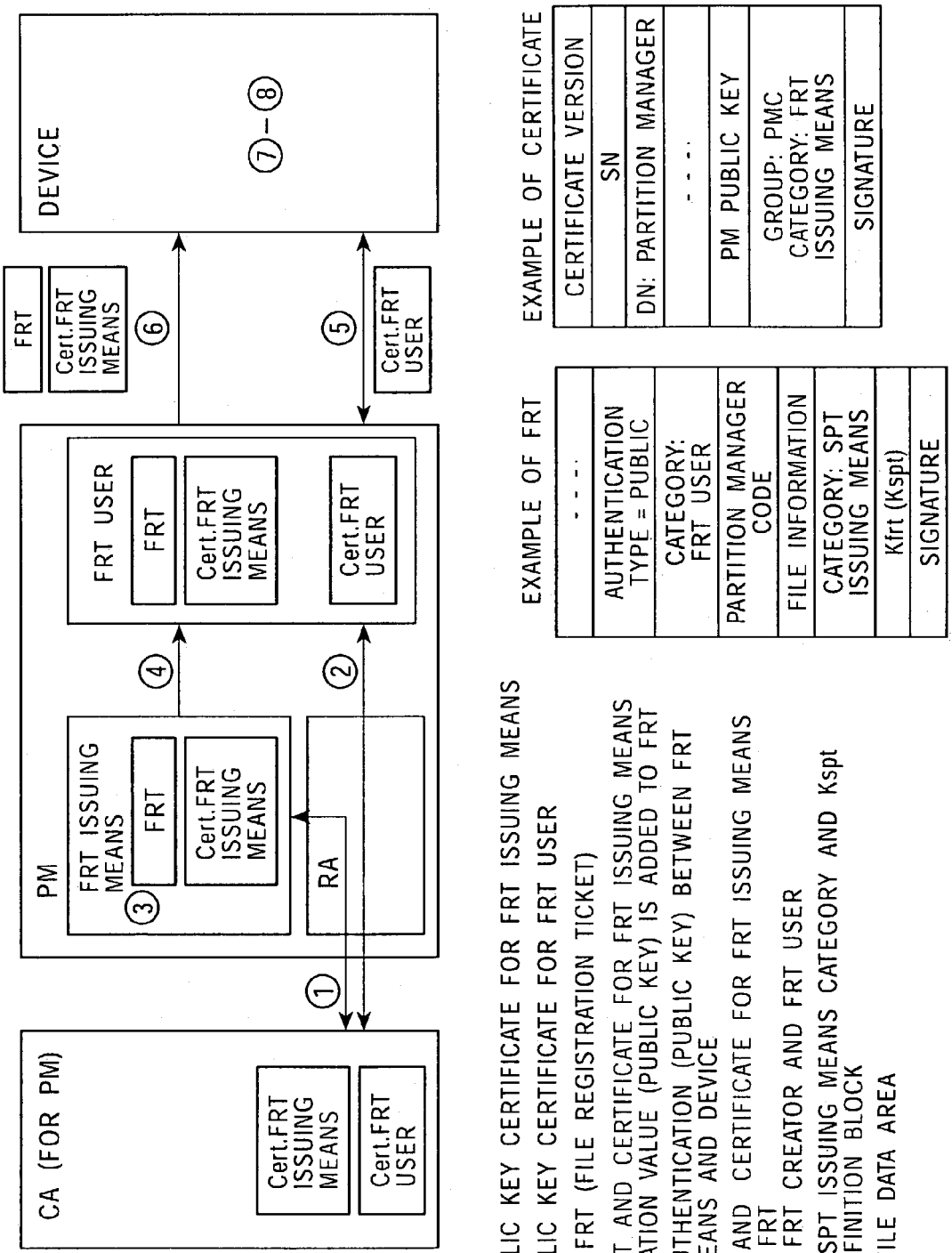
FIG. 75 is a diagram illustrating file creation processing using a file registration ticket (FRT) in the system of the present invention when public-key authentication and public-key ticket verification are performed.

A description is first given, with reference to FIG. 75, of the data transfer performed among the entities when the public key system is used for mutual authentication processing and the public key system is used for ticket (FRT) verification.

The data transfer is performed among the entities in the order of the numbers shown in FIG. 75. The processing is described below according to the numbers.

(1) Issuing of Public Key Certificate (Cert. FRT Issuer) of File Registration Ticket Issuing Means (FRT Issuer)

In response to a request from the file registration ticket issuing means (FRT Issuer), the public key certificate (Cert. FRT Issuer) of the file registration ticket issuing means (FRT Issuer) is issued by the partition certificate authority (CA (PAR)) according to a certificate issuing procedure via the registration authority (RA). The partition manager may serve as the file registration ticket issuing means (FRT Issuer), in which case, the public key certificate of the partition manager (PM) can be used as the public key certificate of the file registration ticket issuing means (FRT User).

(2) Issuing of Public Key Certificate (Cert. FRT User) of File Registration Ticket User (FRT User)

In response to a request from the file registration ticket user (FRT User: and more specifically, a reader/writer as the device access unit that sends a ticket to the device), the public key certificate (Cert. FRT User) of the file registration ticket user (FRT User) is issued by the partition certificate authority (CA(PAR)) according to a certificate issuing procedure via the registration authority (RA). The partition manager may serve as the file registration ticket user (FRT User), in which case, the public key certificate of the partition manager (PM) can be used as the public key certificate of the file registration ticket user (FRT User).

(3) Creation Processing of File Registration Ticket (FRT)

The file registration ticket (FRT) is created by the file registration ticket (FRT) issuing means (FRT Ticket Issuer) managed by the partition manager. In this case, for creating and verifying the public-key signature, the signature is created by the private key of the file registration ticket issuing means (FRT Ticket Issuer) (see FIG. 12), and is added to the FRT.

(4) Supply of FRT and Public Key Certificate (Cert. FRT Issuer) of File Registration Ticket Issuing Means (FRT Ticket Issuer) to File Registration Ticket User (FRT User)

The file registration ticket (FRT) issued by the file registration ticket issuing means (FRT Ticket Issuer) managed by the partition manager is supplied to the file registration ticket user (FRT User), i.e., the unit (ex. a reader/writer as the device access unit) that sends the ticket to the device, together with the public key certificate (Cert. FRT Issuer) of the file registration ticket issuing means (FRT Ticket Issuer).

(5) Mutual Authentication Between File Registration Ticket Issuing Means and Device The partition manager (and more specifically, a reader/writer as the device access unit, which serves as the file registration ticket user (FRT User)) sends the public key certificate (Cert. FRT User) of the ticket user (FRT User) to the device, which is to generate a file according to the file registration ticket (FRT) issued by the file registration ticket issuing means (FRT Ticket Issuer), thereby performing public-key mutual authentication (see FIG. 50).

(6) Supply of FRT and Public Key Certificate (Cert. FRT Issuer) of File Registration Ticket Issuing Means (FRT Ticket Issuer) to Device After the mutual authentication has been successfully conducted between the partition manager (PM) and the device, the partition manager (PM) (and more specifically, a reader/writer as the device access unit, which serves as the file registration ticket user (FRT User)) sends the file registration ticket (FRT) and the public key certificate (Cert. FRT Issuer) of the file registration ticket issuing means (FRT Ticket Issuer) to the device.

The device has checked the following factors concerning the received file registration ticket (FRT): (1) the public key certificate (CERT FRT Issuer) of the ticket issuer is an authorized public key certificate (CERT) without being tampered with; (2) the code recorded in the option area of the public key certificate (CERT FRT Issuer) of the ticket issuer coincides with the ticket issuing means code (FRTIC: FRT Issuer Category) recorded in the device PKDB (Partition Key Definition Block)(PUB); (3) the ticket issuing means (Ticket Issuer) is not revoked; and (4) the ticket has not been tampered with by verifying the signature of the received ticket (FRT). The FRT user (a reader/writer as the device access unit) is also verified (see FIGS. 57 and 58) by verifying whether mutual authentication has been conducted by checking whether the identifier, the category, or the serial (SN) name of the FRT user (a reader/writer as the device access unit, which serves as the ticket user) stored in the FRT ticket coincides with the identifier, the category, or the serial (SN) name recorded as the ID data (DN) of the public key certificate (Cert. FRT User) of the ticket user (FRT User).

(7) Registration of SPTIC and Kspt in FDB

The device registers the service permission ticket (STP) user (SPTIC) (ex. a reader/writer as the device access unit that accesses the data in the device file) and Kspt (the MAC checking key (Kspt) of the service permission ticket (SPT)) in the file definition block (FDB) (see steps S827 and S828 of the flow in FIG. 73).

(8) Reservation of File Data Area

The device reserves a file area having the size indicated in the file registration ticket (FRT) in the corresponding partition.

By performing the above-described processing, the file creation processing in accordance with the mutual authentication (public key) and ticket (FRT) verification (public key) can be executed.

(B) Mutual Authentication (Public Key) and Ticket (FRT) Verification (Common Key)

The data transfer performed among the entities when the public key system is applied to the mutual authentication processing and the common key system is applied to the ticket (FRT) verification is described below with reference to FIG. 76.

Figure 76:
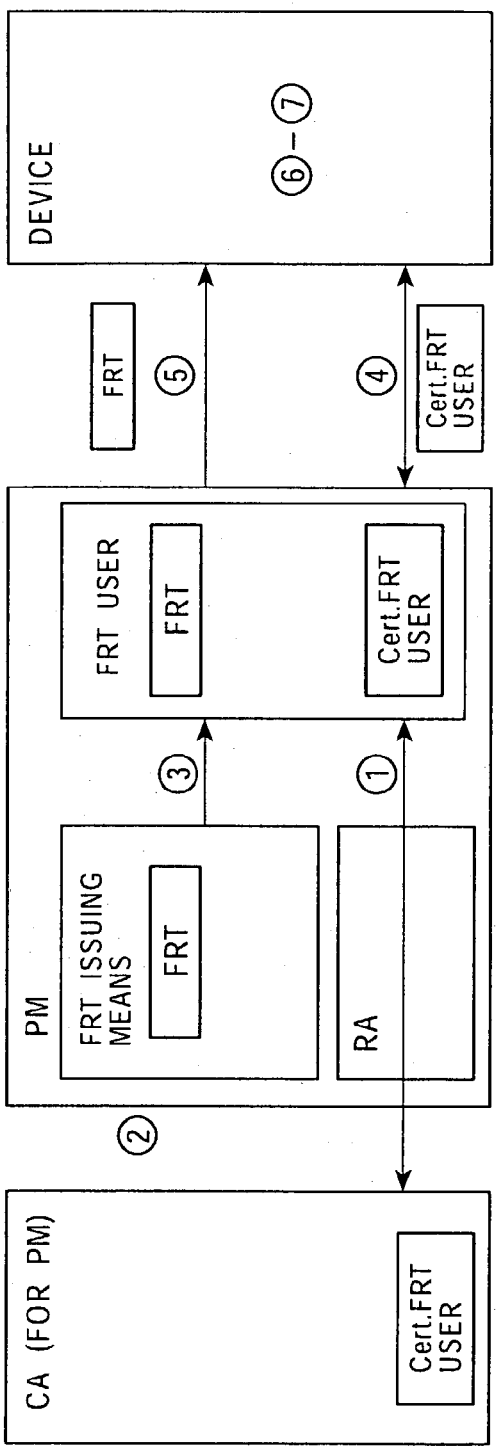
FIG. 76 is a diagram illustrating file creation processing using a file registration ticket (FRT) in the system of the present invention when public-key authentication and common-key ticket verification are performed.

The data transfer is performed among the entities in the order of the numbers shown in FIG. 76. The processing is discussed below according to the numbers.

(1) Issuing of Public Key Certificate (Cert. FRT User) of File Registration Ticket User (FRT User)

In response to a request from the file registration ticket user (FRT User: and more specifically, a reader/writer as the device access unit that sends the ticket to the device), the public key certificate (Cert. FRT User) of the file registration ticket user (FRT User) is issued by the partition certificate authority (CA(PAR)) according to a certificate issuing procedure via the registration authority (RA). The partition manager may serve as the file registration ticket user (FRT User), in which case, the public key certificate of the partition manager (PM) can be used as the public key certificate of the file registration ticket user (FRT User).

(2) Creation Processing of File Registration Ticket (FRT)

The file registration ticket (FRT) is created by the file registration ticket issuing means (FRT Ticket Issuer) managed by the partition manager. In this case, the MAC (Message Authentication Code) (see FIG. 59) is added to the FRT as the common-key verification value.

(3) Supply of FRT to File Registration Ticket User (FRT User)

The file registration ticket (FRT) issued by the file registration ticket issuing means (FRT Ticket Issuer) managed by the partition manager is supplied to the file registration ticket user (FRT User), namely, to the unit (ex. a reader/writer as the device access unit) that sends the ticket to the device.

(4) Mutual Authentication Between File Registration Ticket Issuing Means and Device The partition manager (and more specifically, a reader/writer as the device access unit, which serves as the file registration ticket user (FRT User)) sends the public key certificate (Cert. FRT User) of the ticket user (FRT User) to the device, which is to generate a file according to the file registration ticket (FRT) issued by the file registration ticket issuing means (FRT Ticket Issuer), thereby performing public-key mutual authentication (see FIG. 50).

(5) Supply of FRT to Device

After the mutual authentication between the partition manager (PM) and the device has been successfully conducted, the partition manager (PM) (and more specifically, a reader/writer as the device access unit, which serves as the file registration ticket user (FRT User)) sends the file registration ticket (FRT) to the device. The device performs MAC verification for the received file registration ticket (FRT), and verifies the FRT issuer. The device also verifies the FRT user (PM: a reader/writer as the device access unit) (see FIGS. 57 and 58) by determining whether mutual authentication has been conducted by checking whether the identifier, the category, or the serial (SN) name of the FRT user (a reader/writer as the device access unit, which serves as the ticket user) stored in the FRT ticket coincides with the identifier, the category, or the serial (SN) name recorded as the ID data (DN) of the public key certificate of the partition manager.

(6) Registration of SPTIC and Kspt in FDB

The device registers the service permission ticket (STP) issuer category (SPTIC) (ex. a reader/writer as the device access unit that accesses the data in the device file) and Kspt (the MAC checking key (Kspt) of the service permission ticket (SPT)) in the file definition block (FDB) (see steps S827 and S828 of the flow in FIG. 73).

(8) Reservation of File Data Area

The device reserves a file area having the size indicated in the file registration ticket (FRT) in the corresponding partition.

By performing the above-described processing, the file creation processing according to the mutual authentication (public key) and ticket (FRT) verification (common key) can be executed.

(C) Mutual authentication (Common Key) and Ticket (FRT) Verification (Common Key)

The data transfer performed among the entities when the common key system is applied to the mutual authentication processing and the common key system is applied to ticket (FRT) verification is described below with reference to FIG. 77.

Figure 77:
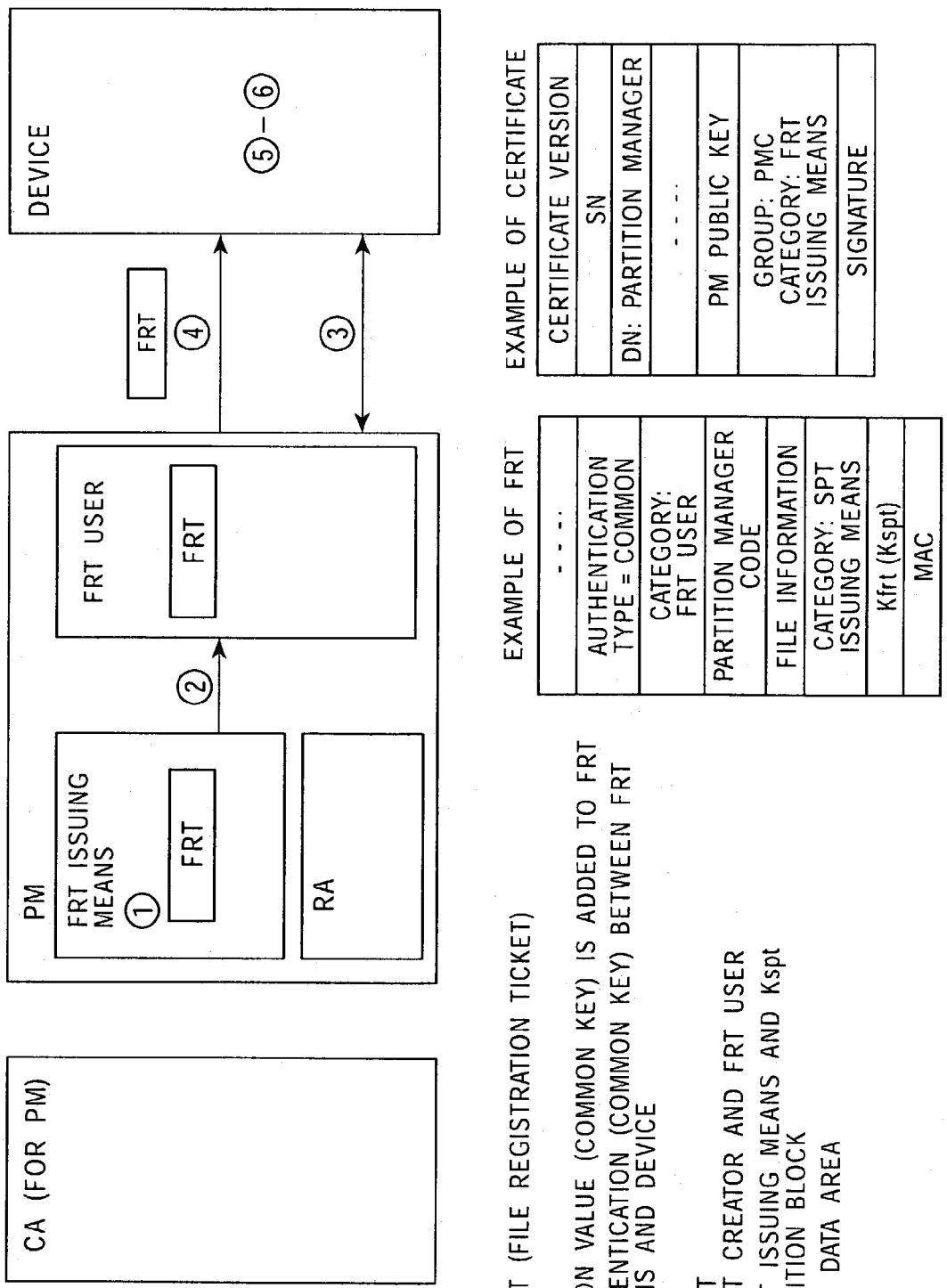
FIG. 77 is a diagram illustrating file creation processing using a file registration ticket (FRT) in the system of the present invention when common-key authentication and common-key ticket verification are performed.

The data transfer is performed among the entities in the order of the numbers indicated in FIG. 77. The processing is described according to the numbers.

(1) Issuing Processing of File Registration Ticket (FRT)

The file registration ticket (FRT) is issued by the file registration ticket issuing means (FRT Ticket Issuer) managed by the partition manager. In this case, the MAC (Message Authentication Code) (see FIG. 59) is added to the FRT as the common-key verification value.

(2) Supply of FRT to File Registration Ticket User (FRT User)

The file registration ticket (FRT) issued by the file registration ticket issuing means (FRT Ticket Issuer) managed by the partition manager is sent to the file registration ticket user (FRT User), namely, to the unit (ex. a reader/writer as the device access unit) that sends the ticket to the device.

(3) Mutual Authentication Between File Registration Ticket Issuing Means and Device The partition manager (and more specifically, a reader/writer as the device access unit, which serves as the file registration ticket user (FRT User)), performs the common-key mutual authentication (see FIGS. 53 and 54) with the device, which is to generate a file according to the file registration ticket (FRT) issued by the file registration ticket issuing means (FRT Ticket Issuer).

(4) Supply of FRT to Device

After the mutual authentication between the partition manager (PM) and the device has been successfully conducted, the partition manager (PM) (and more specifically, a reader/writer as the device access unit, which serves as the file registration ticket user (FRT User)) sends the file registration ticket (FRT) to the device. The device performs MAC verification for the received file registration ticket (FRT), and verifies the FRT issuer. The device also verifies the FRT user (PM: a reader/writer as the device access unit) (see FIGS. 57 and 58) by determining whether mutual authentication has been conducted by checking whether the identifier of the FRT user (a reader/writer as the device access unit, which serves as a ticket user) stored in the FRT ticket coincides with the received identifier of the partition manager.

(6) Registration of SPTIC and Kspt in FDB

The device registers the service permission ticket (STP) issuer category (SPTIC) (ex. a reader/writer as the device access unit that accesses the data in the device file) and Kspt (the MAC checking key (Kspt) of the service permission ticket (SPT)) in the file definition block (FDB) (see steps S827 and S828 of the flow in FIG. 73).

(8) Reservation of File Data Area

The device reserves a file area having the size indicated in the file registration ticket (FRT) in the corresponding partition.

By performing the above-described processing, the file creation processing according to the mutual authentication (common key) and ticket (FRT) verification (common key) is executed.

(D) Mutual Authentication (Common Key) and Ticket (FRT) Verification (Public Key)

The data transfer performed among the entities when the common key system is applied to the mutual authentication processing and the public key system is applied to the ticket (FRT) verification is described below with reference to FIG. 78.

Figure 78:
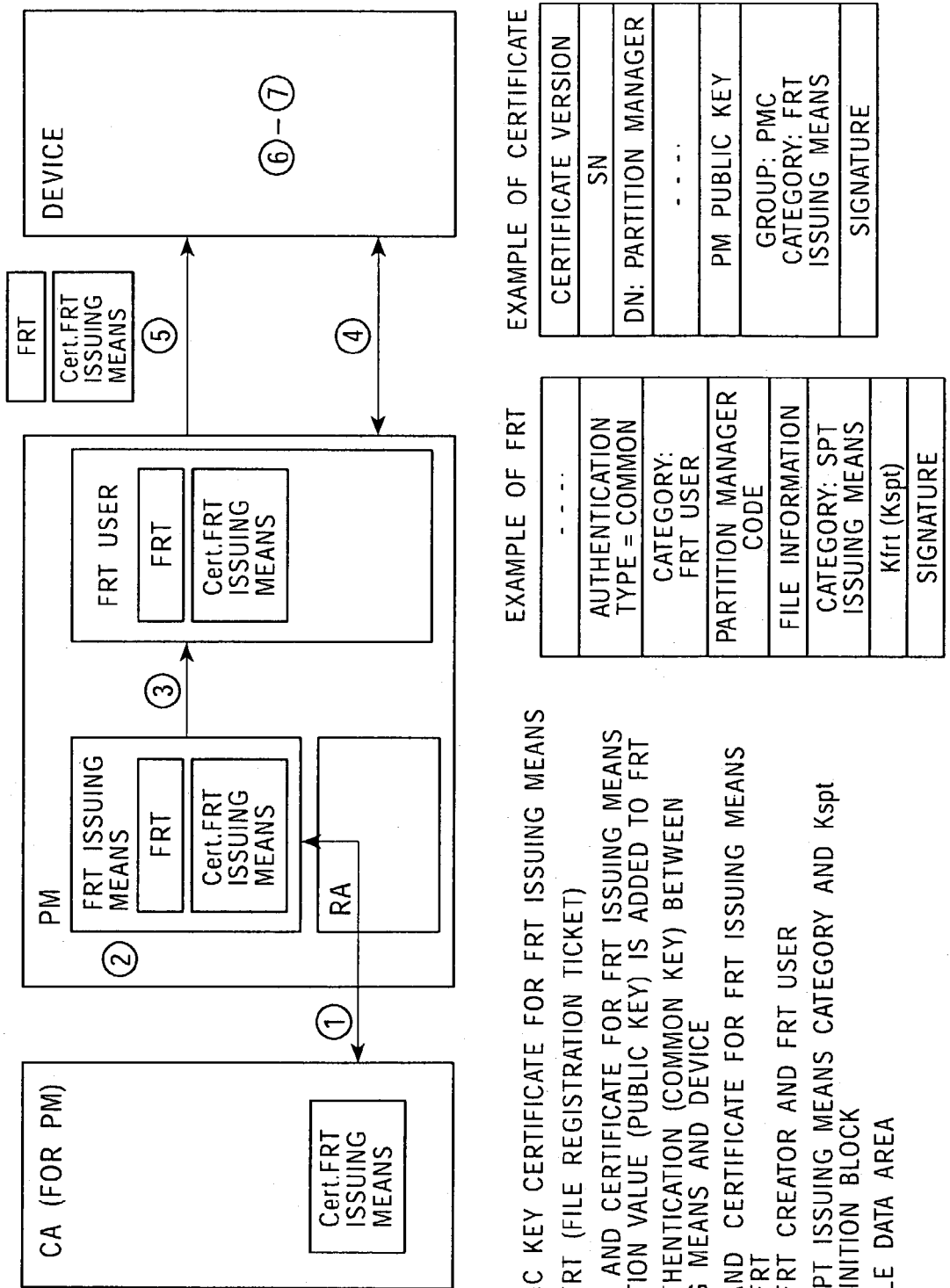
FIG. 78 is a diagram illustrating file creation processing using a file registration ticket (FRT) in the system of the present invention when common-key authentication and public-key ticket verification are performed.

The data transfer is performed among the entities in the order of the numbers shown in FIG. 78. The processing is described below according to the numbers.

(1) Issuing of Public Key Certificate (Cert. FRT Issuer) of File Registration Ticket Issuing Means (FRT Issuer)

In response to a request from the file registration ticket issuing means (FRT Issuer), the public key certificate (Cert. FRT Issuer) of the file registration ticket issuing means (FRT Issuer) is issued by the partition certificate authority (CA (PAR)) according to a certificate issuing procedure via the registration authority (RA). The partition manager may serve as the file registration ticket issuing means (FRT Issuer), in which case, the public key certificate of the partition manager (PM) can be used as the public key certificate of the file registration ticket issuing means (FRT User).

(2) Creation Processing of File Registration Ticket (FRT)

The file registration ticket (FRT) is created by the file registration ticket (FRT) issuing means (FRT Ticket Issuer) managed by the partition manager. In this case, for creating and verifying the public-key signature, the signature is created by the private key of the file registration ticket issuing means (FRT Ticket Issuer) (see FIG. 12), and is added to the FRT.

(3) Supply of FRT and Public Key Certificate (Cert. FRT Issuer) issued by File Registration Ticket Issuing Means (FRT Ticket Issuer) to File Registration Ticket User (FRT User)

The file registration ticket (FRT) issued by the file registration ticket issuing means (FRT Ticket Issuer) managed by the partition manager is sent to the file registration ticket user (FRT User), i.e., to the unit (ex. a reader/writer as the device access unit) that sends the ticket to the device, together with the public key certificate (Cert. FRT Issuer) of the file registration ticket issuing means (FRT Ticket Issuer).

(4) Mutual Authentication Between File Registration Ticket Issuing Means and Device The partition manager (and more specifically, a reader/writer as the device access unit, which serves as the file registration ticket user (FRT User)) performs the common-key mutual authentication (see FIGS. 53 and 54) with the device, which is to generate a file according to the file registration ticket (FRT) issued by the file registration ticket issuing means (FRT Ticket Issuer).

(5) Supply of PRT and Public Key Certificate (Cert. FRT Issuer) of File Registration Ticket Issuing Means (FRT Ticket Issuer) to Device After the mutual authentication has been successfully conducted between the partition manager (PM) and the device, the partition manager (PM) (and more specifically, a reader/writer as the device access unit, which serves as the file registration ticket user (FRT User)) sends the file registration ticket (FRT) and the public key certificate (Cert. FRT Issuer) of the file registration ticket issuing means (FRT Ticket Issuer) to the device.

The device has checked the following factors concerning the received file registration ticket (FRT): (1) the public key certificate (CERT FRT Issuer) of the ticket issuer is an authorized public key certificate (CERT) without being tampered with; (2) the code recorded in the option area of the public key certificate (CERT FRT Issuer) of the ticket issuer coincides with the ticket issuing means code (FRTIC: FRT Issuer Category) recorded in the device PKDB (Partition Key Definition Block)(PUB); (3) the ticket issuing means (Ticket Issuer) is not revoked; and (4) the ticket has not been tampered with by verifying the signature of the received ticket (FRT). The FRT user (a reader/writer as the device access unit) is also verified (see FIGS. 57 and 58) by determining whether mutual authentication has been conducted by checking whether the identifier of the FRT user (a reader/writer as the device access unit, which serves as a ticket user) stored in the FRT ticket coincides with the identifier of the ticket user (FRT User).

(6) Registration of SPTIC and Kspt in FDB

The device registers the service permission ticket (STP) issuer category (SPTIC) (ex. a reader/writer as the device access unit that accesses the data in the device file) and Kspt (the MAC checking key (Kspt) of the service permission ticket (SPT)) in the file definition block (FDB) (see steps S827 and S828 of the flow in FIG. 73).

(7) Reservation of File Data Area

The device reserves a file area having the size indicated in the file registration ticket (FRT) in the corresponding partition.

By performing the above-described processing, the file creation processing according to the mutual authentication (common key) and ticket (FRT) verification (public key) can be executed.

[B4.6. Service (File Access) Processing Using Service Permission Ticket (SPT)]

The file access processing using the service permission ticket (SPT) (see FIGS. 28 and 31) is described below with reference to the flow of FIG. 79 and the other drawings. The file access processing includes mutual authentication processing (device authentication or partition authentication) between the device and the file access unit, and the integrity verification processing of the service permission ticket (SPT).

Figure 79:
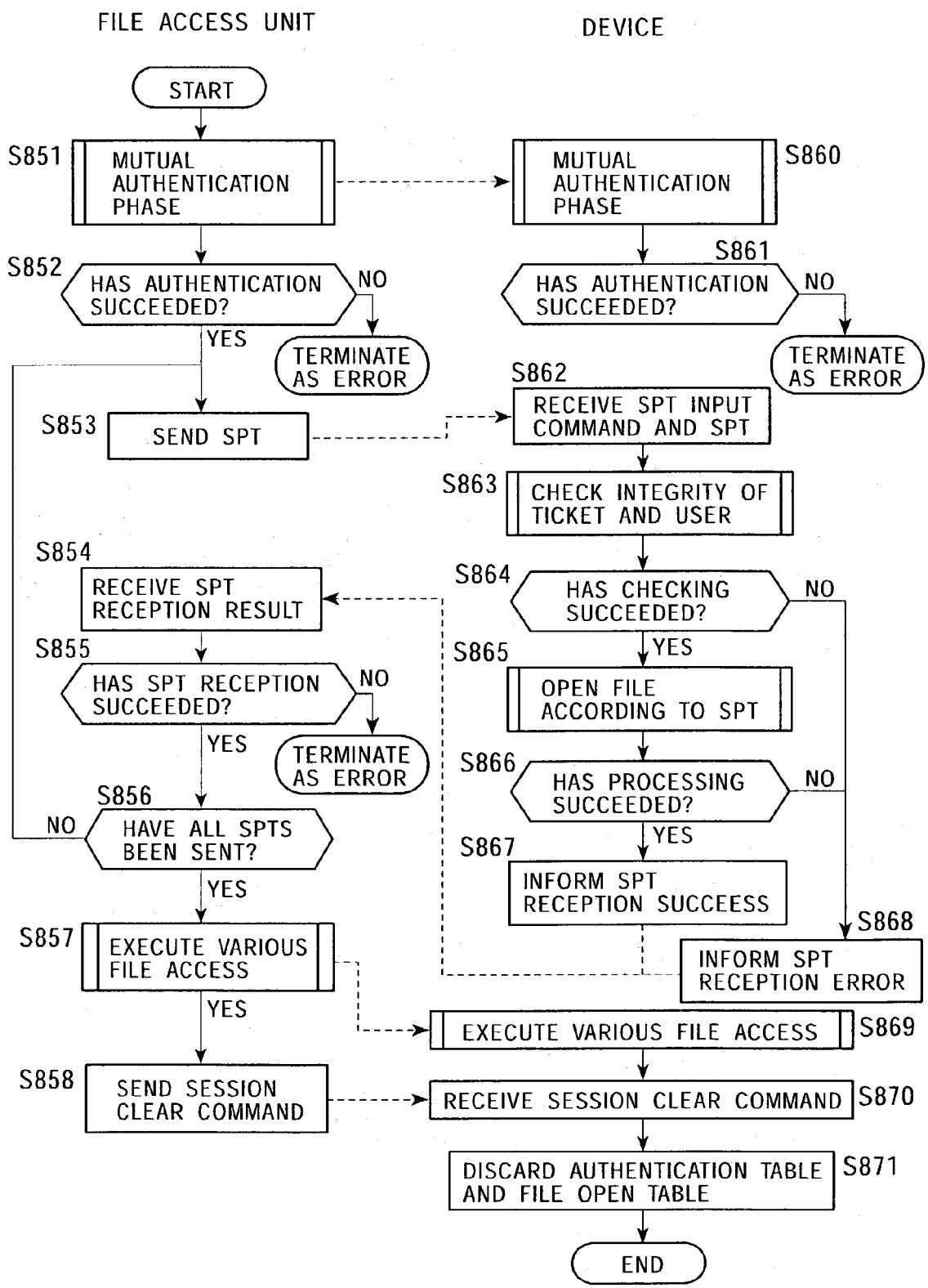
FIG. 79 is a flowchart illustrating file access processing using a service permission ticket (SPT) in the system of the present invention.

In the flow of FIG. 79, the processing of the file access unit is shown at the left side, and the processing of the device (see FIG. 5) is shown at the right side. The file access unit is the management unit of the partition manager, and is the unit (ex. a reader/writer or a PC as the device access unit) which is able to read and write data from and into the device, and corresponds to the reader/writer as the device access unit shown in FIG. 10. An overview of the file access processing performed by the file access unit is described below with reference to FIG. 79, and then, details of the individual processings included in the file access processing are sequentially discussed with reference to the flow of FIG. 80 and the subsequent drawings.

In steps S851 and S860, mutual authentication processing is first performed between the file access unit and the device. Between the two means for performing data sending and receiving, it is first checked with each other whether they are authorized data communication means, and then, data transfer is performed according to the necessity. The mutual authentication processing is to check whether the other party is authorized data communication means. In the mutual authentication processing, a session key is created, and data is encrypted by using the session key as the common key. Then, the data is transferred.

In the mutual authentication processing, partition authentication is performed, as has been discussed in the section of the partition creation/deletion processing. Either the common-key authentication or the public-key authentication is used for the mutual authentication processing. This mutual authentication processing is similar to that described with reference to FIGS. 48 through 56, and an explanation thereof is thus omitted.

The processing to be executed as the mutual authentication processing is determined by:

Authentication Flag: the flag indicating whether mutual authentication with the device is required for using the ticket; and Authentication Type: the type of mutual authentication (public key authentication, common key authentication, or either type (Any)) of the device; of the service permission ticket (SPT) (see FIGS. 28 and 31) to be used.

If authentication processing has failed (No in step S852 or S861), it means that it cannot be verified that the two means are authorized device and unit. Accordingly, the subsequent processing is not executed, and the process is terminated as an error.

The device is also able to perform processing so that access to files in a plurality of different partitions can be made based on a plurality of service permission tickets (SPTs). For example, access can be made to files in a plurality of different partitions based on a plurality of service permission tickets (SPTs) on condition that device authentication has been successfully conducted. The file access rules in each partition are indicated in the service permission ticket (SPT) to be configured as the access control data. The device receives a plurality of service permission tickets (SPTs) from the access unit, and if each ticket indicates that device authentication is required, file access in each partition is allowed on condition that device authentication has been successfully conducted according to the rules.

If the authentication conditions are different among the plurality of service permission tickets (SPTs), access can be made to designated files in the plurality of service permission tickets (SPTs) on condition that partition authentication set in each service permission ticket (SPT) has been successfully conducted.

Subsequently, in step S853, the file access unit sends the service permission ticket (SPT) to the device. The service permission ticket (SPT) is the ticket issued by the service permission ticket (SPT) issuing means (SPT Issuer) managed by the partition manager. The service permission ticket (SPT) is the access control ticket for the device, and has the format configuration shown in FIGS. 28 and 31.

When sending the service permission ticket (SPT) to the ticket user, the public key certificate (CERT_SPTI) of the service permission ticket (SPT) issuing means (SPT Issuer) is sent together if the public key system is employed. The attribute of the public key certificate (CERT_SPTI) of the SPT issuing means coincides with the ticket issuing means code (SPTIC) recorded in FDB (File Definition Block) in the device.

Upon receiving the file registration ticket (SPT) (S862), the device checks the integrity of the received ticket (SPT) and the user (S863). The integrity checking of the ticket is performed by using the MAC checking of the common key system or the signature verification of the public key system. The user checking is to check the integrity of the unit (ticket user) that has sent the ticket. The user checking is performed by determining whether mutual authentication has been conducted by checking the consistency of the ID data of the unit to be authenticated and the ticket user identifier (see FIGS. 28 and 31) recorded in the ticket. These processings are similar to those discussed with reference to FIGS. 57 through 59, as has been discussed in the section of the partition registration ticket (PRT), and an explanation thereof is thus omitted.

After the verification processing of the received ticket (SPT) and the user, if it cannot be determined that the ticket and the user are authorized ticket and user (No in step S864), the device sends a service permission ticket (SPT) reception error to the file access unit (S868). If it can be determined that the ticket and the user are authorized ticket and user (Yes in S864), the file stored in the device memory is opened according to the rules indicated in the received service permission ticket (SPT). Details of the file open processing are described below by using a different flow.

If the file open processing has succeeded according to the description recorded in the service permission ticket (SPT) (Yes in S866), an SPT reception success is informed to the file access unit (S867). If the file open processing has failed (No in S866), an SPT reception error is informed to the file access unit (S868).

The file access unit receives the SPT reception result (S854), and determines the SPT processing result. If the SPT reception result indicates an error (No in S855), the file access unit terminates the process as an error. If the SPT reception result indicates a success (Yes in S855), the file access unit determines whether all the SPTs have been sent (S856). If there is an SPT to be sent, step S853 and the subsequent steps are repeated.

If all the SPTs have been sent, the file access is performed according to the service permission ticket (SPT) in steps S857 and S869. Upon completion of the file access processing, a session clear command is sent and received (S858 and S870), and the authentication table created in the device is discarded (S871). The process is then completed. Details of the file access processing are described below by using a different flow. The authentication table is the table created in the mutual authentication processing in steps S851 and S860, and has the configuration similar to that shown in FIG. 51, as has been discussed in the section of the partition registration ticket (PRT).

As described above, access can be made to a file in a partition set in the device by using the service permission ticket (SPT). The file open processing (S865) and various file access processing (S857 and S869) included in the file access processing are described below.

(File Open Processing)

The file open processing (S865 in FIG. 79) is described below with reference to the flow of FIG. 80. The file open processing is the processing executed by the device according to the received service permission ticket (SPT).

In step S881, the device determines whether the file specified in the received service permission ticket (SPT) has been created and is present in the device. The file ID (see FIGS. 28 and 31) of the file to be processed is recorded in the service permission ticket (SPT), and the file definition block (FIG. 24), for example, is checked for the presence of a file having the same ID as the ID recorded in the service permission ticket (SPT). If there is no file having the same ID as the ID indicated in the ticket, the processing cannot be performed, and the process is terminated as an error.

If there is a file having the same ID as the ID indicated in the ticket, in step S882, an entry in which the ticket issuing means (Ticket issuer=PMC: Partition manager Code) indicated in the service permission ticket (SPT) and the file ID indicated in the service permission ticket (SPT) are related to each other is written into the file open table.

In step S883, the file access mode [File Access Mode: the mode of access to the file] indicated in the service permission ticket (SPT) is written in correspondence with the entry created in the file open table. In step S884, the group file [Group of Target File: the group of files to be accessed] indicated in the service permission ticket (SPT) is written. In step S885, the access file identifier [Target File ID: the identifier (ID) of the file to be accessed] indicated in the service permission ticket (SPT) is written. In step S886, the processing mode to the target file [Read/Write Permission: the processing mode of the target file to be accessed (read or write permission)] indicated in the service permission ticket (SPT) is written. The processing to be performed on the target file includes read, write, and other types of processings.

Examples of the configuration of the file open table are shown in FIGS. 81 and 82. The file open table is the table in which information indicating files that are being accessed in the device and access modes thereof, and other types of information are recorded. The information indicated in the service permission ticket (SPT) received by the device is recorded in the file open table, and the file open table is then stored in the storage means of the device.

If the service permission ticket is the type which permits access only to a single file (see FIG. 28), the file open table includes the following items of information:

Ticket Issuer: the identifier of the ticket issuing means (Ticket Issuer);

File ID: the identifier (ID) of the access file in the partition; and

File Access Mode: the access mode to the file. An example of the configuration of the file open table when the service permission ticket (SPT) is the above-described type is shown in FIG. 81.

As shown in FIG. 81, in the file open table, the partition manager code (PMC) is indicated as the identifier of the ticket issuing means (Ticket Issuer), which is group information, so that the partition can be identified. The file can be identified by the file ID. The access mode to be executed (ex. read, write, or encryption/decryption (Enc, Dec)) can be identified by the file access mode.

If the service permission ticket (SPT) is the type which permits access to a plurality of files among the files set in the partitions (see FIG. 31), the following items of information in addition to the above-described items of information are written into the file open table:

Group of Target File: the group of files to be accessed;
Target File ID: the ID of the file to be accessed; and
Read/Write Permission: the processing mode (read or write) to the file to be accessed (target file). An example of the configuration of the file open table is shown in FIG. 82.

As shown in FIG. 82, in the file open table which is set for the service permission ticket of the type in which access can be made to a plurality of files, in addition to the data shown in FIG. 81, the partition manager code (PMC) as the partition ID data of the group of target files to be accessed, the file ID as the identifier (ID) of the target file to be accessed, and [Read/Write Permission] data indicating the processing mode of the target file are stored. Accordingly, it is possible to identify the types of processings to be executed on a plurality of files.

The processing mode in which access is made to a plurality of files is performed when, for example, data stored in file B is encrypted by using a key stored in file A. To perform this processing, it is necessary that file B should give a permission in response to a read demand of file A. In this case, file B is referred to as a "source file", while the file to which file B gives a permission is referred to as a "target file".

As described above, based on the service permission ticket (SPT) received during the session with the access unit, the device creates a file open table in which the partition manager code (PMC) as the ticket issuing means (Ticket Issuer (PMC)), the file identifier as the ID data of the file on which the file open processing is performed, and the access mode indicated in the service permission ticket (SPT) are related to each other. Accordingly, the device is able to determine by referring to the file open table whether a command received from the access unit can be executed.

(File Access Processing)

Details of the file access processing performed in step S857 or S869 in FIG. 79 are described below.

Figure 83:
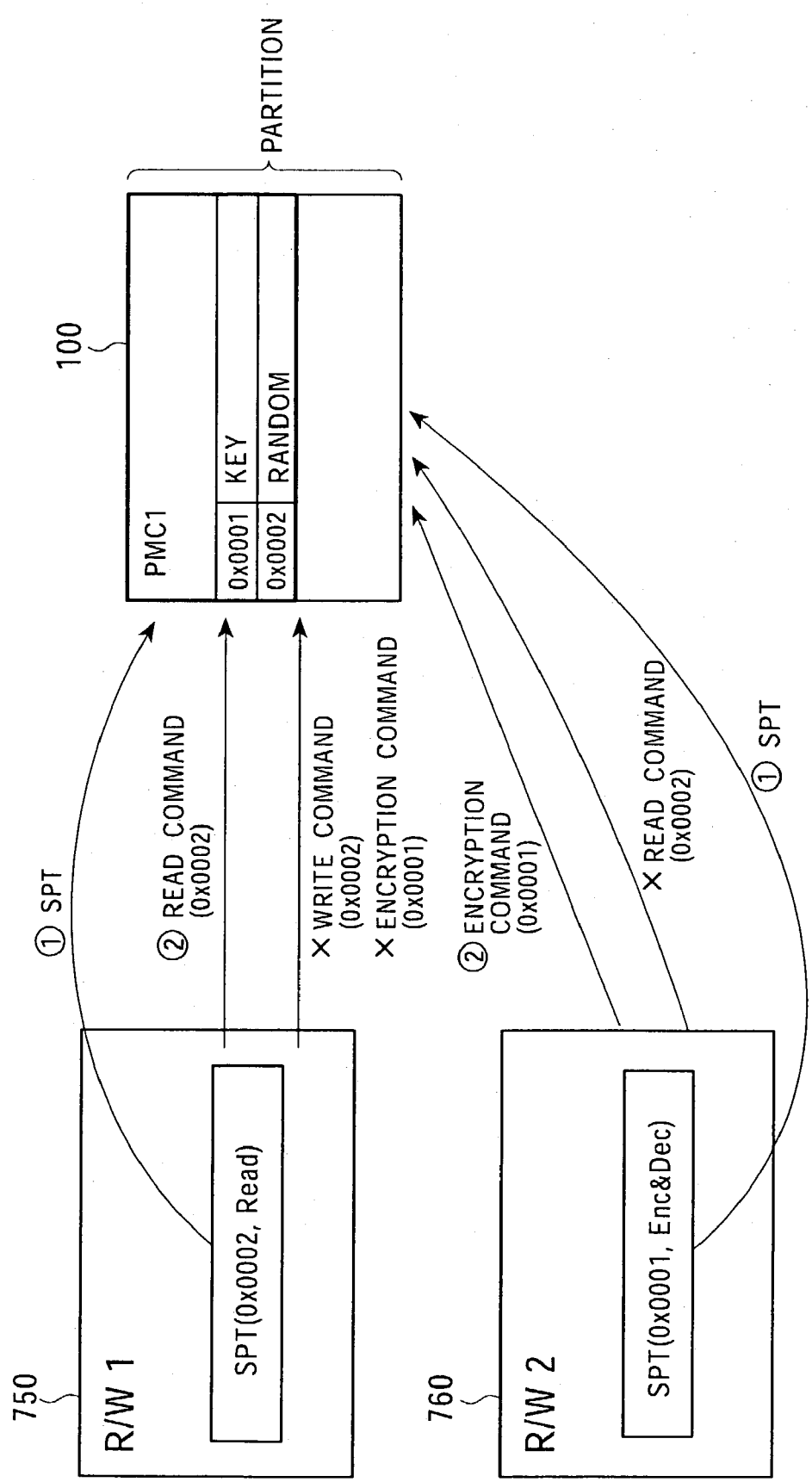
FIG. 83 is a diagram illustrating a first example of file access processing using a service permission ticket (SPT) in the system of the present invention.

The access processing to be executed when the file open table shown in FIG. 81 is created is discussed with reference to FIG. 83. Two file access units (R/W: reader writers as the device access units) 750 and 760 are shown at the left side, and a partition containing files of the device 100 is shown at the right side.

It is now assumed that, after conducting mutual authentication with the device, the file access unit (R/W: reader/writer) 750 has sent an access permission ticket having the file ID: [0x0002] and the file access mode: [Read] to the device 100, and has succeeded in the verification of the ticket, the ticket issuer, and the user.

In this case, the entry of the second row of the file open table shown in FIG. 81 is generated in the device. This entry indicates that the access mode [Read] processing can be performed on the file ID [0x0002] in the partition identified by the partition manager code (PMC).

In this case, the file access unit (R/W: reader/writer) 750 generates a command and sends it to the device. For example, upon receiving a data read command for the file ID [0x0002]: Read Command (0x0002), the device checks the entry of the file open table, and identifies that the access mode [Read] can be executed for the file ID [0x0002], and then, performs reading processing.

If the file access unit (RIW: reader/writer) 750 sends, for example, a data write command for the file ID [0x0002]: Write Command (0x0002), or a data encryption processing command for the file ID [0x0001]: Encryption Command (0x0001), to the device, the device receives the command, checks the entry of the file open table, and identifies that [Write] processing for the file ID [0x0002] or [Encryption processing] for the file ID [0x0001] is not permitted by the service permission ticket (SPT) received from the file access unit (R/W: reader/writer) 750. Thus, the device terminates the process.

It is now assumed that, after conducting mutual authentication with the device, the file access unit (R/W: reader/writer) 760 sends an access permission ticket having the file ID: [0x0001] and the file access mode: [encryption/decryption processing: Enc&Dec] to the device 100, and has succeeded in the verification of the ticket, the ticket issuer, and the user.

In this case, the entry of the first row of the file open table shown in FIG. 81 is generated in the device. This entry indicates that the access mode [encryption/decryption processing: Enc&Dec] can be executed for the file ID [0x0001] in the partition identified by the partition manager code (PMC1).

In this case, the file access unit (R/W: reader/writer) 760 generates a command and sends it to the device. For example, upon receiving the encryption command for the file ID [0x0001] [Encryption Command (0x0001)], the device checks the entry of the file open table, identifies that the access mode [encryption/decryption processing: Enc&Dec] can be executed for the file ID: 0x0001, and executes the encryption processing.

If the file access unit (R/W: reader/writer) 760 sends, for example, a data read command for the file ID [0x0002]: Read Command (0x0002) to the device, the device receives the command, checks the entry of the file open table, and identifies that the [Read] processing for the file ID [0x0002] is not permitted by the service permission ticket (SPT) received from the file access unit (R/W: reader/writer) 760. Thus, the device terminates the process.

Figure 80:
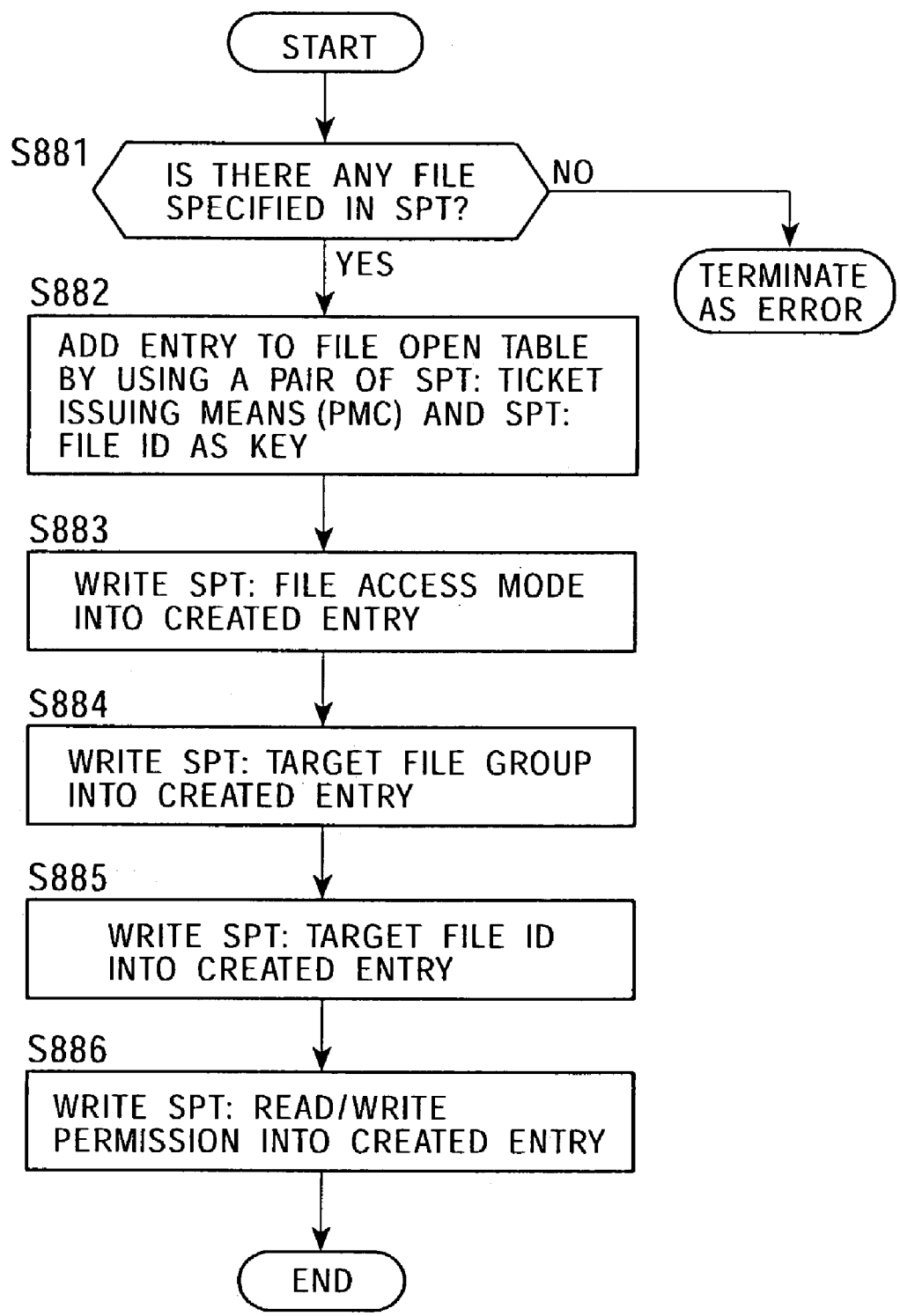
FIG. 80 is a flowchart illustrating a file open operation using a service permission ticket (SPT) in the system of the present invention.

As discussed above, based on the service permission ticket (SPT) received by the device from the reader/writer as the device access unit, which serves as the service permission ticket user, the device creates a file open table according to the processing flow of FIG. 80, determines whether each command from the reader/writer as the file access unit can be executed based on the generated file open table, and executes the determined processing.

Figure 84:
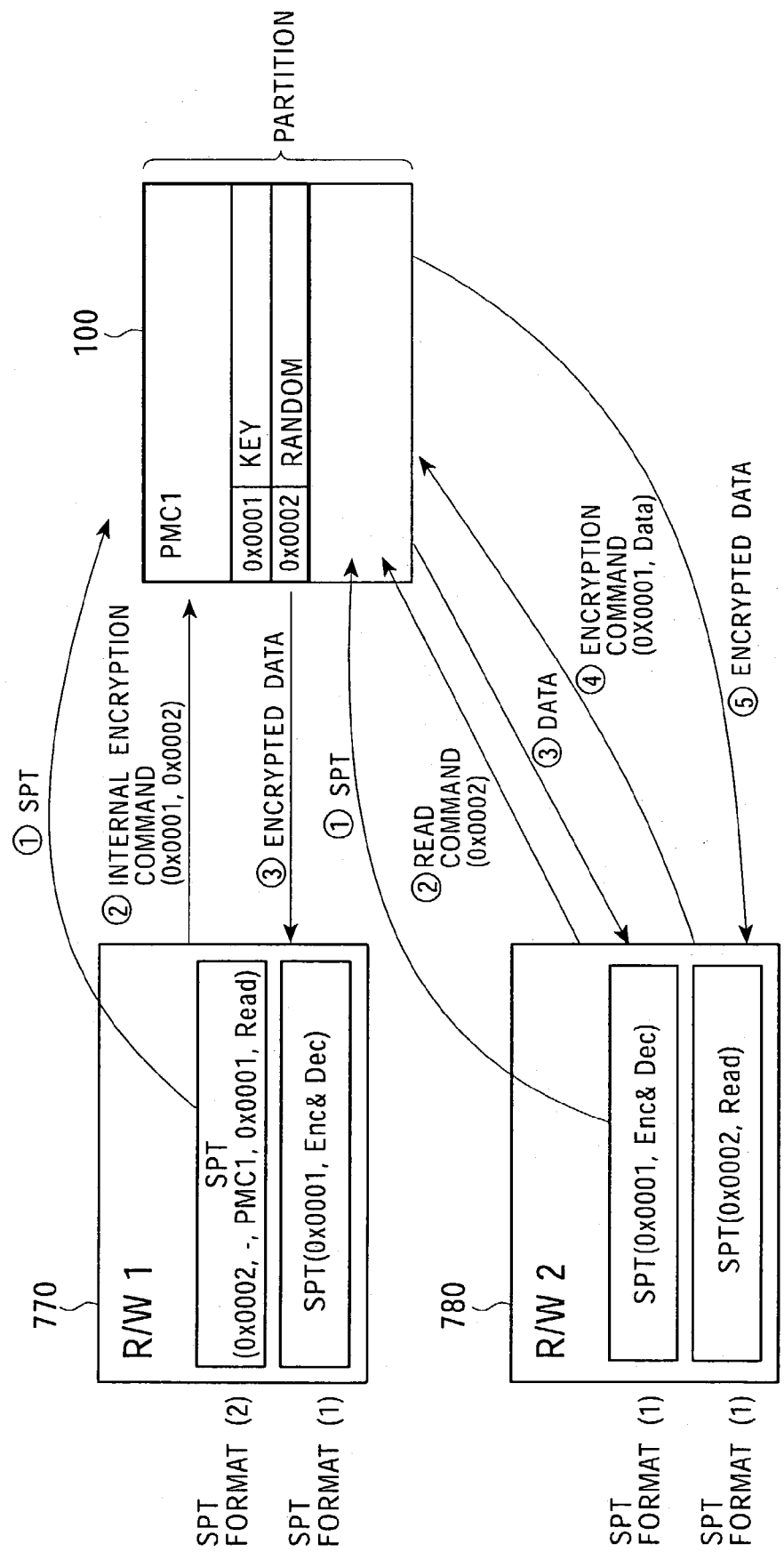
FIG. 84 is a diagram illustrating a second example of file access processing using a service permission ticket (SPT) in the system of the present invention.

Then, the access processing to be performed on two files is discussed below with reference to FIG. 84. In FIG. 84, two file access units (R/Ws: reader/writers) 770 and 780 are shown at the left side, and a partition containing files of the device 100 is shown at the right side.

An example of the processing using the service permission ticket (SPT) (see FIG. 31) that designates the target file is first discussed.

It is now assumed that, after conducting mutual authentication with the device, the file access unit (R/W: reader/writer) 770 sends two access permission tickets, i.e., an access permission ticket having SPT format 1 (file ID: [0x0001], and file access mode: [encryption/decryption processing: Enc&Dec]), and an access permission ticket having SPT format 2 (file ID [0x0002], target file group: [PMC1], target file ID: [0x0001], and read/write permission: [Read]), to the device 100, and that the file access unit 770 has succeeded in the verification of the ticket, the ticket issuer, and the user.

In this case, the entries of the file open table shown in FIG. 82 are generated in the device. These entries indicate that the file ID [0x0001] in the partition identified by the partition manager code (PMC1) is a key file, and is opened so that encryption and decryption can be performed, and that the file ID [0x0002] is a data file, and cannot be externally read since the column of the file access mode is blank, and thus, the file ID [0x0002] is opened so that it can be read for the file ID [0x0001] and is set as the entry of the file open table.

In this case, the file access unit (R/W: reader/writer) 770 generates a command and sends it to the device. For example, the file access unit sends a command for reading the file ID [0x0002] and for performing an internal encryption for the file ID [0x0001]: Internal Encryption Command (0x0001, 0x0002). Upon receiving the command, the device checks the entries of the file open table, and identifies that [Read] can be performed for the file ID [0x0002] so that [Encryption processing] can be executed for the target file [0x0001] of the target file group [PMC1]. The device then reads the data of the file ID [0x0002], and performs encryption by using the key of the file ID [0x0001], and sends the encrypted data to the access unit.

According to the processing using the service permission ticket (SPT) (see FIG. 31) that designates the target file, data read from a file can be encrypted by using an encryption key stored in another file so as to obtain the encrypted data. Thus, a leakage of the decrypted data to an external source can be prevented.

A description is now given of the processing when a plurality of service permission tickets (SPTs) (see FIG. 28) that each specify the processing to be executed on a single file are used rather than the service permission ticket (SPT) (see FIG. 31) that specifies target file.

It is now assumed that, after conducting mutual authentication with the device, the file access unit (R/W: reader/writer) 780 sends two access tickets, i.e., an access ticket having SPT format 1 (file ID: [0x0002] and a file access mode: [Read], and an access ticket having SPT format 2 (file ID: [0x0001] and file access mode [encryption/decryption processing: Enc&Dec]) to the device 100, and has succeeded in the verification of the ticket, the ticket issuer, and the user.

In this case, the entries of the first and second rows of the file open table shown in FIG. 81 are generated in the device. These entries indicate that the access mode [Encryption/decryption processing: Enc&Dec] processing can be executed for the file ID [0x0001] in the partition identified by the partition manager code (PMC1), and that the access mode [Read] processing can be executed for the file ID: 0x0002 in the partition identified by the partition manager code (PMC2).

In this case, the file access unit (R/W: reader/writer) 780 generates a command and sends it to the device. Upon receiving the data read command: Read Command (0x0002) for the data ID: [0x0002], the device checks the entry of the file open table, identifies that the access mode [Read] processing can be executed for the file ID: 0x0002, and executes the reading processing. The device then sends the read data to the file access unit.

The file access unit (R/W: reader/writer) 780 also generates a command, and sends it to the device. Upon receiving the data encryption command for the file ID [0x0001] [Encryption Command (0x0001, Data)], the device checks the entry of the file open table, identifies that the access mode [encryption/decryption processing: Enc&Dec] processing for the file ID [0x0001] can be executed, and executes the encryption processing. The device then sends the encrypted data [Encryption Data] to the file access unit (R/W: reader/writer) 780.

As discussed above, when a plurality of service permission tickets (SPTs) (see FIG. 28) that each specify the processing for a single file is used rather than a service permission ticket (SPT) (see FIG. 31) that specifies the target file, data to be encrypted is read. Accordingly, the number of data transfer operations between the file access unit 780 and the device is increased, and the data is read outside the device without being encrypted.

In contrast, a plurality of file identifiers for identifying a plurality of data files to be accessed are included in the service permission ticket (SPT) (see FIG. 31). Among the plurality of file identifiers, one identifier may be set as the target file identifier, and read or write permission data for the target file is stored. As the access mode for the other data file, encryption processing using an encryption key stored in the data file is set. With this configuration, the memory-loaded device receives the service permission ticket (SPT) from the access unit, and executes the reading of the target file and the encryption processing using the encryption key according to the designated access mode. Accordingly, the memory-loaded device is able to execute internal encryption processing within the device. It is also possible to prevent the data from being output outside the device without being encrypted.

The ticket issuing means for issuing the service permission ticket (SPT) is the ticket issuing means managed by the partition manager, which is the entity managing the memory area of the memory-loaded device. By individually issuing the service permission tickets (SPTs) in which various access modes are set according to the access units, different access modes can be executed according to the access units.

(Usage Mode of Session Key)

Most of the data sent and received between the file access unit and the device are data that have to be prevented from being leaked to an external source, such as user information of the device or billing information. Accordingly, the data sent and received between the file access unit and the device may preferably be encrypted, and MAC (Message Authentication Code) may be added to the data as the tampering check value.

For data encryption, a session key generated in the mutual authentication between the file access unit and the device can be used. As discussed above, the mutual authentication includes device authentication for the device and partition authentication for each partition. When making an access to a file created in the partition, the encryption key is used for data transfer. There are several types of encryption keys.

Figure 85:
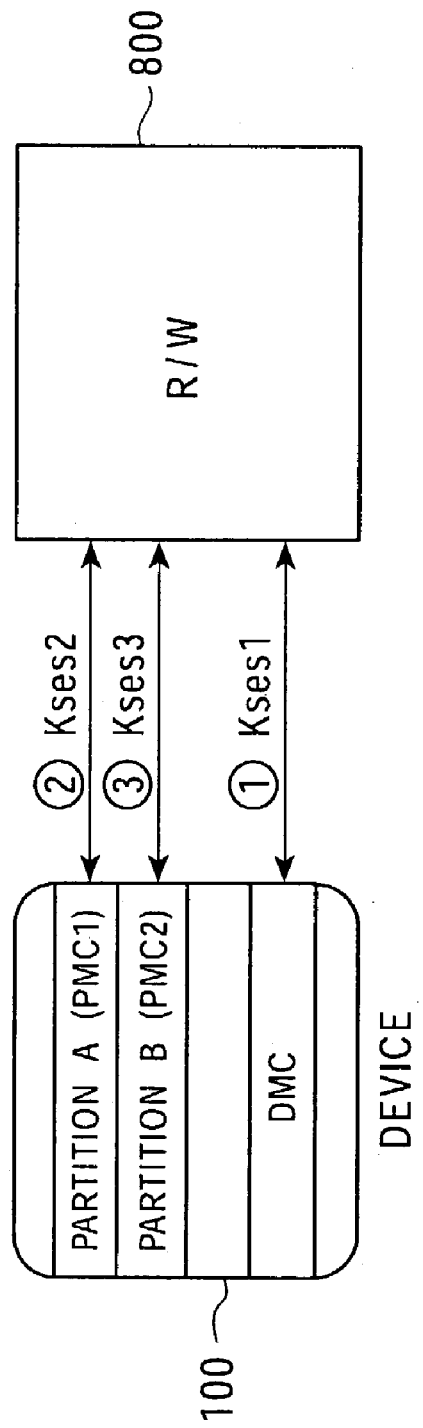
FIG. 85 is a diagram illustrating the handling of session keys generated by performing authentication in the system of the present invention.

For example, as shown in FIG. 85, between the device 100 and an access unit 800, there are a session key Kses1 generated by device authentication, a session key Kses2 generated by partition authentication with a partition corresponding to the partition manager code (PMC1), and a session key Kses3 generated by partition authentication with a partition corresponding to the partition manager code (PMC2).

These session keys are stored in the authentication table (see FIGS. 51 and 52), which is generated during the mutual authentication, until a session is cleared.

The device and the reader/writer (a PC or another communication unit), which serves as the device access unit that communicates with the device, determine in advance which session key is to be used for encryption communication as the rules, and the session key can be employed according to the determined rules.

It is now assumed that access is allowed to files in a plurality of different partitions, on condition that partition authentication has been performed for each of the partitions, or device authentication has been conducted. In this case, a single integrated session key is created from a plurality of session keys obtained as a result of a plurality of authentication processings, and communication data for the access unit is encrypted based on the integrated session key.

One of the methods for creating the integrated session key is as follows. When a plurality of session keys Kses1 through KsesN are generated by the mutual authentication processings between the device and the reader/writer (a PC or another communication unit), which serves as the device access unit that communicates with the device, an exclusive OR (ex. 8-byte processing) is performed on the plurality of session keys Kses1 through KsesN, and the calculation result is used as the encryption session key for the communication data. That is, Kses calculated by:

Kses=Kses XOR Kses2 XOR Kses3 . . .

XOR: exclusive OR processing (ex. 8-byte processing) is used as the session key.

Between the device and the reader/writer (a PC or another communication unit) as the device access unit that communicates with the device, the rule is predetermined in which an exclusive OR is performed on the session keys stored in both authentication tables, and the resulting output value is used as the session key. The session key is then calculated based on this rule, and is used for encrypting the communication data. Similarly, a different session key shared during the mutual authentication, for example, a session key generated during the public key authentication, or session-key generated data, for example, the lower 64 bits of the Y coordinate, can be used for adding a MAC value to the communication data during the session. This MAC value may be sent together with the communication data (may be encrypted data), and the MAC verification is performed by the receiving side, thereby preventing data from being tampered with in the communication channel. The MAC generation and verification has been discussed with reference to FIG. 59.

Alternatively, the following rule may be set: among the plurality of session keys Kses1 through KsesN obtained by the mutual authentication processings between the device and the reader/writer (a PC or another communication unit), which serves as the device access unit that communicates with the device, one key (ex. the latest session key) is selected, and the subsequent communication processing is performed by using this key as the data encryption key. Then, the session key is selected for encrypting the communication data according to this rule.

The above-described calculation or selection by using the plurality of session keys can be applied not only to the encryption communication between the file access unit and the device, but also to the encryption communication between any ticket (PRT, FRT, SPT, or DUT) user (the unit that performs data communication with the device, such as the reader/writer as the device access unit) and the device, when a plurality of session keys are generated by mutual authentication. The method for creating the session key, i.e., the calculation or the selection among the plurality of session keys, may be predetermined as the rule between each ticket user and the device, and then, each ticket user and the device perform processing after confirming the rule. Alternatively, the rule may be recorded in each ticket.

An example of the typical procedure of the access processing (step S857 or 869 in the processing flow of FIG. 79) performed by the file access unit on the device is described below with reference to FIGS. 86 and 87.

The processing when access is made to a single file (Normal) is discussed with reference to FIG. 86, and the processing when access is made to a plurality of files (Combination) is discussed with reference to FIG. 87.

Figure 86:
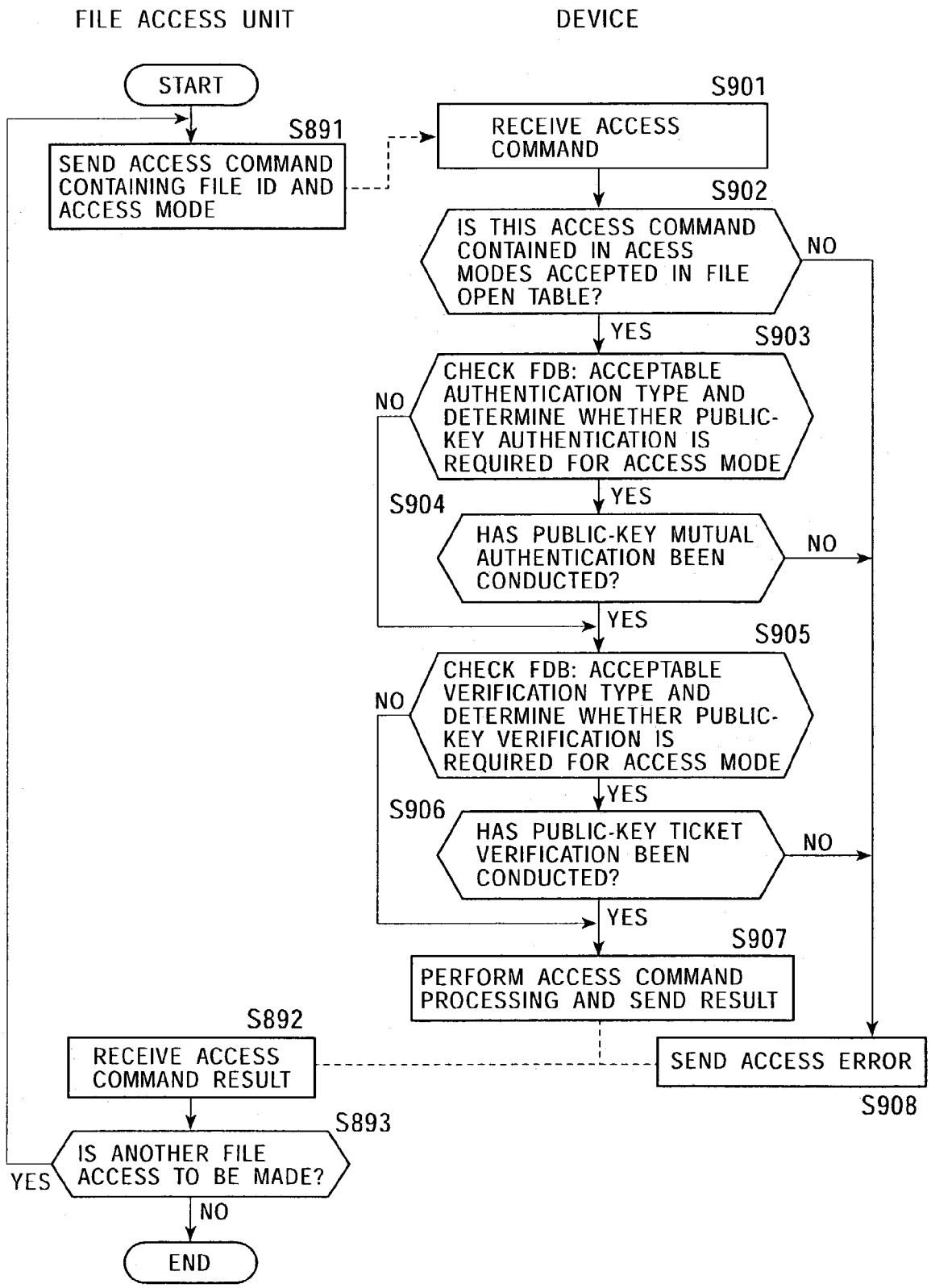
FIG. 86 is a flowchart of a first example of file access processing using a service permission ticket (SPT) in the system of the present invention.
Figure 87:
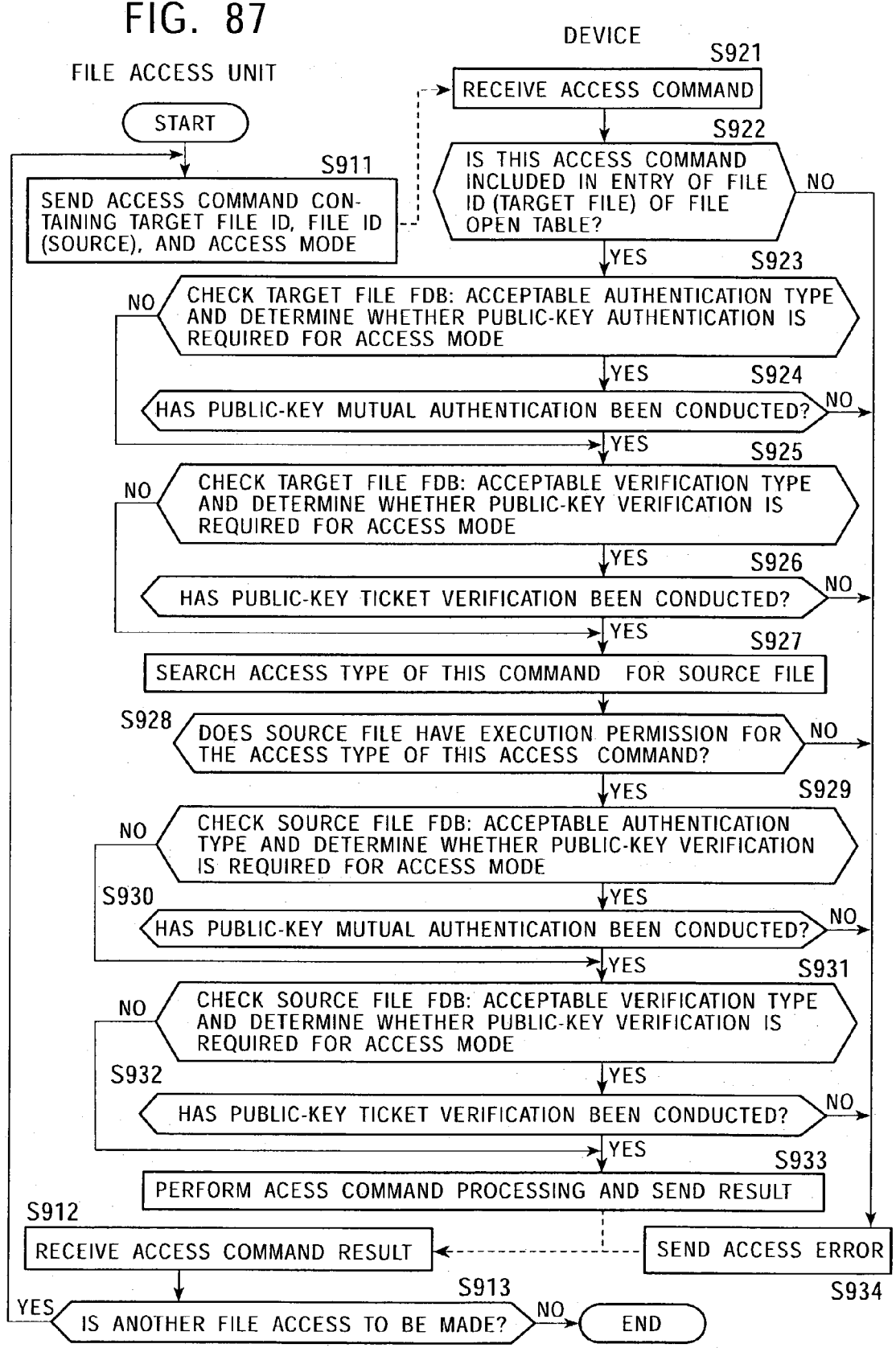
FIG. 87 is a flowchart of a second example of file access processing using a service permission ticket (SPT) in the system of the present invention.

A description is first given of the processing when access is made to a single file (Normal) with reference to FIG. 86. In the flow of FIG. 86, the processing of the file access unit is shown at the left side, and the processing of the device (see FIG. 5) is shown at the right side. In the file access processing, when performing data transfer between the file access unit and the device, data is encrypted by the session key Kses obtained by the mutual authentication processing, or the session key which is calculated or selected from a plurality of session keys, and tamper-checking MAC is generated and verified.

In step S891, the file access unit sends an access command to the device. This command is a command specifying the access file ID and the access mode, and may be, for example, a file ID [0x0002] data read command: Read Command (0x0002) or a file ID [0x0001] encryption command [Encryption Command (0x0001)], which has been discussed with reference to FIG. 83.

Upon receiving the command from the file access unit (S901), the device determines whether the file ID and the access mode contained in the command are recorded as an entry accepted in the file open table (S902). If there is no entry of the file ID and the access mode corresponding to the command in the file open table, the device does not execute the processing in accordance with the command, and sends an access error to the file access unit (S908).

If there is an entry of the file ID and the access mode corresponding to the command in the file open table, in step S903, the device refers to the file access authentication type (Acceptable Authentication type: the authentication type specified when access is made to a specific file) recorded in the file definition block (FDB) (see FIG. 24) of the corresponding partition in the device memory, and determines the authentication level required for executing the access command for the access file (whether the public key authentication is required).

If it is found in step S903 that the file access authentication type (Acceptable Authentication Type) of the file definition block (FDB) indicates that the public key authentication is required, it is determined in step S904 whether the public key authentication has been conducted as the authentication level required for the access command. If the authentication has not been conducted, the processing in accordance with the command is not executed, and sends an access error to the file access unit (S908). A determination as to whether the authentication has been conducted can be made based on the authentication table (see FIG. 51), which has been set in the mutual authentication.

If it is determined in step S903 that the file access authentication type (Acceptable Authentication Type) of the file definition block (FDB) indicates that the public key authentication is required, and if it is determined in step S904 that the public key authentication has been conducted, or if it is determined that the file access authentication type (Acceptable Authentication Type) of the file definition block (FDB) indicates that the public key authentication is not required, the process proceeds to step S905. In step S905, the device refers to the file access verification type (Acceptable Verification Type: the verification type specified when access is made to a specific file) recorded in the file definition block (FDB) (see FIG. 24) of the corresponding partition in the device memory, and determines the verification level required for executing the access command for the access file (whether the public-key verification is required).

If it is found in step S905 that the file access verification type (Acceptable Verification Type) of the file definition block (FDB) indicates that the public-key ticket verification is required, it is determined in step S906 whether the public-key ticket verification has been conducted at the verification level required for the access command. If the verification has not been conducted, the device does not execute the processing in accordance with the command, and sends an access error to the file access unit (S908).

If it is found in step S905 that the file access verification type (Acceptable Verification Type) of the file definition block (FDB) indicates that the public-key ticket verification is required, and if it is determined in step S906 that the public-key ticket verification has been conducted, or if the file access verification type (Acceptable Verification Type) of the file definition block (FDB) indicates that the public-key ticket verification is not required, the process proceeds to step S907. In step S907, the device executes the processing of the access command received from the file access unit, and sends a result to the file access unit.

Upon receiving the access command result (S892), the file access unit determines whether another file access is to be made (S893). If another file access is made, step S891 and the subsequent steps are repeated, and if another file access is not made, the process is completed.

The processing when access is made to a plurality of files (Combination) is described below with reference to FIG. 87. In the flow of FIG. 87, the processing of the file access unit is shown at the left side, and the processing of the device (see FIG. 5) is shown at the right side. In the file access processing, when performing data transfer between the file access unit and the device, data is encrypted by using the session Key Kses obtained in the mutual authentication processing, or the session key calculated or selected from a plurality of session keys, and tamper-checking MAC is generated and verified.

In step S911, the file access unit sends an access command to the device. This command is a command specifying the access file ID (source), the access target file ID, and the access mode, and may be, for example, a command [Internal Encryption Command (0x0001, 0x0002) specifying the execution of the internal encryption processing for the source file ID [0x0002] by using the key of the target file ID [0x0001], as has been discussed with reference to FIG. 84.

Upon receiving the command from the file access unit (S921), the device determines whether this access command is included in the entry of the target file ID of the file open table (S922). If the access command is included in the entry of the target file ID of the file open table, the device does not execute the processing in accordance with the command, and sends an access error to the file access unit (S934).

If the access command is included in the entry of the target file ID of the file open table, in step S923, the device refers to the file access authentication type (Acceptable Authentication Type: the authentication type specified when access is made to a specific file) recorded in the file definition block (FDB) (see FIG. 24) of the corresponding partition in the device memory, and determines the authentication level required for executing the access command for the access target file (whether the public key authentication is required).

If it is found in step S923 that the file access authentication type (Acceptable Authentication Type) of the file definition block (FDB) set for the access target file indicates that the public key authentication is required, it is determined in step S924 whether the public key authentication at the authentication level required for the access command has been conducted. If the authentication has not been conducted, the device does not execute the processing in accordance with the command, and sends an access error to the file access unit (S934). A determination as to whether the authentication has been conducted can be made based on the authentication table (see FIG. 51) which has been set in the mutual authentication.

If it is found in step S923 that the file access authentication type (Acceptable Authentication Type) of the file definition block (FDB) set for the access target file indicates that the public key authentication is required, and if it is determined in step S924 that the public key authentication has been conducted, or if it is determined that the file access authentication type (Acceptable Authentication Type) of the file definition block (FDB) indicates that the public key authentication is not required, the process proceeds to step S925. In step S925, the device refers to the file access verification type (Acceptable Verification Type: the verification type specified when access is made to a specific file) recorded in the file definition block (FDB) (see FIG. 24) of the corresponding partition in the device memory, and determines the verification level required for executing the access command for the access target file (whether the public-key verification is required).

If it is determined in step S925 that the file access verification type (Acceptable Verification Type) of the file definition block (FDB) set for the access target file indicates that the public-key ticket verification is required, it is determined in step S926 whether the public-key ticket verification at the verification level required for the access command has been conducted. If the verification has not been conducted, the device does not execute the processing in accordance with the command, and sends an access error to the file access unit (S934).

If it is found in step S925 that the file access verification type (Acceptable Verification Type) of the file definition block (FDB) set for the access target file indicates that the public-key ticket verification is required, and if it is determined in step S926 that the public-key ticket verification has been conducted, or if it is determined that the file access verification type (Acceptable Verification Type) of the file definition block (FDB) indicates that the public-key ticket verification is not required, the process proceeds to step S927. In step S927, the device checks, based on the command, the file access type (Read/Write) designated by the target file ID contained in the access command.

The device determines whether the file designated by the source file ID contained in the command received from the file access unit is opened for the access type (Read/Write) contained in the access command (S928). If the access type (Read/Write) for executing the command is not contained in the file open table, the device does not execute the processing in accordance with the command, and sends an access error to the file access unit (S934).

If the access type (Read/Write) corresponding to the command is contained in the file open table, in step S929, the device refers to the file access authentication type (Acceptable Authentication Type: the authentication type designated when access is made to a specific file) recorded in the file definition block (FDB) (see FIG. 24) of the corresponding partition in the device memory, and determines the authentication level for executing the access command for the access source file (whether the public key authentication is required).

If it is found in step S929 that the file access authentication type (Acceptable Authentication Type) of the file definition block (FDB) set for the access source file indicates that the public key authentication is required, it is determined in step S930 whether the public key authentication at the authentication level required for the access command has been conducted. If the authentication has not been conducted, the device does not execute the processing in accordance with the command, and send an access error to the file access unit (S934). A determination as to whether the authentication has been conducted can be made based on the authentication table (see FIG. 51) which has been set in the mutual authentication.

If it is determined in step S929 that the file access authentication type (Acceptable Authentication Type) of the file definition block (FDB) set for the access source file indicates that the public key authentication is required, and if it is determined in step S930 that the public key authentication has been conducted, or if the file access authentication type (Acceptable Authentication Type) of the file definition block (FDB) indicates that the public key authentication is not required, the process proceeds to step S931. In step S931, the device refers to the file access verification type (Acceptable Verification Type: the verification type designated when access is made to a specific file) recorded in the file definition block (FDB) of the corresponding partition in the device memory, and determines the verification level required for executing the access command for the access source file (whether the public key verification is required).

If it is found in step S931 that the file access verification type (Acceptable Verification Type) of the file definition block (FDB) set for the access source file indicates that the public-key ticket verification is required, it is determined in step S932 whether the public-key ticket verification at the verification level required for the access command has been conducted. If the verification has not been conducted, the device does not execute the processing in accordance with the command, and sends an access error to the file access unit (S934).

If it is found in step S931 that the file access verification type (Acceptable Verification Type) of the file definition block (FDB) set for the access source file indicates that the public-key ticket verification is required, and if it is determined in step S932 that the public-key ticket verification has been conducted, or if the file access verification type (Acceptable Verification Type) of the file definition block (FDB) indicates that the public-key verification is not required, the process proceeds to step S933. In step S933, the device executes the processing for the access command received from the file access unit, and sends a result to the file access unit.

Upon receiving the access command result (S912), the file access unit determines whether another file access is to be made (S913), and if another file access is made, step S911 and the subsequent steps are repeated. If another file access is not made, the process is completed.

The above-described file access processing has been described, assuming that the data designated by a single file structure is stored in the file. However, data having different file structures may be stored in a single file, so that the processing similar to the above-described sequential processing for a plurality of files can be executed by a single command for a single file.

Figure 88:
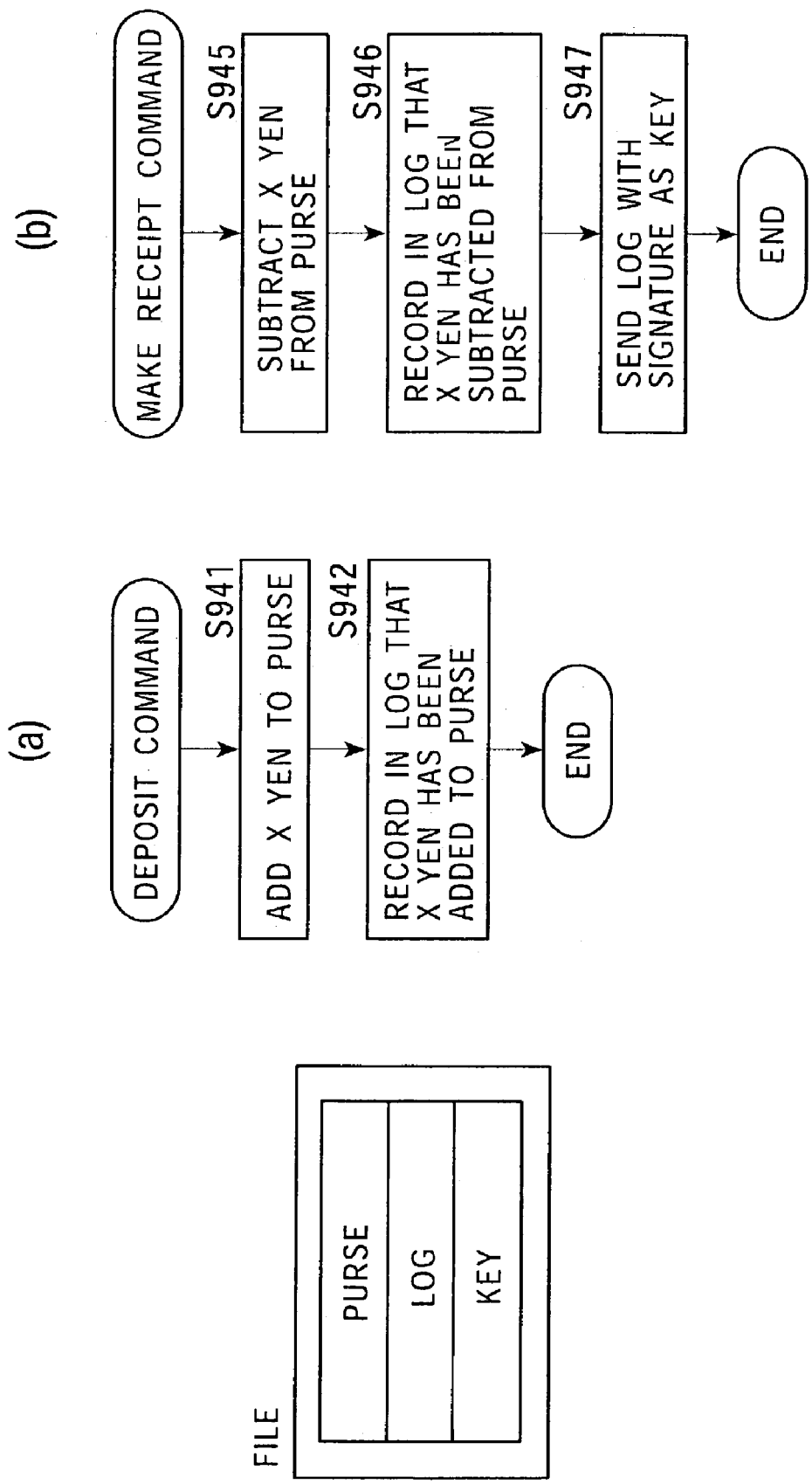
FIG. 88 is a diagram illustrating an example of access processing of a composite file using a service permission ticket (SPT) in the system of the present invention.

FIG. 88 illustrates the configuration in which the sequential processing is performed on data in a single file by a single command for a single file.

As shown in FIG. 88, the file is an e-money file, which is formed of [Purse] as billing data, [Log] as usage log data, and [Key] as key data for encrypting or decrypting the data.

For example, as shown in FIG. 88(a), a deposit command is specified, and two processings can be executed: X yen is added to [Purse] as the billing data in the file (S941); and also, information that X yen has been added to [Purse] is written into [Log] as the usage log data in the file (S942).

The following type of access permission ticket (SPT) specifying a composite file is generated. The above-described money-deposit command is defined as the permission command (see FIG. 30) for the deposit type of the above-described file access mode (see FIG. 29), [Deposit] is set in the file access mode of the access permission ticket, and e-money is set as the file ID. After sending this access permission ticket to the device from the file access unit, the deposit billing data is sent together with the deposit command, thereby making it possible to perform the sequential processing for the data in a single file in the device, as shown in FIG. 88(a).

Also, as shown in FIG. 88(b), a receipt creation command (Make Receipt Command) is defined, and then, three-step processing can be performed: X yen is subtracted from [Purse] as the billing data in the file (S945); information that X yen has been subtracted from [Purse] is written into [Log] as the usage log data in the file (S946); and [Key] as encryption key data is added to [Log], and [Log] is sent with the signature (S947).

In this case, the following access permission ticket (SPT) specifying a composite file is generated. The above-described receipt creation command (Make Receipt Command) is defined as the permission command (see FIG. 30) corresponding to the withdraw type of the file access mode (see FIG. 29); [Withdraw] is set in the file access mode of the access permission ticket, and e-money is set as the file ID. After sending this access permission ticket to the device from the file access unit, withdraw billing data is sent together with the make receipt command, thereby making it possible to perform the sequential processing for the data in a single file in the device, as shown in FIG. 88(b).

In this manner, when the file specified in the service permission ticket (SPT) is a composite file, the device selects the file to be processed indicated in the command received from the access unit from the composite file, and executes the processing. If the data processing command from the access unit is a sequential processing command including a set of processings, the device selects the file to be processed indicated in each command contained in the sequential processing command from the composite file specified in the service permission ticket (SPT), and sequentially performs the processings.

[B4.7. Processing Procedure in Each Access Processing Method Using Service Permission Ticket (SPT]

In the above-described access-processing-file setting registration processing using the service permission ticket (SPT), mutual authentication is conducted between the device and the reader/writer as the device access unit, i.e., a service permission ticket (SPT) user, managed by the partition manager, and then, file access is made based on the service permission ticket (SPT). There are two types of mutual authentication modes, i.e., the public-key mutual authentication and the common-key mutual authentication. There are also two types of ticket (SPT) verification processing modes, i.e., the signature verification of the public key system and the MAC checking of the common key system. That is, the following four processing modes are primarily provided:

(A) mutual authentication (public key) and ticket (SPT) verification (public key);

(B) mutual authentication (public key) and ticket (SPT) verification (common key);

(C) mutual authentication (common key) and ticket (SPT) verification (common key); and (D) mutual authentication (common key) and ticket (SPT) verification (public key).

The four processing modes are briefly discussed with reference to the drawings by emphasizing the data transfer processing executed among the entities, such as the certificate authority (CA(PM)), the partition manager (PM), the reader/writer as the device access unit, i.e., the SPT ticket user, and the device.

(A) Mutual Authentication (Public Key) and Ticket (SPT) Verification (Public Key)

Figure 89:
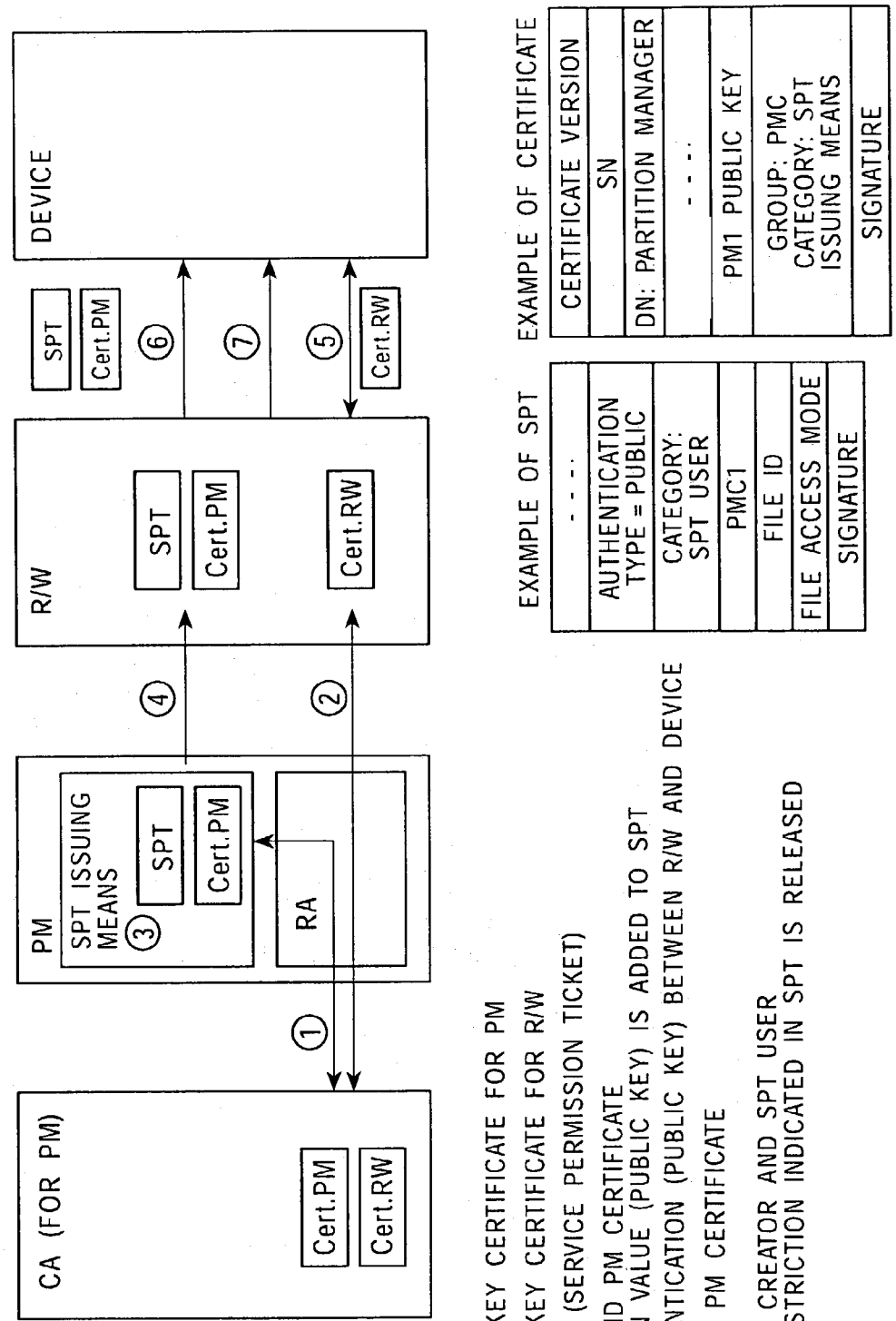
FIG. 89 is a diagram illustrating file access processing using a service permission ticket (SPT) in the system of the present invention when public-key authentication and public-key ticket verification are performed.

A description is first given, with reference to FIG. 89, of the data transfer performed among the entities when the public key system is used for mutual authentication processing and the public key system is used for ticket (SPT) verification.

The data transfer is performed among the entities in the order of the numbers shown in FIG. 89. The processing is described below according to the numbers.

(1) Issuing of Public Key Certificate (Cert. PM) of Partition Manager (PM)

In response to a request from the partition manager (PM), the public key certificate (Cert. PM) of the partition manager (PM) is issued by the partition certificate authority (CA (PAR)) according to a certificate issuing procedure via the registration authority (RA). In this configuration, the partition manager serves as the service permission ticket issuing means (SPT Issuer), and the public key certificate of the partition manager (PM) is used as the public key certificate of the service permission ticket issuing means (SPT Issuer).

(2) Issuing of Public Key Certificate (Cert. RW) of Reader/Writer as Device Access Unit, i.e., Service Permission Ticket User (SPT User)

In response to a request from the reader/writer (R/W), i.e., the service permission ticket user (SPT User: and more specifically, a reader/writer (R/W) as the device access unit that sends a ticket to the device), the public key certificate (Cert. R/W) of the service permission ticket user (SPT User) is issued by the partition certificate authority (CA(PAR)) according to a certificate issuing procedure via the registration authority (RA). The partition manager may serve as the service permission ticket user (SPT User), in which case, the public key certificate of the partition manager (PM) can be used as the public key certificate of the service permission ticket user (SPT User).

(3) Creation Processing of Service Permission Ticket (SPT)

The service permission ticket (SPT) is created by the service permission ticket (SPT) issuing means (SPT Ticket Issuer) managed by the partition manager. In this case, for creating and verifying the public-key signature, the signature is created by the private key of the service permission ticket issuing means (SPT Ticket Issuer) (see FIG. 12), and is added to the SPT.

(4) Supply of SPT and Partition-Manager Public Key Certificate (Cert. PM) of Service Permission Ticket Issuing Means (SPT Ticket Issuer) to Reader/Writer as Device Access Unit, i.e., Service Permission Ticket User (SPT Issuer)

The service permission ticket (SPT) issued by the service permission ticket issuing means (SPT Ticket Issuer) managed by the partition manager is supplied to the reader/writer (R/W) as the device access unit, i.e., the service permission ticket user (SPT User), together with the partition-manager public key certificate (Cert. PM) of the service permission ticket issuing means (SPT Ticket Issuer).

(5) Mutual Authentication between Reader/Writer (R/W) as Device Access Unit and Device The reader/writer, i.e., the service permission ticket user (SPT User), sends the public key certificate (Cert. RW) of the reader/writer (R/W) as the ticket user (SPT User) to the device to which file access is to made according to the service permission ticket (SPT) issued by the service permission ticket issuing means (SPT Ticket Issuer), thereby performing public-key mutual authentication (see FIG. 50).

(6) Supply of SPT and Partition-Manager Public Key Certificate (Cert. PM) of Service Permission Ticket Issuing Means (SPT Ticket Issuer) to Device After the mutual authentication has been successfully conducted between the reader/writer (R/W) as the device access unit and the device, the reader/writer as the ticket user (SPT User) sends the service permission ticket (SPT) and the partition-manager public key certificate (Cert. PM) of the service permission ticket issuing means (SPT Ticket Issuer) to the device.

The device has checked the following factors concerning the received service permission ticket (SPT): (1) the partition-manager public key certificate (Cert. PM) of the ticket issuer is an authorized public key certificate (CERT) without being tampered with; (2) the code recorded in the option area of the public key certificate (CERT PM) of the ticket issuer coincides with (SPTIC) recorded in the FDB (File Definition Block) in the device; (3) the ticket issuing means (Ticket Issuer) is not revoked; and (4) the ticket has not been tampered with by verifying the signature of the received ticket (SPT). The SPT user (a reader/writer as the device access unit) is also verified (see FIGS. 57 and 58) by verifying whether mutual authentication has been conducted by checking whether the identifier, the category, or the serial (SN) name (DN) of the SPT user (a reader/writer as the ticket user) stored in the SPT ticket coincides with the identifier, the category, or the serial (SN) name (DN) recorded as the ID data (DN) of the public key certificate (Cert. RW) of the ticket user (SPT User).

(7) File Access

The device makes access to the corresponding file according to the rules indicated in the service permission ticket (SPT).

By performing the above-described processing, the file access processing in accordance with the mutual authentication (public key) and ticket (SPT) verification (public key) can be executed.

(B) Mutual Authentication (Public Key) and Ticket (SPT) Verification (Common Key)

A description is now given, with reference to FIG. 90, of the data transfer performed among the entities when the public key system is used for mutual authentication processing and the common key system is used for ticket (SPT) verification.

The data transfer is performed among the entities in the order of the numbers shown in FIG. 90. The processing is described below according to the numbers.

(1) Issuing of Public Key Certificate (Cert. RW) of Reader/Writer as Device Access Unit, i.e., Service Permission Ticket User (SPT User)

In response to a request from the reader/writer (R/W), i.e., the service permission ticket user (SPT User: and more specifically, the reader/writer (R/W) as the device access unit that sends a ticket to the device), the public key certificate (Cert. R/W) of the service permission ticket user (SPT User) is issued by the partition certificate authority (CA(PAR)) according to a certificate issuing procedure via the registration authority (RA). The partition manager may serve as the service permission ticket user (SPT User), in which case, the public key certificate of the partition manager (PM) can be used as the public key certificate of the service permission ticket user (SPT User).

(2) Creation Processing of Service Permission Ticket (SPT)

The service permission ticket (SPT) is created by the service permission ticket (SPT) issuing means (SPT Ticket Issuer) managed by the partition manager. In this case, MAC (Message Authentication Code) (see FIG. 59) as the common-key verification value is added to the SPT.

(3) Supply of SPT to Reader/Writer as Device Access Unit, i.e., Service Permission Ticket User (SPT User)

The service permission ticket (SPT) issued by the service permission ticket issuing means (SPT Ticket Issuer) managed by the partition manager is supplied to the reader/writer (R/W) as the device access unit, i.e., the service permission ticket user (SPT User).

(4) Mutual Authentication Between Reader/Writer (R/W) and Device

The reader/writer as the device access unit, i.e., the service permission ticket user (SPT User), sends the public key certificate (Cert. RW) of the reader/writer (R/W) as the ticket user (SPT User) to the device to which file access is to made according to the service permission ticket (SPT) issued by the service permission ticket issuing means (SPT Ticket Issuer), thereby performing public-key mutual authentication (see FIG. 50).

(5) Supply of SPT to Device

After the mutual authentication has been successfully conducted between the reader/writer (R/W) as the device access unit and the device, the reader/writer, i.e., the service permission ticket user (SPT User), sends the service permission ticket (SPT) to the device. The device performs the MAC checking processing for the received service permission ticket (SPT) so as to verify the SPT issuer. The SPT user (a reader/writer as the device access unit) is also verified (see FIGS. 57 and 58) by verifying whether mutual authentication has been conducted by checking whether the identifier, the category, or the serial (SN) name (DN) of the SPT user (a reader/writer as the ticket user) stored in the SPT ticket coincides with the identifier, the category, or the serial (SN) name (DN) recorded as the ID data (DN) of the public key certificate (Cert. RW) of the ticket user (SPT User).

(6) File Access

The device makes access to the corresponding file according to the rules indicated in the service permission ticket (SPT).

By performing the above-described processing, the file access processing in accordance with the mutual authentication (public key) and ticket (SPT) verification (common key) can be executed.

(C) Mutual Authentication (Common Key) and Ticket (SPT) Verification (Common Key)

Figure 91:
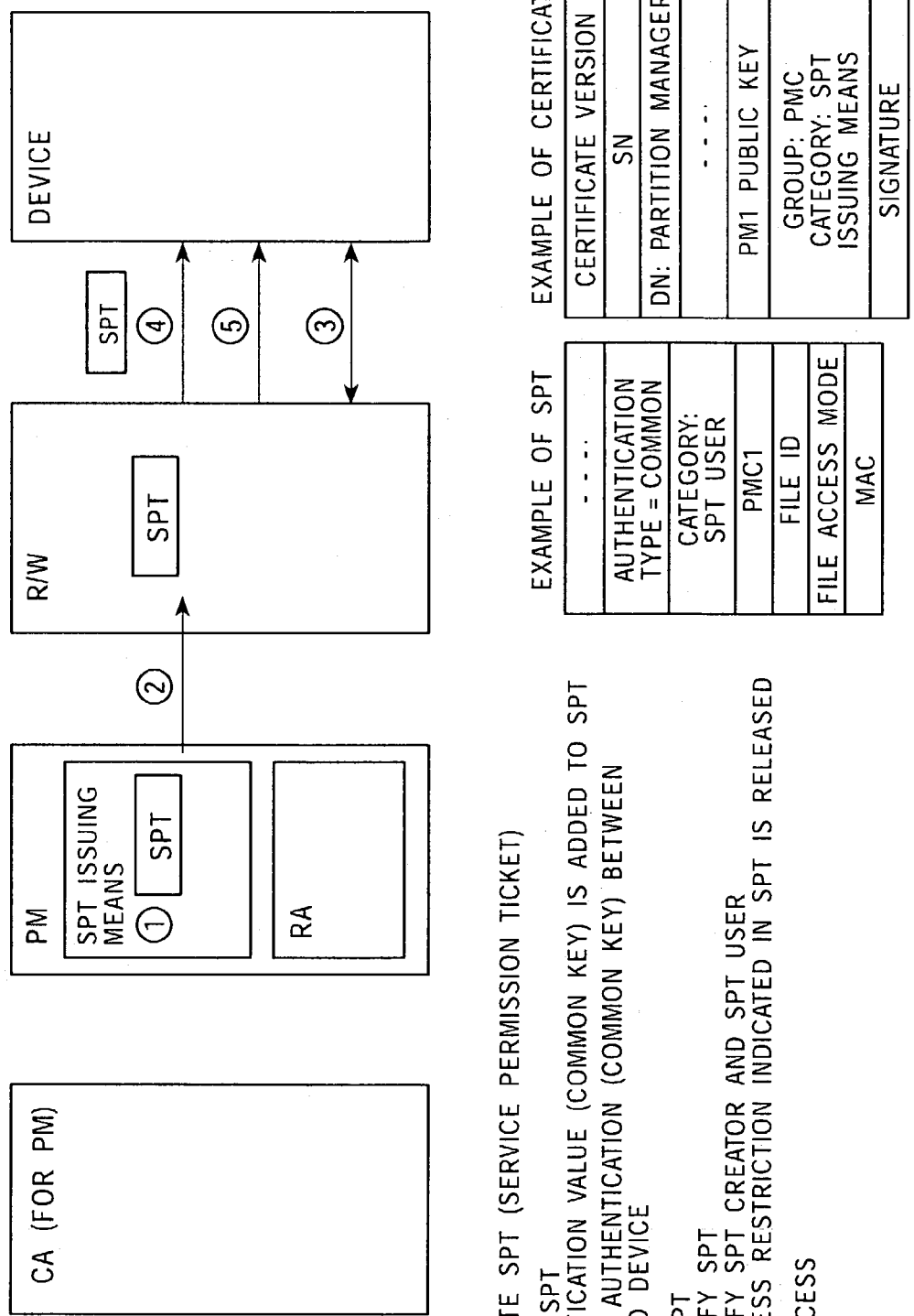
FIG. 91 is a diagram illustrating file access processing using a service permission ticket (SPT) in the system of the present invention when common-key authentication and common-key ticket verification are performed.

A description is now given, with reference to FIG. 91, of the data transfer performed among the entities when the common key system is used for mutual authentication processing and the common key system is used for ticket (SPT) verification.

The data transfer is performed among the entities in the order of the numbers shown in FIG. 91. The processing is described below according to the numbers.

(1) Creation Processing of Service Permission Ticket (SPT)

The service permission ticket (SPT) is created by the service permission ticket (SPT) issuing means (SPT Ticket Issuer) managed by the partition manager. In this case, MAC (Message Authentication Code) (see FIG. 59) as the common-key verification value is added to the SPT.

(2) Supply of SPT to Service Permission Ticket User (SPT User)

The service permission ticket (SPT) issued by the service permission ticket issuing means (SPT Ticket Issuer) managed by the partition manager is supplied to the reader/writer as the device access unit, i.e., the service permission ticket user (SPT User).

(3) Mutual Authentication between Reader/Writer (R/W) as Device Access Unit and Device The reader/writer (R/W) as the device access unit, i.e., the service permission ticket user (SPT User), performs common-key mutual authentication (see FIGS. 53 and 54) with the device that is to create a file according to the service permission ticket (STP) issued by the service permission ticket issuing means (SPT Ticket Issuer).

(4) Supply of SPT to Device

After the mutual authentication has been successfully conducted between the reader/writer (R/W) as the device access unit and the device, the reader/writer, i.e., the service permission ticket user (SPT User), sends the service permission ticket (SPT) to the device. The device performs the MAC checking processing for the received service permission ticket (SPT) so as to verify the SPT issuer. The SPT user (a reader/writer as the device access unit) is also verified (see FIGS. 57 and 58) by verifying whether mutual authentication has been conducted by checking whether the identifier of the SPT user (a reader/writer as the ticket user) stored in the SPT ticket coincides with the identifier of the ticket user (SPT User).

(5) File Access

The device makes access to the corresponding file according to the rules indicated in the service permission ticket (SPT).

By performing the above-described processing, the file access processing in accordance with the mutual authentication (common key) and ticket (SPT) verification (common key) can be executed.

(D) Mutual Authentication (Common Key) and Ticket (SPT) Verification (Public Key)

A description is now given, with reference to FIG. 92, of the data transfer performed among the entities when the common key system is used for mutual authentication processing and the public key system is used for ticket (SPT) verification.

The data transfer is performed among the entities in the order of the numbers shown in FIG. 92. The processing is described below according to the numbers.

(1) Issuing of Public Key Certificate (Cert. PM) of Partition Manager (PM)

In response to a request from the partition manager (PM), the public key certificate (Cert. PM) of the partition manager (PM) is issued by the partition certificate authority (CA (PAR)) according to a certificate issuing procedure via the registration authority (RA). In this configuration, the partition manager serves as the service permission ticket issuing means (SPT Issuer), and the public key certificate of the partition manager (PM) is used as the public key certificate of the service permission ticket issuing means (SPT Issuer).

(2) Creation Processing of Service Permission Ticket (SPT)

The service permission ticket (SPT) is created by the service permission ticket (SPT) issuing means (SPT Ticket Issuer) managed by the partition manager. In this case, for creating and verifying the public-key signature, the signature is created by the private key of the service permission ticket issuing means (SPT Ticket Issuer) (see FIG. 12), and is added to the SPT.

(3) Supply of SPT and Partition-Manager Public Key Certificate (Cert. PM) of Service Permission Ticket Issuing Means (SPT Ticket Issuer) to Reader/Writer as Device Access Unit, i.e., Service Permission Ticket User (SPT Issuer)

The service permission ticket (SPT) issued by the service permission ticket issuing means (SPT Ticket Issuer) managed by the partition manager is supplied to the service permission ticket user (SPT User), namely, the unit (ex., the reader/writer as the device access unit) that sends the ticket to the device, together with the partition-manager public key certificate (Cert. PM) of the service permission ticket issuing means (SPT Ticket Issuer).

(4) Mutual Authentication between Reader/Writer (R/W) as Device Access Unit and Device The reader/writer as the device access unit, i.e., the service permission ticket user (SPT User), performs common-key mutual authentication (see FIGS. 53 and 54) with the device that is to make file access according to the service permission ticket (STP) issued by the service permission ticket issuing means (SPT Ticket Issuer).

(5) Supply of SPT and Partition-Manager Public Key Certificate (Cert. PM) of Service Permission Ticket Issuing Means (SPT Ticket Issuer) to Device After the mutual authentication has been successfully conducted between the reader/writer (R/W) and the device, the reader/writer as the device access unit, i.e., the service permission ticket user (SPT User), sends the service permission ticket (SPT) and the partition-manager public key certificate (Cert. PM) of the service permission ticket issuing means (SPT Ticket Issuer) to the device.

The device has checked the following factors concerning the received service permission ticket (SPT): (1) the partition-manager public key certificate (Cert. PM) of the ticket issuer is an authorized public key certificate (CERT) without being tampered with; (2) the code recorded in the option area of the partition-manager public key certificate (CERT PM) of the ticket issuer coincides with ticket issuing means code (SPTIC) recorded in the FDB (File Definition Block) in the device; (3) the ticket issuing means (Ticket Issuer) is not revoked; and (4) the ticket has not been tampered with by verifying the signature of the received ticket (SPT). The SPT user (a reader/writer) is also verified (see FIGS. 57 and 58) by determining whether mutual authentication has been conducted by checking whether the identifier of the SPT user (a reader/writer as the ticket user) stored in the SPT ticket coincides with the identifier of the ticket user (SPT User).

(6) File Access

The device makes access to the corresponding file according to the rules indicated in the service permission ticket (SPT).

By performing the above-described processing, the file access processing in accordance with the mutual authentication (common key) and ticket (SPT) verification (public key) can be executed.

[B5. Device Data Updating Processing Using Data Update Ticket (DUT)]

The data updating processing using the data update ticket (DUT) is described below. The data update ticket (DUT) is the access control ticket used for performing updating processing of various data stored in the device. By using a DUT issued by authorized data update ticket (DUT) issuing means (Ticket Issuer), the device is accessed by the ticket user (ex. a reader/writer as the device access unit) according to the procedure recorded in the DUT, thereby making it possible to perform data processing within the restriction recorded in the DUT.

As discussed above, the data update ticket (DUT) includes a ticket DUT (DEV) used for updating data items managed by the device manager and a ticket DUT (PAR) (see FIG. 32) used for updating data items in a partition managed by a partition manager.

Figure 93:
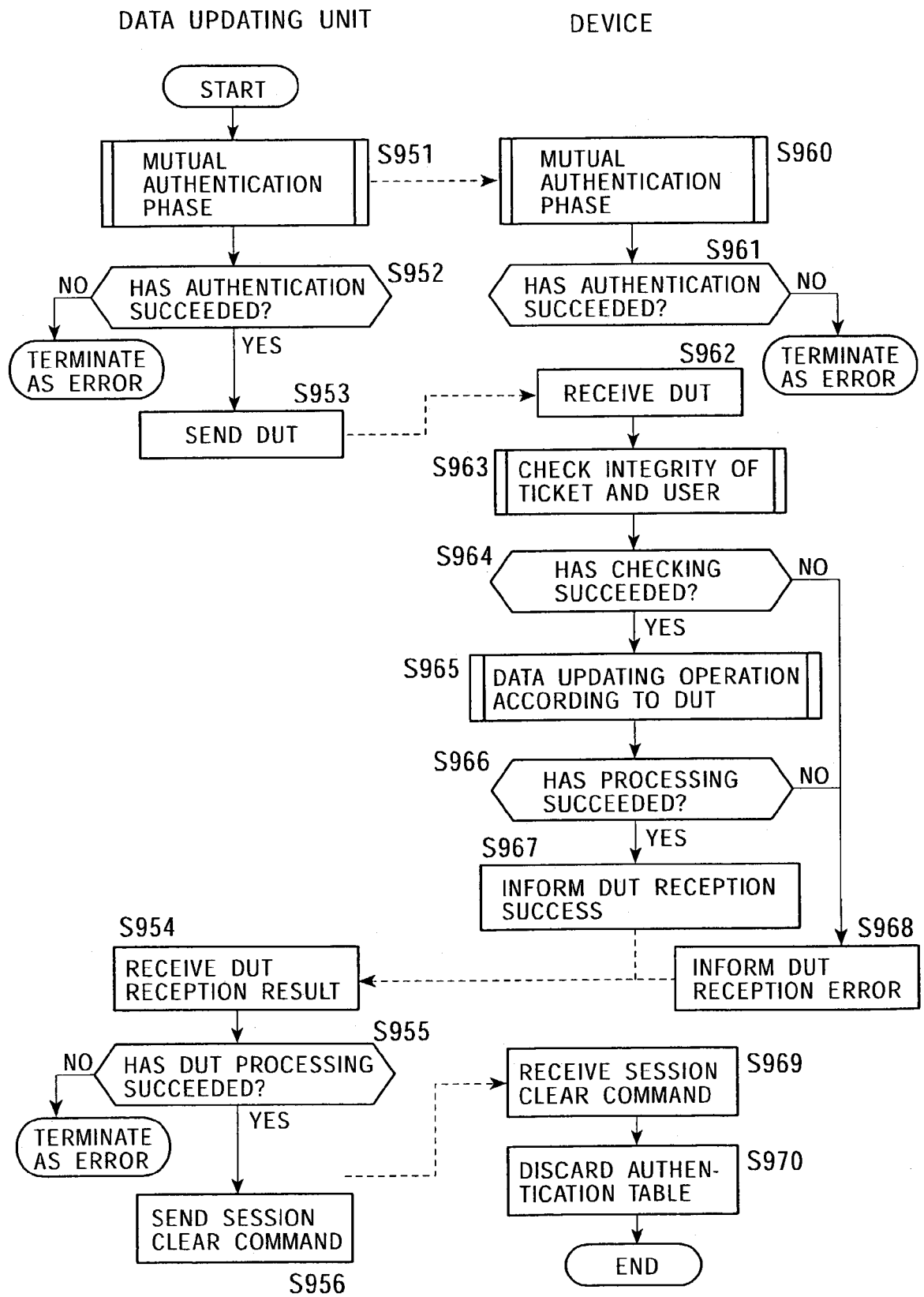
FIG. 93 is a flowchart illustrating data updating processing using a data update ticket (DUT) in the system of the present invention.

A description is now given of performing data updating processing by using the data update ticket (DUT) for the data stored in the device with reference to the flow of FIG. 93 and the other drawings. The data updating processing includes mutual authentication processing (device authentication or partition authentication) between the device and the reader/writer as the device access unit that performs data updating, and integrity verification processing for the data update ticket (DUT).

The data updating processing flow of FIG. 93 is discussed below. In FIG. 93, the processing of the data updating unit is shown at the left side, and the processing of the device (see FIG. 5) is shown at the right side. The data updating unit is the unit (ex. a reader/writer or a PC as the device access unit) which is able to read and write data from and into the device, and corresponds to the reader/writer as the device access unit shown in FIG. 10. An overview of the data updating processing is described below with reference to FIG. 93, and details of the data updating operation contained in the data updating processing are discussed below with reference to the flow of FIG. 94.

In steps S951 and S960 of FIG. 93, mutual authentication processing is first performed between the data updating unit and the device. Between the two means for performing data sending and receiving, it is first checked with each other whether they are authorized data communication means, and then, data transfer is performed according to the necessity. The mutual authentication processing is to check whether the other party is authorized data communication means. In the mutual authentication processing, a session key is created, and data is encrypted by using the session key as the common key. Then, the data is transferred.

As the mutual authentication processing, the partition authentication is performed, as has been discussed in the section of the partition creation/deletion processing. A common key system or a public key system is used for the data updating processing. The mutual authentication is similar to the processing discussed with reference to FIGS. 48 through 56, and an explanation thereof is thus omitted.

The processing to be executed as the mutual authentication processing is determined by:

Authentication Type: the type of mutual authentication (public key authentication, common key authentication, or either type (Any)) of the device of the data update ticket (DUT) (see FIG. 32) to be used.

If the authentication processing has failed (No in S952 or S961), it means that it cannot be determined that the data updating unit and the device are authorized unit and device, and the subsequent processing is not executed, and the process is terminated as an error.

If the authentication processing has succeeded, the data updating unit sends the data update ticket (DUT) to the device. The data update ticket (DUT) is the ticket issued by the data update ticket (DUT) issuing means (DUT Issuer) managed by the device manager or the partition manager. The data update ticket (DUT) is the access control ticket for the device, and has the data format configuration shown in FIG. 32.

When sending the data update ticket (DUT) to the ticket user, the public key certificate (CERT_DUTI) of the data update ticket (DUT) issuing means (DUT Issuer) is also sent together if the public key system is employed. The attribute of the public key certificate (CERT_DUTI) of the DUT issuing means coincides with the identifier (DUTIC) of the ticket issuing means code (DUTIC_DEV) recorded in DKDB(PUB) (Device Key Definition Block) in the device or the identifier (DUTIC) of the ticket issuing means code (DUTIC_PAR) recorded in PKDB(PUB) (Partition Key Definition Block).

Upon receiving the data update ticket (DUT) (S962), the device checks the integrity of the received ticket (DUT) and the user (S963). The ticket verification processing can be performed by either the MAC checking of the common key system or the signature verification of the public key system. The user checking is to check the integrity of the unit that has sent the ticket (ticket user), and is performed by determining whether mutual authentication has been conducted by checking the consistency between the ID data of the unit to be authenticated and the ticket user identifier (see FIG. 32) recorded in the ticket. These processings are similar to those discussed with reference to FIGS. 57 through 59, as has been discussed in the processing using the partition registration ticket (PRT), and an explanation thereof is thus omitted.

As a result of the integrity checking for the received ticket (DUT) and the user, if it cannot be determined that the ticket and the user are authorized ticket and user (No in S964), the device report a data update ticket (DUT) reception error to the data updating unit (S968). If it can be determined that the ticket and the user are authorized ticket and user (Yes in S964), the device updates the data (see FIG. 33) stored in the device memory according to the rules indicated in the received data update ticket (DUT). Details of this processing are described below by using a different flow.

If the data updating processing has succeeded according to the description in the data update ticket (DUT) (Yes in S966), the device reports a DUT reception success to the data updating unit (S967). If the data updating processing has failed (No in S966), the device reports a DUT reception error to the data updating unit (S968).

The data updating unit receives the DUT reception result (S954), and determines the DUT processing result. If the DUT reception result indicates an error (No in S955), the process is terminated as an error. If the DUT reception result indicates a success (Yes in S955), a session clear command is sent and received (S956 and S969), and the authentication table generated in the device is discarded (S970). The process is then completed. The authentication table is the table generated in the mutual authentication processing in steps S951 and S960, and has the configuration shown in FIG. 51, as has been discussed in the processing using the partition registration ticket (PRT).

As described above, the updating processing of the data stored in the device is executed by using the data update ticket (DUT). The data updating operation (S965) included in the updating processing is discussed below with reference to FIG. 94.

Figure 94:
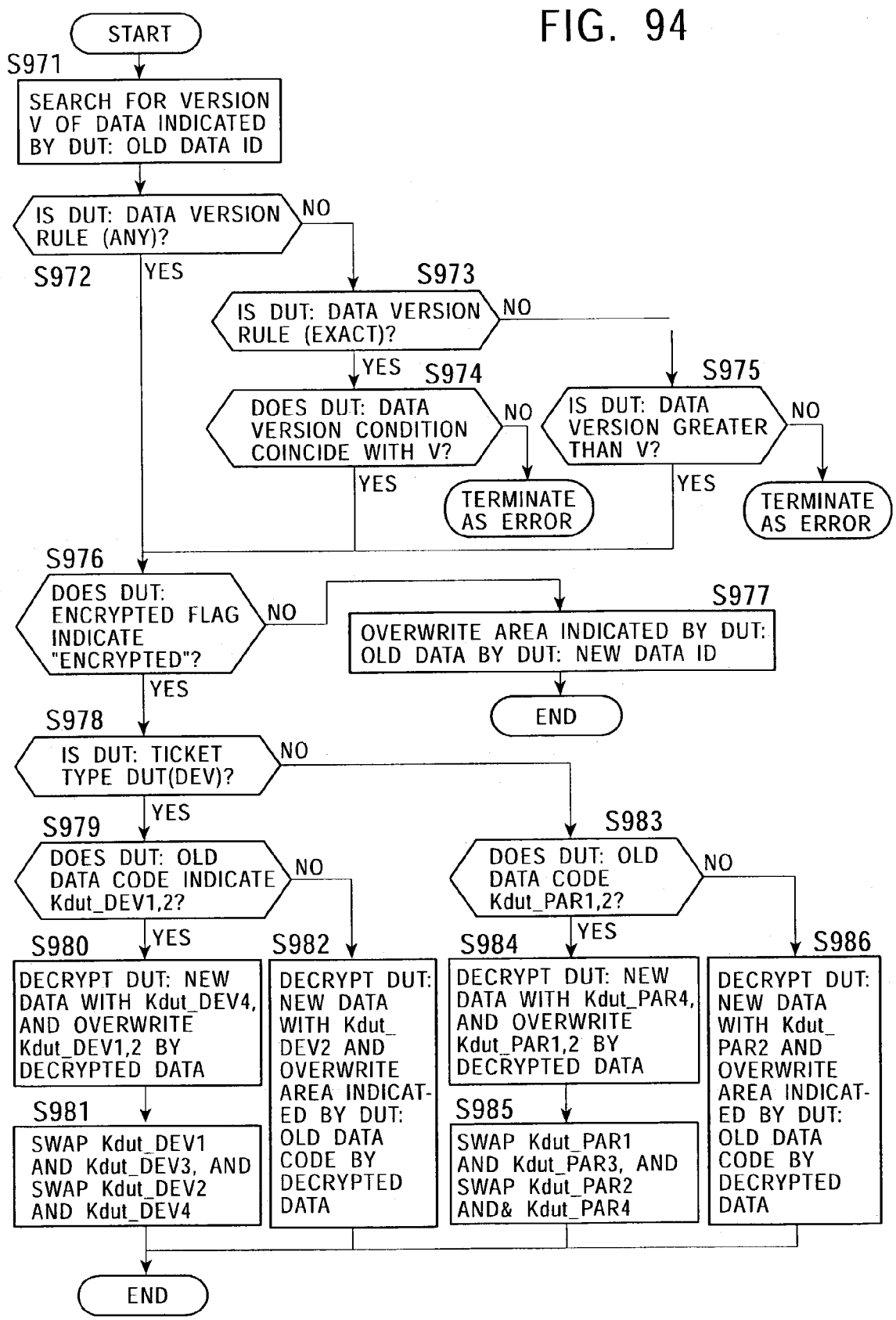
FIG. 94 is a flowchart illustrating a data updating operation using a data update ticket (DUT) in the system of the present invention.
Figure 96:
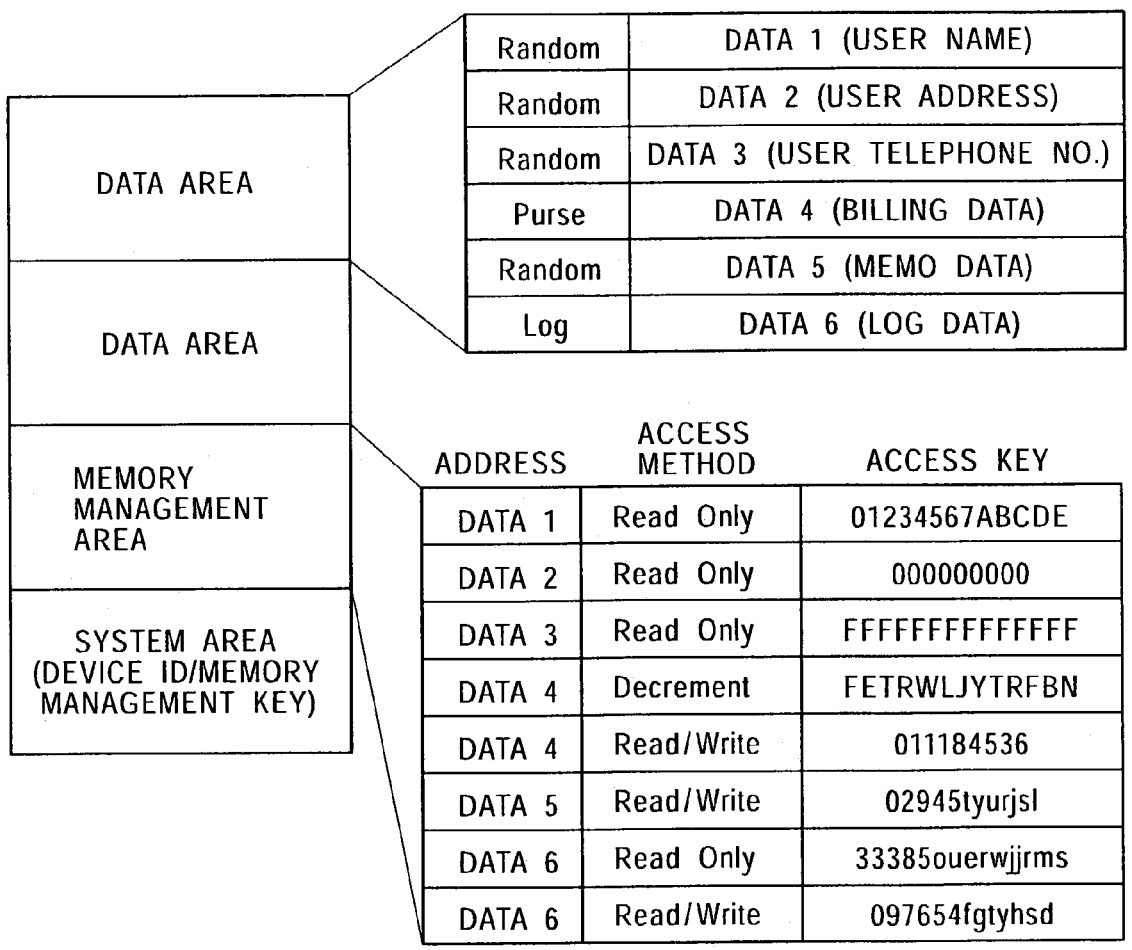
FIG. 96 is a diagram illustrating a known memory structure.
Figure 97:
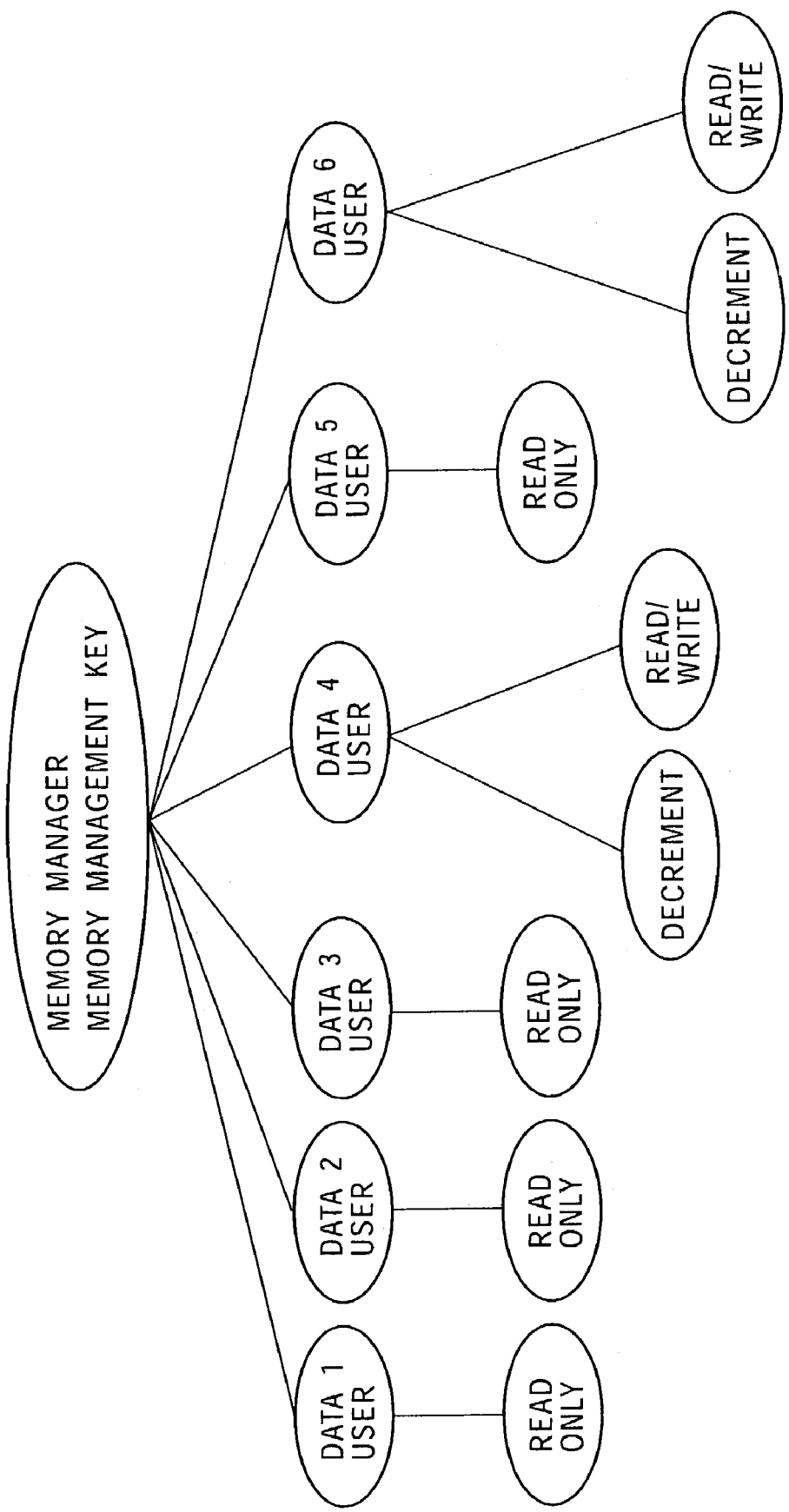
FIG. 97 is a diagram illustrating a known relationship between a memory manager and users.
Figure 98:
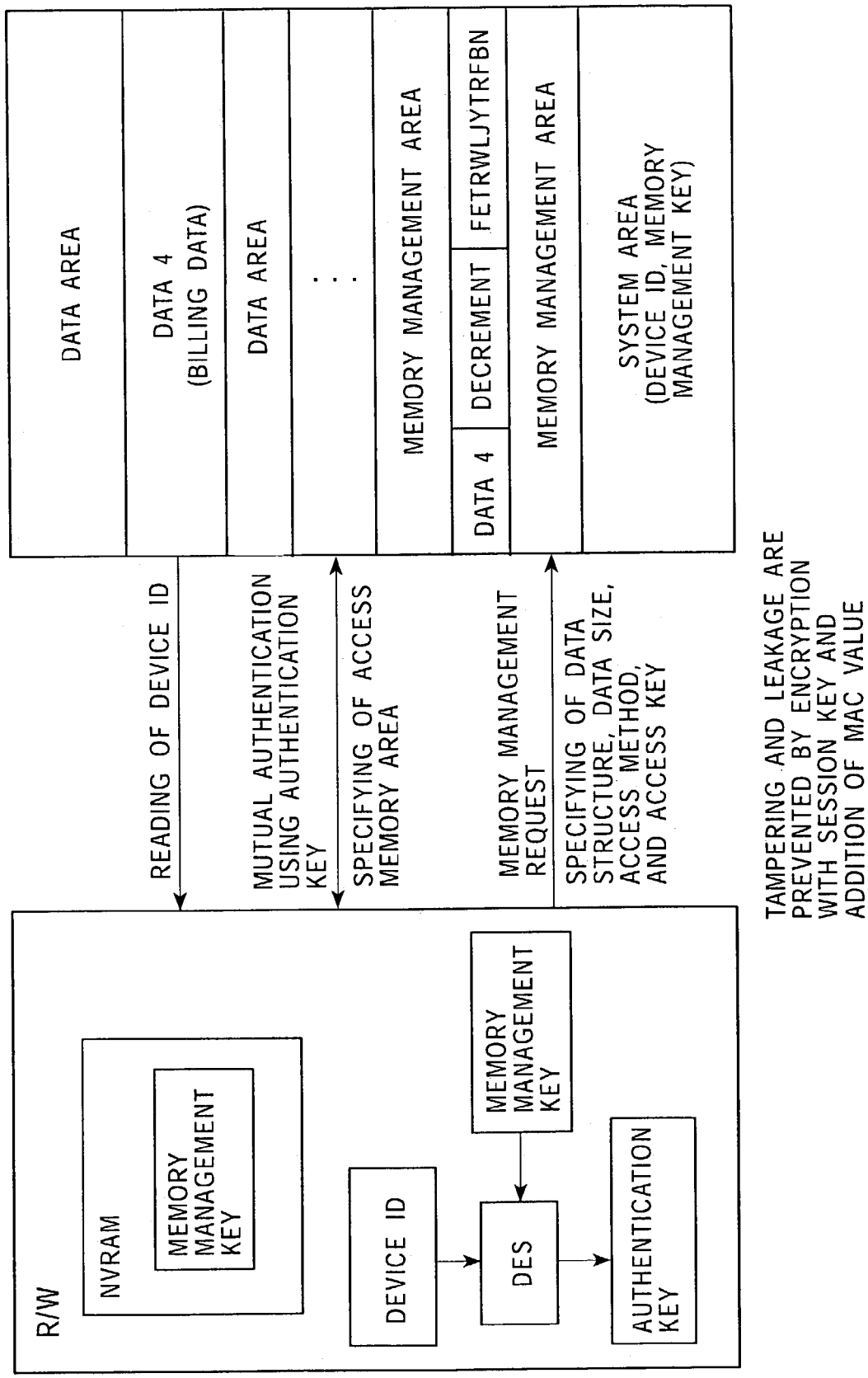
FIG. 98 is a diagram illustrating known memory area reserving processing.
Figure 99:
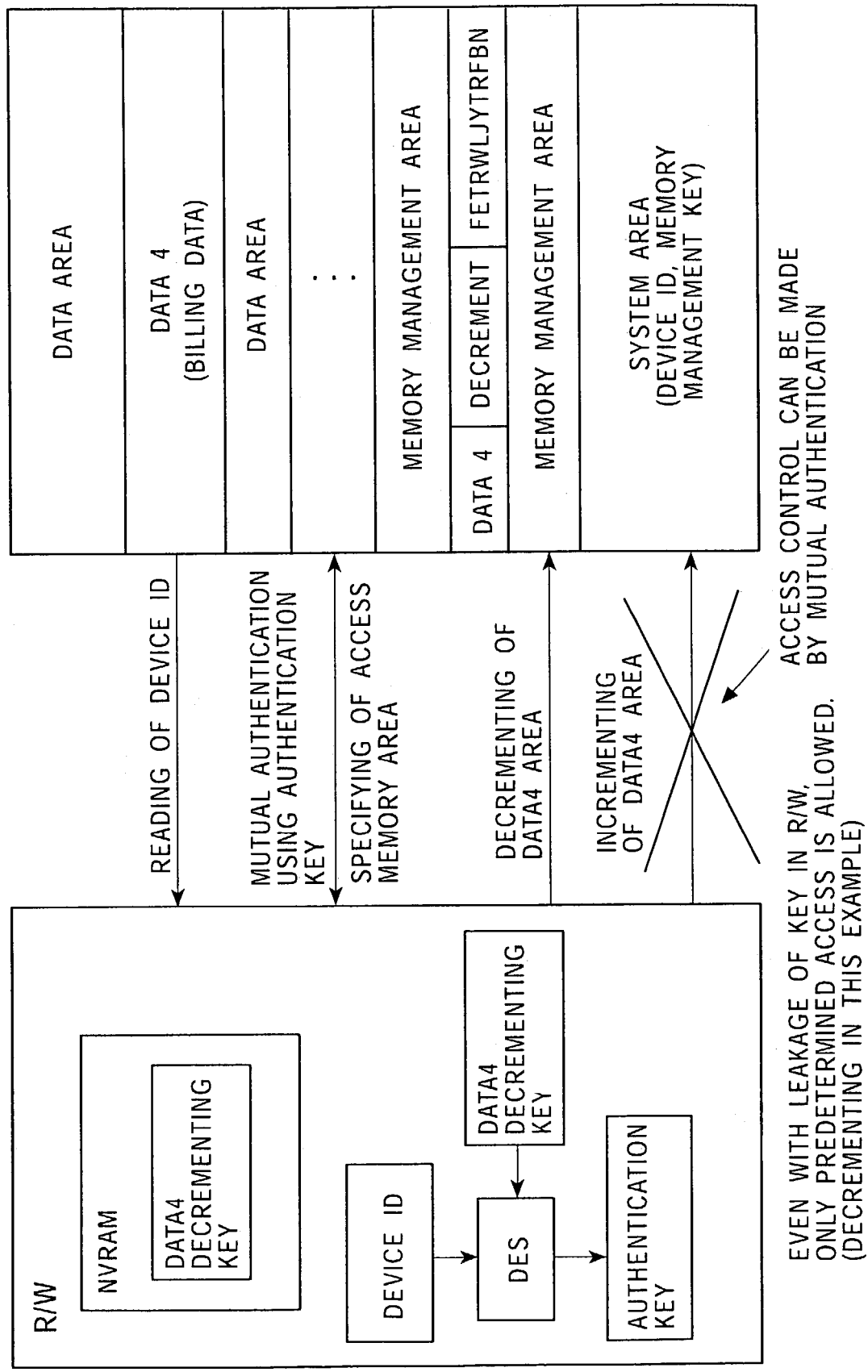
FIG. 99 is a diagram illustrating a known memory access method.

The processing flow of FIG. 94 is executed in the device that has received the data update ticket (DUT), and is performed after the mutual authentication with the unit that has sent the data update ticket (DUT) has been successfully conducted and the ticket verification has succeeded.

In step S971, the device first searches for the version of the data to be updated from the old data code of the data update ticket (DUT). The version is recorded in the device management information block (see FIG. 15) if the data to be updated is the device manager code (DMC). The version is recorded in the partition management information block (see FIG. 20) if the data to be updated is the partition manager code (PMC). The version of the partition registration ticket (PRT) issuing means (PRT Issuer) is contained in the device definition block (see FIG. 16). The version of the revocation list (IRL DEV, CRL DEV) is contained in the revocation list. In this manner, the storage location of the version information is determined according to the type of information, and the device searches for the version of the data to be updated from the old data code to be updated.

Then, in step S972, the device checks the version condition [Data Version Rule] for updating the data recorded in the data update ticket (DUT), and determines whether the version condition is set to [Any].

As discussed above, there are three types of version conditions [Data Version Rule], such as Any, Exact, and Older, when performing data updating. "Any" indicates that data can be updated regardless of the version condition; "Exact" means that data can be updated when the version value is the same as the value designated in the subsequent filed [Data Version Condition]; and "Older" means that data can be updated only when the new data version is newer. If the version condition [Data Version Rule] is Any or Older, [Data Version Condition] is not used or ignored.

If [Data Version Condition] of the data update ticket (DUT) is not set to [Any], the processing in accordance with the version condition [Data Version Rule] is performed. This processing corresponds to steps S973 through S975.

In step S973, the device checks the version condition [Data Version Rule] of the data update ticket (DUT), and determines whether it is set to [EXACT]. [Exact] means that data can be updated when the version value is the same as the value designated in the subsequent filed [Data Version Condition]. If the version condition [Data Version Rule] is set to [EXACT], the device determines in step S974 whether the version of the data to be updated [Old Data] coincides with the version value recorded in [Data Version Condition] of the data update ticket (DUT). If the version values coincide with each other, the process proceeds to the subsequent step, and if they are different, the process is terminated as an error without performing the updating processing.

If it is determined in step S973 that the version condition [Data Version Rule] of the data update ticket (DUT) is not [EXACT], it should be [Older]. According to the setting of [Older], data can be updated only when [New Data Version] indicating the version of new data [New Data] of the data update ticket (DUT) is newer than the version of data to be updated [Old Data]. In this case, it is determined in step S975 whether [New Data Version] indicating the version of new data [New Data] of the data update ticket (DUT) is newer than the version of the data to be updated [Old Data]. Only when [New Data Version] is newer, the process proceeds to the subsequent step. If not, the process is terminated as an error without performing the updating processing.

Then, in step S976, the device verifies [Encrypted Flag] of the data update ticket (DUT). [Encrypted Flag] is the data indicating whether data to be updated is encrypted (encrypted: Encrypted/unencrypted: none). If [Encrypted Flag] indicates that the data to be updated is unencrypted data, in step S977, the new data [New Data] of the data update ticket (DUT) is replaced by the old data to be updated [Old Data] stored in the device memory, and the process is completed. If the version is added to the data to be updated, the version of the updating data (New Data Version) stored in the data update ticket (DUT) is stored in the version storage area, which is set in correspondence with the updating data in the device.

If it is determined in step S976 that [Encrypted Flag] of the data update ticket (DUT) indicates that the data to be updated is encrypted, in step S978, the device verifies [Ticket Type] of the data update ticket (DUT). [Ticket Type] indicates the type of ticket (DUT(DEV)/DUT(PAR)). DUT (DEV) indicates that the data update ticket (DUT) is a ticket for executing the updating processing of a data item managed by the device manager. DUT(PAR) indicates that the data update ticket (DUT) is a ticket for executing the updating processing of a data item in a partition managed by the partition manager.

If [Ticket Type] indicates DUT(DEV), steps S979 through S982 are executed, and if [Ticket Type] indicates DUT (PAR), steps S983 through S986 are executed.

If [Ticket Type] indicates DUT(DEV), it is determined in step S979 whether the data represented by Old Data Code (code of the old data to be updated) indicated in the data update ticket (DUT(DEV)) is Kdut_DEV1 (MAC checking key of the data update ticket (DUT)) or Kdut_DEV2 (data updating encryption key) stored in the device key area (see FIG. 18).

If the data represented by the data of Old Data Code (code of the old data to be updated) indicated in the data update ticket (DUT(DEV)) is Kdut_DEV1 (MAC checking key of the data update ticket (DUT)) or Kdut_DEV2 (data updating encryption key) stored in the device key area (see FIG. 18), the process proceeds to step S980. In step S980, by using Kdut_DEV4 (data updating encryption key) stored in the device key area (see FIG. 18) of the device, Kdut_DEV1 and Kdut_DEV2 as the new data [New Data] stored in the data update ticket (DUT(DEV)) are decrypted, and Kdut_DUT1 and Kdut_DEV2 stored in the device key area of the device are overwritten by the decrypted data. Also, the version of the updating data (New Data Version) stored in the data update ticket (DUT(DEV)) is stored in the version storage area, which is set in correspondence with the updating data in the device, in this case, in the device key area (see FIG. 18) of the device.

Then, in step S981, Kdut_DEV1 (MAC checking key of the data update ticket (DUT) and Kdut_DUT3 (MAC checking key of the data update ticket (DUT) stored in the device key area (see FIG. 18) of the device are swapped, and Kdut_DEV2 (data updating encryption key) and Kdut_DEV4 (data updating encryption key) are also swapped. The process is then completed.

By swapping Kdut_DEV1 and Kdut_DEV3 and swapping Kdut_DEV2 and Kdut_DEV4, a pair of Kdut_DEV3 (MAC checking key of the data update ticket (DUT)) and Kdut_DEV4 (data updating encryption key) is always maintained to be newer versions than a pair of Kdut_DEV1 (MAC checking key of the data update ticket (DUT)) and Kdut_DEV2 (data updating encryption key). It is possible to perform processing by setting that Kdut_DEV1 and Kdut_DEV2 are always to be updated.

If it is found in step S979 that the data represented by Old Data Code (code of the old data to be updated) indicated in the data update ticket (DUT) is neither Kdut_DEV1 (MAC checking key of the data update ticket (DUT)) nor Kdut_DEV2 (data updating encryption key) stored in the device key area (see FIG. 18), the process proceeds to step S982. In step S982, by using Kdut_DEV2 (data updating encryption key) stored in the device key area (see FIG. 18) of the device, the new data [New Data] stored in the data update ticket (DUT(DEV)) is decrypted, and the area indicated by Old Data Code (code of the old data to be updated) of the data update ticket (DUT(DEV)) is overwritten by the decrypted data. If the version is added to the data to be updated, the version of the updating data (New Data Version) stored in the data update ticket (DUT(DEV)) is stored in the version storage area, which is set in correspondence with the updating data in the device.

If it is found in step S978 that the ticket type [Ticket Type] indicates DUT(PAR), steps S983 through S986 are executed.

If the ticket type [Ticket Type] indicates DUT (PAR), it is determined in step S983 whether the data represented by Old Data Code (code of the old data to be updated) indicated in the data update ticket (DUT(PAR)) is Kdut_PAR1 (MAC checking key of the data update ticket (DUT)) or Kdut_PAR2 (data updating encryption key) stored in the partition key area (see FIG. 23).

If the data represented by Old Data Code (code of the old data to be updated) indicated in the data update ticket (DUT (PAR)) is Kdut_PAR1 (MAC checking key of the data update ticket (DUT)) or Kdut_PAR2 (data updating encryption key) stored in the partition key area (see FIG. 23), the process proceeds to step S984. In step S984, by using Kdut_PAR4 (data updating encryption key) stored in the partition key area (see FIG. 23) of the device, Kdut_PAR1 and Kdut_PAR2 as the new data [New Data] stored in the data update ticket (DUT(PAR)) are decrypted, and Kdut_PAR1 and Kdut_PAR2 stored in the partition key area of the device are overwritten by the decrypted data. Also, the version of the updating data (New Data Version) stored in the data update ticket (DUT(PAR)) is stored in the version storage area, which is set in correspondence with the updating data in the device, in this case, in the partition key area (see FIG. 23) of the device.

Then, in step S985, Kdut_PAR1 (MAC checking key of the data update ticket (DUT)) and Kdut_PAR3 (MAC checking key of the data update ticket (DUT)) stored in the partition key area (see FIG. 23) of the device are swapped, and Kdut_PAR2 (data updating encryption key) and Kdut_PAR4 (data updating encryption key) are swapped. The process is then completed.

By swapping Kdut_PAR1 and Kdut_PAR3 and swapping Kdut_PAR2 and Kdut_PAR4, a pair of Kdut_PAR3 (MAC checking key of the data update ticket (DUT)) and Kdut_PAR4 (data updating encryption key) is always maintained to be newer versions than a pair of Kdut_PAR1 (MAC checking value of the data update ticket (DUT)) and Kdut_PAR2 (data updating encryption key). It is thus possible to perform processing by setting that Kdut_PAR1 and Kdut_PAR2 are always to be updated.

If it is found in step S983 that the data represented by Old Data Code (code of the old data to be updated) indicated in the data update ticket (DUT(PAR)) is neither Kdut_DEV1 (MAC checking key of the data update ticket (DUT)) nor Kdut_DEV2 (data updating encryption key) stored in the partition key area (see FIG. 18), the process proceeds to step S986. In step S986, by using Kdut_PAR2 (data updating encryption key) stored in the partition key area (see FIG. 23) of the device, the new data [New Data] stored in the data update ticket (DUT(PAR)) is decrypted, and the area indicated by Old Data Code (code of the old data to be updated) of the data update ticket (DUT(PAR)) is overwritten by the decrypted data. Tf the version is added to the data to be updated, the version of updating data (New Data Version) stored in the data update ticket (DUT(PAR)) is stored in the version storage area, which is set in correspondence with the updating data in the device.

The above-described processing is the data updating operation executed in the device based on the data update ticket.

As is seen from the above-described flow, when the data to be updated is

Kdut_DEV1 (MAC checking key of the data update ticket (DUT)) or

Kdut_DEV2 (data updating encryption key), stored in the device key area, or

Kdut_PAR1 (MAC checking key of the data update ticket (DUT)) or

Kdut_PAR2 (data updating encryption key), stored in the partition key area, the processing other than the normal updating processing is performed.

A brief summary of the updating processing for Kdut_DEV1 (MAC checking key of the data update ticket (DUT)), Kdut_DEV2 (data updating encryption key), Kdut_ PAR1 (MAC checking key of the data update ticket (DUT)), and Kdut_PAR2 (data updating encryption key) is shown in FIG. 95. The updating processing is described in the order from (1) to (3). Since the processing of Kdut_ DEV1, 2 is similar to that of Kdut_PAR1, 2, the updating processing for Kdut_DEV1,2 is only discussed.

(1) After encrypting Kdut_DEV1 and Kdut_DEV2 as the new data [New Data] to be stored in the data update ticket (DUT) by using Kdut_DEV4 (data updating encryption key) stored in the device key area (see FIG. 18) of the device, the encrypted data is stored in the data update ticket (DUT). The data update ticket (DUT) is then sent to the device. In this case, the ticket issuer that is able to update Kdut_DEV1 and Kdut_DEV2 must know Kdut_DEV3 and Kdut_DEV4.

(2) Upon receiving the data update ticket (DUT), the device decrypts Kdut_DEV1 and Kdut_DEV2 as the new data [New Data] stored in the date update ticket (DUT) by using Kdut_DEV4 (data updating encryption key) stored in the device key area of the device, and overwrites Kdut_DEV1 and Kdut_DEV2 stored in the device key area of the device by the decrypted Kdut_DEV1 and Kdut_DEV2, respectively.

(3) Then, the device swaps newly stored Kdut_DEV1 (MAC checking key of the data update ticket (DUT)) in the device key area (see FIG. 18) of the device and the previously stored Kdut_DEV3 (MAC checking key of the data update ticket (DUT)). The device also swaps newly stored Kdut_DEV2 (data updating encryption key) and the previously stored Kdut_DEV4 (data updating encryption key).

By swapping Kdut_DEV1 and Kdut_DEV3 and swapping Kdut_DEV2 and Kdut_DEV4, a pair of Kdut_DEV3 (MAC checking key of the data update ticket (DUT)) and Kdut_DEV4 (data updating encryption key) is always maintained to be newer versions than a pair of Kdut_DEV1 (MAC checking value of the data update ticket (DUT)) and Kdut_DEV2 (data updating encryption key). That is, Kdut_DUV1 and Kdut_DEV2 are keys that are normally used, and Kdut_DEV3 and Kdut_DEV4 are keys that update Kdut_DEV1 and Kdut_DEV2, respectively, in the event of an emergency, which serve as backup keys to replace currently used Kdut_DEV1 and Kdut_DEV2, respectively.

Kdut_DEV1 (MAC checking key of the data update ticket (DUT)) and Kdut_DEV2 (data updating encryption key) are used as a pair, and Kdut_DEV3 (MAC checking key of the data update ticket (DUT)) and Kdut_DEV4 (data updating encryption key) are also used as a pair.

The present invention has been described in detail with reference to a specific embodiment. It is apparent however that those who are skilled in the art are able to modify or arrange the embodiment without departing from the spirit and scope of the invention. That is, the invention has been disclosed in an example only, and should not be interpreted in a restricting manner. The scope of the invention should be determined by taken the claims recited at the head of the specification into consideration.

A series of processings described in this specification can be implemented by hardware or software, or a composite construction including both hardware and software. If the processings are executed by software, a program in which a processing sequence is recorded may be installed into a memory of a computer integrated into dedicated hardware, or the program may be installed into a general-purpose computer which is able to execute various processings.

For example, the program may be recorded in advance in a recording medium, such as a hard disk or a ROM (Read Only Memory). Alternatively, the program may be temporarily or permanently stored (recorded) in a removable recording medium, such as a floppy disk, a CD-ROM (Compact Disc Read Only Memory), an MO (Magneto optical) disk, a DVD (Digital Versatile Disc), a magnetic disk, or a semiconductor memory. Such a removable recording medium can be provided as so-called "package software".

The program may be installed from the above-described removable recording medium into a computer, as discussed above. Alternatively, the program may be wirelessly transferred from a download site to a computer, or may be transferred to a computer by cable via a network, such as a LAN (Local Area Network) or the Internet. Then, the computer receives the transferred program, and installs the program into a recording medium, such as a built-in hard disk.

The various processings described in the specification can be executed in chronological order as disclosed in the specification. Alternatively, the processings may be executed in parallel or individually according to the processing performance of the unit to execute the processing or according to the necessity. Moreover, in this specification, the system is a logical group of a plurality of devices, and the individual devices do not have to be in the same casing.

INDUSTRIAL APPLICABILITY

As is seen from the foregoing description, according to the memory access control system, the device management apparatus, the partition management apparatus, the memory-loaded device, the memory access control method, and the program storage medium, it is possible to implement a configuration in which various types of access control tickets are issued in response to access to a memory having a plurality of divided partitions under the control of each device or partition management entity, and processing based on the rules described in each ticket is executed by the memory-loaded device, thereby implementing a configuration in which data in each partition is independently managed.

According to the memory access control system, the device management apparatus, the partition management apparatus, the memory-loaded device, the memory access control method, and the program storage medium, the device is able to execute partition authentication and device authentication according to a public key designation method or a common key designation method so as to enable the execution of secure data communication between the device and an access unit under various environments.

According to the memory access control system, the device management apparatus, the partition management apparatus, the memory-loaded device, the memory access control method, and the program storage medium, the memory of the memory-loaded device includes one or more partitions for storing data files, which serve as memory areas managed by a partition manager, and a device management area managed by a device manager, which serves as a manager of the memory-loaded device. The memory-loaded device then receives from an access unit an access control ticket managed by the device manager or an access control ticket managed by the partition manager as the access control ticket for the memory, and executes processing according to a description in the received ticket. Accordingly, the mutual authentication mode and the access control ticket verification mode to be conducted can be designated, and the processing can be executed according to the individual modes, thereby enabling the execution of secure data communication between the device and the access unit under various environments.

According to the memory access control system, the device management apparatus, the partition management apparatus, the memory-loaded device, the memory access control method, and the program storage medium, a partition registration ticket (PRT), a file registration ticket (FRT), a service permission ticket (SPT), and a data update ticket (DUT) are issued under the management of the device manager and the partition manager, and the processing in the device is performed on the condition that authentication and ticket verification are successfully conducted. It is thus possible to achieve the provision of services and the data management according to various processing modes under the management of each service entity.

The invention claimed is:

1. A memory access control system, comprising:
   an access unit; and
   a memory-loaded device having a memory in which a data file is stored, a device manager, and a partition manager, wherein:
   the memory of said memory-loaded device includes one or more partitions managed by the partition manager and a device manager management area managed by the device manager; and
   the access unit issues an access control ticket to obtain access to the memory, the access control ticket including at least one of a partition registration ticket (PRT), a file registration ticket (FRT), a service permission ticket (SPT), or a data update ticket (DUT).

2. A memory access control system according to claim 1, wherein:
   the access control ticket further includes mutual authentication designation data that designates a mutual authentication mode executed between said memory-loaded device and the access unit; and
   said memory-loaded device executes mutual authentication according to the mutual authentication designation data of the access control ticket, and performs processing according to a description recorded in the access control ticket.

3. A memory access control system according to claim 1, wherein:
   the access control ticket further includes ticket verification designation data that designates a verification mode for the access control ticket; and
   said memory-loaded device executes ticket verification processing according to the ticket verification designation data of the access control ticket, and performs processing according to a description recorded in the access control ticket.

4. A memory access control system according to claim 1, wherein:
the access control ticket further includes a category or an identifier of issuing means of the access control ticket; and
said memory-loaded device executes processing to check whether the access control ticket is issued by authorized issuing means based on the category or the identifier of the issuing means indicated in the access control ticket, and performs processing according to a description recorded in the access control ticket.

5. A memory access control system according to claim 1, wherein:
the access control ticket further includes a category or an identifier of the access unit; and
said memory-loaded device performs processing to check whether the access control ticket is issued by authorized issuing means based on the category or the identifier of the access unit indicated in the access control ticket, and performs processing according to a description recorded in the access control ticket.

6. A memory access control system according to claim 1, wherein:
the partition registration ticket (PRT) allows partition creation processing or partition deletion processing in the memory of said memory-loaded device; and
said memory-loaded device performs partition creation processing or partition deletion processing according to a description recorded in the partition registration ticket (PRT).

7. A memory access control system according to claim 6, wherein the partition registration ticket (PRT) is issued to said access unit from ticket issuing means managed by the device manager.

8. A memory access control system according to claim 1, wherein:
the file registration ticket (FRT) allows data-file creation processing or data-file deletion processing in a partition which is generated in the memory of said memory-loaded device; and
said memory-loaded device performs file creation processing or file deletion processing according to a description recorded in the file registration ticket (FRT).

9. A memory access control system according to claim 8, wherein the file registration ticket (FRT) is issued to said access unit from ticket issuing means managed by the partition manager.

10. A memory access control system according to claim 1, wherein:
the service permission ticket (SPT) allows access to the data file in a partition in the memory of said memory-loaded device; and
said memory-loaded device accesses the data file according to a description recorded in the service permission ticket (SPT).

11. A memory access control system according to claim 10, wherein the service permission ticket (SPT) is issued to said access unit from ticket issuing means managed by the partition manager.

12. A memory access control system according to claim 1, wherein:
the data update ticket (DUT) allows data stored in the memory of said memory-loaded device to be updated; and
said memory-loaded device performs data updating processing according to a description recorded in the data update ticket (DUT).

13. A memory access control system according to claim 12, wherein:
the data update ticket (DUT) for updating data in the device manager management area managed by the device manager is issued to said access unit from ticket issuing means managed by the device manager; and
the data update ticket (DUT) for updating the data in the partition managed by the partition manager is issued to said access unit from ticket issuing means managed by the partition manager.

14. A device management apparatus for executing device management of a memory-loaded device connectable to an access unit adapted for issuing an access control ticket for accessing said memory-loaded device, said memory-loaded device including a partition management apparatus, one or more partitions managed by the partition management apparatus and a device manager management area managed by said device management apparatus, said device management apparatus comprising:
issuing means for issuing a partition registration ticket (PRT) that allows partition creation processing or partition deletion processing for a memory of said memory-loaded device, the partition registration ticket (PRT) including at least one of a file registration ticket (FRT), a service permission ticket (SPT), or a data update ticket (DUT).

15. A device management apparatus according to claim 14, wherein said device management apparatus further comprises a registration authority structure which manages issuing of a public key certificate for said memory-loaded device.

16. A device management apparatus according to claim 14, wherein the partition registration ticket (PRT) further includes mutual authentication designation data that designates a mutual authentication mode executed between said memory-loaded device and the access unit.

17. A device management apparatus according to claim 14, wherein the partition registration ticket (PRT) further includes ticket verification designation data that designates a verification mode for the access control ticket.

18. A device management apparatus according to claim 14, wherein the partition registration ticket (PRT) includes a category or an identifier of the issuing means.

19. A device management apparatus according to claim 14, wherein the partition registration ticket (PRT) further includes a category or an identifier of the access unit.

20. A partition management apparatus for executing partition management of a memory-loaded device connectable to an access unit adapted for accessing said memory-loaded device, said memory-loaded device including a device management apparatus, one or more partitions managed by said partition management apparatus and a device manager management area managed by the device management apparatus, said partition management apparatus comprising:
issuing means for issuing an access control ticket that allows access to a partition in a memory of said memory-loaded device, the access control ticket including at least one of a partition registration ticket (PRT), a file registration ticket (FRT), a service permission ticket (SPT), or a data update ticket (DUT).

21. A partition management apparatus according to claim 20, wherein the access control ticket includes the file registration ticket (FRT) that allows data-file creation processing or data-file deletion processing in a partition generated in the memory of said memory-loaded device.

22. A partition management apparatus according to claim 20, wherein the access control ticket includes the service permission ticket (SPT) that allows access to a data file in a partition in the memory of said memory-loaded device.

23. A partition management apparatus according to claim 20, wherein said partition management apparatus further comprises a registration authority structure which manages issuing of a public key certificate for said memory-loaded device.

24. A partition management apparatus according to claim 20, wherein the access control ticket further includes mutual authentication designation data that designates a mutual authentication mode executed between said memory-loaded device and the access unit.

25. A partition management apparatus according to claim 20, wherein the access control ticket further includes ticket verification designation data that designates a verification mode for the access control ticket.

26. A partition management apparatus according to claim 20, wherein the access control ticket further includes a category or an identifier of the issuing means.

27. A partition management apparatus according to claim 20, wherein the access control ticket further includes a category or an identifier of the access unit.

28. A memory-loaded device connectable to an access unit, said memory-loaded device comprising:
a partition manager;
a device manager;
a memory including one or more partitions managed by the partition manager and a device manager management area managed by the device manager; and
control means for receiving from the access unit an access control ticket for obtaining access to the memory, the access control ticket including at least one of a partition registration ticket (PRT), a file registration ticket (FRT), a service permission ticket (SPT), or a data update ticket (DUT).

29. A memory-loaded device according to claim 28, wherein:
the access control ticket further includes mutual authentication designation data that designates a mutual authentication mode executed between said memory-loaded device and the access unit; and
said control means executes mutual authentication according to the mutual authentication designation data of the access control ticket, and performs processing according to a description recorded in the access control ticket.

30. A memory-loaded device according to claim 28, wherein:
the access control ticket further includes ticket verification designation data that designates a verification mode for the access control ticket; and
said control means executes ticket verification processing according to the ticket verification designation data of the access control ticket, and performs processing according to a description recorded in the access control ticket.

31. A memory-loaded device according to claim 28, wherein:
the access control ticket further includes a category or an identifier of issuing means of the access control ticket; and
said control means executes processing to check whether the access control ticket is issued by authorized issuing means based on the category or the identifier of the issuing means indicated in the access control ticket, and performs processing according to a description recorded in the access control ticket.

32. A memory-loaded device according to claim 28, wherein:
the access control ticket further includes a category or an identifier of the access unit, which serves as issuing means of the access control ticket; and
said control means performs processing to check whether the access control ticket is issued by authorized issuing means based on the category or the identifier of the access unit indicated in the access control ticket, and performs processing according to a description recorded in the access control ticket.

33. A memory access control method for a system including an access unit and a memory-loaded device having a memory in which a data file is stored, a partition manager, and a device manager, the method comprising:
forming in the memory of said memory-loaded device one or more partitions managed by the partition manager and a device manager management area managed by the device manager; and
providing said memory-loaded device with an access control ticket issued by the access unit for obtaining access to the memory, the access control ticket including at least one of a partition registration ticket (PRT), a file registration ticket (FRT), a service permission ticket (SPT), or a data update ticket (DUT); and
performing processing according to a description in the access control ticket.

34. A memory access control method according to claim 33, wherein:
the access control ticket further includes mutual authentication designation data that designates a mutual authentication mode to be executed between said memory-loaded device and the access unit; and
said memory-loaded device executes mutual authentication according to the mutual authentication designation data of the access control ticket.

35. A memory access control method according to claim 33, wherein: the access control ticket further includes ticket verification designation data that designates a verification mode for the access control ticket; and
said memory-loaded device executes ticket verification processing according to the ticket verification designation data of the access control ticket.

36. A memory access control method according to claim 33, wherein:
the access control ticket further includes a category or an identifier of issuing means of the access control ticket; and
said memory-loaded device executes processing to check whether the access control ticket is issued by authorized issuing means based on the category or the identifier of the issuing means indicated in the access control ticket.

37. A memory access control method according to claim 33, wherein:
the access control ticket further includes a category or an identifier of the access unit; and
said memory-loaded device performs processing to check whether the access control ticket is issued by authorized issuing means based on the category or the identifier of the access unit indicated in the access control ticket.

38. A memory access control method according to claim 33, wherein:
  the partition registration ticket (PRT) allows partition creation processing or partition deletion processing in the memory of said memory-loaded device; and
  said memory-loaded device performs partition creation processing or partition deletion processing according to a description recorded in the partition registration ticket (PRT).

39. A memory access control method according to claim 38, wherein the partition registration ticket (PRT) is issued to the access unit from ticket issuing means managed by the device manager.

40. A memory access control method according to claim 33, wherein:
  the file registration ticket (FRT) allows data-file creation processing or data-file deletion processing in a partition which is generated in the memory of said memory-loaded device; and
  said memory-loaded device performs file creation processing or file deletion processing according to a description recorded in the file registration ticket (FRT).

41. A memory access control method according to claim 40, wherein the file registration ticket (FRT) is issued to the access unit from ticket issuing means managed by the partition manager.

42. A memory access control method according to claim 33, wherein:
  the service permission ticket (SPT) allows access to a data file in a partition in the memory of said memory-loaded device; and
  said memory-loaded device accesses the data file according to a description recorded in the service permission ticket (SPT).

43. A memory access control method according to claim 42, wherein the service permission ticket (SPT) is issued to the access unit from ticket issuing means managed by the partition manager.

44. A memory access control method according to claim 33, wherein:
  the access control ticket includes the data update ticket (DUT) that allows data stored in the memory of said memory-loaded device to be updated; and
  said memory-loaded device performs data updating processing according to a description recorded in the data update ticket (DUT).

45. A memory access control method according to claim 33, wherein:
  the data update ticket (DUT) for updating data in the device manager management area managed by the device manager is issued to the access unit from ticket issuing means managed by the device manager; and
  the data update ticket (DUT) for updating the data in the partition managed by the partition manager is issued to the access unit from ticket issuing means managed by the partition manager.

46. A method for executing memory access control processing in a computer system including an access unit and a memory-loaded device having a partition manager, a device manager, and a memory including one or more partitions managed by the partition manager and a device manager management area managed by the device manager, the method comprising:
  receiving from the access unit an access control ticket for obtaining access to the memory, the access control ticket including at least one of a partition registration ticket (PRT), a file registration ticket (FRT), a service permission ticket (SPT), or a data update ticket (DUT);
  executing mutual authentication between the memory-loaded device and the access unit;
  executing ticket verification processing; and
  performing data processing according to the at least one ticket recorded in the access control ticket.

* * * * *

UNITED STATES PATENT AND TRADEMARK OFFICE
CERTIFICATE OF CORRECTION

PATENT NO. : 7,225,341 B2 Page 1 of 1
APPLICATION NO. : 10/276432
DATED : May 29, 2007
INVENTOR(S) : Kenji Yoshino et al.

It is certified that error appears in the above-identified patent and that said Letters Patent is hereby corrected as shown below:

On the Title Page (54) of the patent, the title should read --MEMORY ACCESS CONTROL SYSTEM USING ACCESS CONTROL TICKET AND MANAGEMENT METHOD--;

In Column 1, lines 1-3 the title should read --MEMORY ACCESS CONTROL SYSTEM USING ACCESS CONTROL TICKET AND MANAGEMENT METHOD--;

In Column 52, line 28, "showh" should read --shown--;

In Column 87, line 20, delete "," after "step";

In Column 127, line 60, "Tf" should read --If--;

Signed and Sealed this

Thirteenth Day of May, 2008

JON W. DUDAS
*Director of the United States Patent and Trademark Office*